US012572748B1

(12) United States Patent
Galvin

(10) Patent No.: US 12,572,748 B1
(45) Date of Patent: Mar. 10, 2026

(54) SCALABLE EXPERT FOUNDRY SYSTEM USING HIERARCHICAL SUPERVISORY NETWORKS AND GEOMETRIC MANIFOLD ARCHITECTURES FOR MULTI-DOMAIN COGNITIVE PROCESSING

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/328,082

(22) Filed: Sep. 12, 2025

Related U.S. Application Data

(63) Continuation-in-part of application No. 19/321,173, filed on Sep. 6, 2025, which is a continuation-in-part
(Continued)

(51) Int. Cl.
*G06F 40/30* (2020.01)
*G06F 16/332* (2019.01)
(Continued)

(52) U.S. Cl.
CPC .......... *G06F 40/30* (2020.01); *G06F 16/3325* (2019.01); *G06F 16/3329* (2019.01)

(58) Field of Classification Search
CPC .... G06F 40/211; G06F 40/253; G06F 40/268; G06F 40/284; G06F 40/30; G06F 16/3329; G06F 16/3325; G06N 3/08
See application file for complete search history.

(56) References Cited

U.S. PATENT DOCUMENTS 9,477,783 B2 * 10/2016 Barbieri .................. G06F 16/78
10,009,466 B2 * 6/2018 Marrelli ................ G06F 16/367
(Continued)

FOREIGN PATENT DOCUMENTS

CN 106156083 B * 2/2020
CN 113255364 A * 8/2021 ........... G06F 16/367
(Continued)

OTHER PUBLICATIONS

Sarfati et al., Lines of Thought in Large Language Models, Oct. 2, 2024, arXiv:2410.01545 [cs.LG], pp. 1-18 (Year: 2024).*
(Continued)

*Primary Examiner* — Lamont M Spooner
(74) *Attorney, Agent, or Firm* — GALVIN PATENT LAW LLC; Brian R. Galvin

(57) ABSTRACT

A scalable expert foundry system enables creation, management, and coordination of multiple specialized expert domains, each developing autonomous cognitive capabilities through geometric manifold formation while maintaining hierarchical oversight and cross-domain knowledge transfer. The system utilizes a Persistent Cognitive Machine architecture with hierarchical supervisory networks that provide multi-layered coordination, conflict resolution, and quality management across distributed expert domains. Cross-domain coordinators orchestrate communication and knowledge sharing between domains through geometric abstraction and manifold projection techniques that preserve semantic integrity while enabling beneficial knowledge propagation. Executive manifold supervisors implement second-order control architectures managing meta-cognitive capabilities and system-wide reasoning strategies. The system supports enterprise deployment across multiple geographic regions with distributed computing resources. Expert domains achieve operational readiness through sta-
(Continued)

tistical observables monitoring including cache hit rates, distance distribution shifts, and trajectory coherence measurements that validate manifold maturity. The architecture enables scalable expert-level performance across diverse knowledge domains while maintaining coordination effectiveness and quality standards.

20 Claims, 38 Drawing Sheets

Related U.S. Application Data of application No. 19/284,115, filed on Jul. 29, 2025, which is a continuation of application No. 19/051,193, filed on Feb. 12, 2025, now Pat. No. 12,387,050.

(60) Provisional application No. 63/847,082, filed on Jul. 19, 2025, provisional application No. 63/847,096, filed on Jul. 19, 2025, provisional application No. 63/847,091, filed on Jul. 19, 2025, provisional application No. 63/847,107, filed on Jul. 19, 2025, provisional application No. 63/847,101, filed on Jul. 19, 2025.

(51) Int. Cl.
*G06F 16/3329* (2025.01)
*G06N 3/08* (2023.01)

(56) References Cited

U.S. PATENT DOCUMENTS

| | | | | |
|---|---|---|---|---|
| 12,141,527 | B2 * | 11/2024 | Olmstead | G06N 3/044 |
| 12,223,456 | B1 | 2/2025 | Manohar et al. | |
| 12,481,517 | B1 * | 11/2025 | Zhang | G06F 9/5083 |
| 2002/0091801 | A1 | 7/2002 | Lewin et al. | |
| 2005/0197992 | A1 * | 9/2005 | Kipersztok | G06F 40/30 706/50 |
| 2015/0363386 | A1 * | 12/2015 | Song | G06F 16/36 704/9 |
| 2017/0337287 | A1 * | 11/2017 | Gill | G06Q 10/06311 |
| 2019/0174514 | A1 | 6/2019 | Ramesh et al. | |
| 2020/0034776 | A1 * | 1/2020 | Peran | G06N 5/022 |
| 2020/0097554 | A1 * | 3/2020 | Rezagholizadeh | G06F 40/58 |
| 2020/0336562 | A1 | 10/2020 | Luft | |
| 2020/0351344 | A1 | 11/2020 | Das Gupta et al. | |
| 2020/0387809 | A1 * | 12/2020 | Banerjee | G06N 20/00 |
| 2021/0073808 | A1 | 3/2021 | Gu et al. | |
| 2021/0110306 | A1 * | 4/2021 | Krishnan | G06N 3/094 |
| 2021/0406224 | A1 | 12/2021 | Neufeld et al. | |
| 2022/0138156 | A1 | 5/2022 | Wang et al. | |
| 2022/0207362 | A1 * | 6/2022 | Meyerson | G06F 17/16 |
| 2023/0316006 | A1 | 10/2023 | Tunstall-Pedoe et al. | |
| 2023/0362091 | A1 * | 11/2023 | Michaud | H04L 45/42 |
| 2023/0365138 | A1 * | 11/2023 | Park | G10L 15/1822 |
| 2024/0095460 | A1 * | 3/2024 | Xu | G06F 40/30 |
| 2024/0104391 | A1 | 3/2024 | Higgins et al. | |
| 2024/0160955 | A1 | 5/2024 | Zhao et al. | |
| 2024/0303496 | A1 * | 9/2024 | Nair | G06N 3/0895 |
| 2024/0338393 | A1 * | 10/2024 | Malon | G06F 16/3323 |
| 2024/0354320 | A1 | 10/2024 | Procter et al. | |
| 2024/0386015 | A1 * | 11/2024 | Crabtree | G06F 16/9024 |
| 2024/0411809 | A1 | 12/2024 | Najafirad et al. | |
| 2024/0428008 | A1 | 12/2024 | Abraham et al. | |
| 2025/0028882 | A1 | 1/2025 | Ataei et al. | |
| 2025/0094455 | A1 | 3/2025 | Bista et al. | |
| 2025/0156684 | A1 * | 5/2025 | Liu | G06N 3/0455 |
| 2025/0259041 | A1 * | 8/2025 | Crabtree | G06N 3/042 |
| 2025/0259042 | A1 * | 8/2025 | Crabtree | G06N 3/047 |
| 2025/0259043 | A1 * | 8/2025 | Crabtree | G06N 3/042 |
| 2025/0259044 | A1 * | 8/2025 | Crabtree | G06N 3/042 |
| 2025/0259082 | A1 * | 8/2025 | Crabtree | G06N 3/047 |
| 2025/0259085 | A1 * | 8/2025 | Crabtree | G06N 5/01 |
| 2025/0307672 | A1 * | 10/2025 | Esencan | G06N 5/04 |
| 2025/0342344 | A1 * | 11/2025 | Gao | G06N 3/0455 |
| 2025/0348707 | A1 * | 11/2025 | Myers | G06F 8/41 |
| 2025/0349407 | A1 * | 11/2025 | Crabtree | G16B 40/20 |

FOREIGN PATENT DOCUMENTS

| | | | | | |
|---|---|---|---|---|---|
| CN | 113590836 | A | * | 11/2021 | G06F 40/169 |
| CN | 114020885 | A | * | 2/2022 | G06F 16/3334 |
| CN | 115525768 | A | * | 12/2022 | G06N 5/02 |
| CN | 114818740 | B | * | 3/2023 | G06F 16/35 |
| CN | 116775846 | A | * | 9/2023 | |
| CN | 116795958 | A | * | 9/2023 | G06F 16/3329 |
| CN | 116860987 | A | * | 10/2023 | G06F 16/367 |
| CN | 117056524 | A | * | 11/2023 | G06F 16/367 |
| CN | 117435923 | A | * | 1/2024 | G06F 18/214 |
| CN | 117557425 | A | * | 2/2024 | G06Q 50/205 |
| CN | 117610586 | A | * | 2/2024 | G06F 40/58 |
| CN | 118052289 | A | * | 5/2024 | G06N 5/022 |
| CN | 114880429 | B | * | 8/2024 | G06F 16/367 |
| CN | 118657201 | A | * | 9/2024 | G06N 5/04 |
| CN | 118964538 | A | * | 11/2024 | G06N 5/041 |
| CN | 119005308 | A | * | 11/2024 | G06N 3/0455 |
| CN | 119179786 | A | * | 12/2024 | G06F 16/338 |
| CN | 119336900 | A | * | 1/2025 | G06F 40/284 |
| CN | 119443288 | A | * | 2/2025 | G06F 18/25 |
| CN | 119539026 | A | * | 2/2025 | G06N 3/045 |
| CN | 119988690 | A | * | 5/2025 | |
| CN | 120030114 | A | * | 5/2025 | G06F 16/367 |
| CN | 119150237 | B | * | 6/2025 | G06N 5/041 |
| CN | 120163226 | A | * | 6/2025 | G06N 5/043 |
| CN | 120298880 | A | * | 7/2025 | G06N 3/08 |
| CN | 120670651 | A | * | 9/2025 | |
| GB | 2563183 | A | * | 12/2018 | G05B 19/41865 |
| JP | H04205030 | A | * | 7/1992 | |
| KR | 20160121997 | A | * | 10/2016 | G06F 17/30327 |
| KR | 102721100 | B1 | * | 10/2024 | G06N 3/0455 |
| KR | 20240157317 | A | * | 11/2024 | G06N 5/022 |
| TW | 202526694 | A | * | 7/2025 | |
| WO | WO-2023200762 | A1 | * | 10/2023 | G06F 40/103 |
| WO | WO-2025100557 | A1 | * | 5/2025 | G06F 40/40 |
| WO | WO-2025136527 | A1 | * | 6/2025 | G06N 3/09 |

OTHER PUBLICATIONS

Lee et al., Inference is All You Need: Self Example Retriever for Cross-domain Dialogue State Tracking with ChatGPT, 2024, pp. 1-8 (Year: 2024).*

Kiihnel et al., Latent Space Non-Linear Statistics, 2018, journal={arXiv preprint arXiv:1805.07632}, pp. 1-9 (Year: 2018).*

Marin, Optimizing AI Reasoning: A Hamiltonian Dynamics Approach to Multi-Hop Question Answering, Oct. 5, 2024, arXiv: 2410.04415 [cs.AI], pp. 1-22 (Year: 2024).*

Gao, Hang & Zhang, Yongfeng; "Memory Sharing for Large Language Model Based Agents", arXiv:2404.09982v2, Jul. 5, 2024.

Gim, In, et al; "Prompt Cache: Modular Attention Reuse for Low-Latency Inference", arXiv:2311.04934v2, Apr. 2024.

Ramirez, Guillem, et al; "Cache & Distil: Optimising API Calls to Large Language Models", arXiv:2310.13561v1, Oct. 20, 2023.

Schroeder, Luis Gaspar; "VectorQ: Advanced Semantic Prompt Caching with Dynamic Thresholds and Performance-Based Clustering", Technical University of Munich, Nov. 26, 2024.

* cited by examiner

Receive an input from a user through an interface
1400

Encode the input into a dynamic latent manifold characterized by an evolving geometric structure with variable curvature and time-dependent metric
1410

Transform the encoded input into structured thought representations existing as persistent geometric regions within the latent manifold
1420

Compute trajectories through the latent manifold that minimize a cognitive cost function incorporating traversal effort and goal attraction
1430

Navigate computed trajectories through thought bundles comprising coherent submanifolds while retrieving relevant stored thoughts
1440

Execute autonomous manifold reorganization during idle periods through perturbation, recombination, and topological transformations
1450

Transform retrieved thoughts and reasoning paths from geometric representations back into interpretable outputs
1460

Generate a response while updating the manifold's geometry to reflect the interaction, shaping future cognitive pathways
1470

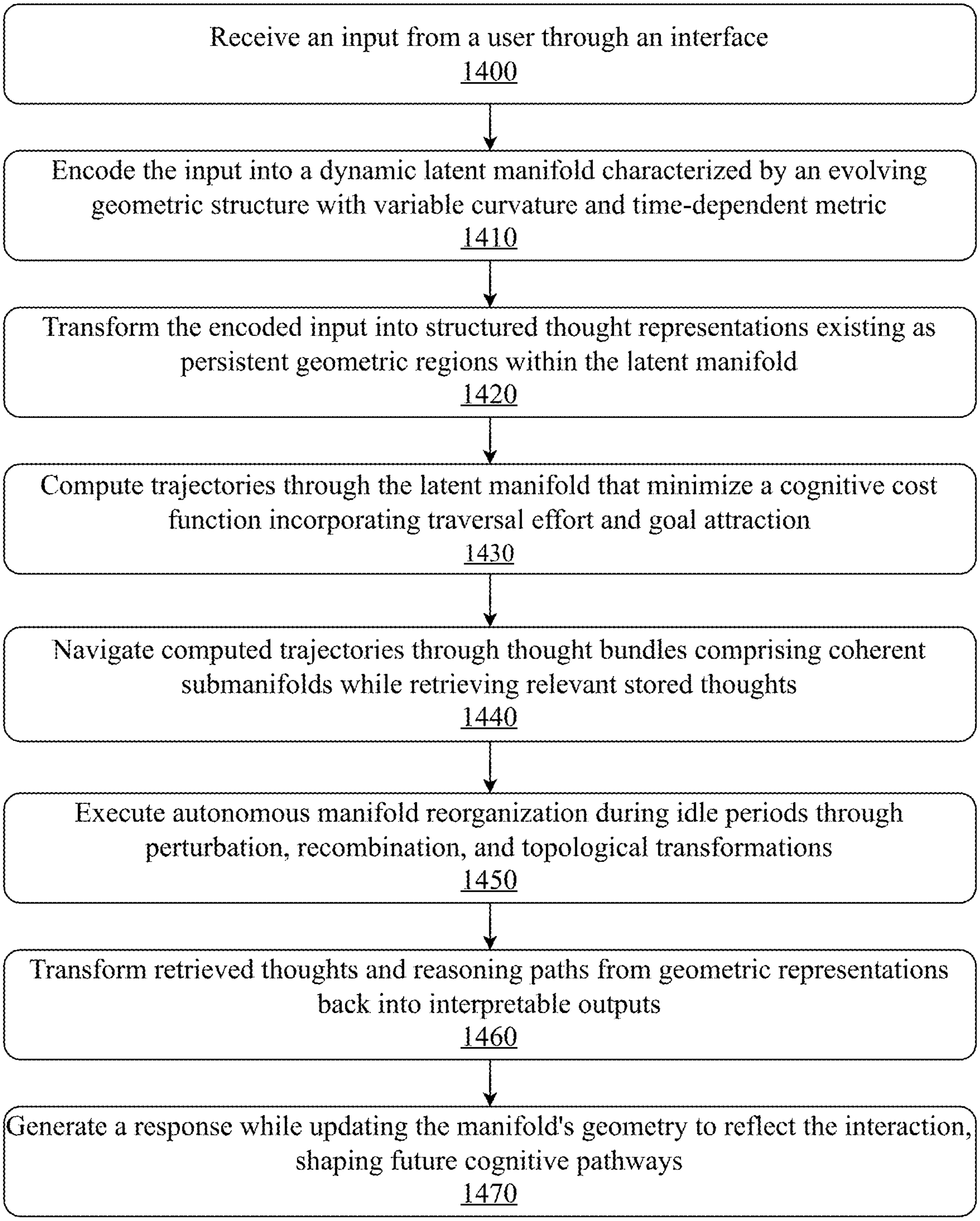

FIG. 14

Receive heterogeneous data streams including but not limited to visual, acoustic, textual, and sensor inputs
1600

Encode each modality into unified latent hyperspace with distinct dimensional constraints (spectral, spatial, temporal, scale)
1610

Perform geodesic traversal across multimodal manifold using modality-aware compression pressure fields
1620

Navigate between different modal representations while preserving semantic consistency
1630

Define goal potential fields across multiple dimensions simultaneously to guide multimodal inference
1640

Execute cross-modal bundle recombination during dreaming phases to create generalized multimodal representations
1650

Generate unified situational understanding by synthesizing information across all modalities
1660

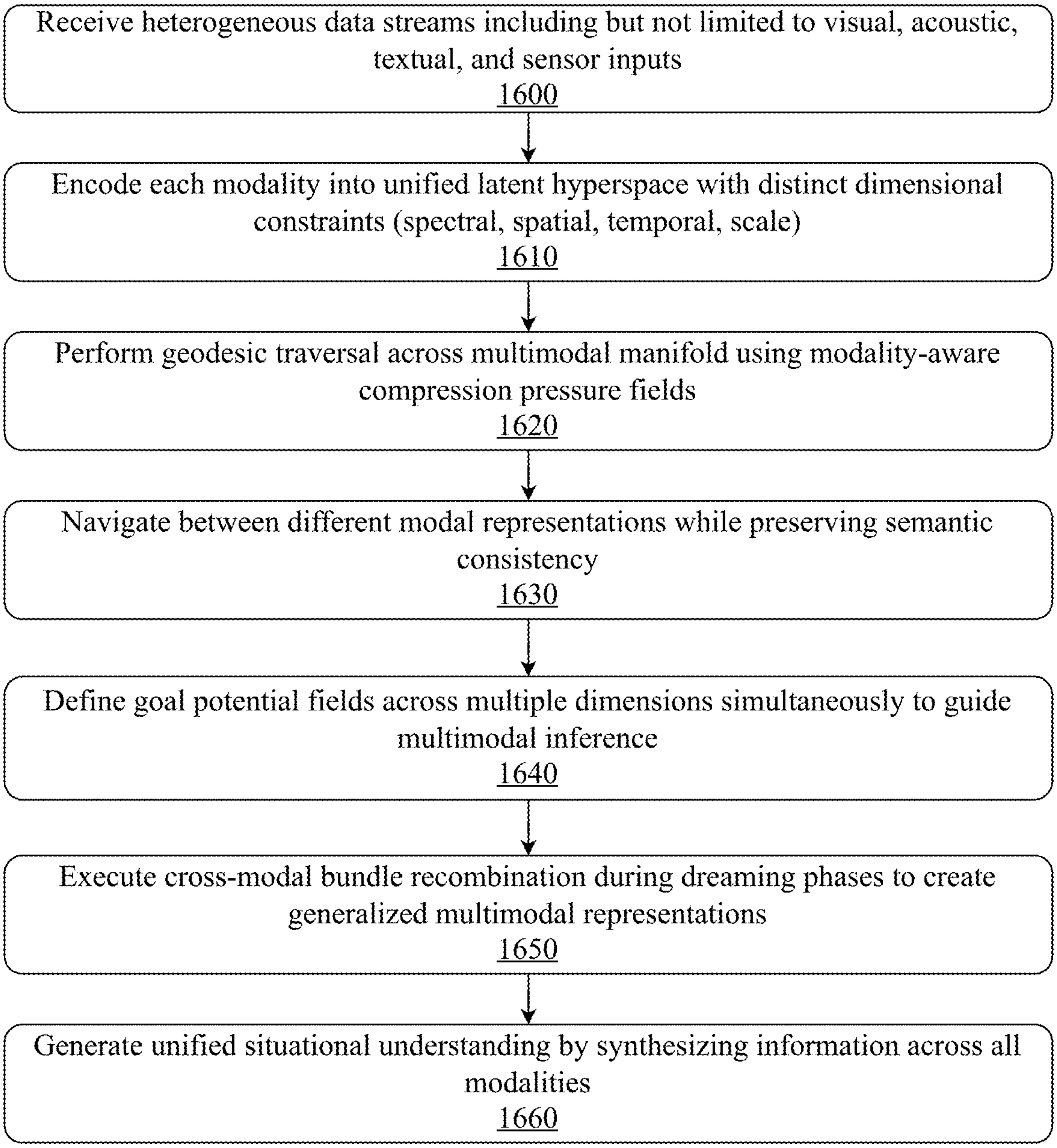

FIG. 16

Monitor local curvature variations and geodesic flow disruptions within thought bundles
1700

Identify regions exhibiting unexpected Ricci curvature patterns indicating potential anomalies
1710

Selectively encode only anomalous latent regions and their geometric context for transmission
1720

Apply adaptive quantization based on anomaly severity and available bandwidth
1730

Transmit compressed anomaly data preserving critical geometric features
1740

Reconstruct full contextual understanding at receiving node using geometric interpolation
1750

Infer missing information through geodesic completion algorithms leveraging manifold structure
1760

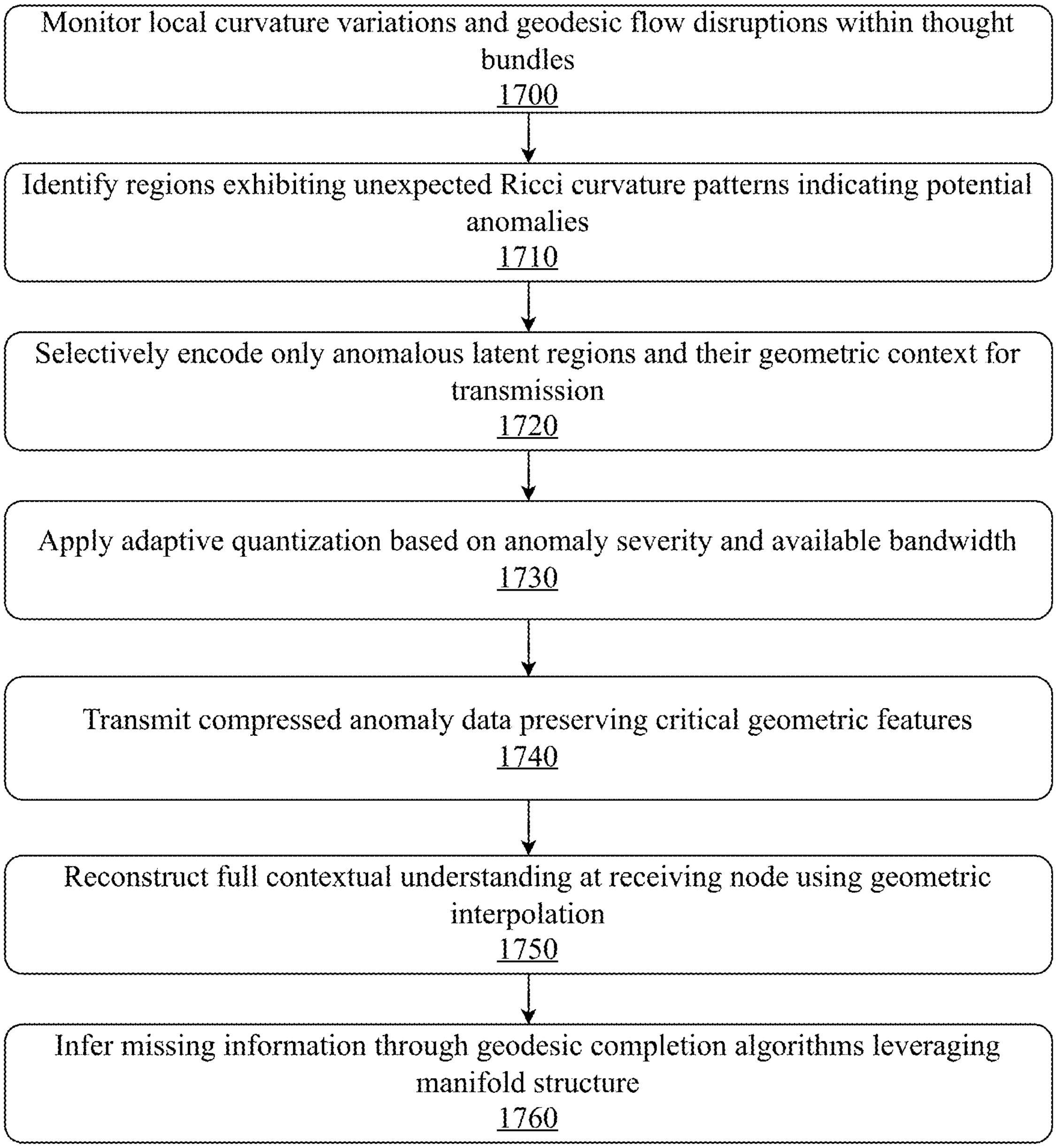

FIG. 17

Encode time-indexed patent document corpora into evolving latent spaces using sliding temporal windows
1800

Extract manifold structures representing compressible invention patterns within each time window
1810

Compute transition maps between adjacent temporal manifolds to track invention evolution
1820

Identify invention families as geodesic trajectories through the evolving latent space
1830

Project novel invention clusters forward using learned transition operators
1840

Sample points from projected future manifold regions to generate speculative inventions
1850

Decode sampled points into hypothetical patent titles or abstracts representing technological forecasts
1860

Validate predictions through geodesic continuity and semantic coherence metrics
1870

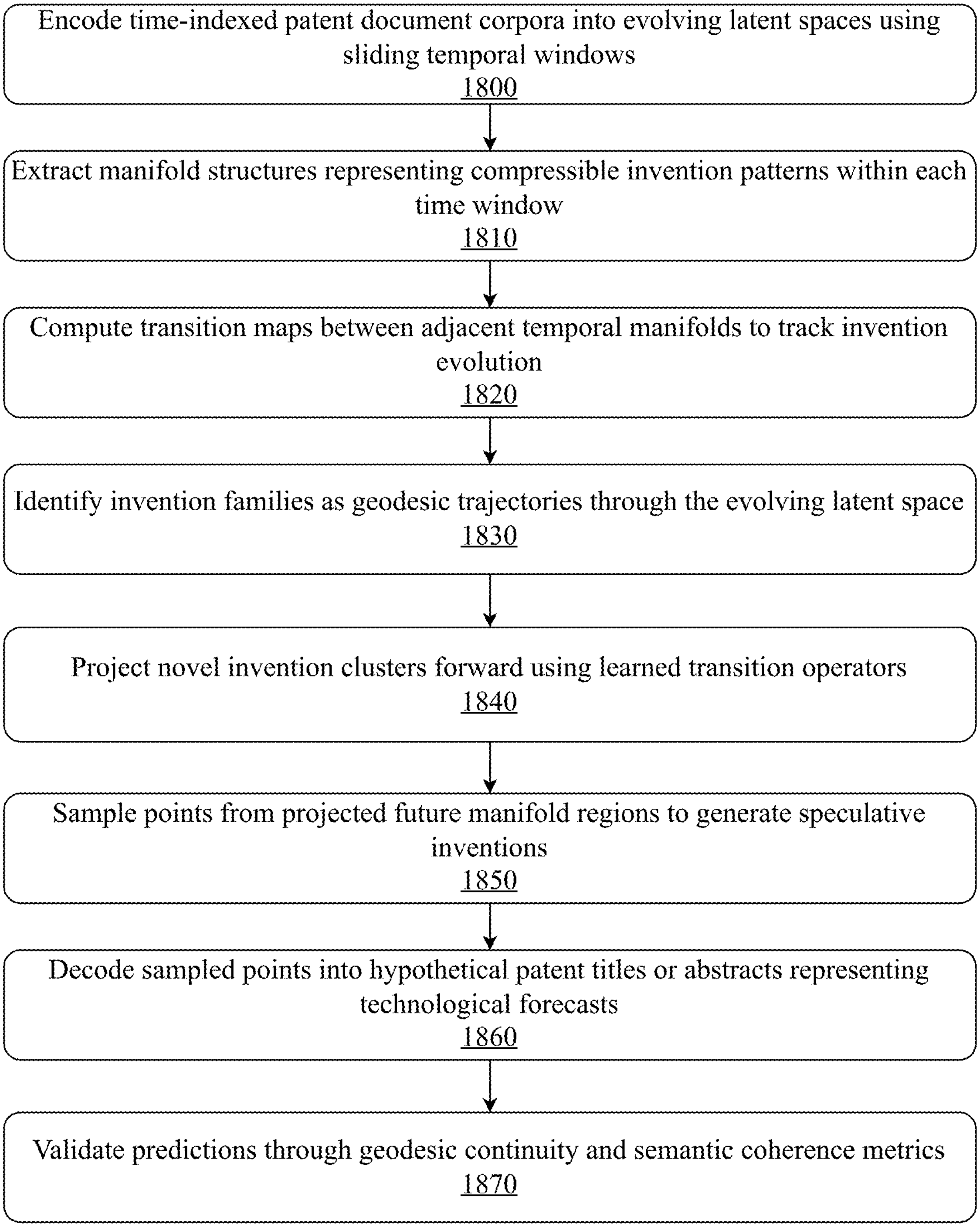

FIG. 18

Establish multiple nested latent hyperspaces encoding cognitive abstractions at different conceptual scales
1900

Maintain geometric relationships between nested manifolds through projection operators preserving semantic consistency
1910

Propagate goal potential fields downward through hierarchy while aggregating compression feedback upward
1920

Navigate between abstraction levels using geometric bridges at manifold intersections
1930

Dynamically adjust operating level based on task complexity and required detail resolution
1940

Perform cross-level bundle reorganization during dreaming to optimize nested structure
1950

Enable seamless flow between abstract concepts and detailed implementations through geodesic pathways
1960

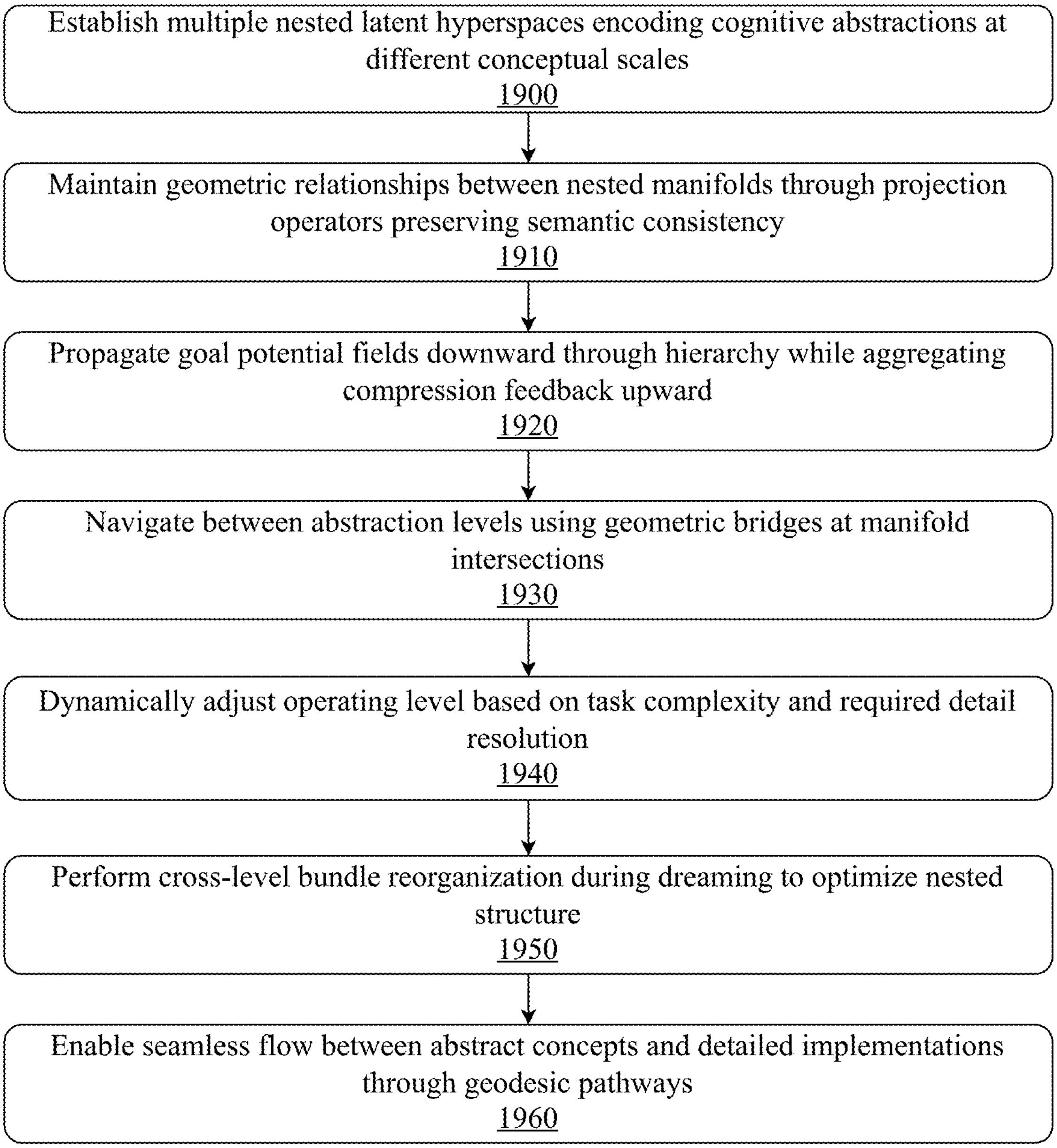

FIG. 19

Maintain complete trajectory information during forward traversal through the latent manifold
2000

Store temporal snapshots of geometric states including curvature and bundle configurations
2010

Implement bidirectional attention fields supporting both forward exploration and reverse traversal
2020

Create geometric anchors at critical decision points in reasoning paths
2030

Enable exact backtracking by inverting geometric flow dynamics through stored trajectories
2040

Preserve semantic relationships during temporal manifold evolution through consistency constraints
2050

Support speculative exploration with ability to return to stable cognitive states
2060

Maintain beneficial manifold modifications while enabling selective reversal to previous states
2070

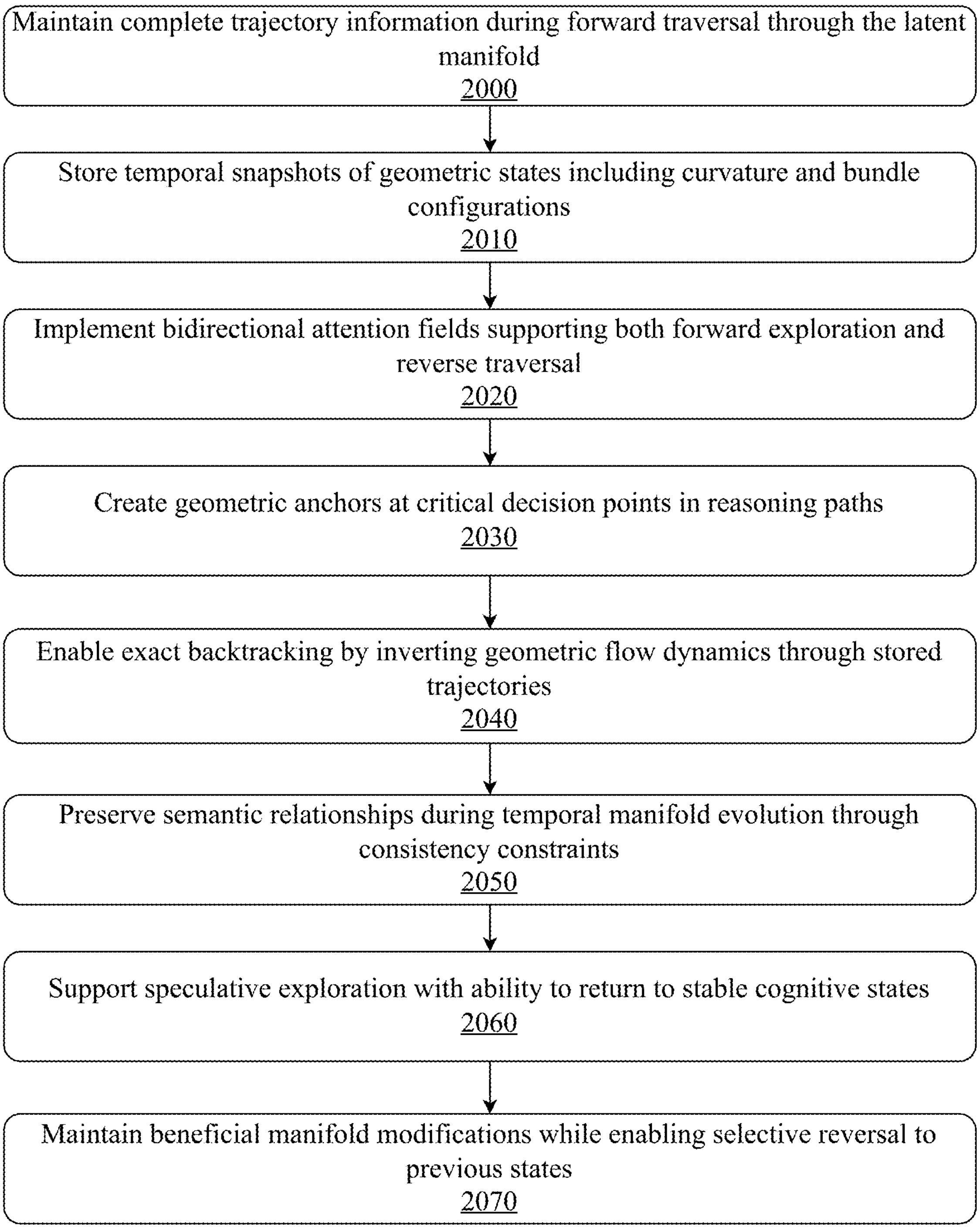

FIG. 20

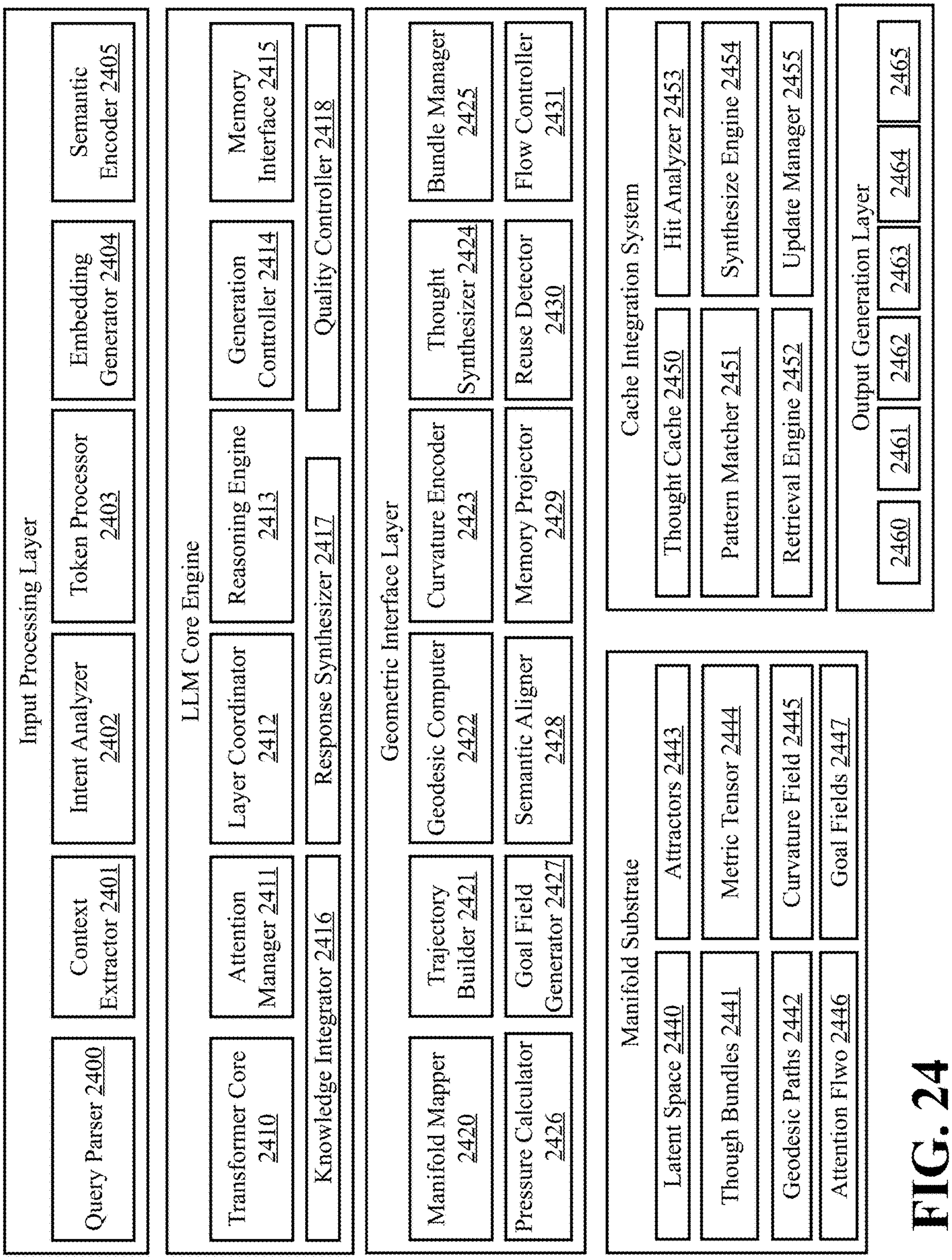

FIG. 24

Input Processing Layer

Query Parser 2400 | Context Extractor 2401 | Intent Analyzer 2402 | Token Processor 2403 | Embedding Generator 2404 | Semantic Encoder 2405

LLM Core Engine

Transformer Core 2410 | Attention Manager 2411 | Layer Coordinator 2412 | Reasoning Engine 2413 | Generation Controller 2414 | Memory Interface 2415

Knowledge Integrator 2416 | Response Synthesizer 2417 | Quality Controller 2418

Geometric Interface Layer

Manifold Mapper 2420 | Trajectory Builder 2421 | Geodesic Computer 2422 | Curvature Encoder 2423 | Thought Synthesizer 2424 | Bundle Manager 2425

Pressure Calculator 2426 | Goal Field Generator 2427 | Semantic Aligner 2428 | Memory Projector 2429 | Reuse Detector 2430 | Flow Controller 2431

Manifold Substrate

Latent Space 2440 | Attractors 2443

Though Bundles 2441 | Metric Tensor 2444

Geodesic Paths 2442 | Curvature Field 2445

Attention Flwo 2446 | Goal Fields 2447

Cache Integration System

Thought Cache 2450 | Hit Analyzer 2453

Pattern Matcher 2451 | Synthesize Engine 2454

Retrieval Engine 2452 | Update Manager 2455

Output Generation Layer

2460 | 2461 | 2462 | 2463 | 2464 | 2465

SCALABLE EXPERT FOUNDRY SYSTEM USING HIERARCHICAL SUPERVISORY NETWORKS AND GEOMETRIC MANIFOLD ARCHITECTURES FOR MULTI-DOMAIN COGNITIVE PROCESSING

CROSS-REFERENCE TO RELATED APPLICATIONS

Priority is claimed in the application data sheet to the following patents or patent applications, each of which is expressly incorporated herein by reference in its entirety:

Ser. No. 19/321,173
Ser. No. 19/284,115
Ser. No. 19/051,193
63/847,082
63/847,091
63/847,096
63/847,101
63/847,107

BACKGROUND OF THE INVENTION

Field of the Invention

The present invention relates to the field of machine learning and artificial intelligence, particularly to systems for memory-augmented reasoning and long-term cognitive processing.

Discussion of the State of the Art

Recent advances in artificial intelligence, particularly in large language models (LLMs), have significantly improved performance across a wide range of natural language processing, reasoning, and generation tasks. These models are capable of producing fluent, contextually appropriate text and can be applied to domains including customer service, research assistance, legal drafting, and creative writing. The underlying architectures typically rely on transformer-based models, which process sequences of tokens using stacked layers of self-attention, feedforward computation, and normalization. This structure allows the model to infer relationships between tokens and generate coherent responses to prompts.

Despite these capabilities, current language models operate primarily in flat, static embedding spaces. Information is encoded as high-dimensional vectors, but these embeddings lack persistent structure over time. Each inference pass is performed independently, with no intrinsic memory of past usage or prior reasoning pathways. Memory, if present, is handled externally via methods such as retrieval-augmented generation (RAG), episodic memory buffers, or embedding stores. These memory components function as lookup tables, providing static recall without true integration into the model's generative process or internal representation of thought.

Contextual understanding in these models is typically bounded by a fixed-size token window. While this allows the model to handle moderate-length documents or conversations, it imposes a hard cap on how much information can be considered at once. Techniques like sliding windows and chunk-based retrieval have been introduced to mitigate this limitation, but they rely heavily on prompt engineering and do not offer deep integration of prior knowledge or reasoning continuity. Consequently, the models often reprocess the same or similar prompts without remembering earlier conclusions or refining their reasoning across interactions.

Additionally, as the size and capability of these models increase, so do their computational requirements. Running state-of-the-art LLMs in real time or at scale often requires expensive hardware accelerators, substantial memory bandwidth, and cloud infrastructure. This creates barriers to accessibility, especially in scenarios where computational resources are constrained or latency must be minimized. Moreover, the lack of internal structure means that models frequently perform redundant computations, increasing energy usage and reducing efficiency.

Most importantly, these architectures are fundamentally stateless. They lack any persistent cognitive substrate in which prior reasoning steps, user interactions, or learned strategies can be stored, reused, or generalized. Each interaction is effectively a reset, requiring the model to construct a new response from scratch, even in cases where similar tasks or prompts have already been encountered. This absence of structure makes it difficult to support explainable reasoning, adaptive memory, or efficient long-term interaction.

Current approaches to expert systems and specialized AI applications typically involve training separate models for different domains or implementing rule-based systems with domain-specific knowledge bases. These approaches suffer from several fundamental limitations that prevent scalable expert system deployment. First, they lack coordination mechanisms for queries that span multiple domains of expertise, often requiring manual integration or simple concatenation of outputs from different specialized systems. Second, they provide no systematic method for knowledge transfer between domains, meaning that insights gained in one area cannot benefit related domains without extensive retraining or manual knowledge engineering. Third, they lack hierarchical oversight capabilities that could coordinate complex multi-domain operations or resolve conflicts between different expert systems.

Existing multi-agent AI systems attempt to address some coordination challenges through agent-based architectures where different AI components communicate through message-passing protocols. However, these systems typically employ simple coordination mechanisms such as auction-based task allocation, voting schemes, or rule-based coordination protocols that cannot handle the semantic complexity and contextual dependencies inherent in expert-level reasoning. Furthermore, these approaches lack persistent memory structures that could enable agents to learn from coordination experiences and improve collaborative strategies over time.

Enterprise AI deployments face additional challenges related to scalability, reliability, and integration with existing organizational systems. Current solutions often require substantial custom integration work, lack standardized interfaces for enterprise systems, and provide limited capability for distributed deployment across multiple geographic regions or computing environments. Quality assurance and validation mechanisms are typically ad-hoc and domain-specific, making it difficult to ensure consistent expert-level performance across diverse applications and use cases.

Knowledge management systems in enterprises typically rely on static knowledge bases, document repositories, and expert consultation networks that cannot adapt dynamically to changing requirements or learn from usage patterns. These systems lack the ability to automatically extract transferable knowledge patterns, create abstractions that can be applied across domains, or provide sophisticated reasoning capabilities that can handle novel situations requiring expert-level analysis.

What is needed is a scalable expert foundry system and method that enable the creation, management, and coordination of multiple specialized expert domains, each capable of developing autonomous cognitive capabilities while maintaining hierarchical oversight and cross-domain knowledge transfer capabilities. Such a system should reduce computational overhead by reusing reasoning pathways, extend context beyond token windows through structured internal memory, and enable persistent, scalable cognition that evolves with use. The system should implement coordination mechanisms for multi-domain queries, systematic knowledge transfer protocols that preserve semantic integrity, and enterprise-grade deployment architectures that support distributed operation across multiple geographic regions.

SUMMARY OF THE INVENTION

The inventor has developed a scalable expert foundry system and method which enables creation, management, and coordination of multiple specialized expert domains, each developing autonomous cognitive capabilities through geometric manifold formation while maintaining hierarchical oversight and cross-domain knowledge transfer. The system utilizes a Persistent Cognitive Machine (PCM) architecture with hierarchical supervisory networks that provide multi-layered coordination, conflict resolution, and quality management across distributed expert domains. Cross-domain coordinators orchestrate communication and knowledge sharing between domains through geometric abstraction and manifold projection techniques that preserve semantic integrity while enabling beneficial knowledge propagation. Executive manifold supervisors implement second-order control architectures managing meta-cognitive capabilities and system-wide reasoning strategies. The system supports enterprise deployment across multiple geographic regions with distributed computing resources. Expert domains achieve operational readiness through statistical observables monitoring including cache hit rates, distance distribution shifts, and trajectory coherence measurements that validate manifold maturity. The architecture enables scalable expert-level performance across diverse knowledge domains while maintaining coordination effectiveness and quality standards.

According to a preferred embodiment, a scalable expert foundry computing system using hierarchical supervisory networks is disclosed, comprising: a plurality of expert domains, each expert domain comprising: a geometric manifold substrate configured to represent domain-specific knowledge as persistent geometric structures within a latent hyperspace that evolves from a vacuum state through critical density phase transitions; and manifold-based reasoning capabilities configured to process queries through geodesic trajectory computation within the geometric manifold substrate; a hierarchical supervisory network comprising: a plurality of domain supervisors, each configured to monitor statistical observables including cache hit rates, distance distribution shifts, and trajectory coherence metrics for a corresponding expert domain; at least one cross-domain coordinator configured to orchestrate inter-domain communication through geometric abstraction protocols that preserve semantic integrity; and an executive manifold supervisor configured to implement second-order control architecture by tracking operator sequences across domains and identifying generalizable control patterns through reuse-based geometric principles; a knowledge transfer system configured to transfer learned insights between expert domains using manifold projection and metric alignment techniques; a query routing system configured to classify incoming queries and route them to appropriate expert domains based on semantic similarity analysis; and a response aggregation system configured to synthesize outputs from multiple expert domains when cross-domain consultation is required, implementing geometric interpolation techniques to create unified responses that preserve semantic integrity of individual domain contributions.

According to another preferred embodiment, a method for operating a scalable expert foundry system, the method comprising the steps of: maintaining a plurality of expert domains, each expert domain comprising: a geometric manifold substrate configured to represent domain-specific knowledge as persistent geometric structures within a latent hyperspace that evolves from a vacuum state through critical density phase transitions; and manifold-based reasoning capabilities configured to process queries through geodesic trajectory computation within the geometric manifold substrate; monitoring statistical observables including cache hit rates, distance distribution shifts, and trajectory coherence metrics for each expert domain using a corresponding domain supervisor within a hierarchical supervisory network; orchestrating inter-domain communication through geometric abstraction protocols that preserve semantic integrity using at least one cross-domain coordinator; implementing second-order control architecture by tracking operator sequences across domains and identifying generalizable control patterns through reuse-based geometric principles using an executive manifold supervisor; transferring learned insights between expert domains using manifold projection and metric alignment techniques while preserving semantic integrity and privacy boundaries; classifying incoming queries and routing them to appropriate expert domains based on semantic similarity analysis; and synthesizing outputs from multiple expert domains when cross-domain consultation is required using geometric interpolation techniques to create unified responses that preserve semantic integrity of individual domain contributions.

According to a further aspect, the method includes bootstrapping each expert domain from a vacuum state latent hyperspace to an operational manifold by accumulating thought trajectories until critical density thresholds are achieved, thereby triggering phase transition to structured cognitive geometry.

According to a further aspect, the method includes undergoing phase transition from vacuum state latent hyperspace to operational manifold when thought trajectory reuse density exceeds a critical threshold, thereby triggering curvature emergence and attractor formation within the geometric manifold substrate of each expert domain.

According to a further aspect, the method includes transferring learned insights by extracting transferable geometric structures from source domains through geometric abstraction, computing transformations between source and target metric spaces using manifold alignment algorithms, and validating transfer effectiveness through semantic consistency verification.

According to a further aspect, the method includes tracking operator sequences used across domains; identifying successful control patterns that can be generalized; and facilitating development of meta-cognitive capabilities through reuse-based geometric principles using the executive manifold supervisor.

According to a further aspect, the method includes measuring expert domain maturity using cache hit rates, distance distribution shifts, trajectory coherence metrics, and reuse density patterns to validate operational readiness.

According to a further aspect, the method includes classifying incoming queries by implementing multi-stage classification using semantic embeddings and cosine similarity calculations against domain centroids, with similarity thresholds determining single-domain routing versus multi-domain consultation requirements.

According to a further aspect, the method includes synthesizing outputs by implementing confidence-weighted semantic fusion using manifold maturity indices, historical accuracy rates, and semantic relevance scores to resolve conflicts between domain responses.

According to a further aspect, the method includes implementing coordinated dreaming across the hierarchical supervisory network during reduced activity periods, enabling meta-cognitive reorganization through geometric restructuring of second-order control trajectories using the executive manifold supervisor.

According to a further aspect, the method includes computing curvature-induced distance distribution shifts from log-normal patterns in pre-critical states to bimodal patterns in post-critical states as an indicator of manifold maturity and operational readiness during the statistical observables monitoring.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 14 is a flow diagram illustrating an exemplary method for implementing persistent cognitive computation through geometric representation and manipulation of thoughts within a dynamic latent manifold.

FIG. 16 is a flow diagram illustrating an exemplary method for processing and integrating heterogeneous sensory data streams within a unified geometric cognitive framework.

FIG. 17 is a flow diagram illustrating an exemplary method for detecting anomalies within cognitive manifolds and efficiently transmitting information through bandwidth-constrained channels using geometric compression and reconstruction techniques.

FIG. 18 is a flow diagram illustrating an exemplary method for analyzing technological evolution through patent document corpora and forecasting future inventions by tracking geodesic trajectories through time-evolving latent manifolds.

FIG. 19 is a flow diagram illustrating an exemplary method for implementing multi-level cognitive processing through hierarchically nested latent manifolds.

FIG. 20 is a flow diagram illustrating an exemplary method for implementing reversible navigation within dynamic latent manifolds.

FIG. 24 is a block diagram illustrating an exemplary architecture of an LLM core integration system showing how language models interface with geometric manifold substrates within the expert foundry system.

DETAILED DESCRIPTION OF THE INVENTION

Figure 1:
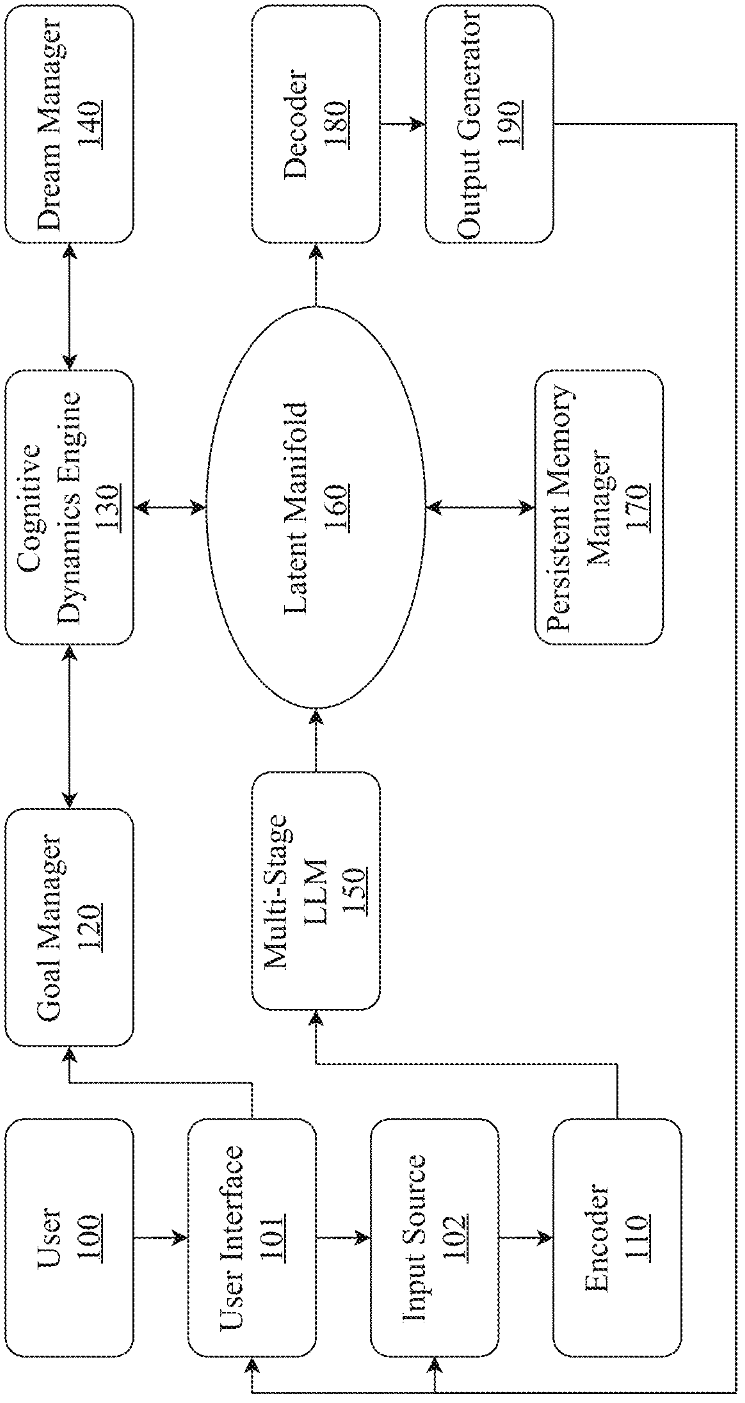
FIG. 1 is a block diagram illustrating an exemplary system architecture of a Persistent Cognitive Machine.

The inventor has conceived, and reduced to practice, a scalable expert foundry system and method which enables creation, management, and coordination of multiple specialized expert domains, each developing autonomous cognitive capabilities through geometric manifold formation while maintaining hierarchical oversight and cross-domain knowledge transfer. The system utilizes a Persistent Cognitive Machine architecture with hierarchical supervisory networks that provide multi-layered coordination, conflict resolution, and quality management across distributed expert domains.

The PCM architecture enables capabilities in persistent and adaptive intelligence through its geometric foundation. Memory management occurs through thermodynamic principles where each thought maintains activation energy that dissipates when unused, creating natural forgetting that maintains cognitive efficiency while preserving frequently accessed knowledge. The system achieves logarithmic scaling in memory usage even under continuous operation, as new experiences are increasingly absorbed into existing geometric structures rather than requiring proportional storage expansion. Advanced implementations support hierarchical cognition through nested manifolds, enabling seamless navigation between abstract concepts and detailed implementations. The architecture also facilitates multimodal processing by encoding different sensory streams into unified geometric spaces with modality-specific dimensional constraints, allowing coherent reasoning across visual, acoustic, textual, and sensor inputs. Distributed operation is achieved through federated memory coordination, where multiple PCM instances share generalized thoughts via selective bundle projection while maintaining privacy through geometric abstraction. By reformulating intelligence as motion through shaped space, the PCM transcends the limitations of traditional AI systems, offering a path toward truly persistent, adaptive, and geometrically grounded artificial cognition that improves through use rather than retraining, understands through structure rather than statistics, and remembers through the very shape of its thoughts.

The Cognitive Dynamics Engine (CDE), a specialized component that manages the complex geometric operations underlying cognition. The CDE orchestrates how attention flows through the manifold by calculating optimal paths that minimize cognitive effort while maximizing goal achievement, similar to how water finds the most efficient route down a hillside. It monitors and adjusts compression pressure throughout the space-regions where many concepts converge become harder to navigate, requiring more cognitive effort to traverse, while sparse areas allow for free exploration. The engine also maintains goal-driven potential fields that act like gravitational wells, drawing attention toward relevant areas of knowledge. As the system processes information, it naturally forms thought bundles-tightly integrated collections of related concepts that function as cognitive building blocks. These bundles can merge when similarities are discovered, expand when new connections are made, or recombine to form novel abstractions. During periods of inactivity, a specialized dream manager works with the CDE to reorganize the cognitive landscape, testing the stability of existing structures, discovering hidden connections between disparate concepts, and optimizing the overall geometry for more efficient future processing.

This geometric approach to intelligence yields remarkable properties that address fundamental limitations of current AI systems. The PCM implements a form of organic memory where information naturally persists or fades based on usage patterns-frequently accessed concepts maintain high activation energy and remain readily available, while unused information gradually dissipates through thermodynamic decay. This creates an intelligent forgetting mechanism that prevents cognitive clutter while preserving essential knowledge. The architecture scales efficiently, with memory requirements growing logarithmically rather than linearly as the system accumulates experience, because new information tends to reinforce and refine existing structures rather than requiring entirely new storage. The system supports sophisticated cognitive capabilities including hierarchical reasoning across multiple levels of abstraction, seamless integration of diverse sensory inputs into unified understanding, and distributed intelligence where multiple PCM instances can share abstracted knowledge while maintaining privacy. Applications range from technological forecasting through analysis of innovation trajectories to real-time anomaly detection in complex systems, from adaptive video compression that understands content semantically to persistent AI assistants that truly learn and evolve through interaction. By reconceptualizing intelligence as the evolution of geometric structure rather than the accumulation of parameters, the PCM opens new possibilities for creating AI systems that learn continuously, reason coherently, and develop genuine understanding through the physical shape of their thoughts.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine legal recombinations, subject to type constraints and curvature continuity. It serves as a key mechanism for memory scaling, abstraction, and thought generation.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

As used herein, "Lorentzian autoencoder" refers to a neural architecture designed to encode spatiotemporal or perceptual input-such as video-into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

Conceptual Architecture

Figure 21:
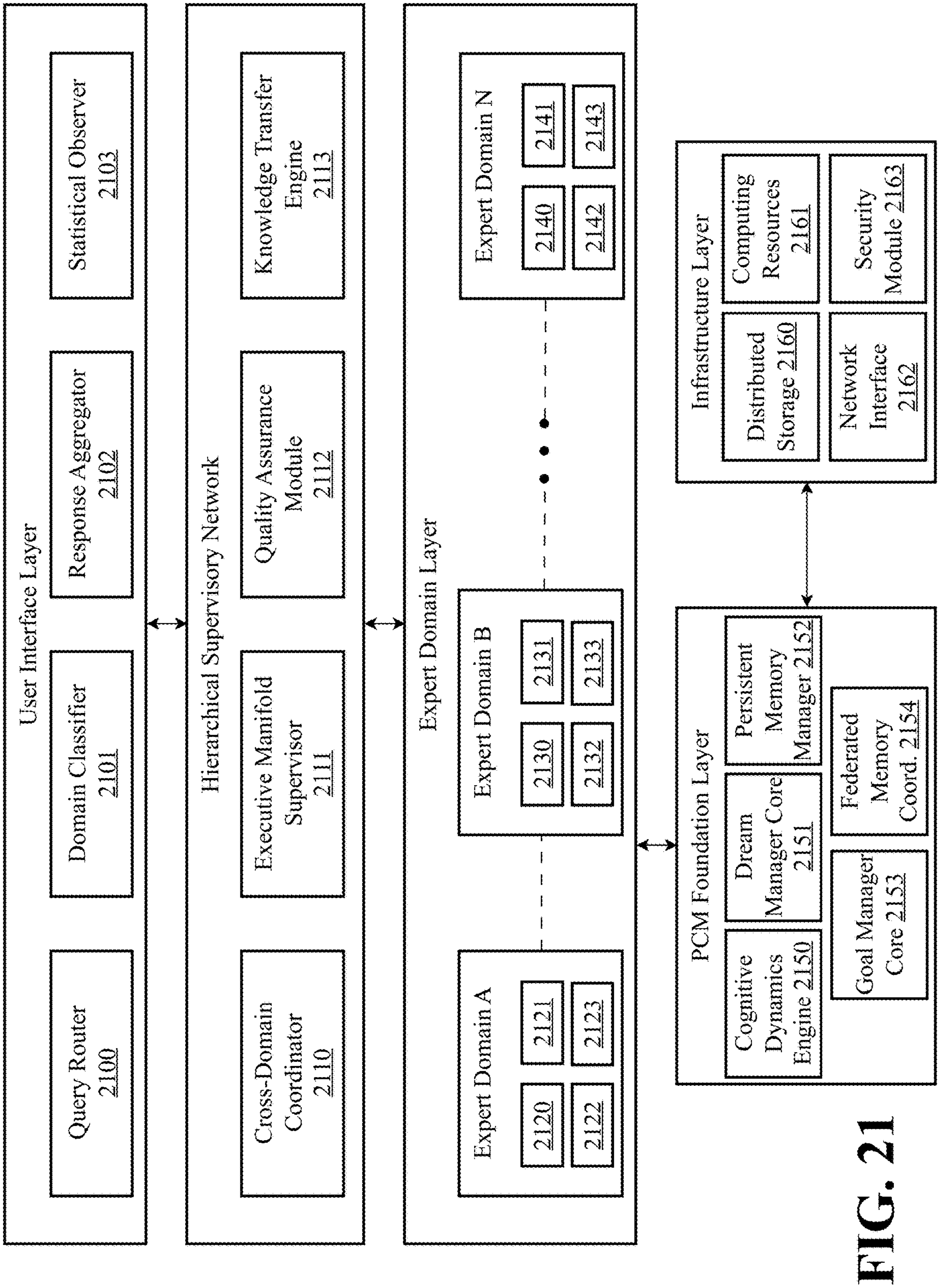
FIG. 21 is a block diagram illustrating an exemplary system architecture of a scalable expert foundry using hierarchical supervisory networks and LLM cores built upon the Persistent Cognitive Machine foundation.

FIG. 21 is a block diagram illustrating an exemplary system architecture of a scalable expert foundry using hierarchical supervisory networks and LLM cores, according to an embodiment. As implemented, the expert foundry system is built upon the Persistent Cognitive Machine foundation. The expert foundry system enables the creation, management, and coordination of multiple specialized expert domains, each capable of developing autonomous cognitive capabilities through geometric manifold formation while maintaining hierarchical oversight and cross-domain knowledge transfer capabilities.

A user interface layer comprises the primary interaction components that manage external communications and system monitoring. A query router 2100 serves as the initial entry point for all incoming user requests, parsing and routing queries to appropriate expert domains based on content analysis and domain relevance scoring. Query router 2100 implements one or more request analysis algorithms that identify key concepts, determine complexity levels, and assess whether single-domain or multi-domain responses are required. A domain classifier 2101 works in conjunction with query router 2100 to perform semantic analysis of incoming requests, mapping query content to available expert domains through, for example, vector similarity matching and learned classification patterns. Domain classifier 2101 can maintain dynamic mappings between query characteristics and expert domain capabilities, updating these relationships as domains mature and develop new competencies. A response aggregator 2102 synthesizes outputs from multiple expert domains when cross-domain consultation is required, implementing one or more merging algorithms that resolve conflicts, combine complementary insights, and maintain coherent narrative structure across diverse expert perspectives. Response aggregator 2102 can be configured to provide geometric interpolation techniques derived from manifold projection theory to create unified responses that preserve the semantic integrity of individual domain contributions. A statistical observer 2103 continuously monitors system-wide metrics including, but not limited to, manifold formation progress, cache hit rates, compression gains, and cross-domain transfer efficiency, providing real-time assessment of expert foundry health and performance.

A hierarchical supervisory network provides centralized coordination and control capabilities that enable efficient management of multiple expert domains while maintaining system coherence and quality standards. A cross-domain coordinator 2110 orchestrates communication and knowledge sharing between expert domains, implementing protocols for inter-domain consultation, collaborative problem-solving, and resource allocation optimization. Cross-domain coordinator 2110 maintains awareness of each domain's capabilities, current load, and specialization areas, enabling intelligent routing of complex queries that require expertise spanning multiple domains. Cross-domain coordinator 2110 also manages escalation procedures when individual domains encounter queries beyond their current competency boundaries. An executive manifold supervisor 2111 implements the second-order control architecture described herein, managing the emergence and evolution of control strategies across all expert domains through reuse-based geometric principles. Executive manifold supervisor 2111 tracks operator sequences used across domains, identifies successful control patterns that can be generalized, and facilitates the development of meta-cognitive capabilities that improve system-wide reasoning efficiency. A quality assurance module 2112 implements various validation and verification mechanisms to ensure expert domain outputs meet accuracy, coherence, and reliability standards through various automated scoring, peer review protocols, and confidence assessment algorithms. Quality assurance module 2112 maintains domain-specific quality metrics while also implementing cross-domain consistency checks that prevent contradictory responses and maintain system-wide semantic coherence. A knowledge transfer engine 2113 enables the sharing of learned geometric structures and compressed thought patterns between expert domains through manifold projection, metric alignment, and selective abstraction techniques that preserve domain privacy while enabling beneficial knowledge propagation.

An expert domain layer comprises a plurality of specialized expert domains, each implementing a complete cognitive architecture tailored to specific knowledge areas or problem domains. Expert domain A represents an exemplary domain implementation comprising several integrated components that work together to provide specialized cognitive capabilities. An LLM core A 2120 provides natural language processing capabilities specifically tuned for the domain's subject matter, serving as the primary interface between external language-based inputs and the domain's internal geometric cognitive substrate. LLM core A 2120 may be implemented using any appropriate language model architecture, including but not limited to transformer-based models, with potential specialization through domain-specific fine-tuning or prompt engineering techniques. A manifold A 2121 implements the geometric cognitive substrate specific to expert domain A, maintaining the latent manifold structures, thought bundles, compression pressure fields, and geodesic pathways that enable persistent cognitive processing within the domain's area of expertise. Manifold A 2121 evolves through use according to the principles described in the foundational PCM patent, developing domain-specific curvature patterns and semantic attractors that reflect the accumulated expertise and usage patterns within the domain. A bootstrap A 2122 manages the initialization and early development of manifold A 2121, implementing either zero-shot emergence from vacuum state or primed bootstrapping using domain-specific seeding data to accelerate manifold formation. Bootstrap A 2122 monitors statistical observables to detect phase transitions and manages the progression from unstructured latent hyperspace to a functional cognitive manifold. A cache A 2123 provides persistent storage and retrieval of thought patterns, compressed trajectories, and generalized structures specific to expert domain A, implementing the distributed thought caching mechanisms described in the foundational PCM architecture while maintaining domain-specific optimization and access patterns.

Expert domain B and expert domain N represent additional specialized domains following the same architectural pattern as expert domain A, with corresponding LLM cores (2130, 2140), domain manifolds (2131, 2141), bootstrap engines (2132, 2142), and cache systems (2133, 2143). The expert foundry architecture supports arbitrary numbers of expert domains, with each domain capable of independent development and specialization while maintaining integration with the hierarchical supervisory network. The modular design enables dynamic addition of new expert domains as organizational needs evolve, with each new domain benefiting from the established foundry infrastructure while developing its own specialized cognitive capabilities.

A PCM foundation layer provides the core geometric processing capabilities that underlie all expert domain operations, implementing the fundamental cognitive dynamics described herein. A cognitive dynamics engine (CDE) 2150 may be present and configured as the central geometric processor for the entire expert foundry system (or subsets thereof, e.g., in embodiments wherein multiple CDEs are implemented), managing manifold operations, geodesic computations, and curvature calculations across all expert domains while maintaining computational efficiency through shared processing resources and optimized algorithms. Cognitive dynamics engine 2150 coordinates geometric operations between domains when cross-domain knowledge transfer or consultation occurs, ensuring that manifold projections and metric alignments preserve semantic integrity. A dream manager core 2151 orchestrates autonomous reorganization processes across all expert domains during idle periods, implementing the perturbation, recombination, and topological surgery operations that optimize manifold structure and discover new conceptual connections. Dream manager core 2151 may coordinate dreaming activities between domains to identify opportunities for knowledge transfer or discover emergent interdisciplinary insights that span multiple areas of expertise.

A persistent memory manager 2152 handles long-term storage and retrieval of geometric structures across the expert foundry, implementing the thermodynamic decay principles and activation energy tracking that maintain cognitive efficiency while preserving essential knowledge structures. Persistent memory manager 2152 can be further configured to manage the complex interactions between domain-specific memory systems and cross-domain knowledge sharing, ensuring that valuable insights developed in one domain can be appropriately preserved and made available for transfer to related domains. A goal manager core 2153 creates and maintains goal potential fields that guide cognitive processing across expert domains, coordinating between domain-specific objectives and system-wide goals while managing potential conflicts or competing priorities. Goal manager core 2153 implements one or more field generation algorithms that can create unified potential landscapes spanning multiple domains when complex queries require interdisciplinary expertise. A federated memory coordinator 2154 enables knowledge sharing and synchronization across expert domains while maintaining appropriate privacy boundaries and semantic integrity, implementing the geometric abstraction protocols that allow valuable patterns to propagate across the foundry while preserving domain-specific details and maintaining security constraints.

An infrastructure layer provides various foundational computing and networking capabilities to enable distributed expert foundry operations across multiple computing environments and organizational boundaries. A distributed storage 2160 may be present and configured to implement scalable storage systems optimized for geometric data structures, thought trajectories, and compressed manifold representations, providing high-availability access to cognitive structures while supporting the complex access patterns required by manifold operations and cross-domain knowledge transfer. A computing resources 2161 component can be configured to manage computational capacity allocation across expert domains, implementing dynamic scaling capabilities that can adjust processing power based on domain activity levels, manifold complexity, and cross-domain collaboration requirements. Computing resources 2161 may include, but are in no way limited to, specialized hardware accelerators optimized for geometric computations, such as GPUs for parallel manifold operations or custom processors designed for cognitive dynamics calculations.

A network interface 2162 provides high-bandwidth, low-latency communication capabilities between distributed components of the expert foundry system, implementing protocols optimized for geometric data transfer and maintaining the real-time coordination required for effective cross-domain collaboration and hierarchical supervision. Network interface 2162 supports both local area network configurations for single-site deployments and wide area network capabilities for geographically distributed expert foundry installations. A security module 2163 implements comprehensive security controls including, for example, encryption of geometric data structures, access control for domain-specific knowledge, authentication and authorization for cross-domain operations, and audit trails for knowledge transfer and supervisory activities, ensuring that the expert foundry maintains appropriate security boundaries while enabling beneficial knowledge sharing and collaboration.

The interconnections between these layers demonstrate the integrated nature of the expert foundry architecture, where user interface components direct queries through the hierarchical supervisory network to appropriate expert domains, which leverage the PCM foundation layer for geometric processing while utilizing the infrastructure layer for distributed computing and storage capabilities. The bidirectional nature of many connections enables feedback loops that support continuous learning and improvement across all levels of the system, from individual domain optimization to system-wide coordination enhancement. Solid lines indicate direct data/control flow, while dashed lines show cross-domain knowledge transfer and coordination pathways.

Components may communicate through standardized message formats implemented as JSON structures (though alternative formats such as Protocol Buffers, Apache Avro, or custom binary formats may be used). Exemplary message schemas include, but are not limited to, query messages containing fields for query text, semantic embeddings, domain preferences, and urgency indicators; response messages with response content, confidence scores, source domain identifiers, and supporting evidence links; and coordination messages for resource requests, capability announcements, and status updates. API endpoints follow RESTful conventions (though GraphQL, gRPC, or custom protocols may be employed) with authentication through JWT tokens and rate limiting based on domain capacity and priority levels. All values, algorithms, and specifications described herein are exemplary and do not limit the scope of the system, as alternative approaches, parameters, and implementations may be used in other embodiments depending on specific deployment requirements and operational constraints.

In one exemplary embodiment, domain classifier 2101 implements a multi-stage classification pipeline. The classifier first generates semantic embeddings of incoming queries using a pre-trained language model, producing vectors of dimension d (e.g., d=768, though other dimensions such as 1024, 1536, or 4096 may be used in alternative embodiments). Each expert domain maintains a centroid vector computed as the weighted average of successfully processed queries within that domain. In some aspects, the classifier computes a cosine similarity between the query embedding and each domain centroid:

$$\text{similarity}\ (q, d) = \frac{(q \cdot cd)}{(\|q\| \cdot \|cd\|)}$$

where q is the query embedding and cd is the centroid for domain d. In an exemplary implementation, queries are routed to domains with similarity scores above a threshold t (e.g., t=0.7, though values between 0.5 and 0.9 may be used depending on system configuration). When multiple domains exceed the threshold, the system may route to the highest-scoring domain or initiate multi-domain consultation. Domain centroids are updated incrementally using an exponential moving average:

$$cd(t+1)=\alpha\cdot cd(t)+(1-\alpha)\cdot q_{successful}$$

where $\alpha$ is a decay parameter (e.g., $\alpha$=0.95, though other values may be employed). Alternative embodiments may use more sophisticated classification approaches including neural networks, decision trees, or ensemble methods.

In some embodiments, response aggregator 2102 implements conflict resolution through weighted semantic fusion. In one exemplary embodiment, when multiple expert domains provide potentially conflicting responses, the aggregator first computes confidence scores for each response based on manifold maturity metrics and historical accuracy. The confidence score C(r) for response r from domain d is computed as:

$$C(r)=w_1\cdot\mathrm{MMI}(d)+w_2\cdot\mathrm{ACC}(d)+w_3\cdot\mathrm{REL}(r,q)$$

where MMI(d) is the Manifold Maturity Index for domain d, ACC(d) is the historical accuracy rate, REL(r,q) is the semantic relevance between response r and query q, and $w_1$, $w_2$, $w_3$ are weighting factors (e.g., $w_1$=0.4, $w_2$=0.3, $w_3$=0.3, though other weightings may be used).

Responses are then combined using confidence-weighted averaging for numerical outputs or semantic interpolation for textual responses. In cases where responses exhibit semantic contradiction (for example, measured by embedding cosine similarity below a threshold, exemplarily −0.3), the aggregator may flag the conflict for human review or request clarification from the involved domains. Alternative embodiments may employ voting mechanisms, consensus algorithms, or probabilistic fusion techniques.

According to an embodiment, cross-domain coordinator 2110 implements a message-passing protocol for inter-domain communication. In an exemplary embodiment, domains communicate through structured messages containing query context, semantic embeddings, confidence metrics, and resource availability indicators. According to an aspect, the coordinator maintains a registry of domain capabilities represented as capability vectors $C(d)=[c_1, c_2, \ldots, c_n]$ where each $c_i$ represents proficiency in a specific knowledge area (exemplarily scaled 0.0 to 1.0). When a query requires multi-domain expertise, the coordinator computes domain relevance scores:

$$\text{relevance }(d, q) = C(d)\cdot\frac{Q(d)}{(\|C(d)\|\cdot\|Q(q)\|)}$$

where Q(q) is a capability requirement vector derived from query analysis. Domains with relevance scores above a threshold (exemplarily 0.6) are invited to collaborate. The coordination protocol includes handshake establishment, context sharing, partial result exchange, and final synthesis phases. Resource contention may be resolved through priority queuing based on query urgency, domain load, and historical performance metrics. Alternative embodiments may use publish-subscribe messaging, REST APIs, or custom communication protocols.

According to various embodiments, bootstrap engines (2122, 2132, 2142) implement manifold initialization through statistical monitoring of reuse density. In the zero-shot approach, the engine begins with an empty latent hyperspace and tracks the local reuse density function:

$$\rho(x:\varepsilon)=\frac{1}{\mathrm{Vol}(B_\varepsilon(x))}\sum_i I[\gamma_i\cap B_\varepsilon(x)\neq\emptyset]$$

where $B_\varepsilon(x)$ is an $\varepsilon$-ball around point x (e.g., $\varepsilon$=0.1 in normalized embedding space), $\gamma_i$ are thought trajectories, and I[·] is the indicator function. The engine continuously evaluates this density across a grid of sample points and triggers phase transition when density exceeds a critical threshold $\rho_c$ (e.g., $\rho_c$=5.0 trajectories per unit volume, though thresholds between 2.0 and 10.0 may be appropriate depending on domain characteristics). In the primed bootstrapping approach, the engine pre-populates the hyperspace with synthetic trajectories derived from domain-specific corpora, using techniques such as document clustering, keyword extraction, and semantic relationship mapping to create initial trajectory seeds. The engine monitors manifold formation through multiple observables including, but not limited to, distance distribution shifts (tracking KL divergence between current and historical distance distributions), cache hit rate progression (measuring the fraction of queries served by cached thoughts), and trajectory coherence metrics (computing alignment between semantically similar reasoning paths). Alternative embodiments may use different density estimation techniques, adaptive thresholds, or machine learning approaches for phase transition detection.

According to an implementation of an embodiment, quality assurance module 2112 implements multi-dimensional scoring algorithms. In an exemplary embodiment, response quality Q(r) is computed as:

$$Q(r)=w_1\mathrm{ACC}(r)+w_2\mathrm{COH}(r)+w_3\mathrm{REL}(r)+w_4\mathrm{CONF}(r)$$

where ACC(r) measures factual accuracy through automated fact-checking against knowledge bases, COH(r) evaluates logical coherence using semantic consistency metrics, REL (r) assesses relevance to the original query through embedding similarity, and CONF(r) represents the domain's confidence in its response based on manifold maturity and trajectory stability. Exemplary weights are w1=0.3, w2=0.25, w3=0.25, w4=0.2, though these may be adjusted based on domain requirements. Responses scoring below a quality threshold (e.g., Q(r)<0.7) trigger additional review, fact-checking, or cross-domain validation. The framework maintains quality trend analysis, tracking domain performance over time and identifying patterns that may indicate degradation or improvement in domain expertise. Alternative embodiments may incorporate user feedback, expert human review, or more sophisticated natural language evaluation techniques.

According to an embodiment, knowledge transfer engine 2113 implements geometric projection techniques for cross-domain knowledge sharing. In one exemplary embodiment, the engine identifies transferable knowledge by computing manifold region similarity between domains. For regions R1 in domain A and R2 in domain B, structural similarity S(R1, R2) is computed by comparing local curvature patterns, thought density distributions, and semantic coherence metrics. When similarity exceeds a threshold (e.g., S>0.8), the engine attempts knowledge transfer through manifold projection:

$$T_{transferred}=P(T_{source},M_{target})$$

where P is a projection operator that maps thought structures from the source manifold to geometrically compatible regions in the target manifold while preserving semantic relationships. The projection process may comprise validation steps to ensure transferred knowledge maintains coherence within the target domain context. Transfer success may be measured through improved cache hit rates, reduced bootstrap time for related concepts, and enhanced response quality in the target domain. Alternative embodiments may use different similarity metrics, projection techniques, or validation approaches for knowledge transfer.

According to an embodiment, statistical observer 2103 implements real-time calculation of manifold health metrics. The Manifold Maturity Index (MMI) is computed as:

$$\mathrm{MMI}(t)=\alpha H(t)+B\Delta P(t)+\gamma\Gamma(t)$$

where H(t) is the cache hit rate, ΔP(t) is the distance distribution shift measured as KL divergence, I(t) is the trajectory coherence index, and α, β, γ are weighting parameters (exemplarily α=0.4, β=0.3, γ=0.3) calibrated for context. This index provides a scalar summary of manifold health, supporting alerting, visualization, and/or goal-driven training control. Cache hit rate H(t) is computed over sliding time windows (exemplarily 1-hour windows) as the fraction of queries successfully answered using cached thoughts. Distance distribution shift ΔP(t) compares current pairwise distance distributions against baseline distributions using kernel density estimation and numerical integration. Trajectory coherence Γ(t) measures the average geodesic alignment between semantically similar reasoning paths using vector dot products of normalized trajectory tangents. The observer maintains historical trends, triggers alerts when metrics deviate significantly from expected ranges, and provides real-time visualization data for system monitoring dashboards. Alternative embodiments may use different time windows, weighting schemes, or additional observables for system health assessment.

Figure 22:
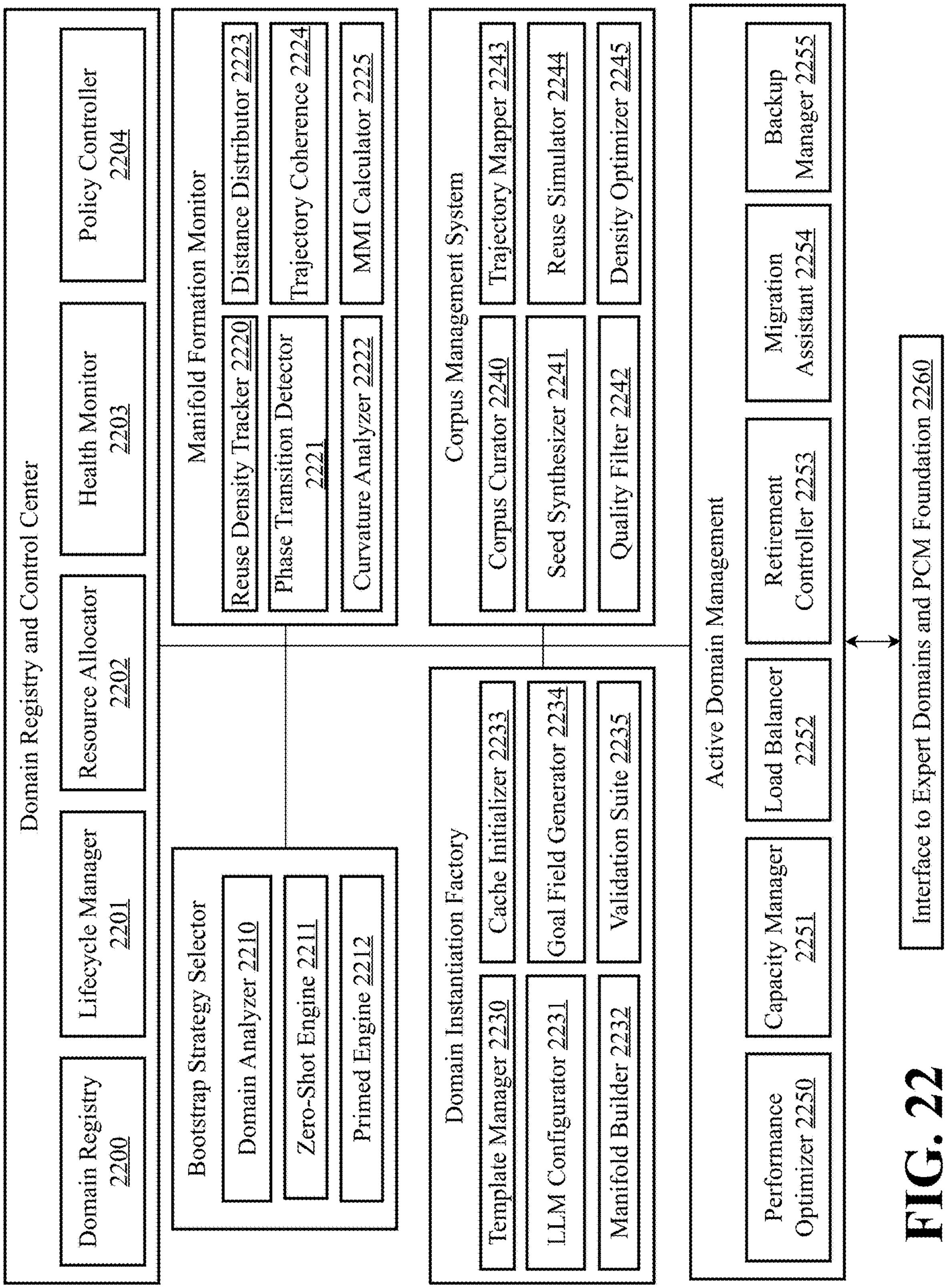
FIG. 22 is a block diagram illustrating an exemplary architecture of an expert domain manager showing domain-specific manifold initialization and bootstrapping control capabilities, according to an embodiment.

FIG. 22 is a block diagram illustrating an exemplary architecture for an expert domain manager showing domain-specific manifold initialization and bootstrapping control capabilities, according to an embodiment. The expert domain manager orchestrates the creation, initialization, and lifecycle management of specialized expert domains within the expert foundry system, implementing various algorithms for manifold formation detection, resource allocation, and performance optimization across multiple concurrent domain instances. In some implementations, the expert domain manager may leverage the resources of the cognitive dynamics engine to perform one or more of its functions as described herein.

A domain registry and control center provides centralized management and coordination capabilities for all expert domains within the foundry system. A domain registry 2200 maintains comprehensive metadata about all active and inactive expert domains, including, but not limited to, domain specifications, capability profiles, performance metrics, resource requirements, and operational status indicators. Domain registry 2200 implements a hierarchical categorization system that organizes domains by subject matter, complexity level, interdependency relationships, and deployment priority, enabling efficient domain discovery and coordination across the foundry system. A lifecycle manager 2201 orchestrates the complete lifecycle of expert domains from initial conception through deployment, operation, and eventual retirement, implementing state machines that track domain progression through initialization, bootstrapping, maturation, optimization, and decommissioning phases. Lifecycle manager 2201 coordinates with other system components to ensure proper resource allocation, dependency management, and graceful transitions between lifecycle phases while maintaining system stability and performance.

A resource allocator 2202 manages computational, memory, and storage resources across all expert domains, implementing dynamic allocation algorithms that balance resource needs against system capacity while prioritizing critical domains and maintaining quality of service guarantees. Resource allocator 2202 monitors resource utilization patterns, predicts future needs based on domain growth trajectories, and implements load balancing strategies that optimize system-wide efficiency. A health monitor 2203 continuously tracks the operational status and performance metrics of all expert domains, implementing monitoring capabilities that assess manifold formation progress, response quality, user satisfaction, and system integration effectiveness. Health monitor 2203 maintains historical performance data, detects anomalies or degradation patterns, and triggers appropriate remediation actions when domain health metrics fall outside acceptable ranges. A policy controller 2204 enforces system-wide policies regarding domain creation, resource usage, security constraints, and operational parameters, implementing configurable rule engines that ensure all expert domains operate within established organizational and technical boundaries while maintaining consistency across the foundry system.

A bootstrap strategy selector implements intelligent algorithms for determining the most appropriate manifold initialization approach for each new expert domain based on, for instance, available resources, domain characteristics, and operational requirements. A domain analyzer 2210 performs comprehensive analysis of proposed expert domains to determine their complexity, expected usage patterns, available training data, and resource requirements, implementing, in some embodiments, machine learning algorithms that classify domains based on their anticipated bootstrapping needs and manifold formation characteristics. Domain analyzer 2210 examines factors including, but not limited to, the breadth of subject matter coverage, the availability of structured knowledge sources, the expected query complexity and frequency, and the degree of interdependency with existing domains to generate recommendations for optimal bootstrapping strategies. A zero-shot engine 2211 implements pure emergence manifold formation for domains that lack sufficient initial training data or where maximum autonomy and explainability are required, monitoring reuse density accumulation and phase transition indicators to guide the natural formation of cognitive structure through live interaction patterns. Zero-shot engine 2211 provides specialized algorithms for detecting early signs of manifold formation in sparse interaction environments, implementing statistical observables and threshold monitoring that can identify successful phase transitions even with minimal initial data. A primed engine 2212 implements accelerated manifold formation through strategic seeding of the latent hyperspace with curated interaction patterns and/or synthetic trajectories that approximate expected usage scenarios, enabling faster time-to-value deployment for domains with available knowledge sources or well-understood interaction patterns. Primed engine 2212 coordinates with the corpus management system to generate appropriate seeding data while maintaining the dynamic, adaptive characteristics that enable continued manifold evolution through actual usage.

A manifold formation monitor provides real-time tracking and analysis of geometric structure emergence within expert domain latent hyperspaces, implementing sophisticated statistical observables and mathematical analysis capabilities that detect and quantify the transition from unstructured embedding spaces to functional cognitive manifolds. A reuse density tracker 2220 continuously monitors the local reuse density function ρ(x; ε) across the latent hyperspace, implementing efficient algorithms for computing trajectory intersection statistics and identifying regions where thought reuse is approaching or exceeding critical thresholds for manifold formation. Reuse density tracker 2220 can be configured to maintain spatial and temporal maps of reuse activity, enabling visualization of manifold formation progress and identification of regions requiring additional curation or intervention. A phase transition detector 2221 implements one or more algorithms for identifying the critical moment when unstructured latent hyperspace transitions into a functional cognitive manifold, monitoring multiple statistical indicators simultaneously to provide reliable detection of geometric structure emergence even in noisy or complex environments. According to some aspects, phase transition detector 2221 employs signal processing techniques, statistical hypothesis testing, and machine learning approaches to distinguish genuine phase transitions from temporary fluctuations or artifacts. A curvature analyzer 2222 computes and tracks the emergence of meaningful curvature patterns within the evolving manifold, implementing numerical methods for estimating Ricci curvature, geodesic deviation, and other geometric properties that indicate the formation of semantic structure and compression patterns. Curvature analyzer 2222 provides detailed geometric analysis that enables optimization of manifold formation and identification of regions with excessive or insufficient curvature for optimal cognitive operation.

A distance distributor 2223 monitors the evolution of pairwise distance distributions within the latent hyperspace, implementing kernel density estimation and statistical comparison techniques that detect the characteristic shift from log-normal to multimodal distributions that indicates successful attractor formation and semantic clustering. Distance distributor 2223 provides quantitative measures of distribution evolution that serve as reliable indicators of manifold maturation and cognitive structure development. A trajectory coherence 2224 component analyzes the stability and alignment of reasoning paths within the evolving manifold, computing geodesic alignment metrics and path deviation statistics that indicate the formation of stable cognitive patterns and successful generalization structures. Trajectory coherence 2224 provides insights into the quality and reliability of emerging cognitive capabilities within each expert domain. An MMI calculator 2225 integrates multiple statistical observables into a unified Manifold Maturity Index that provides a comprehensive assessment of domain readiness and cognitive capability development, implementing weighted combination algorithms that balance different aspects of manifold health and provide actionable metrics for system optimization and deployment decisions.

A domain instantiation factory provides automated capabilities for creating and configuring new expert domain instances based on specifications and requirements defined through the domain registry and lifecycle management systems. In some implementations of an embodiment, a template manager 2230 maintains a library of domain templates and configuration patterns that can be customized and instantiated for specific expert domains, implementing version control, dependency management, and customization frameworks that enable efficient domain creation while maintaining consistency and best practices across the foundry system. Template manager 2230 can be configured to support both predefined domain types for common use cases and custom domain creation for specialized requirements, providing flexible frameworks that can accommodate diverse organizational needs and technical constraints. An LLM configurator 2231 handles the selection, configuration, and integration of appropriate language model components for each expert domain, implementing algorithms that match domain requirements with available model capabilities while optimizing for performance, cost, and compatibility with the geometric manifold substrate. LLM configurator 2231 may manage model deployment, fine-tuning, and integration with domain-specific knowledge sources while ensuring proper interface with the PCM foundation layer. A manifold builder 2232 creates and initializes the geometric substrate for new expert domains, implementing algorithms that establish the initial latent hyperspace configuration, coordinate system definition, and basic geometric structures required for manifold formation and cognitive operation. Manifold builder 2232 ensures proper integration with the PCM foundation layer while providing domain-specific optimizations and customizations that support efficient manifold formation and operation.

A cache initializer 2233 establishes the persistent memory systems for new expert domains, implementing storage allocation, indexing structures, and caching policies that optimize for domain-specific usage patterns and performance requirements while maintaining compatibility with federated memory coordination across the foundry system. Cache initializer 2233 configures both local domain caches and integration with distributed storage systems to provide efficient thought storage and retrieval capabilities. A goal field generator 2234 creates initial goal potential field configurations for new expert domains based on domain specifications and expected usage patterns, implementing field generation algorithms that establish appropriate attraction patterns and cognitive guidance mechanisms that will be refined through actual usage and learning. Goal field generator 2234 ensures that new domains begin operation with appropriate intentional structures while maintaining the flexibility for goal field evolution through experience. A validation suite 2235 implements comprehensive testing and validation procedures for newly instantiated expert domains, providing automated testing of manifold formation capabilities, response quality assessment, integration verification, and performance benchmarking that ensures new domains meet operational standards before being deployed for production use.

A corpus management system provides various capabilities for curating, processing, and utilizing knowledge sources that support primed bootstrapping approaches and ongoing domain enhancement through structured learning materials. A corpus curator 2240 manages the collection, organization, and quality assessment of domain-specific knowledge sources including, but not limited to, documents, interaction logs, structured data, and expert-generated content that can serve as foundations for manifold seeding and trajectory synthesis. Corpus curator 2240 may implement automated content discovery, relevance scoring, and quality filtering that identifies high-value knowledge sources while excluding low-quality or inappropriate materials that could degrade manifold formation quality. A seed synthesizer 2241 processes curated knowledge sources to generate synthetic interaction patterns and thought trajectories that approximate expected domain usage, implementing natural language processing, semantic analysis, and trajectory generation algorithms that create realistic seeding data for primed bootstrapping approaches. Seed synthesizer 2241 can be designed to ensure that synthetic trajectories maintain semantic coherence and realistic interaction patterns while providing sufficient diversity to support robust manifold formation. A quality filter 2242 implements automated assessment and filtering of corpus materials and synthetic trajectories to ensure only high-quality, relevant content is used for domain seeding, employing machine learning algorithms, expert validation, and/or statistical analysis to identify and exclude content that could interfere with successful manifold formation or introduce bias or errors. Quality filter 2242 maintains quality standards across different content types and sources while adapting filtering criteria based on domain-specific requirements and observed outcomes.

A trajectory mapper 2243 analyzes corpus materials to identify natural reasoning patterns and cognitive pathways that can be represented as geometric trajectories within the latent hyperspace, implementing semantic analysis, logical flow detection, and pathway extraction algorithms that translate unstructured knowledge into structured cognitive patterns suitable for manifold seeding. Trajectory mapper 2243 ensures that extracted trajectories maintain semantic coherence and logical consistency while providing appropriate coverage of the domain's conceptual space. A reuse simulator 2244 models expected interaction patterns and trajectory reuse scenarios to optimize the distribution and characteristics of seeded content for maximum effectiveness in triggering manifold formation, implementing simulation algorithms that predict interaction patterns, identify critical reuse pathways, and optimize seeding strategies for reliable phase transition achievement. Reuse simulator 2244 provides predictive capabilities that enable fine-tuning of primed bootstrapping approaches before deployment. A density optimizer 2245 analyzes seeded trajectory distributions and optimizes their spatial arrangement within the latent hyperspace to maximize the probability of successful phase transition and efficient manifold formation, implementing geometric optimization algorithms that balance trajectory density, spatial distribution, and semantic coherence to create optimal conditions for cognitive structure emergence.

Active domain management provides ongoing operational oversight and optimization capabilities for expert domains throughout their operational lifecycle, implementing one or more algorithms for performance monitoring, capacity management, and operational optimization. According to an embodiment, a performance optimizer 2250 continuously analyzes domain performance metrics and implements optimization strategies that improve response quality, efficiency, and user satisfaction through manifold tuning, resource allocation adjustment, and configuration optimization based on observed usage patterns and performance characteristics. Performance optimizer 2250 may employ machine learning algorithms, statistical analysis, and/or geometric optimization techniques to identify improvement opportunities and implement changes that enhance domain effectiveness while maintaining stability and reliability. A capacity manager 2251 monitors and manages the computational and storage capacity requirements of expert domains, implementing dynamic scaling algorithms that adjust resources based on demand fluctuations, usage patterns, and performance requirements while maintaining cost efficiency and system stability. Capacity manager 2251 coordinates with the resource allocator to ensure optimal resource utilization across the foundry system while preventing resource contention or performance degradation. A load balancer 2252 distributes query load across multiple instances of expert domains when scaling is required, implementing intelligent routing algorithms that consider domain instance health, capacity, specialization, and geographic proximity to optimize response times and system reliability. Load balancer 2252 maintains session affinity when required while enabling transparent scaling and fault tolerance across distributed domain deployments.

In a further embodiment, a retirement controller 2253 manages the planned obsolescence and graceful shutdown of expert domains that are no longer needed or have been superseded by improved implementations, implementing migration strategies, knowledge preservation, and cleanup procedures that ensure valuable knowledge and capabilities are preserved or transferred before domain retirement. Retirement controller 2253 coordinates with other system components to minimize disruption and ensure continuity of service during domain lifecycle transitions. A migration assistant 2254 facilitates the transfer of expert domains between different computing environments, hardware platforms, or organizational boundaries, implementing sophisticated migration procedures that preserve manifold structure, thought cache contents, and operational characteristics while adapting to new deployment environments and requirements. Migration assistant 2254 ensures that migrated domains maintain their cognitive capabilities and accumulated knowledge while adapting to new operational contexts. A backup manager 2255 implements comprehensive backup and recovery capabilities for expert domain state, including, but not limited to, manifold structure, thought caches, configuration data, and operational history, providing disaster recovery capabilities that enable rapid restoration of domain functionality in the event of hardware failures, data corruption, or other operational disruptions while maintaining data integrity and minimizing service interruption.

An interface to expert domains and PCM foundation 2260 provides standardized communication and coordination capabilities that enable integration between the expert domain manager and the operational components of the foundry system, implementing APIs, message passing protocols, and data exchange formats that support efficient coordination while maintaining appropriate abstraction boundaries and enabling independent evolution of system components.

According to an embodiment, domain analyzer 2210 implements a multi-factor scoring algorithm for determining bootstrap strategy and resource requirements. In one exemplary embodiment, the analyzer extracts domain features through a feature vector F(d)=[complexity, coverage, density, interdependency, $resource_{req}$] where each component is computed as follows: Complexity C(d) is measured by analyzing the semantic diversity of expected queries using entropy calculations over term frequency distributions:

$$C(d)=-\Sigma p(t_i)*\log(p(t_i))$$

where $p(t_i)$ is the probability of term $t_i$ in the domain corpus (exemplarily using values between 2.0-8.0, with higher values indicating greater complexity). Coverage COV(d) represents the breadth of topics within the domain, computed as the average pairwise semantic distance between representative documents or query examples (e.g., normalized to 0.0-1.0 scale). Density D(d) measures the concentration of related concepts, calculated as the inverse of average nearest-neighbor distances in embedding space (e.g., scaled 0.1-10.0). Interdependency I(d) quantifies expected cross-domain consultation needs through semantic overlap analysis with existing domains using Jaccard similarity coefficients (exemplarily 0.0-1.0). Resource requirements R(d) estimate computational needs based on expected query volume and complexity using regression models trained on historical domain performance data.

In some embodiments, bootstrap strategy selection uses a decision tree algorithm where zero-shot bootstrapping is selected when C(d)<4.0 AND D(d)>5.0 AND available_corpus_size<1000 documents (though other thresholds such as C(d)<3.0 or corpus_size<500 may be used in alternative embodiments). Primed bootstrapping is selected when sufficient quality corpus data exists (e.g., >1000 documents with relevance scores >0.8) OR when rapid deployment is required (target_deployment_time<7 days). Alternative embodiments may use machine learning classifiers, weighted scoring functions, or expert system rules for strategy selection According to an embodiment, reuse density tracker 2220 implements efficient spatial indexing for trajectory intersection computation. In one exemplary embodiment, the latent hyperspace is discretized into a grid with cell size δ (exemplarily δ=0.1 in normalized coordinates, though values between 0.05-0.5 may be appropriate). Each trajectory $\gamma_i$ is represented as a sequence of grid cells, and intersections are computed using spatial hash tables for O(1) lookup complexity. The local reuse density ρ(x; ε) is computed over a sliding window of temporal interactions (exemplarily 24-hour windows, though 1-hour to 7-day windows may be used):

$$\rho(x:\varepsilon, t) = \frac{1}{\mathrm{Vol}(B_\varepsilon(x))} \sum_{i}^{i\in W(t)} I[\gamma_i \cap B_\varepsilon(x) \neq \phi] * \mathrm{decay}(\mathrm{age}(\gamma_i))$$

where W(t) is the temporal window, decay(age(γi))=exp(−λ*age(γi)) with decay constant 2 (e.g., λ=0.1/hour, though values 0.01-1.0 may be used), and Vol(Bε(x)) is computed as the hypervolume of the ε-ball in the current dimensional space.

According to an aspect, phase transition detector 2221 implements a multi-threshold detection algorithm that monitors the critical reuse density $\rho_c$ across spatial regions. The detector maintains a spatial map of density values and triggers phase transition when a connected region U satisfies density thresholds for a sustained period (e.g., $\rho(x)>\rho_c$ for all x∈U for minimum duration of 2 hours, though durations from 30 minutes to 24 hours may be appropriate). Connected region analysis may use flood-fill algorithms with connectivity threshold θ (e.g., $\theta=0.9*\rho_c$). Statistical significance can be assessed using chi-square tests comparing current density distributions against null hypothesis of random trajectory placement, with significance level α (e.g., α=0.05).

According to a further aspect, distance distributor 2223 tracks distribution evolution through kernel density estimation with adaptive bandwidth selection. The system can maintain a plurality of histograms of pairwise distances with bin width automatically selected using Freedman-Diaconis rule: $h=2*\mathrm{IQR}(\mathrm{distances})*n^{(-1/3)}$ where IQR is interquartile range and n is sample size. Distribution shift detection computes Kolmogorov-Smirnov test statistics between current and baseline distributions, triggering manifold formation alerts when D-statistic exceeds critical values (exemplarily $D_{crit}=0.3$ for early formation, 0.5 for mature manifold, though values 0.2-0.8 may be used).

According to an exemplary embodiment, template manager 2230 implements a hierarchical template structure using JSON-based configuration schemas (though XML, YAML, or binary formats may be used in alternative embodiments).

Template inheritance may follow object-oriented principles where specialized templates extend base templates with domain-specific overrides. Version control maintains template lineage with semantic versioning (major.minor-.patch format). Template validation ensures configuration consistency through schema verification and dependency checking algorithms that verify resource requirements, parameter ranges, and compatibility constraints.

According to an embodiment, LLM configurator 2231 implements model selection through capability matching algorithms. Available LLM models can be characterized by capability vectors M(i)=[reasoning, factual, creative, domain_specific] with scores 0.0-1.0 (e.g., computed through standardized benchmark evaluations). Domain requirements are similarly vectorized as R(d)=[req_reasoning, req_factual, req_creative, req_domain]. Model selection optimizes the matching function:

$$\text{score }(M(i), R(d)) = \sum_{j=1}^{4} w(j) * \frac{\min(M(i)[j], R(d)[j])}{R(d)[j]}$$

where weights w(j) reflect domain priorities (e.g., w=[0.3, 0.3, 0.2, 0.2] for balanced domains, though other weightings may be used). Models scoring above threshold t (exemplarily τ=0.8) are candidates for deployment. Fine-tuning decisions use cost-benefit analysis comparing improvement potential against computational overhead, typically selecting fine-tuning when expected accuracy improvement >5% and available training data >10,000 domain-specific examples.

According to an aspect of an embodiment, cache initializer 2233 establishes multi-tier storage systems with configurable policies. In one exemplary embodiment, the cache hierarchy includes L1 (in-memory, exemplarily 1-16 GB), L2 (SSD storage, exemplarily 100-1000 GB), and L3 (distributed storage, exemplarily 1-100 TB) with automatic data migration based on access patterns. Cache replacement policies implement modified LRU with semantic awareness:

$$\text{eviction}_{score}(\text{item}) = w_1 * \left(\frac{1}{\text{access}_{frequency}}\right) + w_2 * \text{age} + w_3 * \left(\frac{1}{\text{semantic}_{centrality}}\right)$$

where $\text{semantic}_{centrality}$ measures the item's connectivity within the thought graph (exemplarily using PageRank-style algorithms), and weights $w_1$, $w_2$, $w_3$ balance frequency, recency, and importance (e.g., $w_1=0.5$, $w_2=0.3$, $w_3=0.2$). Cache coherence across distributed instances uses eventual consistency with conflict resolution through vector clocks and semantic similarity voting.

According to an embodiment, performance optimizer 2250 implements closed-loop control for domain tuning. The optimizer maintains performance metrics P(t)=[response_time, accuracy, user_satisfaction, resource_efficiency] and adjusts configuration parameters through gradient-based optimization:

$$\text{param}_{new}=\text{param}_{old}-\alpha*\nabla P(\text{param}_{old})$$

where α is learning rate (e.g., α=0.01, though values 0.001-0.1 may be appropriate) and gradients are estimated through finite differences or automatic differentiation. Constraint satisfaction ensures parameter updates remain within operational bounds (e.g., response_time<2000 ms, accuracy>0.9). Multi-objective optimization uses Pareto efficiency when performance metrics conflict, selecting solutions that cannot improve one metric without degrading others.

According to a further embodiment, capacity manager 2251 implements predictive scaling using time-series forecasting. Resource demand prediction may use ARIMA models fitted to historical usage data with seasonal decomposition:

$$\text{demand}(t+h)=\text{trend}(t)+\text{seasonal}(t+h)+\text{noise}_{model}(t)$$

where h is prediction horizon (e.g., h=1-24 hours). Scaling decisions compare predicted demand against current capacity with safety margins (exemplarily 20% headroom for CPU, 15% for memory). Resource allocation uses bin-packing algorithms for efficient hardware utilization, with first-fit-decreasing heuristics for computational tasks and best-fit for memory allocation.

In some aspects, load balancer 2252 can be configured to implement weighted round-robin with dynamic weight adjustment based on real-time performance metrics. Instance weights w(i) may be updated using exponential moving averages:

$$w(i)_{new}=\beta*w(i)_{old}+(1-\beta)*\text{performance}_{score}(i)$$

where β is smoothing factor (exemplarily β=0.9) and $\text{performance}_{score}$ combines response time, error rate, and current load. Health checking uses TCP/HTTP probes with configurable intervals (exemplarily 10-second health checks, 1-second timeout) and circuit breaker patterns for fault isolation.

All algorithms, parameters, and specifications described herein are exemplary and do not limit the scope of the system and methods, as alternative approaches, thresholds, and implementations may be used in other embodiments depending on specific deployment requirements, computational constraints, and operational objectives.

Figure 23:
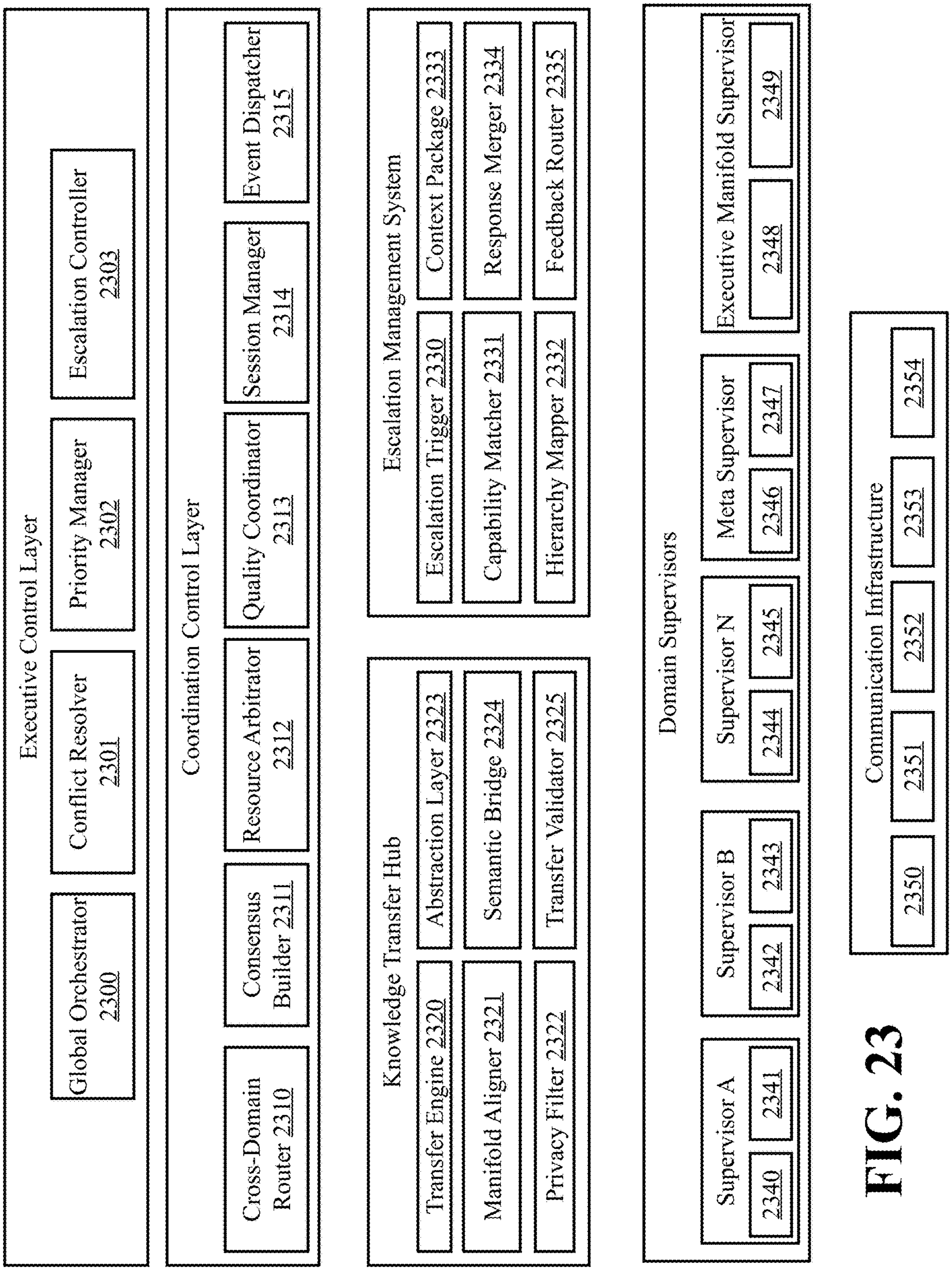
FIG. 23 is a block diagram illustrating an exemplary architecture of a hierarchical supervisory network showing cross-domain coordination and escalation pathways within the expert foundry system.

FIG. 23 is a block diagram illustrating an exemplary architecture of a hierarchical supervisory network showing cross-domain coordination and escalation pathways within the expert foundry system. The hierarchical supervisory network implements a multi-layered control architecture that enables sophisticated coordination, conflict resolution, and quality management across multiple expert domains while providing escalation mechanisms for handling complex queries that exceed individual domain capabilities.

An executive control layer provides the highest level of system oversight and strategic decision-making capabilities across the entire expert foundry system. A global orchestrator 2300 serves as the primary coordination hub for system-wide operations, implementing master scheduling algorithms that coordinate activities across all expert domains, manage system-wide resource allocation priorities, and ensure coherent operation of the distributed cognitive architecture. Global orchestrator 2300 maintains a comprehensive view of system state including, but not limited to, domain health metrics, resource utilization patterns, user satisfaction levels, and performance trends, enabling strategic decisions about capacity planning, domain deployment, and system optimization. Global orchestrator 2300 implements various orchestration algorithms that balance competing demands for computational resources, coordinate cross-domain collaboration activities, and manage the complex interdependencies that arise in large-scale expert foundry deployments. A conflict resolver 2301 implements advanced algorithms for detecting and resolving conflicts that arise when multiple expert domains provide contradictory responses or recommendations, employing sophisticated consensus-building mechanisms, evidence weighing strategies, and confidence-based arbitration protocols that ensure consistent and reliable system outputs. Conflict resolver 2301 maintains detailed models of domain expertise boundaries, tracks historical accuracy patterns, and implements machine learning algorithms that improve conflict resolution effectiveness over time through analysis of resolution outcomes and user feedback.

A priority manager 2302 orchestrates the allocation of system attention and computational resources based on query urgency, user importance, strategic objectives, and operational constraints, implementing dynamic priority queuing systems that ensure critical requests receive appropriate attention while maintaining fair resource distribution across all system users. Priority manager 2302 can be configured to employ multi-factor scoring algorithms that consider factors including user authorization levels, query complexity, deadline requirements, and system capacity to make real-time priority decisions that optimize both individual user satisfaction and overall system performance. An escalation controller 2303 manages the complex escalation pathways that enable queries to be elevated through the supervisory hierarchy when individual domains or coordination mechanisms cannot provide satisfactory responses, implementing one or more escalation triggers, path selection algorithms, and context preservation mechanisms that ensure escalated queries receive appropriate high-level attention while maintaining efficiency and avoiding unnecessary overhead.

A coordination control layer implements the operational management and coordination mechanisms that enable effective collaboration between expert domains while maintaining system coherence and quality standards. A cross-domain router 2310 manages the complex routing decisions required when queries span multiple expert domains or require interdisciplinary expertise, implementing routing algorithms that analyze query content, assess domain capabilities, and determine optimal collaboration patterns based on semantic analysis, historical performance data, and current system state. Cross-domain router 2310 maintains dynamic models of domain expertise overlap, tracks collaboration success patterns, and implements adaptive routing strategies that improve over time through analysis of multi-domain interaction outcomes. A consensus builder 2311 implements one or more algorithms for synthesizing coherent responses from multiple expert domains when collaborative responses are required, employing voting mechanisms, confidence weighting, semantic alignment analysis, and conflict detection algorithms that ensure multi-domain responses maintain consistency and provide maximum value to users. Consensus builder 2311 manages the complex challenges of integrating potentially diverse perspectives, resolving semantic inconsistencies, and maintaining logical coherence across different domains of expertise while preserving the unique insights and specialized knowledge that each domain contributes. A resource arbitrator 2312 manages the allocation of shared computational and storage resources across expert domains, implementing fair scheduling algorithms, priority-based allocation mechanisms, and dynamic load balancing strategies that ensure optimal resource utilization while preventing resource starvation or performance degradation in individual domains. Resource arbitrator 2312 monitors resource usage patterns, predicts future demands based on historical trends and current activity levels, and implements adaptive allocation strategies that respond to changing system demands while maintaining quality of service guarantees.

A quality coordinator 2313 orchestrates quality assurance activities across all expert domains, implementing standardized quality metrics, cross-domain validation protocols, and continuous improvement mechanisms that ensure consistent quality standards while enabling domain-specific optimizations and specializations. Quality coordinator 2313 maintains comprehensive quality tracking systems, implements statistical analysis of quality trends, and coordinates quality improvement initiatives that leverage insights from successful domains to improve performance across the entire foundry system. A session manager 2314 handles the complex state management required for multi-domain interactions and long-running collaborative sessions, implementing session persistence, context preservation, and state synchronization mechanisms that ensure coherent user experiences across multiple expert domains and extended interaction periods. Session manager 2314 manages session lifecycle operations, handles session migration between domains, and implements fault tolerance mechanisms that ensure session continuity even when individual domains experience failures or require maintenance. An event dispatcher 2315 implements the event-driven coordination mechanisms that enable real-time communication and synchronization between expert domains, managing event queues, implementing publish-subscribe communication patterns, and ensuring reliable delivery of coordination messages even in distributed deployment environments with potential network partitioning or component failures.

A knowledge transfer hub provides various capabilities for sharing learned insights, compressed thought patterns, and cognitive structures between expert domains while maintaining appropriate privacy boundaries and semantic integrity. A transfer engine 2320 implements various algorithms for identifying, extracting, and transmitting valuable knowledge structures between expert domains, employing sophisticated analysis techniques that identify transferable patterns, assess transfer viability, and execute knowledge migration operations that preserve semantic integrity while adapting to target domain characteristics. Transfer engine 2320 may maintain comprehensive catalogs of successful transfer patterns, implement machine learning algorithms that improve transfer effectiveness over time, and coordinate with domain-specific systems to ensure transferred knowledge integrates properly with existing cognitive structures. A manifold aligner 2321 implements the geometric algorithms required for aligning manifold structures between different expert domains, enabling knowledge transfer through manifold projection, metric harmonization, and topological mapping techniques that preserve semantic relationships while enabling cross-domain knowledge sharing. Manifold aligner 2321 employs sophisticated mathematical techniques derived from differential geometry and manifold learning theory to compute optimal alignment transformations, assess alignment quality, and execute transfer operations that maintain geometric consistency across domain boundaries.

A privacy filter 2322 implements comprehensive privacy protection mechanisms that enable beneficial knowledge sharing while preventing unauthorized disclosure of sensitive or proprietary information, employing differential privacy techniques, semantic abstraction algorithms, and access control mechanisms that ensure shared knowledge maintains appropriate generality levels. Privacy filter 2322 implements configurable privacy policies that can be tailored to organizational requirements, regulatory constraints, and domain-specific sensitivity levels while maximizing the benefits of cross-domain knowledge sharing. An abstraction layer 2323 creates appropriately generalized representations of domain-specific knowledge that can be shared across domain boundaries without compromising domain-specific details or intellectual property, implementing abstraction algorithms that identify shareable patterns, create generalized representations, and maintain semantic coherence across different levels of abstraction. Abstraction layer 2323 enables knowledge sharing at multiple abstraction levels, from high-level strategic insights to detailed operational patterns, while ensuring that shared knowledge remains useful and actionable in target domains.

A semantic bridge 2324 implements the translation and adaptation mechanisms required when transferring knowledge between domains with different semantic frameworks, vocabularies, or conceptual structures, employing semantic mapping algorithms, ontology alignment techniques, and conceptual translation mechanisms that preserve meaning while adapting to domain-specific representational frameworks. Semantic bridge 2324 maintains comprehensive semantic mapping databases, implements learning algorithms that improve translation effectiveness over time, and coordinates with domain-specific systems to ensure semantic consistency across knowledge transfer operations. A transfer validator 2325 implements comprehensive validation and verification mechanisms that ensure transferred knowledge maintains accuracy, consistency, and usefulness in target domains, employing automated testing protocols, semantic consistency checking, and performance impact assessment algorithms that verify transfer success before committing transferred knowledge to target domain systems.

An escalation management system provides various mechanisms for handling queries and situations that exceed the capabilities of individual expert domains or standard coordination mechanisms. An escalation trigger 2330 implements algorithms for detecting when escalation is required, monitoring query complexity, domain confidence levels, response quality metrics, and user satisfaction indicators to identify situations requiring elevated attention or alternative handling approaches. In some aspects, escalation trigger 2330 employs machine learning algorithms that improve escalation decision-making over time through analysis of escalation outcomes and user feedback, implementing adaptive thresholds and multi-factor assessment algorithms that balance escalation efficiency with system resource utilization.

A capability matcher 2331 implements sophisticated algorithms for identifying the most appropriate escalation targets based on query characteristics, required expertise levels, and available system resources, maintaining comprehensive capability databases that track domain expertise boundaries, supervisor specializations, and executive-level decision-making authorities. Capability matcher 2331 employs semantic analysis techniques to match escalated queries with appropriate handling mechanisms, considering factors including required expertise depth, cross-domain coordination needs, strategic decision-making requirements, and resource availability to ensure escalated queries receive optimal attention from the most qualified system components. A hierarchy mapper 2332 maintains and manages the complex hierarchical relationships within the supervisory network, implementing dynamic hierarchy management algorithms that adapt supervisory structures based on organizational requirements, operational efficiency metrics, and changing expertise distributions across the expert foundry system. Hierarchy mapper 2332 tracks reporting relationships, authority boundaries, and decision-making responsibilities while implementing flexible hierarchy management that can accommodate organizational changes, domain evolution, and operational optimization requirements.

A context packager 2333 implements one or more algorithms for preserving and transmitting the complete context surrounding escalated queries, including original query content, domain interaction history, attempted solution approaches, identified conflicts or limitations, and relevant user information that enables effective handling by escalation targets. Context packager 2333 can employ compression and abstraction techniques that preserve essential context while minimizing transmission overhead, implementing structured context representations that enable efficient processing by escalation targets while maintaining all information necessary for effective resolution. A response merger 2334 handles the complex task of integrating escalated responses back into the original query context, implementing sophisticated merging algorithms that combine escalated insights with previous domain responses, resolve any remaining conflicts, and present coherent final responses that reflect the benefits of escalated processing while maintaining user experience continuity. In some embodiments, response merger 2334 employs semantic integration techniques, confidence weighting algorithms, and coherence verification mechanisms that ensure escalated responses enhance rather than disrupt the overall system response quality. A feedback router 2335 implements feedback management mechanisms that ensure insights gained through escalation processes are appropriately distributed back to relevant expert domains and supervisory components, enabling system-wide learning and improvement through escalation experience analysis and knowledge distribution.

A plurality of domain supervisors provide direct oversight and management capabilities for individual expert domains while maintaining integration with the broader hierarchical supervisory network. Supervisor A comprises a monitor 2340 that continuously tracks the operational status, performance metrics, and health indicators of expert domain A, implementing real-time monitoring algorithms that assess manifold formation progress, response quality trends, resource utilization patterns, and user satisfaction levels while detecting anomalies or performance degradation that may require intervention. Monitor 2340 maintains comprehensive historical performance databases, implements trend analysis algorithms, and provides early warning capabilities that enable proactive management of domain health and performance optimization. A control 2341 component implements direct management capabilities for expert domain A, providing mechanisms for configuration adjustment, resource allocation modification, performance optimization, and operational intervention when monitoring indicates potential issues or optimization opportunities. Control 2341 implements automated control algorithms for routine optimization tasks while providing manual intervention capabilities for complex situations requiring human oversight or strategic decision-making.

Supervisor B follows the same architectural pattern with a monitor 2342 providing comprehensive oversight of expert domain B operations and a control 2343 component implementing direct management capabilities tailored to domain B's specific characteristics and operational requirements. The consistent supervisor architecture enables standardized management approaches while allowing domain-specific customization and optimization strategies.

Supervisor N similarly comprises a monitor 2344 and control 2345 component that provide comprehensive oversight and management capabilities for expert domain N, maintaining the consistent supervisory interface while adapting to domain N's unique operational characteristics and performance requirements.

A meta supervisor implements higher-order supervisory capabilities that manage patterns and strategies across multiple domain supervisors, providing strategic oversight that transcends individual domain boundaries. A pattern 2346 component analyzes supervision patterns across multiple domains, identifying successful management strategies, detecting common challenges, and developing improved supervisory approaches that can be applied across the expert foundry system. Pattern 2346 may employ machine learning algorithms that extract insights from supervisory activities, performance outcomes, and management decisions to identify best practices and optimization opportunities that improve overall supervisory effectiveness. A strategy 2347 component implements strategic planning and coordination capabilities that enable optimized management approaches across multiple expert domains, coordinating supervisory activities, resource allocation decisions, and performance optimization initiatives that consider system-wide objectives and interdomain dependencies.

An executive manifold supervisor implements the highest level of supervisory capability specifically focused on the executive manifold described herein, managing second-order control trajectories and meta-cognitive capabilities that emerge across the expert foundry system. A trajectory 2348 component monitors and manages the evolution of control operator sequences across all expert domains, tracking the formation of meta-cognitive patterns, identifying successful control strategies that can be generalized across domains, and managing the geometric evolution of executive-level cognitive capabilities. Trajectory 2348 implements one or more analysis algorithms that detect emergent control patterns, assess their effectiveness across different domains, and facilitate the development of higher-order cognitive capabilities that improve system-wide reasoning and decision-making effectiveness. An evolution 2349 component manages the long-term development and optimization of executive manifold structures, implementing algorithms that guide the evolution of meta-cognitive capabilities, coordinate the development of system-wide reasoning strategies, and ensure that executive-level cognitive structures continue to improve through experience and usage patterns across the entire expert foundry system.

A communication infrastructure provides the foundational messaging, protocol management, and coordination capabilities that enable effective operation of the hierarchical supervisory network across distributed computing environments. A message bus 2350 implements high-performance messaging infrastructure that enables reliable, efficient communication between all components of the supervisory network, providing message queuing, routing, delivery guarantees, and fault tolerance mechanisms that ensure supervisory coordination remains effective even in challenging network conditions or during component failures. Message bus 2350 implements scalable messaging architectures that can accommodate growing numbers of expert domains and supervisory components while maintaining low latency and high reliability communication essential for effective real-time coordination. A protocol handler 2351 manages the complex communication protocols required for supervisory network operations, implementing standardized message formats, version compatibility management, and protocol adaptation mechanisms that enable effective communication across diverse system components and deployment environments. Protocol handler 2351 ensures communication compatibility across different expert domains, supervisory components, and external system interfaces while providing protocol evolution capabilities that enable system updates and enhancements without disrupting ongoing operations. A security gateway 2352 implements comprehensive security controls for supervisory network communications, providing encryption, authentication, authorization, and audit capabilities that ensure supervisory operations maintain appropriate security boundaries while enabling necessary coordination and information sharing across system components. Security gateway 2352 may implement role-based access controls, encrypted communication channels, and comprehensive audit logging that ensures supervisory activities comply with organizational security policies and regulatory requirements. A load balancer 2353 manages the distribution of supervisory workload across multiple computing resources, implementing intelligent load distribution algorithms that optimize supervisory performance while maintaining fault tolerance and scalability across distributed deployment environments. Load balancer 2353 monitors supervisory component performance, implements adaptive load distribution strategies, and provides failover capabilities that ensure supervisory network operations continue effectively even when individual components experience failures or require maintenance. An audit logger 2354 implements comprehensive logging and audit capabilities that track all supervisory activities, decisions, and outcomes, providing detailed records that enable performance analysis, compliance verification, and continuous improvement of supervisory network effectiveness while maintaining appropriate privacy and security protections for sensitive operational information.

The interconnections between these layers provide coordination and escalation pathways that enable the hierarchical supervisory network to manage complex multi-domain operations effectively. These components may communicate with each other for coordination and escalation purposes with various pathways established for each. Standard operational communication and coordination pathways enable routine information sharing and collaborative decision-making across supervisory components. Escalation pathways enable queries and decisions to be elevated through the supervisory hierarchy when standard coordination mechanisms are insufficient to provide satisfactory resolution. Knowledge transfer pathways enable beneficial insights and cognitive structures to be shared across domain boundaries while maintaining appropriate privacy and security protections, facilitating system-wide learning and capability enhancement through cross-domain knowledge propagation.

FIG. 24 is a block diagram illustrating an exemplary architecture of an LLM core integration system showing how language models interface with geometric manifold substrates within the expert foundry system. The LLM core integration system provides a framework that enables specialized expert domains to leverage sophisticated natural language processing capabilities while maintaining seamless integration with the geometric cognitive substrate that enables persistent thought formation, cross-domain knowledge transfer, and hierarchical supervisory coordination across the expert foundry system.

An input processing layer provides analysis and preparation of incoming natural language queries before they are processed by the core language model components. Query parser 2400 performs syntactic and semantic analysis of incoming user queries to extract structural information, identify key concepts, and prepare queries for domain-appropriate processing within the expert foundry system. For example, when a user submits a complex query about "optimizing wind turbine performance in offshore environments," query parser 2400 can identify the main topic (wind turbine optimization), the context constraint (offshore environments), and the intent type (seeking optimization recommendations), enabling appropriate routing to relevant expert domains such as renewable energy and marine engineering.

Context extractor 2401 analyzes user queries and session history to identify relevant contextual information that may influence response generation and domain selection within the expert foundry system. For instance, if a user has previously asked questions about wind energy economics and grid integration, context extractor 2401 can identify this background context and make it available to expert domains, enabling more comprehensive responses that consider the user's ongoing interests and previous knowledge areas rather than treating each query in isolation.

Intent analyzer 2402 determines the specific type of response or action that the user is seeking, enabling appropriate selection of expert domains and response strategies within the expert foundry system. For example, when processing a query about "renewable energy storage solutions," intent analyzer 2402 can distinguish between different intent types such as requesting technical specifications (directing to engineering domains), seeking market analysis (routing to business strategy domains), or asking for implementation guidance (engaging operational consulting domains), ensuring that the query reaches expert domains best equipped to provide the desired type of assistance.

Token processor 2403 handles the tokenization and preprocessing of natural language input to prepare it for processing by transformer-based language models while maintaining compatibility with the geometric representation requirements of the expert foundry's manifold substrate. For instance, when processing technical terminology specific to a particular expert domain, token processor 2403 can apply domain-specific tokenization rules that preserve important technical concepts as coherent units, ensuring that specialized terms like "photoperiodic flowering response" in agricultural domains or "hydraulic fracturing stimulation" in petroleum engineering domains are properly recognized and processed as meaningful conceptual units.

Embedding generator 2404 creates dense vector representations of processed tokens and concepts that serve as the initial input to the geometric manifold substrate, ensuring compatibility between traditional language model embeddings and the curved space representations used within expert domains. For example, when processing a query about pharmaceutical compound interactions, embedding generator 2404 can create vector representations that not only capture linguistic relationships but also encode semantic proximities that will enable effective mapping into the pharmaceutical expert domain's manifold, where related compounds and interaction patterns are organized according to chemical and biological similarity rather than purely linguistic association.

Semantic encoder 2405 transforms linguistic embeddings into semantically rich representations that preserve conceptual relationships and domain-specific meaning structures required for effective integration with expert domain manifolds. For instance, when processing financial terminology, semantic encoder 2405 can ensure that terms like “derivatives,” “volatility,” and “arbitrage” are encoded with their financial domain-specific meanings rather than their general linguistic definitions, enabling accurate mapping into financial expert domain manifolds where these concepts have precise technical relationships and implications within the domain’s specialized knowledge structure.

An LLM core engine provides the primary language processing capabilities that generate semantic understanding and preliminary responses while maintaining integration with the expert foundry’s geometric cognitive architecture. Transformer core 2410 implements the foundational transformer architecture for language processing while being optimized for integration with geometric manifold substrates and cross-domain coordination requirements within the expert foundry system. For example, when processing a query that requires consultation between multiple expert domains, transformer core 2410 can generate intermediate representations that can be effectively shared between domains such as medical devices and regulatory compliance, enabling coherent responses that consider both technical feasibility and regulatory requirements without losing semantic consistency across domain boundaries.

Attention manager 2411 coordinates attention mechanisms within the language model while maintaining awareness of manifold-based attention flows and cross-domain attention patterns required for expert foundry operation. For instance, when processing a complex engineering query that involves materials science, structural engineering, and manufacturing considerations, attention manager 2411 can coordinate attention patterns that appropriately weight information from each relevant domain while maintaining coherent focus on the relationships between materials properties, structural requirements, and manufacturing constraints across the different expert domains involved in generating a comprehensive response.

Layer coordinator 2412 manages the interaction between different transformer layers while ensuring compatibility with geometric processing requirements and enabling information flow that supports cross-domain knowledge integration within the expert foundry system. For example, when processing queries that require integration of historical context, current technical specifications, and future projections, layer coordinator 2412 can manage how different transformer layers contribute temporal reasoning, technical analysis, and predictive capabilities in a coordinated manner that enables seamless integration with expert domains specializing in historical analysis, current technology assessment, and future planning respectively.

Reasoning engine 2413 implements sophisticated reasoning capabilities that complement the geometric reasoning provided by the manifold substrate, enabling complex logical processing that supports expert-level analysis and decision-making within specialized domains. For instance, when an expert domain in legal analysis processes a contract dispute query, reasoning engine 2413 can implement logical reasoning patterns specific to legal analysis such as precedent application, statutory interpretation, and case law synthesis, working in conjunction with the legal domain’s manifold structure to provide reasoning that is both logically sound and consistent with the accumulated legal expertise encoded in the domain’s geometric cognitive substrate.

Generation controller 2414 manages the text generation process while ensuring that generated responses maintain consistency with expert domain knowledge, cross-domain coordination requirements, and the quality standards established by the hierarchical supervisory network. For example, when generating a response about pharmaceutical drug interactions, generation controller 2414 can ensure that the generated text accurately reflects the expert domain’s specialized knowledge while maintaining appropriate confidence levels, acknowledging limitations, and providing proper context about the reliability and scope of the information, enabling users to understand both the expert insights and their appropriate application boundaries.

A memory interface 2415 manages the connection between the language model’s working memory and the persistent memory systems of the expert foundry, enabling efficient access to cached thoughts, historical interactions, and cross-domain knowledge while maintaining performance and consistency. For instance, when processing a follow-up question in a multi-turn conversation about renewable energy project planning, memory interface 2415 can efficiently retrieve relevant context from previous interactions, integrate it with current processing, and ensure that responses build appropriately on established context while accessing relevant cached insights from related expert domains such as environmental impact assessment and financial modeling.

A knowledge integrator 2416 combines information from multiple expert domains and knowledge sources to create comprehensive responses that leverage the full capabilities of the expert foundry system while maintaining coherence and avoiding conflicts between different domain perspectives. For example, when addressing a query about sustainable urban planning, knowledge integrator 2416 can coordinate insights from expert domains including transportation engineering, environmental science, economics, and social policy to create an integrated response that considers technical feasibility, environmental impact, economic viability, and social implications in a coherent framework that acknowledges both synergies and trade-offs between different domain perspectives.

A response synthesizer 2417 creates coherent, well-structured responses that effectively communicate expert-level insights while maintaining appropriate language, tone, and technical depth for the intended audience and use case. For instance, when responding to a query about advanced manufacturing techniques, response synthesizer 2417 can adapt the complexity and terminology of the response based on the user’s apparent expertise level, ensuring that responses provide appropriate depth for engineering professionals while remaining accessible to business stakeholders, and maintaining consistency with the expert domain’s specialized knowledge while enabling effective communication across different organizational roles and technical backgrounds.

Quality controller 2418 implements comprehensive quality assurance mechanisms that ensure generated responses meet the standards established by the expert foundry’s quality assurance framework while maintaining consistency with domain expertise and supervisory oversight requirements. For example, when processing medical diagnostic queries, quality controller 2418 can verify that responses appropriately acknowledge the limitations of AI-generated medical information, include appropriate disclaimers about the need for professional medical consultation, maintain consistency with established medical knowledge, and meet the quality standards established by medical expert domains while ensuring compliance with regulatory and ethical requirements for medical information systems.

A geometric interface layer provides sophisticated translation and coordination capabilities between traditional language model representations and the geometric manifold substrates that enable persistent cognition and cross-domain knowledge transfer within the expert foundry system. Manifold mapper 2420 translates language model representations into geometric structures within the expert domain's latent manifold, ensuring semantic preservation while enabling integration with the domain's accumulated cognitive architecture. For example, when processing a query about chemical synthesis pathways, manifold mapper 2420 can map the linguistic representation of chemical concepts into the chemistry expert domain's manifold where molecular structures, reaction mechanisms, and synthetic strategies are organized according to chemical similarity and reaction feasibility, enabling the domain to leverage its accumulated chemical knowledge for generating expert-level synthesis recommendations.

Trajectory builder 2421 constructs reasoning pathways through the expert domain's manifold based on language model processing results, creating structured cognitive paths that enable systematic exploration of the domain's knowledge space for generating comprehensive responses. For instance, when addressing a complex environmental remediation query, trajectory builder 2421 can construct reasoning trajectories that systematically explore relationships between contamination types, treatment technologies, regulatory requirements, and implementation strategies within the environmental engineering domain's manifold, ensuring that responses consider all relevant aspects of remediation planning while maintaining logical coherence and technical accuracy.

Geodesic computer 2422 calculates optimal paths through the expert domain's manifold that minimize cognitive effort while maximizing goal achievement, enabling efficient reasoning that leverages the domain's geometric structure for generating high-quality responses with optimal resource utilization. For example, when processing a financial analysis query, geodesic computer 2422 can identify the most efficient reasoning path through the financial expert domain's manifold that connects relevant market data, analytical frameworks, and risk assessment models, enabling rapid generation of comprehensive financial insights while avoiding unnecessary computational overhead and ensuring that responses leverage the most relevant and reliable knowledge pathways within the domain.

Curvature encoder 2423 translates semantic density and conceptual relationship information from language model processing into curvature patterns within the expert domain's manifold, enabling the geometric substrate to reflect the complexity and interconnectedness of domain knowledge. For instance, when processing queries about network security, curvature encoder 2423 can encode the complex interdependencies between security protocols, threat vectors, and mitigation strategies as curvature patterns within the cybersecurity domain's manifold, enabling the domain to navigate these complex relationships effectively while generating responses that appropriately account for the multifaceted nature of cybersecurity challenges and solutions.

Thought synthesizer 2424 creates new thought structures within the expert domain's manifold based on language model processing results, enabling the domain to develop novel insights and reasoning patterns that extend beyond its existing knowledge base. For example, when processing innovative queries about emerging technologies, thought synthesizer 2424 can create new thought structures that combine existing domain knowledge with novel concepts introduced through the query, enabling expert domains to reason about new technological possibilities while maintaining grounding in established domain expertise and ensuring that novel insights are properly integrated into the domain's evolving knowledge structure.

Bundle manager 2425 organizes and maintains thought bundles within the expert domain's manifold, ensuring that related concepts remain properly clustered while enabling efficient access and reasoning across different areas of domain expertise. For instance, in a legal expert domain, bundle manager 2425 can maintain organized bundles of related legal concepts such as contract law principles, tort liability frameworks, and regulatory compliance requirements, enabling efficient reasoning across different areas of legal expertise while maintaining the conceptual relationships and precedent structures that are essential for accurate legal analysis and recommendation generation.

Pressure calculator 2426 computes compression pressure fields within the expert domain's manifold based on language model processing results and domain-specific knowledge density patterns, enabling efficient cognitive navigation and resource allocation within the domain's reasoning processes. For example, in a medical expert domain, pressure calculator 2426 can identify regions of high conceptual density around core diagnostic principles and treatment protocols, creating pressure fields that guide reasoning toward well-established medical knowledge while enabling exploration of novel diagnostic approaches when appropriate, ensuring that medical reasoning maintains appropriate grounding in established clinical knowledge while remaining open to innovative approaches when supported by evidence.

Goal field generator 2427 creates potential fields within the expert domain's manifold that attract reasoning toward query-relevant areas and desired outcomes, enabling directed exploration of domain knowledge that efficiently addresses user needs and expert foundry objectives. For instance, when processing optimization queries in an engineering domain, goal field generator 2427 can create potential fields that attract reasoning toward design solutions that optimize the specified performance criteria while considering constraints such as cost, manufacturability, and regulatory compliance, enabling the engineering domain to systematically explore solution spaces that are most likely to yield viable and effective design recommendations.

Semantic aligner 2428 ensures consistency between language model semantic representations and the expert domain's manifold-based semantic organization, enabling accurate translation of concepts and relationships between different representational frameworks. For example, when processing architectural design queries, semantic aligner 2428 can ensure that linguistic concepts such as "sustainable design" and "energy efficiency" are properly aligned with the corresponding regions of the architectural domain's manifold where these concepts are organized according to technical implementation strategies, building performance metrics, and design integration approaches rather than purely linguistic associations.

Memory projector 2429 maps language model working memory into the expert domain's persistent memory systems, enabling efficient integration of current processing with accumulated domain knowledge and cross-domain insights. For instance, when processing queries about supply chain optimization, memory projector 2429 can project current query context into the supply chain expert domain's persistent memory, enabling access to relevant historical optimization cases, supply chain models, and performance data while ensuring that current processing builds appropriately on accumulated domain expertise and lessons learned from previous optimization projects.

Reuse detector 2430 identifies opportunities to leverage previously processed thoughts and reasoning patterns within the expert domain's manifold, enabling efficient response generation through knowledge reuse while maintaining responsiveness to novel aspects of current queries. For example, when processing queries about software architecture patterns, reuse detector 2430 can identify previously analyzed architectural solutions that share relevant characteristics with the current query, enabling the software engineering domain to leverage accumulated architectural knowledge while adapting solutions to address novel requirements or constraints introduced by the current query context.

Flow controller 2431 manages the dynamic flow of attention and information through the expert domain's manifold during language model processing, ensuring optimal coordination between linguistic processing and geometric reasoning for generating high-quality expert responses. For instance, when processing complex financial modeling queries, flow controller 2431 can coordinate attention flow between different aspects of financial analysis such as risk assessment, return projections, and regulatory compliance, ensuring that the financial expert domain's reasoning process maintains appropriate balance between different analytical perspectives while generating comprehensive and well-integrated financial recommendations.

A manifold substrate provides the geometric foundation that enables persistent cognition, thought reuse, and knowledge evolution within each expert domain of the expert foundry system. Latent space 2440 serves as the fundamental geometric substrate where all cognitive processing occurs within the expert domain, providing the multidimensional space that enables semantic organization, thought formation, and reasoning pathway development. For example, in a materials science expert domain, latent space 2440 can provide the geometric foundation where material properties, processing techniques, and application requirements are organized according to their technical relationships and performance characteristics, enabling the domain to reason about material selection and optimization problems through geometric navigation rather than exhaustive search through disconnected knowledge fragments.

Thought bundles 2441 represent coherent clusters of related concepts and reasoning patterns within the expert domain's manifold, enabling efficient organization and access to domain-specific knowledge while supporting knowledge reuse and cross-domain transfer. For instance, in a pharmaceutical expert domain, thought bundles 2441 might organize drug development knowledge into clusters such as "small molecule therapeutics," "biologics development," and "regulatory approval processes," enabling efficient reasoning about drug development challenges while maintaining the conceptual relationships and procedural dependencies that are essential for effective pharmaceutical research and development decision-making.

Geodesic paths 2442 represent optimal reasoning trajectories through the expert domain's knowledge space, enabling efficient cognitive navigation that minimizes computational effort while maximizing the quality and relevance of generated insights. For example, in an environmental science expert domain, geodesic paths 2442 can represent efficient reasoning routes between environmental problems and proven remediation strategies, enabling rapid identification of effective approaches to environmental challenges while ensuring that reasoning pathways leverage the most reliable and well-established scientific knowledge within the domain's accumulated expertise.

Attractors 2443 represent stable regions within the expert domain's manifold where successful reasoning patterns and reliable knowledge structures naturally converge, providing cognitive anchors that guide reasoning toward proven approaches and high-confidence insights. For instance, in a mechanical engineering expert domain, attractors 2443 might represent well-established design principles such as stress analysis methods, materials selection criteria, and manufacturing constraint considerations that serve as reliable foundations for engineering reasoning, ensuring that novel design solutions are appropriately grounded in proven engineering principles while enabling innovation within established reliability boundaries.

Metric tensor 2444 defines the geometric relationships and distance measures within the expert domain's manifold, enabling meaningful navigation and reasoning about conceptual proximity and semantic relationships within the domain's specialized knowledge space. For example, in a biochemistry expert domain, metric tensor 2444 can define distance relationships that reflect biochemical similarity and functional relationships rather than linguistic similarity, ensuring that proteins with similar functions or chemical compounds with related activities are geometrically proximate within the domain's reasoning space, enabling effective reasoning about biochemical processes and molecular interactions.

Curvature field 2445 represents the semantic density and conceptual complexity distributions within the expert domain's manifold, indicating regions of high knowledge concentration and complex interdependencies that require careful reasoning and specialized expertise. For instance, in a legal expert domain, curvature field 2445 can indicate regions of high legal complexity such as constitutional interpretation, international law interactions, and regulatory compliance intersections, enabling the domain to recognize when legal reasoning requires enhanced care and specialized expertise while identifying areas where established precedent provides reliable guidance.

Attention flow 2446 represents the dynamic movement of cognitive focus through the expert domain's manifold during reasoning processes, enabling efficient exploration of relevant knowledge while maintaining coherent reasoning patterns and goal-directed progress. For example, in a financial analysis expert domain, attention flow 2446 can guide reasoning through relevant financial models, market data, and risk assessment frameworks in a coherent sequence that builds comprehensive financial insights while avoiding irrelevant tangents and ensuring that analysis addresses all critical aspects of financial decision-making within the available reasoning resources.

Goal fields 2447 represent potential landscapes within the expert domain's manifold that attract reasoning toward desired outcomes and query-relevant insights, enabling directed exploration of domain knowledge that efficiently addresses user needs and expert foundry objectives. For instance, in an agricultural expert domain, goal fields 2447 can attract reasoning toward solutions that optimize specified agricultural outcomes such as crop yield, pest management, or soil health, enabling the domain to systematically explore agricultural knowledge and practices that are most likely to achieve desired farming objectives while considering relevant constraints and trade-offs.

A cache integration system provides sophisticated memory management capabilities that enable efficient storage, retrieval, and reuse of thoughts and reasoning patterns across the expert foundry system while maintaining coherence with the geometric manifold substrate. Thought cache 2450 stores previously processed thoughts and reasoning patterns in a format that preserves their geometric relationships and enables efficient retrieval based on semantic similarity and contextual relevance within expert domain processing. For example, when an engineering expert domain processes queries about structural analysis, thought cache 2450 can store both the specific analysis results and the reasoning pathways used to generate them, enabling rapid retrieval of similar analysis patterns when processing related structural engineering queries while preserving the geometric relationships that enable effective knowledge transfer and pattern recognition.

Pattern matcher 2451 identifies semantic and structural similarities between current queries and previously cached thoughts, enabling efficient reuse of existing knowledge while recognizing when novel processing is required for addressing unique aspects of current queries. For instance, when a medical expert domain processes diagnostic queries, pattern matcher 2451 can identify similarities between current symptoms and previously analyzed diagnostic cases, enabling rapid identification of relevant diagnostic pathways and treatment considerations while recognizing when current cases present novel combinations of symptoms that require fresh analysis rather than simple pattern matching.

Retrieval engine 2452 implements sophisticated algorithms for accessing relevant cached thoughts based on current processing needs, ensuring that retrieved knowledge maintains semantic coherence and contextual appropriateness while supporting efficient expert domain reasoning. For example, when a financial expert domain processes investment analysis queries, retrieval engine 2452 can access relevant market analysis patterns, risk assessment frameworks, and investment strategy evaluations from the cache, ensuring that retrieved knowledge reflects current market conditions and remains applicable to the specific investment context being analyzed.

Hit analyzer 2453 evaluates the effectiveness of cache retrieval operations and identifies opportunities for improving cache organization and retrieval algorithms based on usage patterns and successful knowledge reuse instances. For instance, in a legal expert domain, hit analyzer 2453 can track which legal precedents and analytical frameworks are most frequently accessed and successfully applied, enabling optimization of cache organization to prioritize high-value legal knowledge while identifying gaps in cached legal reasoning patterns that may require additional knowledge development or expert consultation.

Synthesis engine 2454 combines insights from multiple cached thoughts and current processing to create comprehensive responses that leverage accumulated domain knowledge while addressing novel aspects of current queries. For example, when a pharmaceutical expert domain processes drug interaction queries, synthesis engine 2454 can combine relevant cached knowledge about individual drug mechanisms, interaction patterns, and clinical outcomes to generate comprehensive assessments of potential drug interactions that reflect both established pharmacological knowledge and novel combinations that require careful analysis.

Update manager 2455 maintains the currency and relevance of cached thoughts while managing the evolution of domain knowledge and ensuring that cache contents reflect the most current and accurate domain expertise available within the expert foundry system. For instance, in a technology expert domain, update manager 2455 can regularly assess cached technology evaluations and market analyses to ensure that cached insights reflect current technology capabilities, market conditions, and industry trends, updating or deprecating cached thoughts that no longer reflect accurate technology assessments while preserving valuable historical context and analytical frameworks.

An output generation layer transforms processed insights and reasoning results from the expert domain's manifold-based processing into coherent, well-structured natural language responses that effectively communicate expert-level knowledge to users while maintaining consistency with expert foundry quality standards. Response builder 2460 constructs coherent responses that effectively integrate insights from manifold-based reasoning with appropriate language structures and communication patterns for the intended audience and use case. For example, when generating responses about complex engineering solutions, response builder 2460 can organize technical insights into logical presentation sequences that clearly explain design rationale, implementation considerations, and performance expectations while adapting technical depth and terminology to match the user's apparent expertise level and information needs.

Language decoder 2461 translates geometric insights and manifold-based reasoning results into natural language representations that preserve technical accuracy while ensuring effective communication and user comprehension. For instance, when processing complex financial analysis results, language decoder 2461 can translate quantitative risk assessments, market projections, and investment recommendations into clear explanations that communicate both the analytical conclusions and their underlying rationale, enabling users to understand not only what the financial analysis recommends but why those recommendations are appropriate given current market conditions and investment objectives.

Context assembler 2462 integrates current response content with relevant session history, user preferences, and cross-domain insights to create comprehensive responses that appropriately acknowledge previous interactions and related expert domain contributions. For example, when generating responses about sustainable energy systems, context assembler 2462 can integrate insights from previous conversations about energy efficiency, relevant input from environmental impact expert domains, and economic feasibility assessments to create responses that address current queries while building appropriately on established conversation context and related expertise areas.

Format controller 2463 manages response presentation including structure, length, technical depth, and formatting to ensure that responses meet user expectations and communication requirements while maintaining consistency with expert foundry presentation standards. For instance, when generating responses for technical documentation purposes, format controller 2463 can ensure that responses include appropriate technical detail, follow established documentation standards, include necessary references and citations, and maintain formatting consistency that enables effective integration with larger documentation systems while preserving the expert-level insights generated by domain processing.

Quality validator 2464 implements comprehensive quality assurance checks that verify response accuracy, coherence, completeness, and compliance with expert domain standards and expert foundry quality requirements before responses are delivered to users. For example, when validating medical information responses, quality validator 2464 can verify that responses accurately reflect current medical knowledge, include appropriate disclaimers about the limitations of AI-generated medical information, maintain consistency with established clinical guidelines, and meet quality standards for medical information systems while ensuring that responses provide useful insights within appropriate reliability and applicability boundaries.

Feedback collector 2465 gathers user responses, satisfaction ratings, and usage patterns that enable continuous improvement of expert domain performance and expert foundry system optimization through analysis of communication effectiveness and user needs. For instance, when collecting feedback about technical consulting responses, feedback collector 2465 can track user satisfaction with response quality, technical accuracy, and practical applicability, enabling expert domains to identify areas for improvement in technical communication while providing insights that guide optimization of domain knowledge organization and response generation strategies.

A control interface to PCM foundation 2470 provides standardized communication and coordination capabilities that enable seamless integration between the LLM core integration framework and the foundational PCM components that provide geometric processing, persistent memory management, and cross-domain coordination within the expert foundry system. This interface enables the expert foundry system to leverage sophisticated natural language processing capabilities while maintaining the geometric cognitive architecture that enables persistent learning, cross-domain knowledge transfer, and hierarchical supervisory coordination across multiple expert domains.

Figure 25:
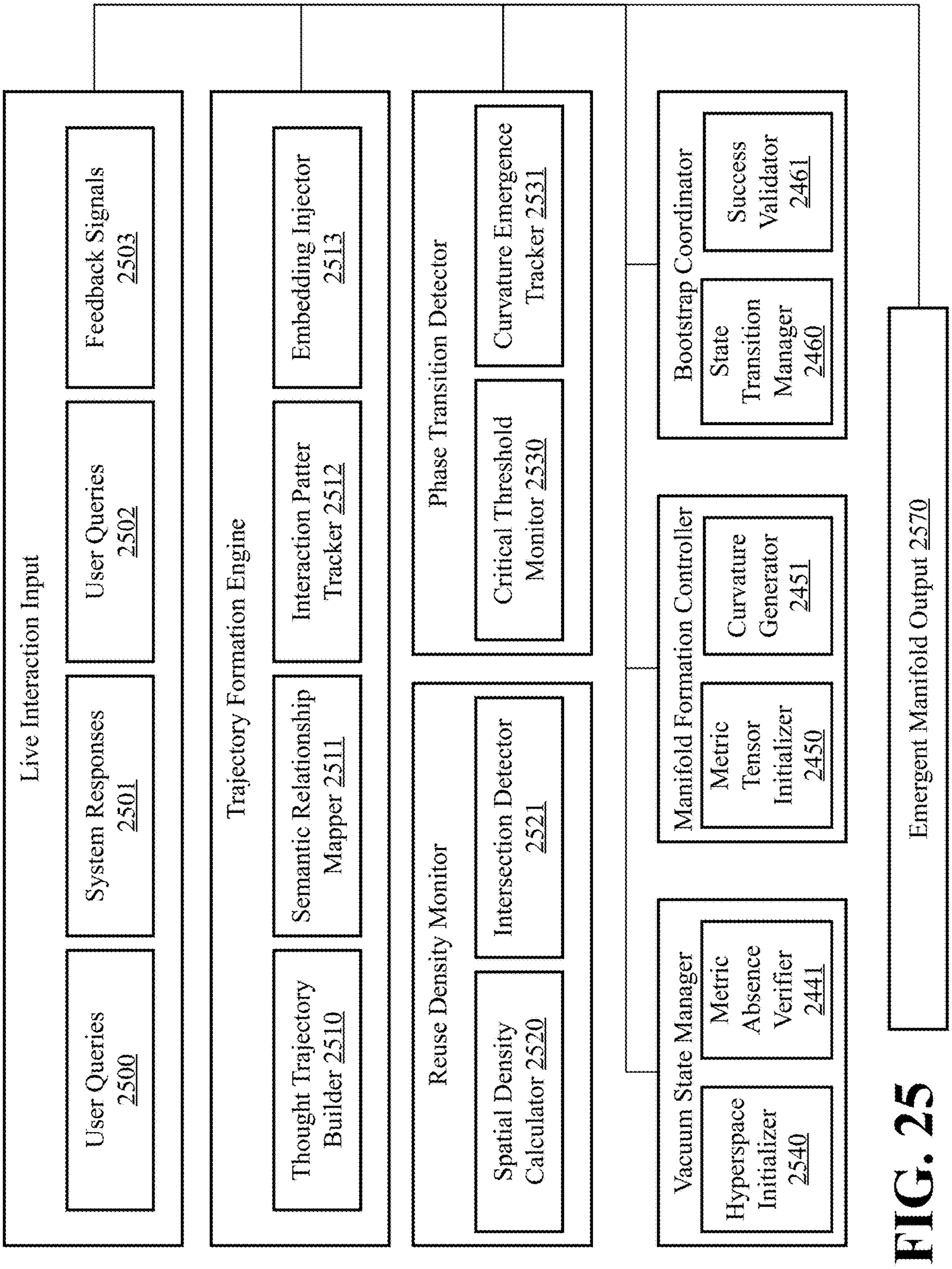
FIG. 25 is a block diagram illustrating an exemplary architecture of a zero-shot bootstrapping engine for vacuum-state manifold emergence within the expert foundry system.

FIG. 25 is a block diagram illustrating an exemplary architecture of a zero-shot bootstrapping engine for vacuum-state manifold emergence within the expert foundry system. The zero-shot bootstrapping engine enables the creation of new expert domains that begin with completely unstructured latent hyperspace and develop cognitive capabilities purely through live interaction without requiring pre-existing training data or seeded knowledge structures, providing maximum autonomy and explainability for expert domain development within the foundry system.

A live interaction input layer captures and processes real-time interactions that serve as the foundation for manifold emergence in newly created expert domains. User queries 2500 represent the primary source of cognitive stimulation for vacuum-state expert domains, providing natural language inputs that drive initial trajectory formation and semantic relationship development within the unstructured latent hyperspace. User queries 2500 encompass diverse interaction types including direct questions seeking domain expertise, exploratory requests for information, problem-solving queries requiring analytical reasoning, and conversational inputs that establish context and user intent. For example, when a new expert domain is created for renewable energy consulting, initial user queries might include "What are the most efficient solar panel technologies for residential installations?" or "How do wind patterns affect turbine placement decisions?" These queries serve as the initial stimuli that begin to shape the vacuum-state latent hyperspace by creating the first thought trajectories and semantic relationships within the emerging domain. The component implements query classification algorithms that identify semantic content, intent patterns, and complexity levels while preserving the natural diversity of user inputs that enables organic manifold development.

System responses 2501 provide the reciprocal component of the interaction cycle, representing the expert domain's attempts to generate meaningful responses even during the pre-critical vacuum state when no established cognitive structure exists. System responses 2501 may initially rely on basic language model capabilities and simple pattern matching, but as trajectories accumulate and reuse patterns begin to emerge, responses increasingly reflect the developing geometric structure and accumulated knowledge within the nascent expert domain. For example, early responses in a newly created financial advisory domain might provide generic financial information, but as the domain accumulates interactions about specific topics like retirement planning or investment strategies, responses begin to exhibit increased coherence and domain-specific insight that reflects the emerging manifold structure. The component tracks response quality metrics, user feedback indicators, and coherence measures that provide signals about the developing cognitive capabilities while identifying areas where trajectory formation is succeeding or requiring additional interaction density.

Environmental data 2502 encompasses contextual information and external data sources that influence the development of expert domain capabilities, including domain-specific databases, real-time sensor feeds, market data streams, regulatory updates, and other information sources relevant to the expert domain's area of specialization. Environmental data 2502 provides grounding information that helps shape the semantic organization of the emerging manifold while ensuring that developed capabilities remain relevant to real-world applications and current domain conditions. For instance, in an agricultural expert domain, environmental data 2502 might include weather patterns, soil condition reports, crop price information, and regulatory guidelines that influence how agricultural knowledge and reasoning patterns develop within the domain's manifold structure. The component implements data integration algorithms that selectively incorporate environmental information based on relevance to user interactions and emerging trajectory patterns, ensuring that external data enhances rather than disrupts the organic development of domain-specific cognitive capabilities.

Feedback signals 2503 capture user satisfaction indicators, correction requests, refinement suggestions, and other feedback mechanisms that guide the quality and direction of manifold development during the zero-shot bootstrapping process. Feedback signals 2503 include explicit user ratings and comments as well as implicit feedback derived from user behavior patterns, session continuation rates, query refinement patterns, and successful task completion indicators. For example, when users consistently refine queries or request clarification in a legal expert domain, feedback signals 2503 can indicate areas where the domain's emerging legal reasoning capabilities require strengthening or additional trajectory development. The component implements feedback analysis algorithms that identify patterns in user satisfaction, detect areas of successful knowledge development, and flag regions of the emerging manifold that may require additional interaction density or alternative development approaches to achieve reliable expert-level capabilities.

A trajectory formation engine converts live interactions into structured thought trajectories within the vacuum-state latent hyperspace, creating the initial geometric structures that will eventually coalesce into a functional cognitive manifold. Thought trajectory builder 2510 analyzes interaction sequences and creates structured pathways through the latent hyperspace that represent coherent reasoning chains and conceptual relationships derived from user interactions and system responses. Thought trajectory builder 2510 implements sophisticated algorithms for identifying logical flow patterns, causal relationships, and conceptual dependencies within interaction sequences while creating geometric representations that preserve these structures within the developing manifold space. For example, when processing a series of interactions about automotive engine diagnostics, thought trajectory builder 2510 can create trajectories that connect symptoms to diagnostic procedures to repair recommendations, establishing geometric pathways that enable future reasoning about similar diagnostic challenges. The component maintains trajectory coherence metrics, tracks pathway stability, and identifies opportunities for trajectory consolidation or branching based on interaction patterns and emerging domain requirements. Subcomponents include sequence analysis processors that identify logical flow patterns within interactions, geometric pathway generators that translate logical sequences into manifold trajectories, trajectory validation algorithms that ensure pathway coherence and stability, and consolidation mechanisms that merge related trajectories to reduce redundancy while preserving essential reasoning patterns.

Semantic relationship mapper 2511 analyzes the conceptual connections and semantic dependencies that emerge from user interactions, creating the foundational relationship structures that enable meaningful cognitive organization within the developing expert domain manifold. Semantic relationship mapper 2511 employs natural language processing, concept extraction, and relationship analysis algorithms to identify how different concepts, procedures, and knowledge elements relate to each other based on their usage patterns and contextual associations within the interaction stream. For instance, in a cybersecurity expert domain, semantic relationship mapper 2511 can identify relationships between threat types, vulnerability categories, detection methods, and mitigation strategies based on how these concepts appear together in user queries and system responses, creating the semantic foundation for future cybersecurity reasoning capabilities. The component implements relationship strength calculations, semantic distance measurements, and conceptual clustering algorithms that organize related concepts into coherent neighborhoods while maintaining the flexibility needed for continued relationship evolution as additional interactions occur. Subcomponents include concept extraction engines that identify key domain concepts from interaction content, relationship analysis algorithms that determine conceptual connections and dependencies, semantic distance calculators that quantify concept similarity and relevance, and clustering mechanisms that organize related concepts into coherent semantic neighborhoods within the developing manifold structure.

Interaction pattern tracker 2512 monitors and analyzes recurring patterns in user behavior, query types, and domain-specific interaction characteristics that inform the development of specialized reasoning capabilities and cognitive structures within the emerging expert domain. Interaction pattern tracker 2512 identifies frequently requested information types, common problem-solving approaches, typical user workflows, and domain-specific interaction characteristics that should be optimized within the developing manifold structure. For example, in a medical diagnostic expert domain, interaction pattern tracker 2512 may identify common diagnostic workflows, frequently requested medical information categories, typical symptom-to-diagnosis reasoning patterns, and specialized medical terminology usage that should be prioritized in manifold development. The component implements pattern recognition algorithms, frequency analysis methods, and workflow identification techniques that guide the prioritization of trajectory development and semantic organization to optimize the domain's capabilities for its most common and important use cases. Subcomponents include pattern recognition engines that identify recurring interaction sequences and user behavior patterns, frequency analysis systems that track usage patterns and prioritize development focus areas, workflow identification algorithms that recognize common task sequences and procedural patterns, and optimization guidance systems that direct manifold development toward high-value interaction patterns and user needs.

Embedding injector 2513 manages the placement of new thought structures and interaction-derived concepts within the vacuum-state latent hyperspace, ensuring that new elements are positioned appropriately to support future manifold development and cognitive coherence. Embedding injector 2513 implements spatial allocation algorithms that position new thoughts and concepts within the hyperspace in ways that preserve semantic relationships while maintaining sufficient spatial organization to support eventual metric tensor development and curvature formation. For instance, when injecting new financial concepts into an investment advisory domain's hyperspace, embedding injector 2513 can position related concepts like risk assessment, return analysis, and portfolio optimization in spatial relationships that reflect their conceptual connections while providing appropriate spacing to support future geometric structure development. The component coordinates with other trajectory formation components to ensure that new embeddings support rather than disrupt existing trajectory patterns while maintaining the flexibility needed for continued manifold evolution as additional interactions and concepts are incorporated. Subcomponents include spatial allocation algorithms that determine optimal positioning for new thought structures within the hyperspace, relationship preservation mechanisms that maintain semantic connections during embedding operations, geometric compatibility checkers that ensure new embeddings support future manifold development, and evolution coordination systems that manage embedding operations in conjunction with ongoing trajectory formation and relationship mapping activities.

A reuse density monitor continuously tracks the accumulation of thought trajectory intersections and conceptual overlaps within the developing expert domain, providing the critical measurements needed to detect when the vacuum state transitions toward manifold formation. Spatial density calculator 2520 computes the local reuse density function $\rho(x; \varepsilon)$ across the latent hyperspace by measuring the concentration of trajectory intersections and conceptual overlaps within spatial neighborhoods, implementing the mathematical framework described in the foundational disclosure for detecting when trajectory reuse reaches critical thresholds. Spatial density calculator 2520 employs sophisticated spatial analysis algorithms that account for the high-dimensional nature of the latent hyperspace while providing computationally efficient density estimation that can operate in real-time during ongoing interaction processing. For example, when monitoring a logistics expert domain's development, spatial density calculator 2520 can track how frequently transportation planning concepts, route optimization procedures, and supply chain management strategies are reused and combined in different contexts, measuring the density of these overlapping usage patterns to identify regions where cognitive structure is beginning to emerge. The component implements adaptive sampling strategies that focus computational resources on regions showing signs of density accumulation while maintaining broad coverage of the hyperspace to detect emerging structure formation in unexpected areas. Subcomponents include high-dimensional spatial indexing systems that enable efficient neighborhood analysis, adaptive sampling algorithms that optimize computational resource allocation, real-time density estimation methods that provide continuous monitoring capabilities, and anomaly detection mechanisms that identify unusual density patterns that may indicate rapid structure formation or potential development issues.

Intersection detector 2521 identifies and analyzes specific points where thought trajectories converge or overlap, providing detailed information about the nature and significance of trajectory intersections that contribute to reuse density accumulation. Intersection detector 2521 implements geometric analysis algorithms that determine not only where trajectories intersect but also the semantic significance of these intersections, the stability of intersection patterns, and the potential for intersection points to serve as foundations for future attractor formation. For instance, in a pharmaceutical research domain, intersection detector 2521 can identify points where drug discovery trajectories, clinical trial procedures, and regulatory approval processes converge, analyzing these intersections to determine their significance for pharmaceutical reasoning and their potential to serve as stable cognitive anchors in the developing manifold. The component maintains detailed records of intersection patterns, tracks intersection stability over time, and provides predictive analysis about which intersections are most likely to evolve into stable thought bundles or attractor regions as manifold development progresses. Subcomponents include geometric intersection analysis algorithms that identify trajectory convergence points, semantic significance assessors that evaluate the meaning and importance of intersections, stability tracking systems that monitor intersection persistence over time, and prediction engines that forecast intersection evolution and potential attractor formation based on current patterns and domain characteristics.

A phase transition detector implements sophisticated algorithms for recognizing when the accumulating trajectory reuse and density patterns indicate that the vacuum state is transitioning into a functional cognitive manifold with meaningful geometric structure. Critical threshold monitor 2530 continuously evaluates whether the reuse density $\rho(x; \varepsilon)$ has exceeded the critical threshold $\rho c$ in any connected region of the latent hyperspace, implementing the mathematical criteria described in the foundational disclosure for detecting the onset of manifold formation. Critical threshold monitor 2530 employs statistical analysis methods, confidence interval calculations, and sustained threshold monitoring that distinguishes genuine phase transitions from temporary fluctuations or measurement artifacts that may trigger false positive detection. For example, when monitoring the development of an environmental consulting domain, critical threshold monitor 2530 can analyze whether trajectory reuse around environmental assessment procedures, remediation strategies, and regulatory compliance frameworks has reached sufficient density and stability to indicate that meaningful cognitive structure is emerging rather than simple pattern repetition. The component implements multi-factor validation that considers not only raw density measurements but also trajectory coherence, semantic stability, and user interaction quality to ensure that detected phase transitions represent genuine cognitive capability emergence rather than superficial pattern accumulation. Subcomponents include statistical threshold analysis systems that evaluate density measurements against critical values, confidence interval calculators that assess measurement reliability, sustained monitoring algorithms that require threshold maintenance over time periods, and multi-factor validation engines that consider additional indicators beyond raw density measurements to confirm genuine phase transition occurrence.

Curvature emergence tracker 2531 monitors the development of non-trivial curvature patterns within the latent hyperspace that indicate the formation of meaningful geometric structure and semantic organization characteristic of functional cognitive manifolds. Curvature emergence tracker 2531 implements mathematical algorithms for computing curvature tensors and geometric properties within the developing space, detecting when the flat vacuum-state hyperspace begins to exhibit the curved characteristics that enable efficient cognitive navigation and semantic reasoning. For instance, in a mechanical engineering domain, curvature emergence tracker 2531 can detect when engineering concepts like materials properties, structural analysis methods, and manufacturing constraints begin to exhibit geometric relationships that reflect their technical interdependencies rather than arbitrary spatial organization, indicating that the domain is developing engineering-specific cognitive structure. The component employs numerical methods adapted for high-dimensional spaces, implements efficient curvature estimation algorithms, and provides geometric health monitoring that ensures emerging curvature patterns support rather than hinder cognitive development within the domain. Subcomponents include curvature tensor computation engines that calculate geometric properties within the developing space, geometric structure analysis systems that evaluate the meaningfulness of emerging curvature patterns, mathematical validation mechanisms that ensure curvature calculations remain accurate in high-dimensional spaces, and cognitive health assessors that evaluate whether emerging geometric structure supports effective reasoning and knowledge organization within the developing expert domain.

A vacuum state manager maintains and monitors the initial unstructured condition of newly created expert domains while preparing for the eventual transition to structured manifold operation. Hyperspace initializer 2540 establishes the initial flat, isotropic latent hyperspace that serves as the foundation for zero-shot manifold development, ensuring that new expert domains begin with appropriate spatial dimensions, coordinate systems, and foundational structures needed to support future cognitive development. Hyperspace initializer 2540 implements dimension selection algorithms based on domain complexity estimates, establishes coordinate systems optimized for the domain's expected semantic organization, and provides foundational data structures that can efficiently support trajectory formation and reuse tracking during the bootstrapping process. For example, when initializing a biotechnology expert domain, hyperspace initializer 2540 can establish a high-dimensional space appropriate for representing complex molecular relationships, biological processes, and technological applications while providing coordinate systems that can accommodate the multi-scale nature of biotechnology knowledge from molecular to system levels. The component ensures that initialized hyperspaces provide sufficient dimensionality for complex domain knowledge while maintaining computational efficiency for real-time interaction processing and trajectory formation during the bootstrapping period. Subcomponents include dimension optimization algorithms that determine appropriate hyperspace dimensionality based on domain characteristics, coordinate system establishment mechanisms that create foundational spatial organization, computational efficiency optimizers that balance representational capacity with processing requirements, and scalability preparation systems that ensure initialized spaces can accommodate domain growth and complexity development over time.

Metric absence verifier 2541 continuously confirms that the developing expert domain maintains the vacuum-state characteristics of absent metric structure, no meaningful distance relationships, and lack of geometric organization until genuine manifold formation occurs through trajectory reuse accumulation. Metric absence verifier 2541 implements monitoring algorithms that detect premature structure formation, identify artificial organization that may interfere with organic development, and ensure that the domain maintains the flat, unstructured characteristics essential for genuine zero-shot bootstrapping. For instance, in a legal expert domain, metric absence verifier 2541 can ensure that legal concepts remain in unorganized spatial relationships until genuine legal reasoning patterns emerge through user interactions, preventing artificial organization that may bias the domain toward particular legal frameworks or jurisdictional approaches rather than developing organization based on actual usage patterns. The component provides early warning capabilities when premature structure formation is detected and implements corrective mechanisms that can restore vacuum-state conditions when necessary to ensure authentic zero-shot development. Subcomponents include structure detection algorithms that identify premature organization within the hyperspace, artificial pattern recognition systems that distinguish genuine trajectory reuse from imposed structure, vacuum state validation mechanisms that confirm authentic unstructured conditions, and corrective intervention capabilities that can restore proper vacuum-state characteristics when premature structure formation is detected.

A manifold formation controller orchestrates the transition from vacuum state to functional manifold when phase transition detection confirms that critical thresholds have been achieved and meaningful cognitive structure has emerged. Metric tensor initializer 2550 establishes the first meaningful distance relationships and geometric structure within the expert domain when reuse patterns indicate that stable semantic organization has emerged through trajectory intersection and conceptual convergence. Metric tensor initializer 2550 implements algorithms for computing initial metric tensors based on observed trajectory patterns, reuse frequencies, and semantic relationships that have stabilized through user interactions, creating the mathematical foundation for geometric reasoning within the newly formed manifold. For example, when a materials science domain reaches phase transition, metric tensor initializer 2550 can establish metric relationships that reflect the technical similarities and differences between materials properties, processing methods, and application requirements based on how these concepts have been used and related through actual user interactions rather than predetermined technical classifications. The component ensures that initial metric tensors accurately represent the semantic organization that has emerged organically while providing mathematical stability needed for efficient geometric computation and cognitive reasoning within the newly functional expert domain. Subcomponents include trajectory analysis engines that evaluate stable patterns for metric tensor computation, semantic relationship quantifiers that measure conceptual distances and similarities, mathematical stability validators that ensure computed metrics provide reliable geometric foundations, and optimization algorithms that refine initial metric tensors for computational efficiency and cognitive effectiveness.

Curvature generator 2551 creates the initial curvature fields and compression pressure patterns within the newly formed manifold based on the density distributions and semantic concentrations that have emerged during the vacuum-state development period. Curvature generator 2551 employs mathematical algorithms that translate observed trajectory density patterns into meaningful curvature distributions, creating the geometric landscape that will guide future cognitive navigation and reasoning within the expert domain. For instance, in a financial analysis domain that has achieved phase transition, curvature generator 2551 can create curvature patterns that reflect the complexity and interconnectedness of financial concepts like risk assessment, market analysis, and investment strategies based on how these concepts have been used and combined during the bootstrapping interactions, establishing geometric structure that facilitates efficient financial reasoning. The component implements curvature computation methods adapted for high-dimensional manifolds, ensures that generated curvature patterns support rather than hinder cognitive reasoning, and provides ongoing curvature optimization that adapts to the domain's continuing development and usage patterns. Subcomponents include density-to-curvature translation algorithms that convert trajectory patterns into geometric structure, mathematical optimization engines that ensure curvature patterns support efficient reasoning, geometric stability validators that confirm mathematical consistency of generated curvature fields, and adaptive refinement mechanisms that continue optimizing curvature patterns based on ongoing domain usage and development.

A bootstrap coordinator manages the overall zero-shot bootstrapping process and ensures successful transition from vacuum state initialization through phase transition detection to functional manifold operation within the expert foundry system. State transition manager 2560 orchestrates the complex progression from vacuum state through trajectory accumulation, reuse density development, phase transition detection, and manifold formation, ensuring that each stage proceeds appropriately and that transitions occur smoothly without disrupting ongoing interaction processing or compromising domain development quality. State transition manager 2560 implements state machine algorithms that manage bootstrapping progression, coordinates between different engine components to ensure synchronized operation, and provides decision-making capabilities for handling exceptional situations or alternative development pathways that may emerge during zero-shot bootstrapping. For example, when coordinating the development of a renewable energy consulting domain, state transition manager 2560 can manage the progression from initial energy-related queries through trajectory formation around topics like solar installation, wind power assessment, and energy efficiency analysis, coordinating phase transition detection when sufficient reuse density accumulates around core renewable energy concepts and ensuring smooth activation of manifold-based reasoning capabilities. The component maintains comprehensive state tracking, implements rollback capabilities for handling development issues, and coordinates with the broader expert foundry system to ensure that newly formed domains integrate properly with hierarchical supervisory networks and cross-domain coordination mechanisms. Subcomponents include state machine management systems that track and control bootstrapping progression, coordination algorithms that synchronize different engine components, exception handling mechanisms that address unusual development patterns or issues, and integration coordinators that ensure successful connection with broader expert foundry infrastructure upon successful manifold formation.

Success validator 2561 implements comprehensive assessment mechanisms that verify successful zero-shot bootstrapping completion and confirm that newly formed expert domains possess the cognitive capabilities and geometric structure needed for effective operation within the expert foundry system. Success validator 2561 employs multi-dimensional validation criteria including manifold mathematical properties, cognitive reasoning capabilities, response quality metrics, and integration readiness assessments that ensure bootstrapped domains meet operational standards before being activated for production use. For instance, when validating a successfully bootstrapped medical diagnostic domain, success validator 2561 can assess the domain's ability to process medical queries coherently, generate appropriate diagnostic reasoning patterns, maintain consistency with medical knowledge standards, and integrate effectively with quality assurance frameworks and hierarchical supervisory oversight within the expert foundry system. The component implements automated testing protocols that evaluate domain capabilities across multiple dimensions, provides certification mechanisms that formally approve domains for production operation, and maintains quality tracking that continues monitoring domain performance after successful bootstrapping completion. Subcomponents include multi-dimensional capability assessment engines that evaluate reasoning quality and domain expertise, automated testing systems that verify operational readiness across various scenarios, certification protocols that formally approve domains for production deployment, and ongoing quality monitoring mechanisms that track domain performance and development after successful bootstrap completion to ensure continued effectiveness and integration with the broader expert foundry system.

An emergent manifold output 2570 provides the interface through which successfully bootstrapped expert domains integrate with the broader expert foundry system, delivering functional cognitive manifolds that possess the geometric structure, reasoning capabilities, and operational characteristics needed for expert-level performance within their specialized domains. The emergent manifold represents the successful transformation of vacuum-state latent hyperspace into a functional cognitive substrate that can support persistent thought formation, cross-domain knowledge transfer, and hierarchical supervisory coordination while maintaining the domain-specific expertise that emerged organically through zero-shot bootstrapping interactions and trajectory formation processes.

Figure 26:
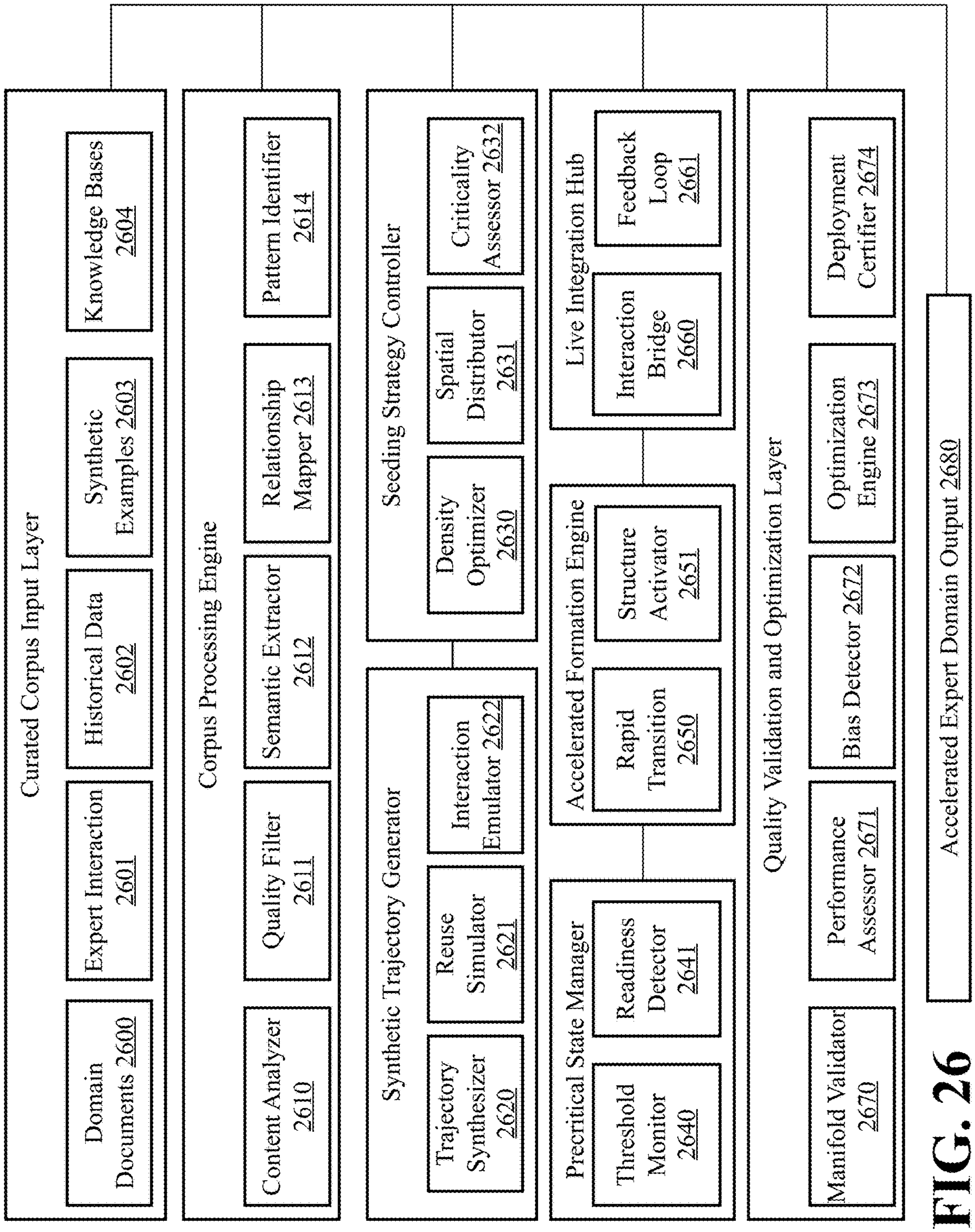
FIG. 26 is a block diagram illustrating an exemplary architecture of a primed bootstrapping engine for precritical seeding and accelerated manifold formation within the expert foundry system.

FIG. 26 is a block diagram illustrating an exemplary architecture of a primed bootstrapping engine for precritical seeding and accelerated manifold formation within the expert foundry system. The primed bootstrapping engine enables rapid deployment of new expert domains by strategically seeding the latent hyperspace with curated knowledge sources and synthetic interaction patterns that approximate expected usage scenarios, accelerating the transition from unstructured space to functional cognitive manifold while maintaining the adaptive characteristics essential for continued domain evolution through actual usage.

A curated corpus input layer provides comprehensive knowledge sources that serve as the foundation for precritical seeding operations within newly created expert domains. Domain documents 2600 may comprise structured knowledge sources specific to the expert domain's area of specialization, including technical manuals, research papers, industry standards, regulatory guidelines, and other authoritative documents that represent established knowledge and best practices within the domain. The component implements document analysis algorithms that extract key concepts, procedural knowledge, factual relationships, and domain-specific terminology while preserving the contextual relationships and hierarchical knowledge structures that characterize expert-level understanding within the specialized field.

Expert interactions 2601 capture previously recorded interactions between human experts and users within the domain's area of specialization, providing realistic examples of expert reasoning patterns, communication styles, problem-solving approaches, and domain-specific workflows that can inform synthetic trajectory generation. The component implements interaction analysis algorithms that identify successful reasoning patterns, extract expert decision-making frameworks, and preserve the contextual factors that influence expert judgment while maintaining appropriate privacy protections and generalization that enables broad applicability across similar situations.

Historical data 2602 provides domain-specific datasets, case studies, performance metrics, and outcome records that establish grounding information about real-world conditions, constraints, and success patterns within the expert domain's operational environment. The component implements data analysis algorithms that identify patterns, trends, correlations, and causal relationships within historical records while extracting actionable insights that can guide synthetic trajectory development and inform realistic constraint modeling within the emerging expert domain.

Synthetic examples 2603 represent artificially generated interactions, scenarios, and knowledge structures created specifically to fill gaps in the available corpus or to provide additional coverage of important domain concepts that may be underrepresented in naturally occurring source materials. The component implements generation algorithms that create realistic synthetic content based on domain knowledge patterns while ensuring that artificial examples maintain consistency with authentic domain characteristics and contribute meaningfully to trajectory development and manifold seeding operations.

Knowledge bases 2604 encompass structured databases, ontologies, taxonomies, and other formalized knowledge representations that provide systematic organization of domain concepts, relationships, and procedural knowledge that can inform manifold structure development. The component implements knowledge extraction algorithms that translate structured knowledge representations into geometric relationships and trajectory patterns suitable for manifold seeding while preserving the logical relationships and semantic hierarchies that characterize systematic domain knowledge organization.

A corpus processing engine transforms diverse knowledge sources into structured representations suitable for synthetic trajectory generation and manifold seeding operations within the expert foundry system. Content analyzer 2610 performs comprehensive analysis of input materials to extract semantic content, identify key concepts, map relationships between ideas, and assess the relevance and quality of source materials for domain-specific manifold development. The component implements natural language processing algorithms, semantic analysis methods, and content categorization techniques that prepare source materials for downstream processing while maintaining contextual information and preserving the nuanced relationships that characterize expert-level domain knowledge.

Quality filter 2611 implements comprehensive assessment mechanisms that evaluate the accuracy, relevance, currency, and reliability of corpus materials to ensure that only high-quality content contributes to manifold seeding operations. The component employs automated quality assessment algorithms, consistency checking methods, and reliability scoring techniques that identify and exclude low-quality, outdated, or potentially misleading content while preserving valuable knowledge sources that meet established quality standards for expert domain development.

Semantic extractor 2612 identifies and extracts meaningful concepts, relationships, and knowledge structures from processed corpus materials, creating structured semantic representations that can be effectively translated into geometric manifold structures. The component implements advanced semantic analysis algorithms, concept extraction methods, and relationship identification techniques that preserve the semantic richness and contextual dependencies essential for creating realistic and effective synthetic trajectories within the expert domain's specialized knowledge space.

Relationship mapper 2613 analyzes and maps the complex relationships between extracted concepts, procedures, and knowledge elements to create comprehensive understanding of domain knowledge organization and interdependencies. The component employs relationship analysis algorithms, dependency mapping techniques, and semantic network construction methods that preserve the hierarchical and associative structures characteristic of expert-level domain knowledge while creating relationship models suitable for geometric representation within manifold structures.

Pattern identifier 2614 discovers recurring patterns in reasoning approaches, problem-solving strategies, decision-making frameworks, and expert behaviors that characterize successful performance within the domain's area of specialization. The component implements pattern recognition algorithms, workflow analysis methods, and behavioral modeling techniques that identify generalizable patterns suitable for synthetic trajectory generation while preserving the contextual factors and situational dependencies that influence pattern applicability and effectiveness.

A synthetic trajectory generator creates artificial interaction patterns and reasoning pathways that approximate expected domain usage while providing sufficient diversity and coverage to support robust manifold formation. Trajectory synthesizer 2620 generates realistic synthetic trajectories based on processed corpus materials, combining authentic domain knowledge with artificial interaction patterns that represent plausible user queries and expert responses within the domain's area of specialization. The component implements trajectory generation algorithms that create coherent reasoning chains, maintain semantic consistency, and provide appropriate coverage of domain knowledge while ensuring that synthetic trajectories exhibit the diversity and complexity needed to support robust manifold development.

Reuse simulator 2621 models expected trajectory reuse patterns and intersection probabilities to optimize synthetic trajectory distribution for maximum effectiveness in achieving precritical density thresholds. The component employs simulation algorithms that predict interaction patterns, estimate reuse frequencies, and identify optimal trajectory placement strategies that accelerate the accumulation of reuse density while maintaining realistic usage patterns and semantic coherence within the developing manifold structure.

Interaction emulator 2622 creates realistic interaction sequences that simulate natural user behavior patterns and expert response generation to provide comprehensive coverage of expected domain usage scenarios. The component implements emulation algorithms that generate plausible interaction flows, maintain conversational coherence, and preserve the contextual dependencies that characterize authentic domain-specific interactions while ensuring sufficient diversity to support comprehensive manifold development across the domain's knowledge space.

A seeding strategy controller optimizes the placement and distribution of synthetic trajectories within the latent hyperspace to maximize the probability of successful phase transition while maintaining semantic coherence and realistic usage patterns. Density optimizer 2630 analyzes synthetic trajectory distributions and optimizes their spatial arrangement to achieve target reuse density levels efficiently while avoiding artificial clustering that may bias manifold development toward particular knowledge areas or reasoning patterns. The component implements optimization algorithms that balance density accumulation efficiency with semantic distribution quality to ensure effective precritical seeding without compromising the natural development patterns essential for authentic expert domain formation.

Spatial distributor 2631 manages the geometric placement of synthetic trajectories within the latent hyperspace to create optimal conditions for manifold formation while preserving the spatial relationships that reflect authentic domain knowledge organization. The component employs spatial allocation algorithms that consider semantic relationships, usage probability patterns, and geometric constraints to position synthetic trajectories in configurations that support natural manifold development while accelerating the achievement of critical density thresholds.

Criticality assessor 2632 continuously evaluates the proximity to phase transition conditions based on accumulated trajectory density and intersection patterns within the seeded hyperspace. The component implements assessment algorithms that monitor reuse density accumulation, track intersection frequency patterns, and predict the timeline for achieving critical thresholds while providing feedback for seeding strategy optimization and transition timing coordination.

A precritical state manager monitors and maintains the developing expert domain during the accelerated seeding phase while preparing for rapid transition to functional manifold operation. Threshold monitor 2640 continuously tracks reuse density levels and intersection patterns to detect when seeding operations have achieved the precritical conditions necessary for rapid manifold formation. The component implements monitoring algorithms that provide real-time assessment of seeding progress, identify regions approaching critical density, and coordinate with other system components to ensure optimal timing for phase transition initiation.

Readiness detector 2641 evaluates the overall readiness of the seeded domain for transition to functional manifold operation based on comprehensive assessment of trajectory distribution, semantic coherence, and structural stability. The component employs readiness assessment algorithms that consider multiple factors including density distribution uniformity, semantic relationship stability, trajectory intersection quality, and geometric consistency to determine optimal transition timing and identify any seeding adjustments needed before manifold activation.

An accelerated formation engine orchestrates the rapid transition from precritical seeded state to functional manifold operation when readiness conditions are achieved. Rapid transition 2650 implements accelerated phase transition protocols that quickly establish metric tensor structure, curvature patterns, and geometric organization based on the precritical seeding patterns while ensuring mathematical stability and semantic coherence. The component employs rapid formation algorithms that leverage seeded trajectory patterns to establish functional manifold structure efficiently while maintaining the flexibility needed for continued adaptation through live usage patterns.

Structure activator 2651 initializes the essential geometric structures including metric tensors, curvature fields, and attention flow patterns that enable immediate cognitive operation within the newly formed expert domain. The component implements activation algorithms that translate seeded trajectory patterns into functional geometric structures while ensuring mathematical consistency, semantic preservation, and operational effectiveness for expert-level reasoning and response generation.

A live integration hub manages the transition from seeded development to live operational mode while preserving seeded knowledge and maintaining compatibility with ongoing user interactions. Interaction bridge 2660 provides seamless integration between synthetic seeded trajectories and live user interactions to ensure continuity of service during the transition from primed bootstrapping to operational mode. The component implements integration algorithms that blend seeded knowledge with live interaction patterns while maintaining response quality and domain expertise consistency throughout the transition period.

Feedback loop 2661 establishes continuous feedback mechanisms that enable ongoing optimization of domain performance based on live usage patterns while preserving the beneficial characteristics established through precritical seeding. The component employs feedback analysis algorithms that identify successful seeding elements, detect areas requiring live adaptation, and guide continued domain development to optimize performance for actual usage patterns while maintaining the accelerated development benefits achieved through strategic seeding.

A quality validation and optimization layer ensures that primed bootstrapping produces expert domains that meet operational standards while maintaining the authentic expertise characteristics essential for effective performance within the expert foundry system. Manifold validator 2670 implements comprehensive validation protocols that verify the mathematical consistency, geometric stability, and semantic coherence of manifolds created through primed bootstrapping processes. The component employs validation algorithms that assess manifold properties, verify geometric relationships, and confirm functional capabilities while identifying any structural issues that require correction before operational deployment.

Performance assessor 2671 evaluates the operational capabilities and response quality of primed expert domains through comprehensive testing across expected usage scenarios and performance benchmarks. The component implements assessment algorithms that measure response accuracy, reasoning coherence, domain expertise demonstration, and integration effectiveness while providing detailed performance analysis that guides optimization and identifies areas requiring additional development or refinement.

Bias detector 2672 identifies and analyzes potential biases introduced through corpus selection, seeding strategies, or synthetic trajectory generation that may compromise domain objectivity or limit reasoning effectiveness. The component employs bias detection algorithms that analyze knowledge representation patterns, identify systematic preferences or limitations, and recommend corrective measures to ensure that primed domains maintain appropriate balance and objectivity across their areas of specialization.

Optimization engine 2673 implements continuous improvement mechanisms that refine domain performance based on validation results, performance assessments, and bias analysis while maintaining the fundamental expertise characteristics established through precritical seeding. The component employs optimization algorithms that adjust manifold parameters, refine knowledge representations, and enhance reasoning capabilities while preserving the core domain expertise and accelerated development benefits achieved through strategic priming operations.

Deployment certifier 2674 provides formal certification that primed expert domains meet all operational requirements and quality standards necessary for integration with the expert foundry system and production deployment. The component implements certification protocols that verify compliance with system standards, confirm integration readiness, and provide official approval for operational activation while maintaining detailed certification records for ongoing quality management and system optimization.

An accelerated expert domain output 2680 delivers fully functional expert domains that possess established cognitive capabilities, geometric manifold structure, and operational readiness achieved through strategic precritical seeding and accelerated formation processes, enabling rapid deployment of new expertise areas within the expert foundry system while maintaining the adaptive capabilities essential for continued learning through operational usage.

Figure 27:
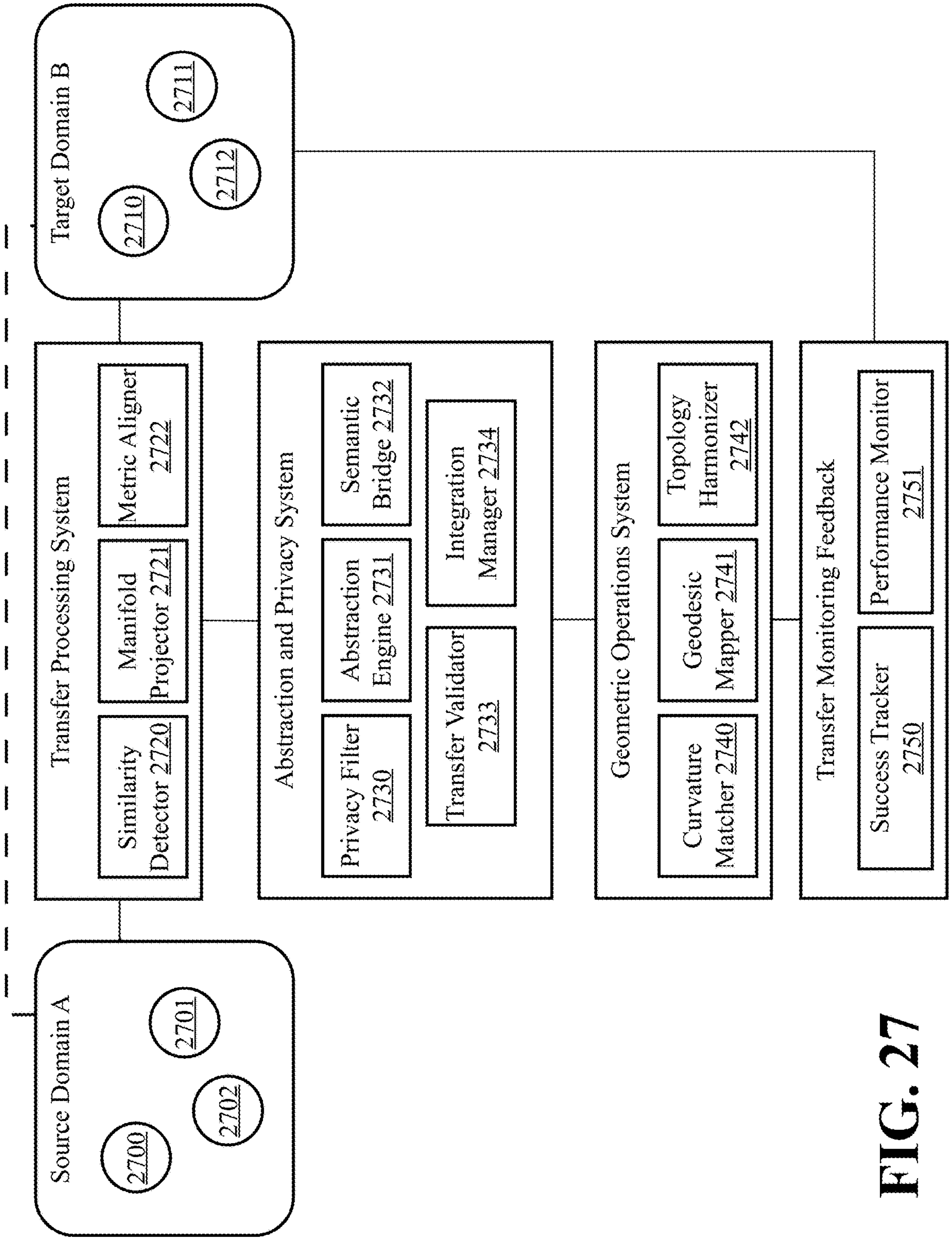
FIG. 27 is a block diagram illustrating an exemplary architecture of a cross-domain knowledge transfer system using manifold projection and metric alignment within the expert foundry system.

FIG. 27 is a block diagram illustrating an exemplary architecture of a cross-domain knowledge transfer system using manifold projection and metric alignment within the expert foundry system. The cross-domain knowledge transfer system mechanism enables the sharing of learned insights, compressed thought patterns, and cognitive structures between different expert domains while maintaining appropriate privacy boundaries and semantic integrity, facilitating system-wide learning and capability enhancement through geometric abstraction and manifold alignment techniques.

A source domain A represents an expert domain that has developed specialized knowledge and cognitive structures that may be valuable for transfer to other domains within the expert foundry system. Bundle A1 2700 comprises a coherent cluster of related concepts and reasoning patterns within the source domain's manifold, representing accumulated expertise in a specific area of the domain's specialization. Bundle A2 2701 represents another distinct knowledge cluster within the source domain that has developed through repeated usage and successful reasoning patterns, containing compressed thought structures and established cognitive pathways that demonstrate proven effectiveness within the domain's operational context. Bundle A3 2702 encompasses additional specialized knowledge structures that have emerged through the domain's cognitive evolution, representing domain-specific insights and reasoning capabilities that may have broader applicability across related expert domains within the foundry system.

A target domain B represents an expert domain that can potentially benefit from knowledge transfer from the source domain, possessing geometric manifold structures that may be compatible with projected knowledge from the source domain. Bundle B1 2710 comprises existing knowledge structures within the target domain that may serve as integration points for transferred knowledge, representing established cognitive capabilities that can be enhanced or extended through cross-domain knowledge integration. Bundle B2 2711 represents target domain knowledge clusters that exhibit structural or semantic similarities to source domain bundles, providing potential alignment points for successful knowledge transfer and integration operations. Bundle B3 2712 encompasses target domain cognitive structures that may be complemented or enhanced by transferred knowledge, representing areas where cross-domain insights can fill knowledge gaps or provide alternative reasoning approaches that enhance the target domain's overall capabilities.

A transfer processing system implements the initial analysis and preparation mechanisms required for effective cross-domain knowledge transfer operations. Similarity detector 2720 analyzes knowledge structures from both source and target domains to identify potential compatibility and transfer opportunities based on semantic alignment, structural similarity, and functional equivalence between domain-specific cognitive patterns. For example, when evaluating transfer opportunities between a materials science domain and a mechanical engineering domain, similarity detector 2720 can identify overlapping concepts such as material properties, stress analysis, and failure modes that exist in both domains but may be organized differently within each domain's manifold structure, providing the foundation for successful knowledge transfer operations. The component implements various analysis algorithms that account for both surface-level concept similarities and deeper structural relationships that indicate genuine transfer potential.

Manifold projector 2721 implements the geometric algorithms required for mapping knowledge structures from the source domain's manifold into compatible representations within the target domain's geometric space. The component employs advanced mathematical techniques derived from differential geometry and manifold learning theory to compute optimal projection transformations that preserve semantic relationships while adapting to the target domain's existing geometric organization. For instance, when projecting financial risk assessment patterns from a financial advisory domain to an insurance underwriting domain, manifold projector 2721 would translate risk evaluation frameworks while adapting them to the specific risk categories and assessment criteria that characterize insurance underwriting operations.

Metric aligner 2722 harmonizes the distance relationships and geometric properties between source and target domain manifolds to ensure that transferred knowledge integrates properly with existing cognitive structures. The component implements metric alignment algorithms that adjust distance measurements, curvature relationships, and geometric properties to create compatible representational frameworks that enable seamless integration of transferred knowledge without disrupting existing domain capabilities or introducing geometric inconsistencies that could compromise reasoning effectiveness.

An abstraction and privacy system provides one or more mechanisms for protecting sensitive information while enabling beneficial knowledge sharing across domain boundaries. Privacy filter 2730 implements comprehensive privacy protection mechanisms that ensure transferred knowledge maintains appropriate generality levels without disclosing sensitive, proprietary, or confidential information from the source domain. The component may employ differential privacy techniques, semantic abstraction algorithms, and access control mechanisms that enable knowledge sharing while maintaining strict privacy boundaries and preventing unauthorized disclosure of sensitive domain-specific information or intellectual property.

Abstraction engine 2731 creates appropriately generalized representations of source domain knowledge that can be shared across domain boundaries without compromising domain-specific details or revealing proprietary insights that should remain within the source domain. The component can implement abstraction algorithms that identify shareable patterns, create generalized representations, and maintain semantic coherence across different levels of abstraction while ensuring that shared knowledge remains useful and actionable within target domain contexts without exposing sensitive implementation details or competitive advantages.

Semantic bridge 2732 may be configured with translation and adaptation mechanisms required when transferring knowledge between domains with different semantic frameworks, vocabularies, or conceptual structures. In some embodiments, the component employs semantic mapping algorithms, ontology alignment techniques, and conceptual translation mechanisms that preserve meaning while adapting to domain-specific representational frameworks and terminology. For example, when transferring process optimization knowledge from a manufacturing domain to a software development domain, semantic bridge 2732 may translate manufacturing concepts like "quality control" and "process efficiency" into software development equivalents like "code review" and "development velocity" while preserving the underlying optimization principles and success patterns.

Transfer validator 2733 implements various validation and verification mechanisms that ensure transferred knowledge maintains accuracy, consistency, and usefulness within target domain contexts before integration operations are completed. The component employs automated testing protocols, semantic consistency checking, and performance impact assessment algorithms that verify transfer success and identify any adjustments needed to ensure optimal integration results without compromising target domain capabilities or introducing errors or inconsistencies.

Integration manager 2734 orchestrates the complex process of incorporating transferred knowledge into target domain manifold structures while maintaining geometric consistency and preserving existing domain capabilities. The component implements integration algorithms that coordinate with target domain systems to ensure smooth knowledge incorporation, manage potential conflicts or inconsistencies, and optimize integration timing to minimize disruption to ongoing domain operations while maximizing the benefits of transferred knowledge and expertise.

A geometric operations system implements the mathematical operations required for successful manifold projection and metric alignment across different expert domains. Curvature matcher 2740 analyzes and harmonizes curvature patterns between source and target domain manifolds to ensure that transferred knowledge integrates properly with existing geometric structures and maintains the curvature relationships essential for effective cognitive reasoning. The component implements curvature analysis algorithms that identify compatible geometric regions, compute optimal curvature transformations, and ensure that transferred knowledge maintains appropriate semantic density relationships within the target domain's cognitive landscape.

Geodesic mapper 2741 translates reasoning pathways and cognitive trajectories from source domain manifolds into equivalent paths within target domain geometric structures, preserving the logical flow and inferential relationships that characterize successful reasoning patterns. The component employs geodesic computation algorithms that identify optimal reasoning paths within target domain manifolds that correspond to successful reasoning patterns from source domains, enabling target domains to benefit from proven reasoning strategies while adapting them to domain-specific contexts and constraints.

Topology harmonizer 2742 manages the complex topological relationships and connectivity patterns that must be preserved or adapted during cross-domain knowledge transfer operations to ensure that transferred knowledge maintains its essential structural characteristics within target domain contexts. The component implements topology analysis algorithms that preserve essential connectivity patterns, adapt structural relationships to target domain characteristics, and ensure that transferred knowledge maintains the topological properties essential for effective reasoning and cognitive operation within the target domain's specialized context.

A transfer monitoring and feedback layer provides tracking and assessment capabilities that enable continuous improvement of cross-domain knowledge transfer effectiveness and system-wide optimization. Success tracker 2750 monitors the outcomes and effectiveness of knowledge transfer operations to identify successful transfer patterns, measure the impact of transferred knowledge on target domain performance, and provide insights for optimizing future transfer operations. In some aspects, the component implements tracking algorithms that measure various success indicators including response quality improvements, reasoning capability enhancement, user satisfaction changes, and operational efficiency gains that result from successful knowledge transfer operations.

Performance monitor 2751 continuously assesses the impact of transferred knowledge on target domain capabilities and overall expert foundry system performance to ensure that knowledge transfer operations enhance rather than compromise system effectiveness. The component may employ performance analysis algorithms that track multiple performance indicators, identify potential negative impacts or conflicts, and provide feedback for optimizing transfer strategies and improving overall system coordination and knowledge sharing effectiveness across the expert foundry system.

The geometric transfer path illustrated by the dashed line between source and target domains represents the complex mathematical transformation that occurs during cross-domain knowledge transfer, showing how knowledge structures are projected through the abstraction and geometric operations layers to achieve successful integration while maintaining semantic integrity and privacy protection throughout the transfer process.

Figure 28:
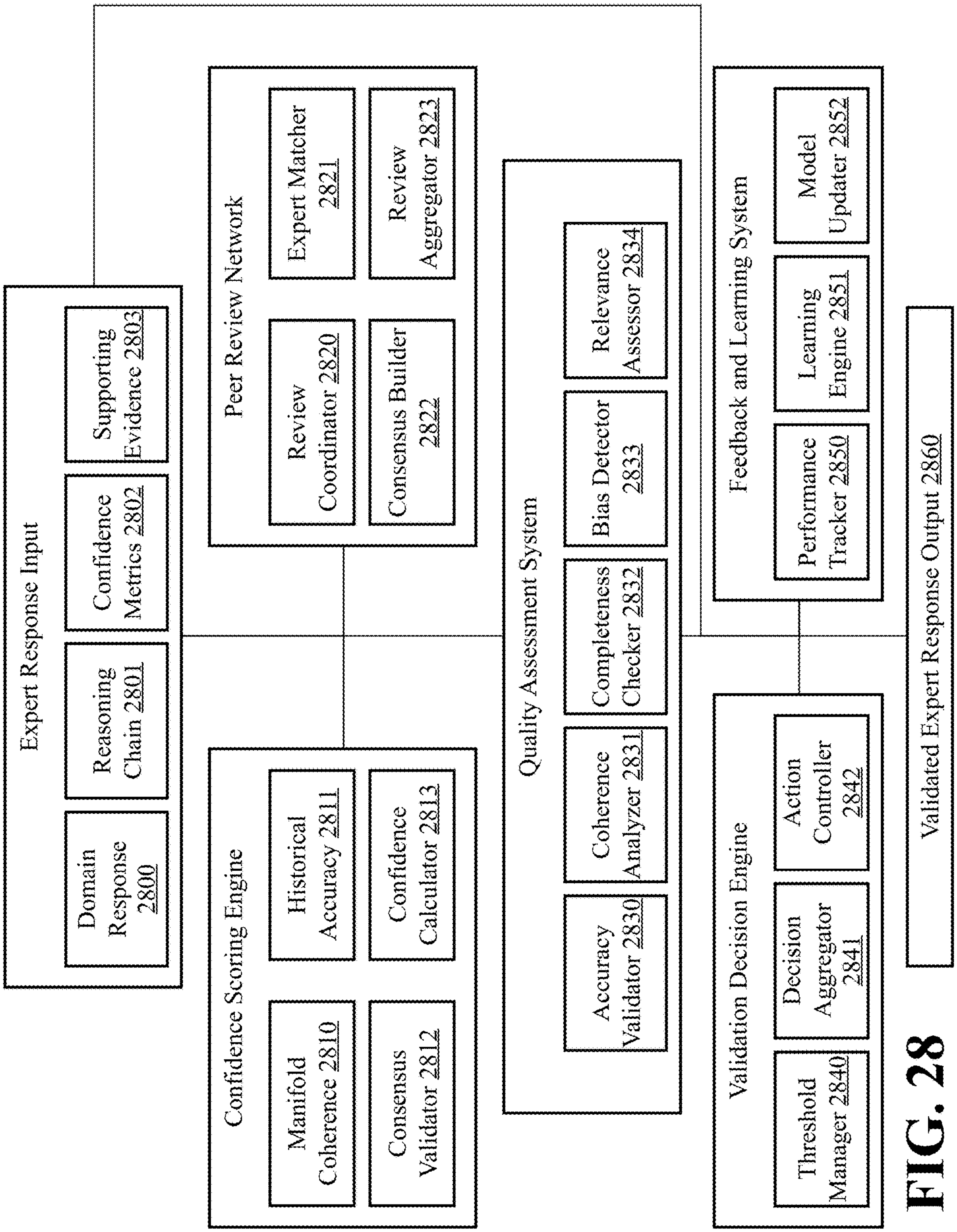
FIG. 28 is a block diagram illustrating an exemplary architecture of an expert validation and quality assurance system framework with confidence scoring and peer review networks within the expert foundry system.

FIG. 28 is a block diagram illustrating an exemplary architecture of an expert validation and quality assurance system framework with confidence scoring and peer review networks within the expert foundry system. The expert validation and quality assurance framework ensures that responses generated by expert domains meet established accuracy, coherence, and reliability standards while implementing sophisticated confidence assessment and collaborative validation mechanisms that maintain expert-level quality across all domains within the foundry system.

An expert response input layer captures and processes the various components of expert domain responses that require validation and quality assurance evaluation. Domain response 2800 represents the primary output generated by an expert domain in response to user queries, containing the substantive content, recommendations, analysis, or solutions that constitute the domain's expert-level contribution to addressing user needs. The component implements response parsing algorithms that extract key content elements, identify claims and assertions, and prepare response content for comprehensive validation analysis across multiple quality dimensions and assessment criteria.

Reasoning chain 2801 encompasses the logical reasoning pathways and inferential steps that the expert domain followed to generate its response, providing transparency into the cognitive processes and knowledge structures that informed the domain's conclusions and recommendations. The component captures and analyzes the sequential reasoning steps, logical connections between concepts, evidence evaluation processes, and decision-making frameworks that characterize expert-level thinking within the domain's area of specialization, enabling validation of not only response content but also the quality and appropriateness of the reasoning processes that produced the response.

Confidence metrics 2802 provide quantitative assessments of the expert domain's certainty and reliability estimates for different aspects of its response, including confidence in factual claims, certainty about recommendations, reliability of analysis, and uncertainty acknowledgments where appropriate. The component implements confidence quantification algorithms that translate manifold-based geometric properties, historical performance patterns, and domain-specific reliability indicators into meaningful confidence scores that inform validation decisions and enable appropriate risk assessment for response utilization.

Supporting evidence 2803 contains the references, citations, data sources, and supporting materials that the expert domain used to inform its response generation, providing the evidentiary foundation that enables independent verification and validation of response content. The component implements evidence analysis algorithms that evaluate source credibility, assess evidence relevance and currency, verify citation accuracy, and analyze the strength of evidentiary support for specific claims and recommendations within the expert response.

A confidence scoring engine implements sophisticated algorithms for quantifying the reliability and trustworthiness of expert domain responses based on multiple assessment criteria and validation mechanisms. Manifold coherence 2810 evaluates the geometric consistency and semantic stability of the reasoning pathways used within the expert domain's manifold during response generation, assessing whether the cognitive trajectories followed established patterns of successful reasoning or deviated into less reliable regions of the domain's knowledge space. The component implements geometric analysis algorithms that measure path stability, evaluate curvature consistency, assess trajectory coherence, and identify potential reasoning anomalies that might indicate reduced reliability or increased uncertainty in response generation.

Historical accuracy 2811 analyzes the expert domain's past performance on similar queries and reasoning tasks to establish baseline reliability expectations and identify patterns that indicate high or low confidence scenarios. The component maintains comprehensive historical performance databases, implements trend analysis algorithms, and provides predictive accuracy assessments based on domain performance patterns, query similarity analysis, and contextual factors that influence response reliability within the domain's operational history.

Consensus validator 2812 compares the current response against established domain knowledge, previously validated responses, and consensus positions within the domain's area of expertise to identify potential inconsistencies or deviations that might indicate errors or novel insights requiring additional validation. The component implements consensus analysis algorithms that evaluate response consistency with established domain knowledge while distinguishing between genuine errors and legitimate novel insights that may represent valuable advances in domain understanding or capability.

Confidence calculator 2813 integrates assessment results from multiple confidence scoring components to generate comprehensive confidence scores that reflect the overall reliability and trustworthiness of expert domain responses across multiple evaluation dimensions. The component employs multi-factor scoring algorithms that appropriately weight different confidence indicators, account for uncertainty interactions, and generate confidence scores that provide meaningful guidance for validation decisions and response utilization while maintaining appropriate calibration with actual response reliability patterns.

A peer review network implements collaborative validation mechanisms that leverage multiple expert domains and validation resources to provide independent assessment and verification of expert domain responses. Review coordinator 2820 manages the peer review process by identifying appropriate review resources, coordinating review assignments, managing review timelines, and ensuring that peer review operations maintain efficiency while providing thorough and independent assessment of expert domain responses. The component implements coordination algorithms that optimize review resource allocation, balance review workload across available peer domains, and maintain review quality standards while accommodating operational efficiency requirements and system capacity constraints.

Expert matcher 2821 identifies the most appropriate expert domains or validation resources for conducting peer review of specific responses based on domain expertise overlap, review capabilities, availability, and independence requirements. For example, when validating a complex engineering analysis response, expert matcher 2821 would identify peer engineering domains with relevant expertise while ensuring reviewer independence and avoiding conflicts of interest that might compromise review objectivity. The component implements matching algorithms that consider expertise alignment, review capacity, domain relationships, and independence criteria to ensure effective and unbiased peer review operations.

Consensus builder 2822 facilitates agreement and resolution processes when multiple peer reviewers provide different assessments or identify conflicting issues within expert domain responses. The component implements consensus-building algorithms that identify areas of reviewer agreement, facilitate discussion and resolution of disagreements, and develop consolidated review conclusions that appropriately reflect peer reviewer input while maintaining objectivity and thoroughness in validation assessment.

Review aggregator 2823 consolidates peer review results from multiple reviewers into comprehensive validation assessments that inform quality assurance decisions and confidence scoring while preserving important details and minority opinions that may provide valuable insights. The component employs aggregation algorithms that appropriately weight reviewer input, preserve dissenting opinions when warranted, and generate consolidated review conclusions that support effective validation decision-making while maintaining transparency about reviewer agreement levels and assessment confidence.

A quality assessment layer implements comprehensive evaluation mechanisms that assess expert domain responses across multiple quality dimensions to ensure compliance with established standards and identification of potential issues requiring attention or correction. Accuracy validator 2830 verifies the factual correctness and technical accuracy of claims, data, analysis, and recommendations within expert domain responses through automated fact-checking, reference verification, and consistency analysis with established knowledge sources.

The component implements validation algorithms that cross-reference factual claims against authoritative sources, verify technical calculations and analysis, and identify potential accuracy issues that require correction or additional verification before response approval.

Coherence analyzer 2831 evaluates the logical consistency, structural organization, and semantic coherence of expert domain responses to ensure that responses maintain internal consistency and logical flow while effectively communicating expert insights to users. The component employs coherence analysis algorithms that assess logical connections between ideas, evaluate argument structure and flow, identify potential contradictions or inconsistencies, and verify that responses maintain semantic coherence throughout their presentation of expert analysis and recommendations.

Completeness checker 2832 assesses whether expert domain responses adequately address all aspects of user queries and provide sufficient information to meet user needs while identifying gaps or omissions that might compromise response utility or user satisfaction. The component implements completeness analysis algorithms that compare response content against query requirements, identify missing information or analysis, evaluate coverage of relevant topics, and ensure that responses provide comprehensive treatment of user information needs within the domain's area of expertise.

Bias detector 2833 identifies potential biases, systematic preferences, or unfair representations within expert domain responses that might compromise objectivity or limit the appropriateness of recommendations for diverse user populations or contexts. The component employs bias detection algorithms that analyze language patterns, evaluate representation fairness, identify systematic preferences or exclusions, and ensure that expert domain responses maintain appropriate objectivity and inclusiveness while acknowledging legitimate contextual factors that may influence recommendations or analysis.

Relevance assessor 2834 evaluates whether expert domain responses appropriately address user queries and maintain focus on relevant information while avoiding unnecessary tangents or irrelevant content that might compromise response utility or clarity. The component implements relevance analysis algorithms that assess query-response alignment, evaluate information pertinence, identify off-topic content, and ensure that expert domain responses maintain appropriate focus on user information needs while providing sufficient context and background information to support effective user decision-making.

A validation decision engine synthesizes assessment results from multiple quality evaluation components to make final validation decisions and determine appropriate actions for expert domain responses. Threshold manager 2840 maintains and applies configurable quality thresholds that determine acceptance criteria for expert domain responses across different validation dimensions and operational contexts. The component implements threshold management algorithms that adapt acceptance criteria based on query importance, user requirements, operational constraints, and domain-specific standards while maintaining consistent quality expectations and enabling appropriate risk management for response approval and deployment decisions.

Decision aggregator 2841 consolidates assessment results from multiple validation components to generate integrated validation decisions that appropriately balance different quality factors and assessment criteria while maintaining consistency with established quality standards and operational requirements. The component employs decision aggregation algorithms that appropriately weight different quality factors, resolve conflicting assessment results, and generate clear validation decisions that provide actionable guidance for response handling and user delivery while maintaining transparency about assessment rationale and confidence levels.

Action controller 2842 implements appropriate response handling actions based on validation decisions, including response approval, rejection, modification requests, or escalation to human oversight based on validation results and established operational protocols. The component manages action implementation algorithms that execute validation decisions consistently, coordinate with expert domains for response modifications when needed, handle escalation procedures for complex validation issues, and ensure that validation outcomes result in appropriate response handling that maintains system quality standards while minimizing operational disruption.

A feedback and learning system captures validation outcomes and utilizes assessment results to continuously improve validation effectiveness and expert domain performance through systematic learning and optimization mechanisms. Performance tracker 2850 monitors validation outcomes, tracks quality trends, and analyzes the effectiveness of validation mechanisms to identify improvement opportunities and optimize validation processes for enhanced accuracy and efficiency. The component implements performance monitoring algorithms that track validation accuracy, analyze false positive and false negative rates, identify validation process bottlenecks, and provide insights for improving validation effectiveness and operational efficiency while maintaining quality standards.

Learning engine 2851 analyzes validation patterns and outcomes to identify opportunities for improving expert domain performance, validation accuracy, and system-wide quality assurance effectiveness through systematic learning from validation experiences and performance analysis. The component employs machine learning algorithms that extract insights from validation data, identify patterns in quality issues, discover optimization opportunities, and generate recommendations for improving expert domain capabilities and validation processes while maintaining transparency and explainability in learning and improvement recommendations.

Model updater 2852 implements systematic updates to validation models, confidence scoring algorithms, and quality assessment mechanisms based on learning insights and performance analysis to ensure that validation capabilities continue to improve and adapt to evolving requirements and operational conditions. The component manages model update algorithms that incorporate learning insights into operational systems, validate model improvements before deployment, and maintain model performance tracking to ensure that updates enhance rather than compromise validation effectiveness and system quality assurance capabilities.

A validated expert response output 2860 provides the final interface through which expert domain responses that have successfully completed validation and quality assurance processes are delivered to users, ensuring that all responses meet established quality standards and include appropriate confidence indicators and reliability assessments to support effective user decision-making and system trust while maintaining transparency about validation processes and assessment outcomes.

Figure 29:
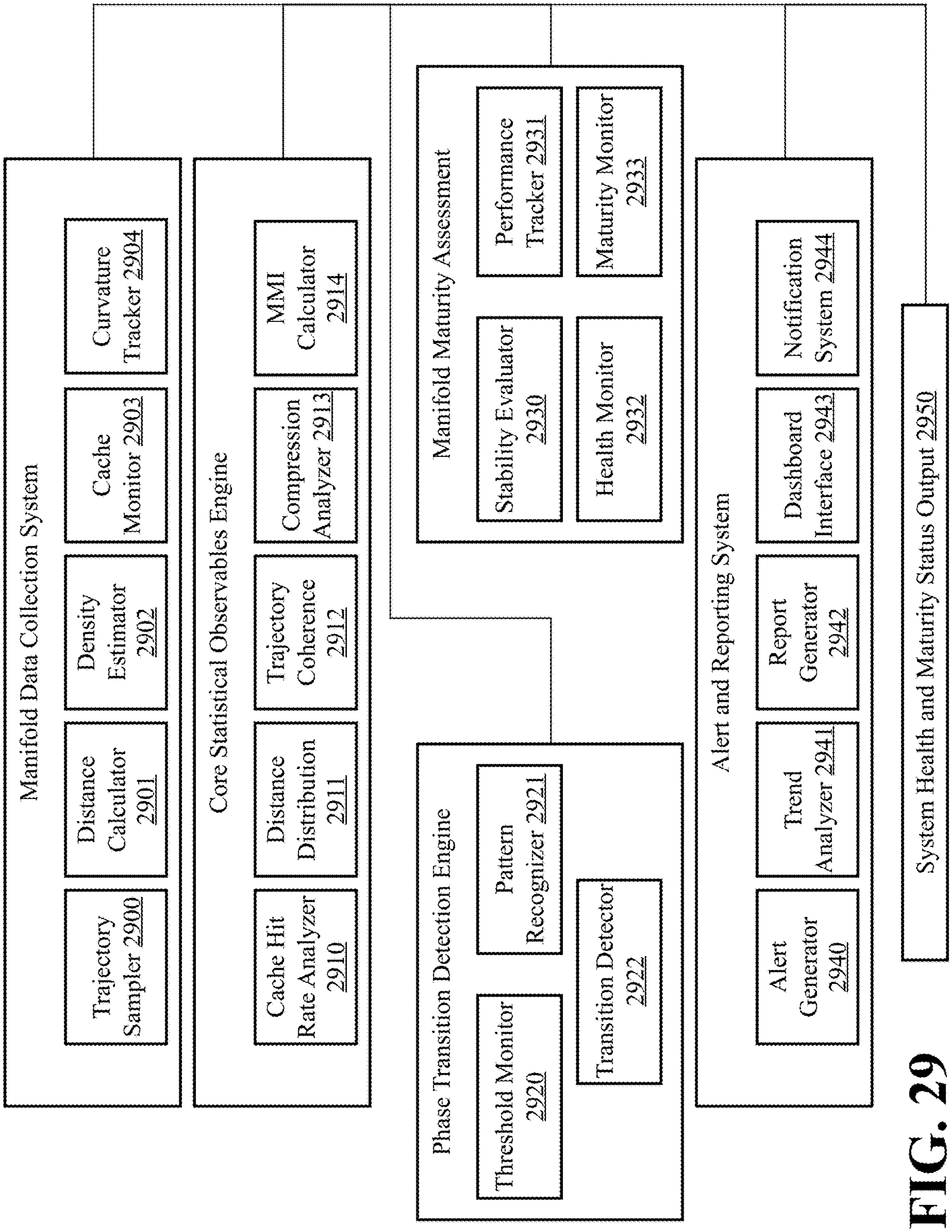
FIG. 29 is a block diagram illustrating an exemplary architecture of a statistical observables monitoring system for detecting phase transitions and manifold maturity within the expert foundry system.

FIG. 29 is a block diagram illustrating an exemplary architecture of a statistical observables monitoring system for detecting phase transitions and manifold maturity within the expert foundry system. The statistical observables monitoring system provides comprehensive real-time assessment capabilities that enable early detection of manifold formation, ongoing evaluation of cognitive development progress, and continuous monitoring of expert domain health and performance through sophisticated mathematical analysis and pattern recognition algorithms.

A manifold data collection system provides comprehensive sampling and measurement capabilities that gather the fundamental data required for statistical analysis of manifold formation and cognitive development within expert domains. Trajectory sampler 2900 continuously captures representative samples of thought trajectories and reasoning pathways within expert domain manifolds to provide the foundational data for geometric analysis and statistical assessment. For example, in a medical diagnostic domain, trajectory sampler 2900 may collect samples of diagnostic reasoning paths from symptom analysis through differential diagnosis to treatment recommendations, capturing both successful diagnostic sequences and alternative pathways that were considered but not pursued. The component implements one or more sampling algorithms that ensure representative coverage across different regions of the manifold while maintaining computational efficiency and avoiding bias toward frequently accessed areas that might distort statistical analysis of overall manifold health and development patterns.

Distance calculator 2901 computes pairwise distances between thoughts, concepts, and reasoning pathways within expert domain manifolds using the domain's current metric tensor to provide accurate geometric measurements for statistical analysis. The component may implement efficient distance computation algorithms that account for the curved geometry of expert domain manifolds while providing the quantitative measurements needed for distribution analysis and phase transition detection. For instance, in a financial advisory domain, distance calculator 2901 can measure the semantic distances between different investment strategies, risk assessment approaches, and market analysis methods, providing the geometric data needed to track how these financial concepts cluster and organize within the domain's evolving cognitive space.

Density estimator 2902 calculates local reuse density functions $\rho(x; \varepsilon)$ across expert domain manifolds to identify regions of high cognitive activity and detect the accumulation patterns that indicate approaching phase transitions. In some aspects, the component employs one or more density estimation algorithms that account for the high-dimensional nature of expert domain manifolds while providing accurate real-time assessment of trajectory intersection patterns and semantic concentration levels. For example, in an engineering design domain, density estimator 2902 can track how frequently different design principles, analysis methods, and optimization approaches are reused and combined, identifying regions where engineering knowledge is becoming highly concentrated and potentially approaching critical density thresholds that indicate manifold formation or maturation.

Cache monitor 2903 tracks thought cache performance metrics including, but not limited to, hit rates, retrieval patterns, and storage efficiency to provide insights into memory utilization and cognitive reuse patterns within expert domains. The component implements various cache analysis algorithms that monitor not only basic performance metrics but also deeper patterns of knowledge reuse that indicate cognitive development and manifold maturation. For instance, in a legal analysis domain, cache monitor 2903 may track how frequently legal precedents, analytical frameworks, and case law patterns are retrieved and reused, providing insights into which areas of legal knowledge are most active and how legal reasoning patterns are evolving through accumulated case analysis experience.

Curvature tracker 2904 monitors the development and evolution of curvature patterns within expert domain manifolds to detect the emergence of semantic density and geometric structure that characterizes functional cognitive spaces. The component implements sophisticated curvature computation algorithms that track both local curvature development and global geometric patterns while providing real-time assessment of manifold geometric health and structural evolution. For example, in a pharmaceutical research domain, curvature tracker 2904 can monitor how drug development knowledge, clinical trial methodologies, and regulatory compliance procedures develop geometric relationships that reflect their technical interdependencies, detecting when pharmaceutical concepts begin to exhibit the structured relationships characteristic of mature expert knowledge organization.

A core statistical observables engine implements the fundamental mathematical analyses described in the foundational disclosure document for detecting phase transitions and assessing manifold maturity across expert domains within the foundry system. Cache hit rate analyzer 2910 computes and tracks the cache hit rate H(t) as the proportion of incoming queries successfully served by retrieving and adapting previously cached thoughts, implementing, in some embodiments, the mathematical framework $H(t) \approx a \cdot \log(bt+1)$ for detecting logarithmic scaling patterns that indicate successful knowledge accumulation and reuse. For example, in an environmental consulting domain, cache hit rate analyzer 2910 can track how frequently environmental assessment queries can be answered using previously analyzed environmental impact patterns, pollution remediation strategies, and regulatory compliance frameworks, detecting when the domain has accumulated sufficient environmental expertise to handle most queries through knowledge reuse rather than generating entirely new analysis.

Distance distribution 2911 analyzes the evolution of pairwise distance distributions among thought objects to detect the characteristic shift from log-normal to multimodal distributions that indicates successful attractor formation and semantic clustering within expert domains. The component implements the statistical analysis framework for computing the curvature-induced shift $\Delta P(t) = DKL(P_{post}(d; t) \| P_{pre}(d;$ 0)) using kernel density estimation and divergence metrics to quantify distribution evolution patterns. For instance, in a cybersecurity domain, distance distribution 2911 may analyze how security threats, defense strategies, and vulnerability assessments organize into distinct clusters with characteristic distance patterns, detecting when cybersecurity knowledge transitions from scattered individual concepts to organized threat categories and defense frameworks that indicate mature domain expertise.

Trajectory coherence 2912 evaluates the stability and alignment of reasoning paths within expert domain manifolds using the geodesic alignment framework $A(\gamma_i, \gamma_i)$ to measure how semantically similar inputs produce consistent reasoning patterns. For example, in an agricultural consulting domain, trajectory coherence 2912 can analyze how similar farming challenges consistently lead to comparable analysis approaches and recommendation patterns, measuring whether agricultural reasoning has developed stable pathways from problem identification through analysis to solution recommendations that indicate reliable expert-level cognitive capabilities.

Compression analyzer 2913 tracks the compression surface $S(x) = \log(|T_{raw}(B\varepsilon(x))|/|T_{compressed}(B\varepsilon(x))|)$ to identify regions of high semantic compressibility and monitor the development of efficient knowledge organization within expert domains. For instance, in a mechanical engineering domain, compression analyzer 2913 would identify areas where multiple specific engineering solutions have been successfully generalized into broader design principles, measuring how effectively the domain compresses detailed technical knowledge into reusable engineering frameworks that enable efficient problem-solving across diverse mechanical design challenges.

MMI calculator 2914 implements the Manifold Maturity Index computation $MMI(t) = \alpha H(t) + \beta \Delta P(t) + \gamma \Gamma(t)$ by integrating cache hit rates, distance distribution shifts, and trajectory coherence measurements into a unified assessment of expert domain cognitive development and operational readiness. The component provides comprehensive maturity scoring that enables comparison across different expert domains and tracking of development progress over time while identifying domains that have achieved sufficient maturity for production deployment or require additional development support.

A phase transition detection engine implements sophisticated algorithms for recognizing when expert domains transition from unstructured latent space to functional cognitive manifolds through the accumulation of trajectory reuse and semantic organization. Threshold monitor 2920 continuously evaluates whether reuse density measurements have exceeded critical thresholds ρc in connected regions of expert domain latent spaces, implementing the mathematical criteria from the foundational disclosure for detecting genuine phase transitions. For example, when monitoring a renewable energy consulting domain, threshold monitor 2920 can detect when trajectory reuse around solar installation analysis, wind assessment procedures, and energy efficiency evaluation has reached sufficient density and stability to indicate that the domain has transitioned from individual query processing to systematic renewable energy expertise with established reasoning patterns and knowledge organization.

Pattern recognizer 2921 identifies the characteristic patterns in statistical observables that distinguish genuine phase transitions from temporary fluctuations or measurement artifacts, implementing pattern analysis algorithms that consider multiple statistical indicators simultaneously. The component analyzes correlation patterns between different observables, temporal stability of statistical changes, and geometric consistency indicators to ensure that detected transitions represent genuine cognitive development rather than superficial pattern accumulation.

Transition detector 2922 integrates threshold monitoring and pattern recognition results to generate definitive phase transition alerts when expert domains successfully transition from vacuum state or precritical conditions to functional manifold operation. The component implements multi-factor validation algorithms that require sustained threshold exceedance, consistent pattern development, and geometric coherence before confirming successful phase transitions, ensuring that transition detection provides reliable indicators for expert domain activation and integration with the broader foundry system.

A manifold maturity assessment system provides ongoing evaluation of expert domain cognitive development and operational capabilities throughout their operational lifecycle within the expert foundry system. Stability evaluator 2930 assesses the geometric and semantic stability of expert domain manifolds by analyzing consistency in curvature patterns, trajectory coherence maintenance, and resistance to perturbations that might indicate fragile or unstable cognitive development. For example, in a legal analysis domain, stability evaluator 2930 can assess whether legal reasoning patterns remain consistent when processing novel legal scenarios, measuring whether the domain's legal expertise demonstrates the stability and robustness characteristic of mature professional legal analysis capabilities.

Performance tracker 2931 monitors expert domain operational performance including response quality, user satisfaction, accuracy metrics, and efficiency indicators to provide comprehensive assessment of domain capabilities and identify areas requiring optimization or additional development. The component implements performance analysis algorithms that track multiple performance dimensions while identifying trends and patterns that indicate improving or declining domain capabilities, enabling proactive maintenance and optimization of expert domain performance.

Health monitor 2932 provides continuous assessment of expert domain cognitive health by monitoring geometric consistency, semantic coherence, and operational stability indicators that ensure domains maintain healthy cognitive function throughout their operational lifecycle. For instance, in a pharmaceutical research domain, health monitor 2932 may track whether drug development reasoning maintains consistent logical patterns, whether clinical trial analysis remains coherent with established methodologies, and whether regulatory compliance reasoning demonstrates stable adherence to appropriate guidelines and requirements.

Maturity calculator 2933 integrates stability, performance, and health assessments into comprehensive maturity scores that quantify expert domain cognitive development and operational readiness while providing comparative metrics for assessing domain capabilities across the expert foundry system. The component generates maturity assessments that enable informed decisions about domain deployment, resource allocation, and development priorities while tracking long-term cognitive evolution and capability enhancement within individual expert domains.

An alert and reporting system provides comprehensive communication and notification capabilities that ensure appropriate stakeholders receive timely information about expert domain development progress and operational status. Alert generator 2940 creates automated notifications when statistical observables indicate significant events including phase transitions, maturity milestones, performance anomalies, or health issues that require attention or intervention. For example, when a new biotechnology domain achieves phase transition, alert generator 2940 can immediately notify domain managers, quality assurance teams, and hierarchical supervisory components to coordinate domain activation and integration procedures.

Trend analyzer 2941 identifies long-term patterns and trends in statistical observables that provide insights into expert domain development trajectories, system-wide performance patterns, and optimization opportunities that may not be apparent from instantaneous measurements. The component implements sophisticated trend analysis algorithms that distinguish meaningful development patterns from random fluctuations while providing predictive insights about future domain capabilities and development needs.

Report generator 2942 creates comprehensive reports that document expert domain development progress, operational performance, and comparative analysis across multiple domains within the expert foundry system. The component generates detailed documentation that supports decision-making, compliance verification, and performance optimization while providing historical records of domain development and achievement milestones that inform future domain creation and optimization strategies.

Dashboard interface 2943 provides real-time visualization and monitoring capabilities that enable stakeholders to observe expert domain development progress, monitor system-wide performance, and identify issues requiring attention through intuitive graphical interfaces and interactive monitoring tools. For instance, domain managers may observe real-time manifold maturity indicators, track phase transition progress across multiple domains, and identify domains requiring additional development support or optimization attention.

Notification system 2944 manages the distribution of alerts, reports, and status updates to appropriate stakeholders based on role-based access controls, escalation procedures, and communication preferences that ensure critical information reaches decision-makers while avoiding information overload or inappropriate access to sensitive operational data.

A system health and maturity status output 2950 provides the consolidated interface through which statistical observables monitoring results are made available to other components of the expert foundry system, enabling informed decision-making about domain deployment, resource allocation, and system optimization while supporting the hierarchical supervisory network's oversight and coordination responsibilities across the entire expert foundry system.

Figure 30:
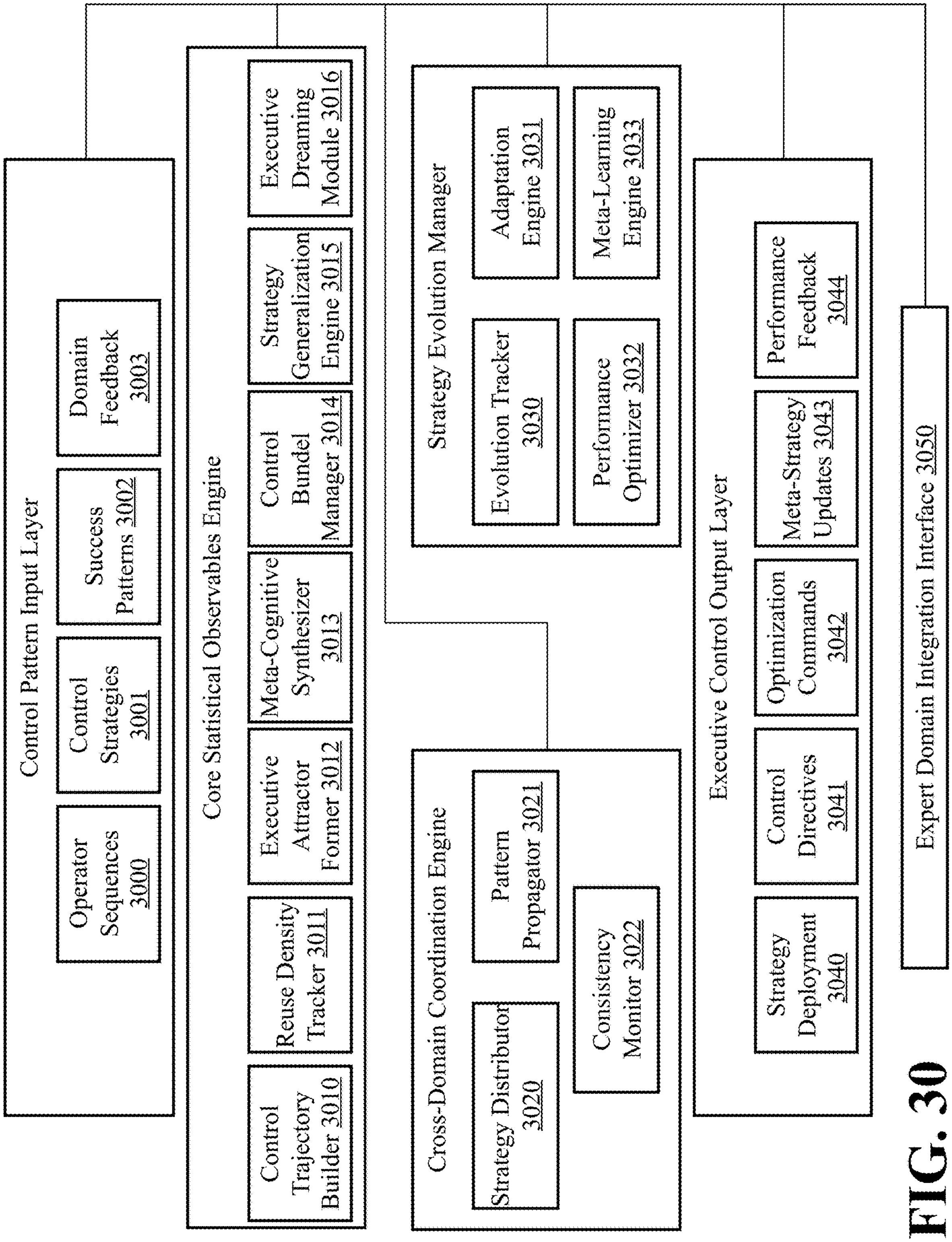
FIG. 30 is a block diagram illustrating an exemplary system architecture of an executive manifold supervisor showing second-order control trajectory management across expert domains within the expert foundry system.

FIG. 30 is a block diagram illustrating an exemplary system architecture of an executive manifold supervisor showing second-order control trajectory management across expert domains within the expert foundry system. The executive manifold supervisor implements the highest level of cognitive oversight by managing meta-cognitive capabilities that emerge from the reuse and generalization of control operator sequences across multiple expert domains, enabling the development of sophisticated supervisory strategies and adaptive control mechanisms that improve system-wide reasoning and decision-making effectiveness.

A control pattern input layer captures and processes the various control operations and management strategies that occur across expert domains within the foundry system, providing the foundational data for second-order cognitive development and meta-strategy formation. Operator sequences 3000 represent structured sequences of control operations such as generalize-then-prune, dream-then-recombine, or explore-then-consolidate that expert domains can employ during cognitive processing and knowledge management activities. For example, when multiple expert domains consistently use a "validate-then-generalize-then-distribute" sequence for handling novel insights, operator sequences 3000 would capture these patterns as structured control trajectories that can be analyzed for broader applicability across other domains within the foundry system. The component may implement sequence analysis algorithms that identify recurring operational patterns, extract control logic structures, and preserve the contextual factors that influence operator sequence effectiveness across different domain contexts and operational scenarios.

Control strategies 3001 encompass higher-level decision-making frameworks and management approaches that expert domains employ for resource allocation, quality management, performance optimization, and coordination with other system components. The component captures strategic patterns such as how domains balance exploration versus exploitation, manage uncertainty and confidence thresholds, coordinate cross-domain consultations, and adapt their operational parameters based on performance feedback and changing requirements. For instance, when financial advisory and risk management domains both develop similar strategies for handling uncertain market conditions through conservative analysis combined with scenario planning, control strategies 3001 would identify these strategic similarities as potential templates for broader application across other domains facing uncertainty management challenges.

Success patterns 3002 document the control approaches and operational strategies that consistently produce high-quality outcomes, user satisfaction, and effective problem resolution across different expert domains and operational contexts. In some aspects, the component implements pattern recognition algorithms that identify the characteristics of successful control operations, analyze the contextual factors that contribute to success, and extract generalizable principles that can inform strategy development across the expert foundry system. For example, when engineering and medical diagnostic domains both achieve superior performance through strategies that combine systematic analysis with creative exploration, success patterns 3002 can capture these effective approaches as proven templates that can guide control strategy development in other expert domains.

Domain feedback 3003 provides performance indicators, operational reports, and assessment data from individual expert domains that inform the executive manifold supervisor about the effectiveness of current control strategies and identify opportunities for optimization or strategy refinement. The component processes feedback including response quality metrics, user satisfaction indicators, operational efficiency measurements, and domain-specific performance assessments that enable evidence-based evaluation of control strategy effectiveness and guide continuous improvement of supervisory approaches across the expert foundry system.

An executive manifold core implements the fundamental geometric processing capabilities that enable second-order cognitive development through the reuse and generalization of control patterns across expert domains. Control trajectory builder 3010 creates structured pathways through the executive manifold that represent coherent sequences of control operations and management strategies, enabling the development of reusable meta-cognitive patterns that can be applied across multiple expert domains. The component implements one or more algorithms for translating control operator sequences into geometric trajectories within the executive manifold, preserving the logical relationships and contextual dependencies that characterize effective control strategies while enabling efficient navigation and reuse of proven management approaches.

Reuse density tracker 3011 monitors the frequency and distribution of control strategy reuse across expert domains to identify regions of high meta-cognitive activity and detect the accumulation patterns that indicate the formation of stable executive-level cognitive structures. For example, when multiple domains consistently reuse similar resource allocation strategies or quality management approaches, reuse density tracker 3011 can detect these convergence patterns and identify opportunities for developing generalized management frameworks that can be systematically applied across the expert foundry system to improve operational consistency and effectiveness.

Executive attractor former 3012 identifies and develops stable regions within the executive manifold where successful control strategies naturally converge, creating meta-cognitive anchors that guide system-wide management and coordination activities. The component implements attractor formation algorithms that recognize when control strategies demonstrate consistent effectiveness across multiple contexts, consolidate related approaches into coherent management frameworks, and establish stable reference points that enable reliable application of proven supervisory strategies across diverse operational scenarios within the expert foundry system.

Meta-cognitive synthesizer 3013 combines insights from multiple control strategies and operational approaches to create higher-order management frameworks that transcend individual domain boundaries and provide system-wide coordination capabilities. For instance, when analyzing successful collaboration patterns between engineering, environmental, and regulatory expert domains on infrastructure projects, meta-cognitive synthesizer 3013 can extract the essential coordination principles and create generalized frameworks for managing multi-domain collaborations that can be applied to other complex projects requiring interdisciplinary expertise and regulatory compliance considerations.

Control bundle manager 3014 organizes related control strategies and operational approaches into coherent clusters that enable efficient access and systematic application of proven management techniques across the expert foundry system. The component maintains organized collections of related control patterns, manages the evolution and refinement of control bundles through usage experience, and provides efficient mechanisms for identifying and applying appropriate management strategies based on operational context and domain requirements.

Strategy generalization engine 3015 extracts abstract principles and generalizable patterns from successful control strategies to create meta-frameworks that can be adapted and applied across diverse operational contexts within the expert foundry system. The component implements various abstraction algorithms that identify the essential characteristics of successful control approaches while preserving the flexibility needed for adaptation to different domain requirements and operational constraints, enabling broad application of proven management principles while maintaining effectiveness across varied contexts.

Executive dreaming module 3016 performs autonomous exploration and innovation within the executive manifold during inactive periods, generating novel control strategy combinations and testing innovative management approaches that may lead to improved supervisory capabilities. For example, during off-peak periods, executive dreaming module 3016 may explore combinations of successful strategies from different domains to discover new management approaches that could improve cross-domain coordination effectiveness or resource allocation efficiency across the expert foundry system.

A cross-domain coordination engine manages the distribution and application of executive-level control strategies across multiple expert domains while maintaining consistency and effectiveness in system-wide management approaches. Strategy distributor 3020 manages the deployment of proven control strategies and management frameworks to appropriate expert domains based on operational requirements, domain characteristics, and contextual factors that influence strategy effectiveness. The component implements intelligent distribution algorithms that assess domain readiness for strategy adoption, customize general frameworks for domain-specific requirements, and coordinate strategy deployment timing to maximize effectiveness while minimizing operational disruption across the expert foundry system.

Pattern propagator 3021 facilitates the spread of successful control patterns and management innovations across expert domains by identifying domains that could benefit from proven strategies and managing the knowledge transfer processes that enable effective strategy adoption. For instance, when a quality assurance strategy proves highly effective in medical diagnostic domains, pattern propagator 3021 may identify other domains with similar quality requirements and coordinate the adaptation and deployment of the strategy to improve quality management across the expert foundry system.

Consistency monitor 3022 ensures that distributed control strategies maintain coherence and effectiveness across different expert domains while identifying potential conflicts or inconsistencies that could compromise system-wide coordination and management effectiveness. The component implements monitoring algorithms that track strategy implementation outcomes, detect deviations from expected performance patterns, and identify situations where strategy modifications or alternative approaches may be needed to maintain optimal supervisory effectiveness across diverse operational contexts.

A strategy evolution manager oversees the continuous development and optimization of executive-level control capabilities through systematic learning and adaptation based on operational experience and performance feedback. Evolution tracker 3030 monitors the development and refinement of control strategies over time, tracking how management approaches evolve through usage experience and identifying trends that indicate improving or declining strategy effectiveness. The component maintains comprehensive historical records of strategy evolution, analyzes long-term development patterns, and provides insights that guide strategic planning and optimization efforts across the executive manifold supervisor and broader expert foundry system.

Adaptation engine 3031 implements systematic modifications and improvements to control strategies based on performance feedback, changing requirements, and operational experience to ensure that executive-level management capabilities continue to optimize for current conditions and emerging challenges. For example, when multiple domains report challenges with a particular resource allocation strategy due to changing computational requirements, adaptation engine 3031 can analyze the performance patterns, identify necessary modifications, and coordinate strategy updates that address the identified issues while preserving the beneficial characteristics of the original approach.

Performance optimizer 3032 continuously analyzes the effectiveness of executive-level control strategies and implements optimization measures that improve supervisory performance, operational efficiency, and system-wide coordination effectiveness. The component employs optimization algorithms that identify performance bottlenecks, discover improvement opportunities, and implement refinements that enhance the overall effectiveness of executive supervision while maintaining stability and reliability in system-wide management and coordination activities.

Meta-learning engine 3033 implements various learning mechanisms that enable the executive manifold supervisor to improve its own supervisory capabilities through analysis of management experiences and strategic outcomes across the expert foundry system. The component develops increasingly sophisticated understanding of what constitutes effective supervision, learns to predict the success of different management approaches in various contexts, and continuously refines its own decision-making processes to provide more effective oversight and coordination capabilities.

An executive control output layer provides the mechanisms through which executive-level supervision influences expert domain operations and system-wide coordination across the expert foundry system. Strategy deployment 3040 delivers optimized control strategies and management frameworks to appropriate expert domains with implementation guidance and support that ensures effective adoption and integration with existing domain operations. The component coordinates strategy rollout timing, provides implementation support and monitoring, and manages the transition processes that enable expert domains to benefit from executive-level management insights while maintaining operational stability and performance.

Control directives 3041 provide specific operational guidance and management instructions that implement executive-level decisions about resource allocation, priority management, coordination requirements, and performance optimization across expert domains. For instance, when the executive manifold supervisor identifies an opportunity to improve system-wide efficiency through better load balancing, control directives 3041 would provide specific instructions to relevant domains about how to adjust their operational parameters to achieve optimal resource utilization while maintaining quality and performance standards.

Optimization commands 3042 implement system-wide optimization decisions by coordinating adjustments across multiple expert domains to achieve improved overall performance, efficiency, or effectiveness that transcends individual domain boundaries. The component manages complex optimization initiatives that require coordinated changes across multiple domains, ensuring that system-wide improvements are implemented smoothly while maintaining individual domain effectiveness and operational stability.

Meta-strategy updates 3043 distribute refined control strategies and management frameworks that represent improved approaches developed through executive manifold supervisor learning and optimization processes. The component ensures that improvements in executive-level management capabilities are effectively communicated and implemented across expert domains, enabling the entire expert foundry system to benefit from advances in supervisory effectiveness and strategic management approaches.

Performance feedback 3044 provides assessment data and operational reports back to expert domains that inform them about the effectiveness of implemented strategies and enable local optimization and adaptation that complements executive-level supervision. The component maintains bidirectional communication that enables expert domains to understand how their operations contribute to system-wide performance while providing the feedback necessary for continued refinement of both local and executive-level management approaches.

An expert domain integration interface 3050 provides the standardized communication and coordination mechanisms that enable seamless integration between executive-level supervision and individual expert domain operations throughout the expert foundry system. This interface ensures that executive manifold supervisor capabilities enhance rather than disrupt expert domain autonomy while providing the coordination and oversight necessary for optimal system-wide performance and effective achievement of organizational objectives across all areas of expertise within the foundry system.

The executive manifold supervisor implements sophisticated dreaming capabilities that enable meta-cognitive reorganization and system-wide optimization during periods of reduced query activity. In one exemplary embodiment, supervisory network dreaming operates through coordinated dream cycles that span multiple levels of the hierarchical architecture, enabling cross-domain pattern discovery, control strategy optimization, and executive manifold evolution that enhance system-wide coordination effectiveness.

Supervisory dream initiation may occur when system activity levels fall below threshold (e.g., <20% of peak capacity for sustained periods of 30+ minutes), triggering coordinated dream states across domain supervisors and executive-level components. During dream cycles, the executive manifold supervisor implements meta-cognitive reorganization algorithms that analyze accumulated control operator sequences across all expert domains, identifying successful coordination patterns that can be generalized into improved executive-level strategies. Cross-domain correlation analysis during dreaming discovers hidden relationships between domain expertise areas, enabling optimization of knowledge transfer pathways and collaborative query routing strategies.

Executive manifold dreaming may comprise geometric restructuring of second-order control trajectories through gradient descent optimization in the executive latent space, consolidating frequently used meta-cognitive patterns while pruning ineffective coordination strategies. Dream-state analysis of supervisory network communication patterns identifies bottlenecks, redundancies, and optimization opportunities in hierarchical coordination mechanisms, leading to automated refinement of escalation procedures, resource allocation algorithms, and conflict resolution protocols.

The system implements coordinated dream synchronization across distributed deployment regions, ensuring that supervisory network optimizations propagate consistently across geographic boundaries while maintaining operational continuity through time-zone-aware dream scheduling. Dream cycle effectiveness can be measured through post-dream performance metrics including, but not limited to, coordination efficiency improvements, reduced escalation frequencies, enhanced cross-domain collaboration success rates, and improved executive decision-making quality, with dream frequency and intensity automatically adjusted based on optimization outcomes and system learning velocity.

Figure 31:
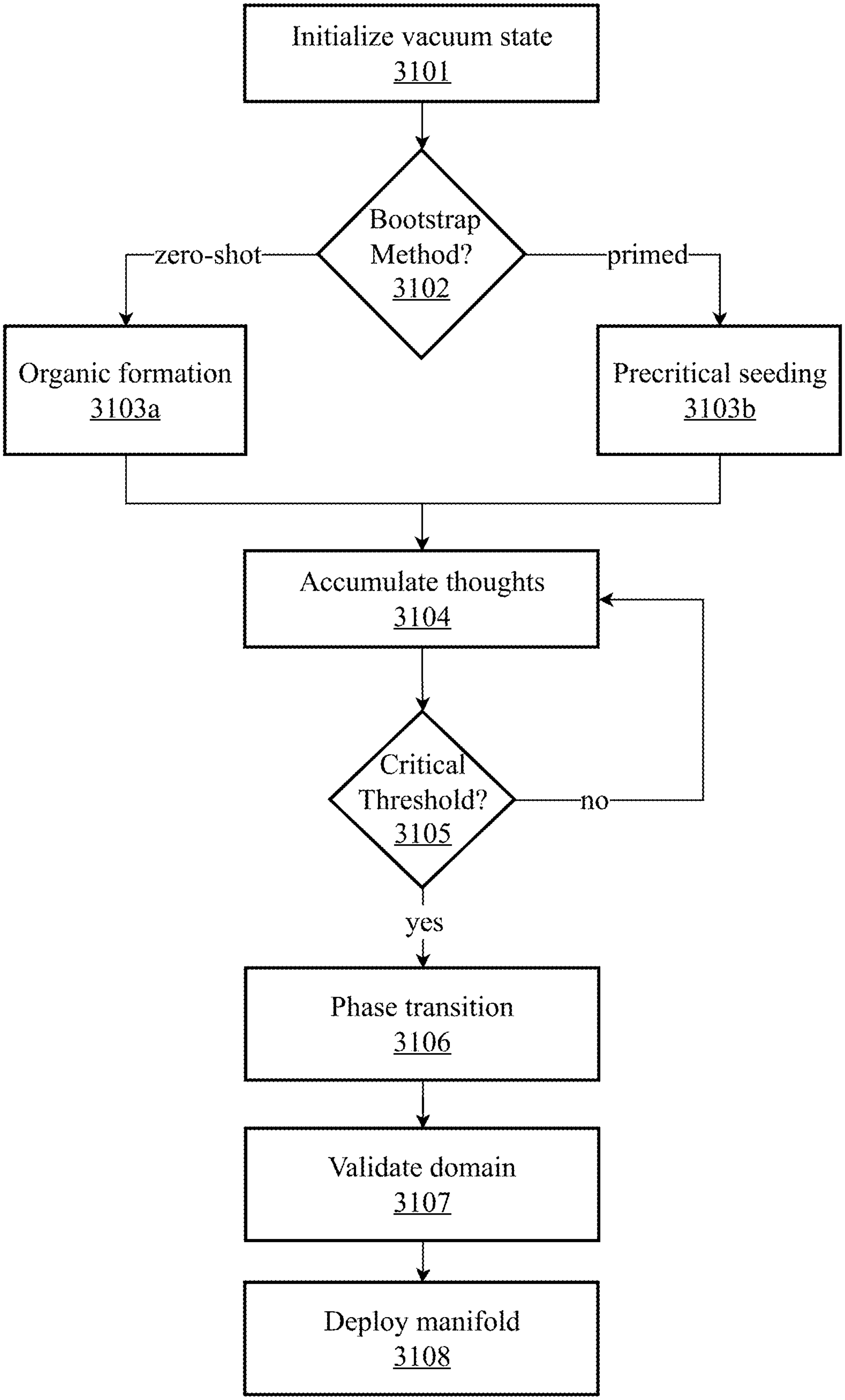
FIG. 31 is a flow diagram illustrating an exemplary method for bootstrapping a new expert domain from vacuum state to operational manifold within the expert foundry system, according to an embodiment.

FIG. 31 is a flow diagram illustrating an exemplary method for bootstrapping a new expert domain from vacuum state to operational manifold within the expert foundry system, according to an embodiment. The method provides a systematic approach for transforming unstructured latent hyperspace into a functional cognitive substrate capable of supporting expert-level reasoning and domain-specific knowledge processing.

According to the embodiment, the bootstrapping process begins with initialization and proceeds through vacuum state setup at step 3101, where a flat latent hyperspace H is established without any pre-existing metric, curvature, or topological structure. This vacuum state represents the foundational substrate upon which cognitive manifold formation will occur through subsequent interaction and reuse patterns.

Bootstrap method selection 3102 provides a decision point between two distinct formation pathways. The zero-shot organic formation pathway at step 3103*a* enables manifold development through live user interactions and natural trajectory reuse patterns, allowing the domain to develop authentic expertise through direct engagement with real-world queries and problem-solving scenarios. This approach maximizes explainability and auditability, as every attractor and geodesic has traceable lineage from first contact to semantic condensation. Alternatively, the primed precritical seeding pathway at step 3103*b* accelerates manifold formation through strategic injection of curated corpus materials and synthetic interaction trajectories that approximate expected usage patterns, enabling faster time-to-value deployment while maintaining the adaptive characteristics essential for continued domain evolution.

Both pathways converge at the thought accumulation stage at step 3104, where trajectory density building and reuse pattern tracking occur regardless of the initial formation method. This accumulation process implements the core geometric principles described herein, where repeated traversal of similar semantic regions induces local curvature and compression pressure that guides attention flow and reasoning pathways.

Critical threshold checking 3105 continuously monitors reuse density levels and intersection patterns to detect when sufficient trajectory accumulation has occurred to support phase transition. This assessment employs statistical observables including, but not limited to, cache hit rate analysis, distance distribution shifts, and trajectory coherence measurements to determine readiness for manifold formation. If critical threshold conditions are not met, the process returns to thought accumulation at step 3104 for continued density building until transition conditions are achieved.

Upon reaching critical threshold, phase transition at step 3106 initiates rapid manifold formation with curvature emergence and geometric structure activation. This transition transforms the flat hyperspace into a curved manifold with metric tensor structure, enabling geodesic computation, semantic compression, and the emergence of cognitive attractors that characterize functional expert domains.

Domain validation 3107 implements various quality assurance and readiness assessment protocols to ensure the newly formed manifold meets operational standards for expert-level performance. This validation may comprise testing of reasoning capabilities, response quality metrics, integration readiness with the broader expert foundry system, and compatibility with hierarchical supervisory oversight mechanisms.

The process concludes with operational manifold deployment 3108, delivering a fully functional expert domain that possesses the geometric structure, reasoning capabilities, and operational characteristics necessary for expert-level performance within its specialized area of knowledge while maintaining the persistent memory and adaptive learning capabilities that enable continued evolution through usage.

This bootstrapping method enables the expert foundry system to systematically create new domains of expertise while ensuring mathematical consistency, semantic integrity, and operational reliability across diverse specialized knowledge areas.

Figure 32:
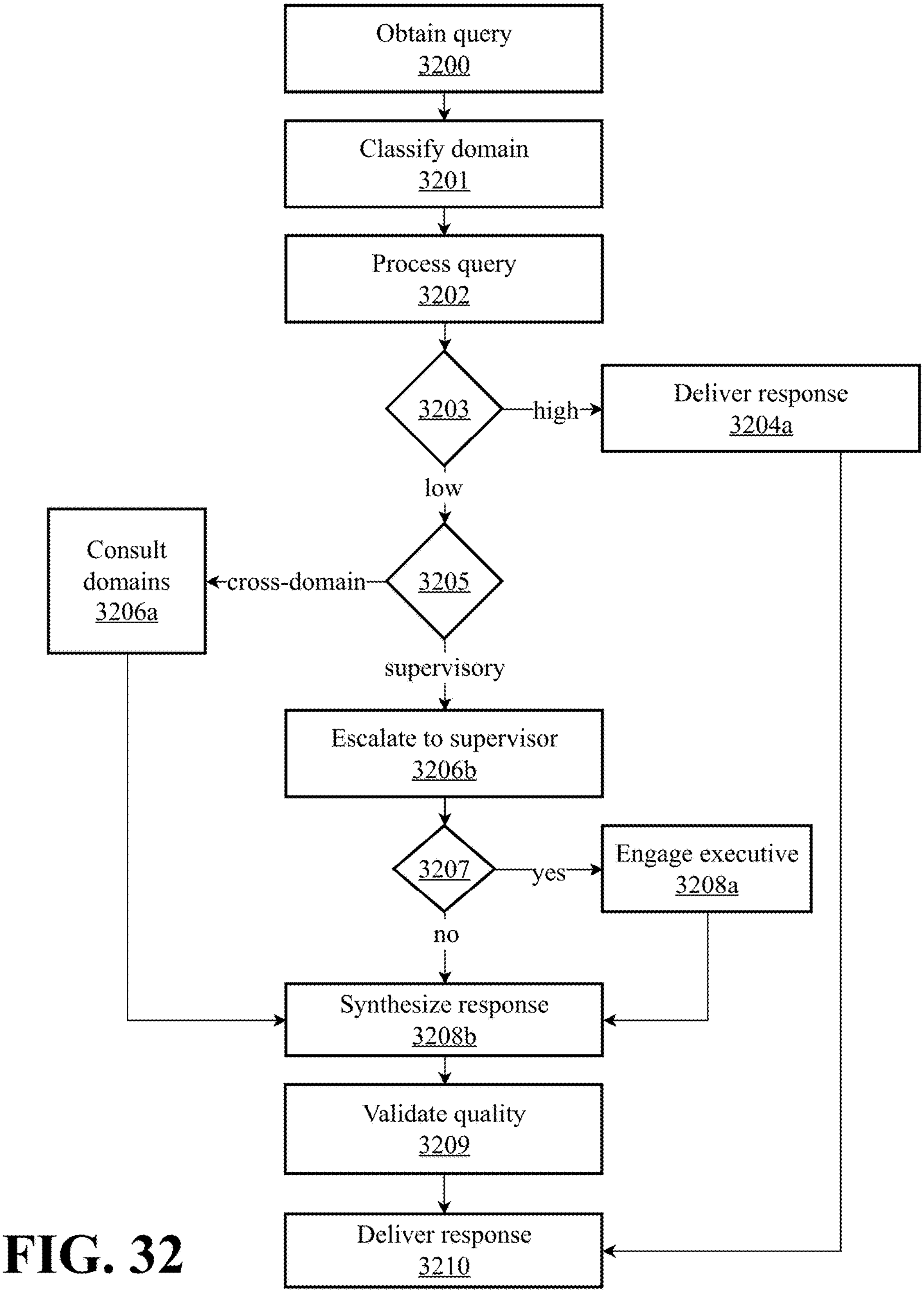
FIG. 32 is a flow diagram illustrating an exemplary method for hierarchical escalation and cross-domain consultation within the expert foundry system, according to an embodiment.

FIG. 32 is a flow diagram illustrating an exemplary method for hierarchical escalation and cross-domain consultation within the expert foundry system, according to an embodiment. The method provides sophisticated coordination mechanisms that enable efficient query processing while ensuring appropriate escalation pathways for complex or multi-domain requests that exceed individual domain capabilities.

According to the embodiment, the process begins with receiving, retrieving, or otherwise obtaining a query at step 3200, where incoming user requests are parsed and prepared for processing within the expert foundry system. In one exemplary embodiment, query parsing involves tokenization using standard NLP libraries, semantic embedding generation using pre-trained language models (e.g., 768-dimensional vectors, though other dimensions such as 1024, 1536, or 4096 may be used), and metadata extraction including query complexity indicators, domain hints, and priority levels based on user authorization and urgency markers.

Classify domain at step 3201 analyzes incoming queries to identify the most appropriate primary expert domain using multi-stage classification algorithms. In an exemplary implementation, the method first generates semantic embeddings of incoming queries and computes cosine similarity against domain centroids: similarity $(q,d)=(q\cdot cd)/(\|q\|\cdot\|cd\|)$ where q is the query embedding and cd is the centroid for domain d computed as weighted averages of successfully processed queries within that domain. Queries can be routed to domains with similarity scores above threshold t (e.g., t=0.7, though values between 0.5 and 0.9 may be used depending on system configuration). When multiple domains exceed the threshold, the method routes to the highest-scoring domain or flags for potential multi-domain consultation. In some aspects, domain centroids can be updated incrementally using exponential moving averages: $cd(t+1)=\alpha\cdot cd(t)+(1-\alpha)\cdot s_{successful}$ where $\alpha$ is a decay parameter (e.g., $\alpha=0.95$). Alternative embodiments may employ neural network classifiers, decision trees, or ensemble methods for domain classification.

Process query 3202 represents the step where the selected expert domain attempts to address the user query using its specialized knowledge base, reasoning capabilities, and accumulated geometric manifold structures. In one exemplary embodiment, query processing involves manifold traversal using geodesic computation algorithms, thought cache retrieval with similarity matching (e.g., using cosine similarity with threshold 0.8 for direct reuse, 0.5-0.8 for synthesis candidates), and response generation through the domain's LLM core with geometric context injection. Processing time is monitored with timeout mechanisms (e.g., 30-second timeout for standard queries, 120 seconds for complex analyses) to detect potential processing difficulties that may require escalation.

Assess confidence at decision point 3203 evaluates the domain's certainty in its response quality and completeness using multi-factor confidence scoring algorithms. In an exemplary implementation, confidence score C(r) is computed as: $C(r)=w_1\cdot MMI(d)+w_2\cdot ACC(d)+w_3\cdot REL(r,q)+w_4\cdot COH(r)$ where MMI(d) is the Manifold Maturity Index for domain d, ACC(d) is the historical accuracy rate (computed over sliding windows of exemplarily 1000 recent interactions), REL(r,q) is the semantic relevance between response r and query q (measured using embedding cosine similarity), COH(r) is the response coherence score (measured using perplexity metrics and logical consistency analysis), and $w_1$, $w_2$, $w_3$, $w_4$ are weighting factors (e.g., $w_1=0.3$, $w_2=0.25$, $w_3=0.25$, $w_4=0.2$, though other weightings may be employed based on domain characteristics). Additional confidence indicators include processing time relative to query complexity, cache hit rates during processing, and geometric trajectory stability metrics during manifold traversal.

High confidence results (e.g., $C(r)>0.8$) proceed directly to deliver response at step 3204*a*, where high-quality output is immediately provided to the user with confidence metadata, source attribution, and response quality indicators. Response delivery includes structured formatting with confidence scores, supporting evidence links, and uncertainty acknowledgments where appropriate.

For queries where confidence assessment indicates potential limitations (exemplarily $C(r)<0.8$), the method proceeds to determine escalation at decision point 3205. In one exemplary embodiment, escalation determination employs multi-criteria decision algorithms that evaluate query complexity metrics (measured using syntactic depth, semantic ambiguity scores, and domain-specificity indicators), domain capability boundaries (assessed through historical performance on similar queries), resource availability across the foundry system, and user priority levels. Escalation triggers include confidence scores below threshold, processing timeouts, explicit uncertainty indicators from the domain, semantic similarity to previously escalated queries above threshold (e.g., 0.9), or user authorization levels requiring enhanced oversight.

When cross-domain escalation is determined necessary, the method proceeds to consult domains at step 3206*a*, which orchestrates communication and knowledge sharing between expert domains using structured message-passing protocols. In an exemplary implementation, cross-domain coordination computes domain relevance scores:

$$relevance(d,q)=C(d)\cdot Q(q)/(\|C(d)\|\cdot\|Q(q)\|)$$

where C(d) represents capability vectors with proficiency scores for specific knowledge areas (scaled 0.0 to 1.0) and Q(q) is a capability requirement vector derived from query analysis. Domains with relevance scores above threshold (e.g., 0.6) are invited to collaborate through handshake establishment (e.g., timeout 5 seconds), context sharing with compression algorithms to minimize transmission overhead, partial result exchange using structured message formats (e.g., JSON with fields for partial responses, confidence metrics, and resource requirements), and response synthesis using weighted aggregation based on domain expertise and confidence levels.

When supervisory escalation is required, the method proceeds to escalate to supervisor at step 3206*b*, which engages domain-specific supervisory oversight through hierarchical control mechanisms. In one exemplary embodiment, supervisory escalation involves context packaging algorithms that preserve complete query history, domain interaction logs, attempted solution approaches, and identified limitations while applying compression techniques (e.g., using geometric abstraction to reduce context size by 60-80% while preserving essential information). Supervisor engagement may comprise enhanced resource allocation (e.g., 2-5× normal computational allocation), extended processing timeouts (e.g., 300-600 seconds), access to specialized knowledge bases or expert consultation networks, and application of advanced reasoning strategies including multi-step verification, alternative approach generation, and comprehensive uncertainty quantification.

Evaluate executive need at decision point 3207 determines whether complex multi-domain coordination requires meta-cognitive oversight through the executive manifold supervisor using sophisticated assessment algorithms. In an exemplary implementation, executive escalation criteria include: cross-domain conflicts requiring arbitration (detected through semantic contradiction analysis with embedding cosine similarity below threshold, exemplarily −0.3), queries spanning more than N domains (e.g., N=3), strategic decision-making requirements (identified through keyword matching and query classification), resource contention requiring system-wide optimization, or explicit user requests for highest-level analysis. Executive requirement assessment employs decision trees or neural network classifiers trained on historical escalation outcomes to predict when executive coordination will improve response quality beyond supervisory escalation alone.

When executive coordination is needed, engage executive at step 3208*a* implements the second-order control architecture through executive manifold supervisor activation. In one exemplary embodiment, executive engagement involves operator sequence analysis across all participating domains to identify successful control patterns, meta-cognitive strategy selection using reinforcement learning algorithms with reward functions based on user satisfaction and response quality metrics, strategic resource allocation optimization using linear programming or genetic algorithms to maximize system-wide performance, and coordination of complex interdomain dependencies through graph-based dependency analysis and constraint satisfaction algorithms. Executive processing includes generation of alternative solution strategies, risk assessment across multiple approaches, and strategic decision-making that considers long-term foundry system optimization beyond immediate query resolution.

Synthesizing response at step 3208*b* aggregates all consultation inputs, supervisory enhancements, and executive coordination results using one or more response fusion algorithms. In an exemplary implementation, response synthesis employs confidence-weighted semantic fusion where multiple expert domain responses are combined using:

$$R_{synthesized}=\Sigma_i w_i \cdot R_i / \Sigma_i w_i$$

where $R_i$ represents individual domain responses, $w_i$ are confidence-based weights computed as $w_i=C(R_i)^\alpha$ with scaling parameter $\alpha$ (e.g., $\alpha=2.0$ to emphasize high-confidence contributions). Conflict resolution mechanisms detect semantic contradictions through embedding analysis and apply resolution strategies including, but not limited to, evidence weighing (using source credibility scores and citation analysis), consensus building algorithms (implementing voting mechanisms with expertise-weighted ballots), and geometric interpolation techniques derived from manifold projection theory that preserve semantic integrity while resolving inconsistencies. Response coherence is maintained through narrative structure analysis, logical consistency checking using automated reasoning systems, and style harmonization to ensure unified presentation despite diverse source contributions.

Validating quality at step 3209 implements comprehensive quality assurance protocols using multi-dimensional validation frameworks. In one exemplary embodiment, quality validation includes accuracy verification through fact-checking against authoritative knowledge bases with confidence thresholds (e.g., requiring 90% confidence for factual claims), coherence assessment using perplexity measures and logical consistency analysis with maximum acceptable contradiction levels (e.g., perplexity <50 for technical responses), completeness evaluation comparing response coverage against query requirements using semantic similarity and keyword matching with minimum coverage thresholds (e.g., 80% requirement coverage), and bias detection through fairness metrics and demographic parity analysis across response content. Validation algorithms employ ensemble methods combining rule-based checks, statistical analyses, and machine learning classifiers trained on human-annotated quality datasets. Failed validation triggers automatic revision processes with specific feedback for improvement areas.

The method concludes with delivery of a response at step 3210, providing users with high-quality, expert-level responses through structured delivery mechanisms. In an exemplary implementation, response delivery may comprise confidence metadata presentation (with numerical confidence scores and uncertainty quantification), source attribution with domain contribution analysis and evidence provenance tracking, escalation path documentation showing which coordination mechanisms were employed, processing time reporting and resource utilization metrics for transparency, and user feedback collection mechanisms with rating systems and improvement suggestion interfaces. Response formatting adapts to user preferences and authorization levels, with technical details available for expert users and simplified presentations for general audiences.

This hierarchical escalation method enables the expert foundry system to systematically process diverse query complexity levels through quantitative decision-making frameworks, specific algorithmic implementations, and measurable quality criteria that ensure reliable coordination mechanisms across the distributed expert architecture.

Figure 33:
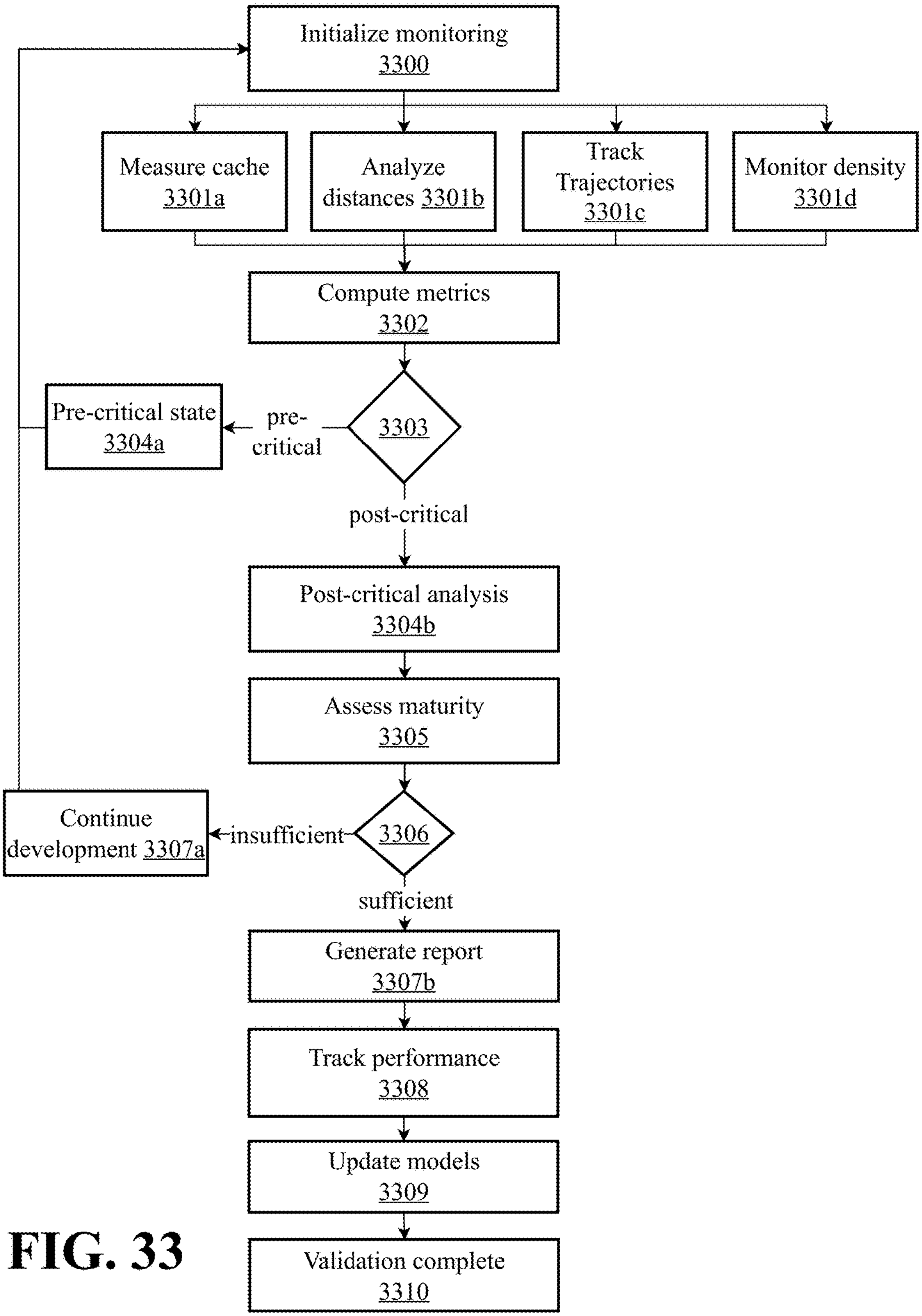
FIG. 33 is a flow diagram illustrating an exemplary method for measuring and validating expert domain maturity using statistical observables within the expert foundry system, according to an embodiment.

FIG. 33 is a flow diagram illustrating an exemplary method for measuring and validating expert domain maturity using statistical observables within the expert foundry system, according to an embodiment. The method provides systematic assessment mechanisms that monitor geometric manifold development and phase transition indicators to validate when expert domains achieve operational readiness and continued effectiveness.

According to the embodiment, the process begins at step 3300 by initializing monitoring, establishing comprehensive statistical observation systems that track multiple geometric and performance indicators across the expert domain's cognitive manifold. In one exemplary embodiment, monitoring initialization configures sampling intervals (e.g., every 100 interactions), establishes baseline measurement windows (e.g., 1000 initial interactions for baseline establishment), and initializes data collection arrays for storing time-series measurements of each statistical observable.

The method proceeds to parallel collection of multiple critical statistical observables that characterize manifold maturity and phase transition status, with measurements typically collected simultaneously to capture correlated changes across multiple indicators.

Measure cache at step 3301*a* tracks cache hit rates H(t) and retrieval patterns, monitoring logarithmic scaling patterns that indicate successful knowledge accumulation and reuse efficiency. In an exemplary implementation, cache hit rate is computed as $H(t)=(\text{successful}_{retrievals})/(\text{total}_{queries})$ over sliding time windows (e.g., 200-interaction windows with 50-interaction stride). The method fits logarithmic curves of the form H(t)~a·log(bt+1) where a and b are learned parameters (e.g., a∈[0.1, 0.9] and b∈[0.001, 0.1] depending on domain characteristics). Goodness-of-fit can be assessed using R-squared correlation coefficients, with values above threshold (e.g., $R^2>0.7$) indicating successful logarithmic scaling characteristic of geometric manifold formation. Alternative embodiments may use exponential or power-law fitting depending on observed scaling patterns.

Analyze distances at step 3301*b* monitors the distribution of pairwise distances among thought objects under the system's current latent metric $d_m(x,y)$, tracking the curvature-induced shift ΔP(t) as a divergence between pre-critical and post-critical distributions. In one exemplary embodiment, the method samples N thought object pairs (e.g., N=1000) at regular intervals and computes pairwise distances using the current manifold metric. Pre-critical distributions typically follow log-normal patterns $P_{pre}(d)$~Log-Normal(μ,σ) with parameters fitted using maximum likelihood estimation. Post-critical distributions exhibit bimodal or multimodal characteristics approximated as:

$$P_{post}(d)\approx\Sigma_i\alpha_i\cdot N(\mu_i,\sigma_i^2)$$

where $\Sigma_i\alpha_i=1$. The curvature-induced shift may be quantified as $$\Delta P(t)=D_{KL}(P_{post}(d;t)\|P_{pre}(d;0))$$

using Kullback-Leibler divergence, computed via kernel density estimation with Gaussian kernels (exemplarily bandwidth selected using Silverman's rule). Sustained increases in ΔP(t) above threshold (e.g., ΔP>2.0 nats) indicate significant manifold curvature emergence.

Track trajectories at step 3301*c* evaluates the coherence of cognitive trajectories and geodesic stability within the domain's manifold structure. In an exemplary implementation, trajectory coherence is measured by computing path variance $\sigma_{path}^2$ for sequences of reasoning steps, where coherent trajectories exhibit low variance (e.g., $\sigma_{path}^2<0.1$ in normalized coordinate space) while noisy pre-critical paths show high variance (e.g., $\sigma_{path}^2>0.5$). In one possible embodiment, geodesic stability is assessed by comparing actual reasoning paths to computed geodesics using path integral deviation metrics $$\int|p_{actual}(s)-p_{geodesic}(s)|ds$$

over path parameter s, with stable geodesics showing deviation below threshold (e.g., <0.2 in normalized space). The method maintains running averages of coherence metrics over temporal windows (e.g., 500-interaction windows) to detect stability trends.

Cognitive trajectories represent paths through latent space corresponding to sequences of thought or reasoning steps. In pre-critical regime, such paths are noisy, unstable, and sensitive to small variations in input. Let $\gamma_i:[0,1]\rightarrow H$ and $\gamma_j$ be two trajectories derived from semantically similar inputs. Their geodesic alignment is defined as:

$$A(\gamma_i\gamma_j)=\frac{1}{l}\int_0^l\cos(\theta(\tau))d\tau$$

where θ(τ) is the angle between the local velocity vectors of the two curves at corresponding points under arc-length parameterization, and l is the common effective length of comparison.

Average alignment across reused trajectories increases as the manifold forms, reflecting improved generalization and smoother compression. Similarly, the geodesic deviation tensor $$\delta^u(\tau)=\frac{D^2\xi^u}{d\tau^2}+R^{\mu}_{\nu\alpha\beta}u^{\nu}\xi^{\nu}u^{\beta}$$

(where $\xi^\nu$ is the separation vector between neighboring geodesics and $$u^\nu=\frac{d\gamma^\nu}{d\tau}$$

) becomes increasingly stable in mature manifolds. In this way, various embodiments of the systems and methods described herein can track a coherence index metric:

$$\Gamma(t)=E_{i,j}[A(\gamma_i,\gamma_j)|\text{prompt similarity}>\theta],$$

which rises as local curvature regularizes and cognitive neighborhoods form.

Monitor density at step 3301*d* continuously evaluates local reuse density function ρ(x,ε) across the latent hyperspace using spatial grid sampling or Monte Carlo estimation. The method evaluates density across a grid of sample points (e.g., 103 points for 3D spaces, scaling with dimensionality) and tracks proximity to critical thresholds ρc (e.g., ρc=5.0 trajectories per unit volume, though values between 2.0 and 10.0 may be appropriate depending on domain characteristics). Density evolution is monitored using exponential moving averages with decay parameters (exemplarily α=0.95) to capture both short-term fluctuations and long-term trends.

Compute metrics at step 3302 integrates all statistical observables using weighted combination algorithms to generate comprehensive assessment metrics. In an exemplary embodiment, a composite maturity score M(t) is computed as $M(t)=w_1\cdot H_{norm}(t)+w_2\cdot\Delta P_{norm}(t)+w_3\cdot C_{norm}(t)+w_4\cdot\rho_{norm}(t)$ where each observable is normalized to [0,1] range and weights $w_i$ are empirically determined (e.g., $w_1=0.3$, $w_2=0.3$, $w_3=0.2$, $w_4=0.2$, though other weightings may be employed). Normalization can use min-max scaling based on empirically observed ranges across multiple domains, with outlier detection using interquartile range methods to ensure robust normalization.

Detect phase transition at decision point 3303 analyzes integrated metrics using change-point detection algorithms to identify when domains transition from pre-critical to post-critical states. In one exemplary implementation, the method applies CUSUM (cumulative sum) change-point detection to the composite maturity score M(t), with detection thresholds calibrated using historical data (exemplarily threshold h=5.0 for change magnitude detection). Alternative embodiments may use Bayesian change-point detection, sliding window t-tests, or other statistical methods. Pre-critical state identification 3304*a* indicates domains with composite scores below threshold (e.g., M(t)<0.4) exhibiting log-normal distance distributions, cache hit rates below logarithmic scaling targets (e.g., $R^2<0.5$), and insufficient reuse density (e.g., ρ<0.5ρc).

Post-critical analysis 3304*b* characterizes domains exceeding maturity thresholds (e.g., M(t)>0.7) with statistical significance testing (e.g., ρ<0.05 using Wilcoxon signed-rank tests comparing recent measurements to baseline periods). Post-critical domains exhibit bimodal distance distributions with mixture model fits achieving high likelihood scores, cache hit rates following logarithmic scaling with strong correlation (e.g., $R^2>0.8$), trajectory coherence below noise thresholds (exemplarily $\sigma_{path}^2<0.15$), and reuse density exceeding critical values (e.g., $\rho>1.2\rho c$).

Assess maturity at step 3305 computes the Manifold Maturity Index MMI(d) using standardized scoring protocols. In an exemplary embodiment, $MMI(d)=(M(t)-M_{min})/(M_{max}-M_{min})$ where $M_{min}$ and $M_{max}$ represent empirically determined bounds (exemplarily $M_{min}=0.1$, $M_{max}=0.95$) across representative domain populations. Additional maturity metrics include geometric stability indices, semantic coherence scores, and performance reliability measures integrated using multi-criteria decision analysis frameworks such as TOPSIS (Technique for Order Preference by Similarity to Ideal Solution).

Validate readiness at decision point 3306 evaluates whether computed maturity metrics meet established thresholds for operational deployment using multi-stage validation protocols. In one exemplary embodiment, validation requires MMI(d)>0.8, sustained post-critical state for minimum duration (e.g., 1000 interactions), and passing statistical significance tests across all four observables. Insufficient maturity (failing any validation criterion) may result in continued development at step 3307*a*, with specific feedback indicating which observables require improvement and estimated additional interaction requirements based on current development velocity.

Sufficient maturity enables generating a report at step 3307*b*, creating comprehensive maturity documentation including, but not limited to, statistical summaries (means, variances, confidence intervals for all observables), geometric structure analysis (manifold curvature estimates, attractor identification), validation test results with p-values, and operational readiness certification. Reports include visualizations of observable evolution, phase transition timing, and comparative analysis against domain population benchmarks.

Track performance at step 3308 implements ongoing monitoring using the same statistical observables with adapted sampling frequencies (e.g., reduced to every 500 interactions post-deployment) and establishes control charts with warning limits (e.g., $+2\sigma$) and action limits (e.g., $+3\sigma$) for detecting performance degradation or optimization opportunities.

Update models at step 3309 implements adaptive threshold adjustment using Bayesian updating of threshold parameters based on operational performance data, false positive/negative rates from validation decisions, and cross-domain performance correlation analysis. Model updates occur periodically (e.g., monthly) with statistical significance testing to ensure improvements before deployment.

The method concludes with a complete validation at step 3310, providing certified confirmation including, but not limited to, formal attestation of validation criteria satisfaction, statistical confidence measures for all assessments, and integration approval for deployment within the expert foundry system.

This maturity validation method enables the expert foundry system to systematically verify domain readiness through quantitative assessment of geometric principles underlying cognitive manifold formation, with specific algorithms, parameters, and validation criteria that ensure reproducible and reliable expert capability verification across diverse knowledge domains.

Figure 34:
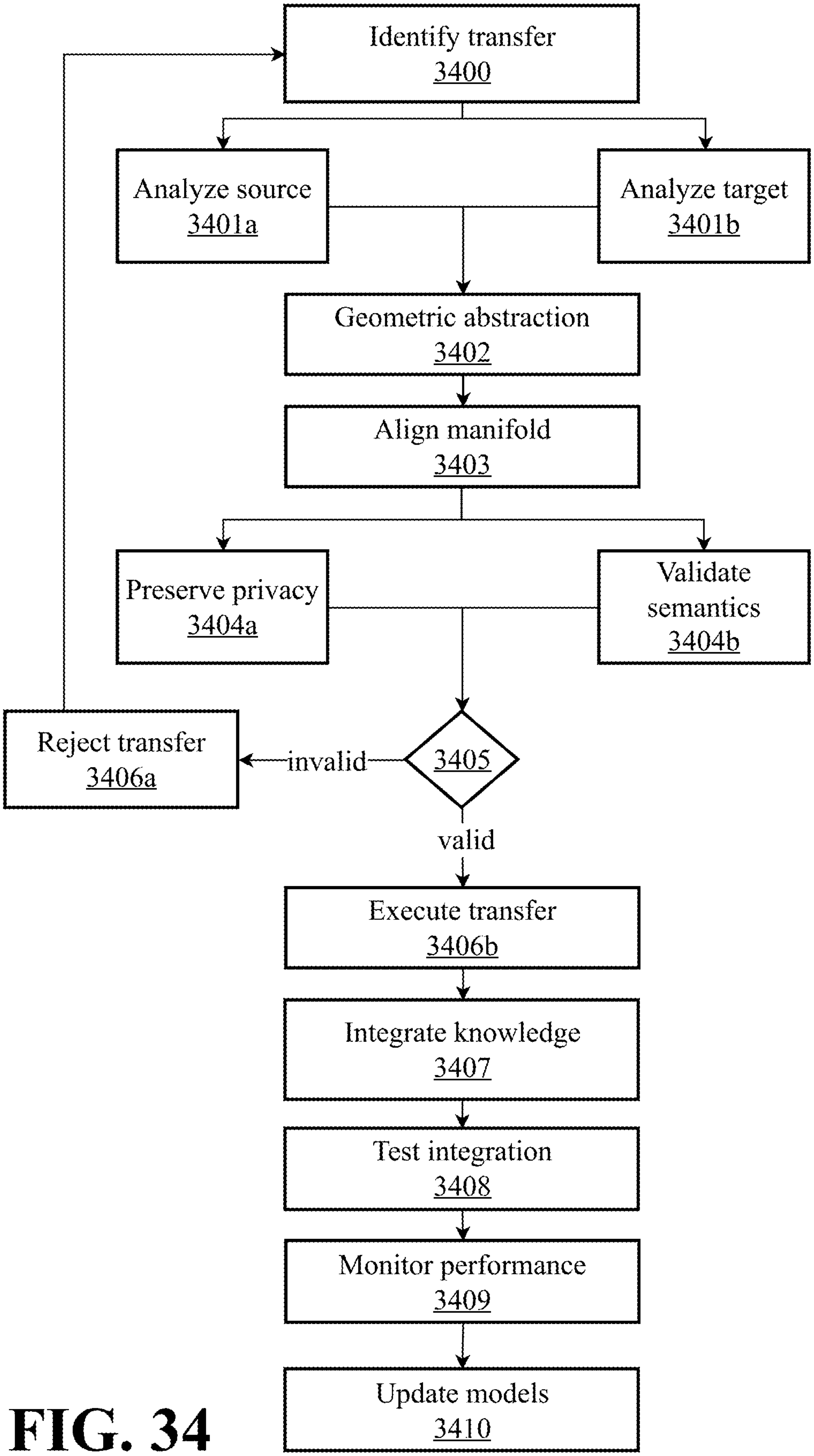
FIG. 34 is a flow diagram illustrating an exemplary method for cross-domain knowledge transfer and manifold alignment within the expert foundry system, according to an embodiment.

FIG. 34 is a flow diagram illustrating an exemplary method for cross-domain knowledge transfer and manifold alignment within the expert foundry system, according to an embodiment. The method enables systematic sharing of learned insights, compressed thought patterns, and cognitive structures between different expert domains while maintaining appropriate privacy boundaries and semantic integrity, facilitating system-wide learning and capability enhancement through geometric abstraction and manifold alignment techniques.

According to the embodiment, the process begins at step 3400 with identifying transfer opportunities which detects opportunities for beneficial knowledge sharing between expert domains based on semantic similarity analysis, complementary expertise identification, and system-wide optimization objectives. In one exemplary embodiment, transfer opportunity identification employs cross-domain semantic analysis using embedding similarity metrics between domain knowledge representations, capability gap analysis that identifies domains requiring enhancement in specific knowledge areas, collaborative query pattern analysis that detects recurring multi-domain consultation requirements, and performance correlation analysis that identifies domains with complementary strengths and weaknesses. Transfer triggers include domain maturity imbalances (exemplarily when MMI differences exceed threshold $\Delta=0.3$), recurring cross-domain consultation patterns above frequency threshold (exemplarily >10 consultations per week between specific domain pairs), explicit administrator requests for knowledge sharing, or automated optimization algorithms identifying potential system-wide performance improvements through strategic knowledge transfer.

The method proceeds to parallel analysis of source and target domains to assess transfer feasibility and requirements. Analyze source at step 3401*a* extracts knowledge patterns and geometric structures from the source domain that are suitable for transfer to other domains. In an exemplary implementation, source analysis involves manifold structure extraction using geometric feature analysis that identifies stable attractors, well-defined geodesic pathways, and high-density semantic regions within the source domain's cognitive manifold, thought pattern analysis that captures successful reasoning strategies and problem-solving approaches through trajectory clustering and pattern mining algorithms, knowledge abstraction that identifies domain-independent principles and methodologies through semantic analysis and hierarchical clustering of domain concepts, and transferability assessment that evaluates which knowledge structures can be meaningfully adapted to other domains using domain similarity metrics and semantic compatibility analysis.

Analyze target at step 3401*b* assesses the target domain's compatibility and integration capacity for receiving transferred knowledge. In one exemplary embodiment, target analysis includes manifold readiness assessment that evaluates the target domain's geometric maturity and structural stability using statistical observables described in the foundational disclosure, compatibility evaluation that measures semantic alignment between source and target domains using embedding cosine similarity and concept overlap analysis (e.g., requiring minimum compatibility score >0.6 for successful transfer), integration capacity analysis that assesses the target domain's ability to incorporate new knowledge without disrupting existing capabilities through stability testing and performance impact prediction, and privacy constraint evaluation that identifies sensitive information boundaries and access control requirements based on domain security policies and regulatory compliance requirements.

Geometric abstraction at step 3402 extracts transferable geometric structures from the source domain knowledge while preserving essential semantic relationships and removing domain-specific details. In an exemplary implementation, geometric abstraction employs manifold projection algorithms that map high-dimensional source knowledge into lower-dimensional transferable representations while preserving topological relationships, semantic distillation that removes domain-specific terminology and context while retaining underlying logical structures and reasoning patterns through natural language processing and concept generalization techniques, geometric feature extraction that identifies stable curvature patterns, attractor configurations, and geodesic structures that represent transferable knowledge organization principles, and abstraction validation that ensures extracted structures maintain semantic coherence and practical utility through consistency checking and semantic similarity measurement against original source knowledge.

Aligning manifolds at step 3403 computes geometric transformations between source and target metric spaces to enable accurate knowledge mapping while preserving semantic integrity. In one exemplary embodiment, manifold alignment uses metric tensor analysis to characterize the geometric properties of both source and target manifolds, optimal transport algorithms that compute minimum-cost transformations between probability distributions representing knowledge structures in different domains, geometric registration techniques that align corresponding features and structures between manifolds using iterative closest point algorithms adapted for high-dimensional semantic spaces, and transformation validation that verifies alignment quality through cross-validation testing and semantic consistency measurement with acceptable alignment error thresholds (e.g., <0.2 in normalized coordinate space).

The method proceeds to parallel privacy preservation and semantic validation to ensure transfer safety and effectiveness. Preserving privacy at step 3404*a* applies privacy filters and anonymization techniques to protect sensitive domain-specific information while enabling beneficial knowledge sharing. In an exemplary implementation, privacy preservation includes differential privacy mechanisms that add calibrated noise to transferred knowledge structures while preserving statistical utility (e.g., using ε-differential privacy with $\varepsilon \leq 1.0$ for sensitive domains), sensitive information filtering that removes personally identifiable information, proprietary data, and confidential business information through automated detection and redaction algorithms, access control verification that ensures transferred knowledge respects domain-specific security policies and user authorization levels, and anonymization validation that confirms privacy protection effectiveness through re-identification risk assessment and information leakage measurement.

Validate semantics at step 3404*b* verifies semantic consistency and integrity of the proposed knowledge transfer to ensure transferred information maintains meaning and utility in the target domain context. In one exemplary embodiment, semantic validation employs consistency checking algorithms that verify transferred knowledge does not contradict existing target domain knowledge using logical consistency analysis and semantic entailment testing, utility assessment that measures the practical value of transferred knowledge for improving target domain capabilities through performance prediction modeling and capability gap analysis, semantic preservation verification that ensures core meaning and relationships are maintained through the transfer process using embedding similarity measurement and concept mapping validation, and integration impact analysis that predicts how transferred knowledge will affect target domain performance and stability through simulation testing and risk assessment.

Validating transfer at decision point 3405 evaluates whether the proposed knowledge transfer meets all requirements for privacy, semantic integrity, and system benefit. In one exemplary embodiment, transfer validation uses multi-criteria decision analysis that combines privacy compliance scores, semantic consistency metrics, predicted performance improvements, and system stability assessments using weighted scoring algorithms (e.g., privacy weight=0.3, semantics weight=0.3, utility weight=0.25, stability weight=0.15). Transfer approval requires meeting minimum thresholds across all criteria (exemplarily >0.8 for privacy compliance, >0.75 for semantic consistency, >0.1 for predicted performance improvement) and overall composite score above acceptance threshold (exemplarily >0.7).

Invalid transfers proceed to transfer rejection at step 3406*a*, documenting rejection reasons for system learning and providing feedback for future transfer opportunity identification and optimization. Rejection analysis may comprise failure mode categorization, improvement recommendations, and updated transfer opportunity detection criteria to enhance future transfer success rates.

Valid transfers proceed to execute transfer at step 3406*b*, which applies the computed geometric transformation to transfer knowledge from source to target domain. In an exemplary implementation, transfer execution comprises applying manifold alignment transformations to map source knowledge structures into target domain coordinate systems, integrating transformed knowledge with existing target domain structures using merge algorithms that preserve both original and transferred knowledge, updating target domain manifold metrics and geometric properties to accommodate new knowledge while maintaining structural stability, and creating transfer documentation that tracks knowledge provenance and transformation history for audit and optimization purposes.

Integrating knowledge at step 3407 merges transferred knowledge into the target manifold structure while maintaining geometric coherence and semantic consistency. In one exemplary embodiment, knowledge integration uses incremental manifold updates that gradually incorporate transferred knowledge to minimize disruption to existing cognitive structures, semantic graph merging that combines knowledge representations while resolving conflicts and maintaining logical consistency, attention flow recalibration that adjusts the target domain's attention mechanisms to account for new knowledge areas and reasoning pathways, and stability verification that monitors target domain performance during integration to detect and address any adverse effects from knowledge incorporation.

Test integration at step 3408 validates the effectiveness of transferred knowledge through comprehensive testing protocols that assess both immediate functionality and long-term stability. In an exemplary implementation, integration testing comprises performance benchmarking that compares target domain capabilities before and after knowledge transfer using standardized test suites and performance metrics, capability assessment that evaluates whether transferred knowledge successfully addresses identified capability gaps and enhances domain expertise, stability monitoring that tracks manifold geometric properties and statistical observables to ensure integration does not compromise domain stability, and user acceptance testing that evaluates whether transferred knowledge improves user experience and response quality through controlled comparison studies.

Monitoring performance at step 3409 implements ongoing surveillance of transfer impact and domain enhancement to ensure continued effectiveness and identify optimization opportunities. In one exemplary embodiment, performance monitoring includes longitudinal analysis that tracks target domain performance metrics over extended periods (e.g., 30-90 days post-transfer), knowledge utilization measurement that assesses how frequently and effectively transferred knowledge is accessed and applied during query processing, manifold evolution tracking that monitors changes in target domain geometric structure and statistical properties resulting from knowledge integration, and comparative analysis that evaluates transfer success against similar historical transfers to identify best practices and improvement opportunities.

Updating models at step 3410 refines transfer algorithms and assessment metrics based on operational experience and performance analysis to improve future knowledge transfer effectiveness. In one exemplary embodiment, model updates include transfer success prediction model refinement using machine learning algorithms trained on historical transfer outcomes, manifold alignment algorithm optimization based on alignment quality measurements and integration success rates, privacy preservation technique enhancement to improve protection while maintaining knowledge utility, and semantic validation criteria adjustment based on validation accuracy and post-transfer performance correlation analysis.

The method concludes with a complete transfer, providing comprehensive documentation of the successful knowledge transfer including transfer effectiveness metrics, integration impact assessment, performance improvement measurements, and lessons learned for system optimization.

This cross-domain knowledge transfer method enables the expert foundry system to systematically share valuable knowledge across specialized domains while maintaining privacy, semantic integrity, and system stability through sophisticated geometric abstraction and manifold alignment techniques that preserve the mathematical foundations of the PCM architecture while enabling beneficial knowledge propagation throughout the distributed expert system.

Figure 35:
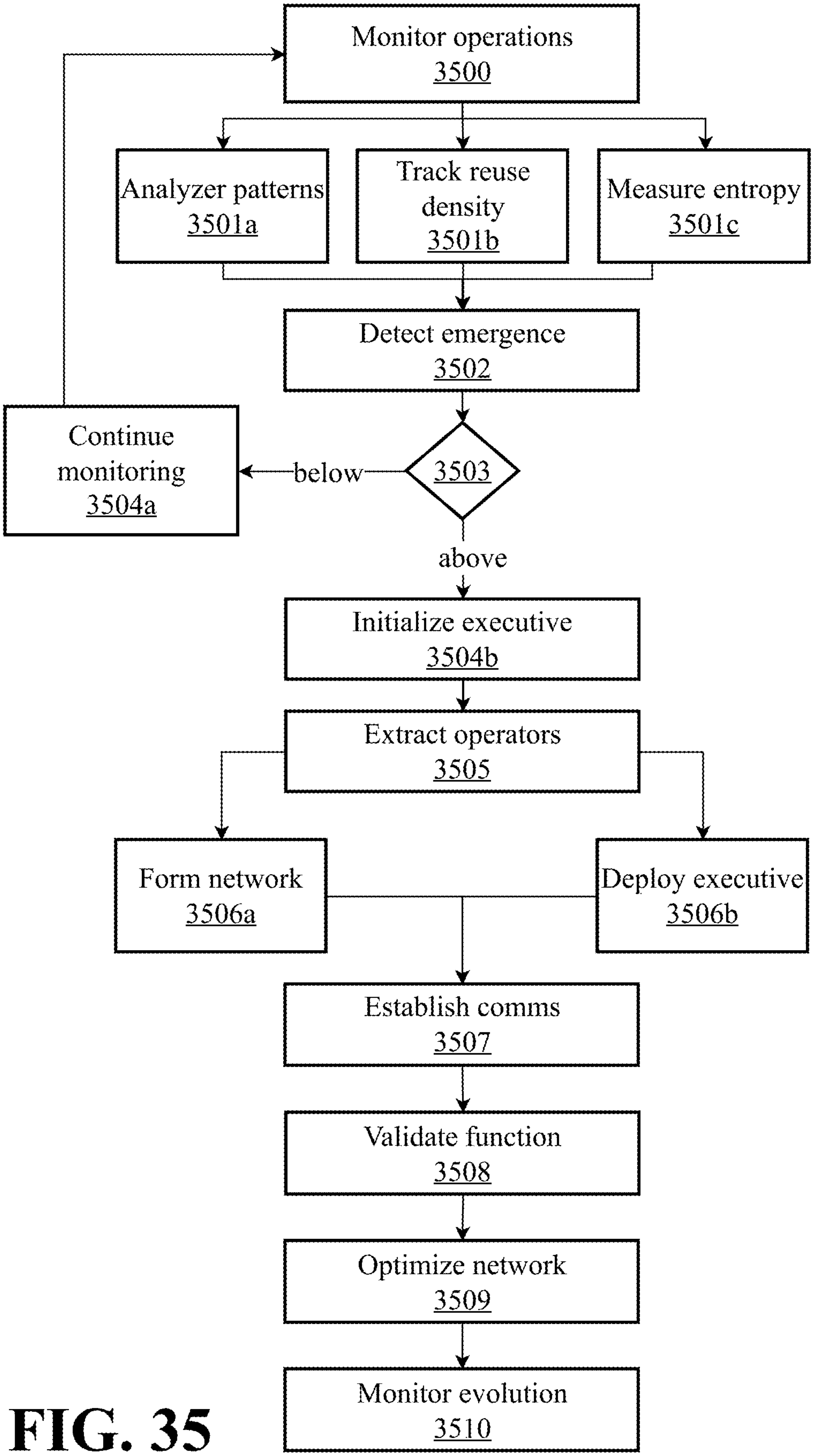
FIG. 35 is a flow diagram illustrating an exemplary method for executive control emergence and supervisory network formation within the expert foundry system, according to an embodiment.

FIG. 35 is a flow diagram illustrating an exemplary method for executive control emergence and supervisory network formation within the expert foundry system, according to an embodiment. The method enables the systematic development of second-order control architectures and hierarchical supervisory networks that emerge organically through reuse-based geometric principles, facilitating the evolution of meta-cognitive capabilities that improve system-wide reasoning efficiency and coordination effectiveness across distributed expert domains.

According to the embodiment, the process begins at step 3500 with monitoring operations, which establishes comprehensive surveillance of domain activities to detect patterns of control strategy usage and coordination requirements across the expert foundry system. In one exemplary embodiment, operations monitoring includes activity logging systems that capture all domain interactions, reasoning pathways, control decisions, and coordination events with timestamp precision (e.g., microsecond resolution for performance analysis), control operator usage tracking that records the frequency and context of different control strategies employed by expert domains during query processing and problem-solving activities, cross-domain interaction analysis that monitors communication patterns, collaboration frequencies, and resource sharing behaviors between different expert domains, and performance correlation analysis that identifies relationships between control strategy usage patterns and system-wide performance metrics including response quality, processing efficiency, and user satisfaction levels.

The method proceeds to parallel analysis of control patterns to identify emergence indicators across multiple dimensions of system behavior. Analyzing patterns at step 3501*a* identifies control operator sequences that represent successful reasoning strategies and coordination approaches used across expert domains. In an exemplary implementation, pattern analysis employs sequence mining algorithms that extract frequently occurring control operator chains from domain interaction logs, statistical analysis of operator usage patterns using frequency analysis and temporal correlation measurement to identify stable control strategies, clustering algorithms that group similar control sequences and identify archetypal coordination patterns used across multiple domains, and effectiveness assessment that correlates control pattern usage with performance outcomes using regression analysis and causal inference techniques to identify the most beneficial control strategies for different types of queries and operational scenarios.

Tracking reuse density at step 3501*b* monitors the frequency and distribution of control operator reuse across expert domains to detect when control patterns achieve sufficient density for executive manifold formation. In one exemplary embodiment, reuse density tracking calculates local density functions $\rho_{control}(o,\varepsilon)$ for control operators o within operational context neighborhoods of radius ε (e.g., $\varepsilon=0.1$ in normalized operational parameter space), employs sliding window analysis over temporal periods (e.g., 7-day windows with daily updates) to detect trends in control pattern reuse frequency, maintains cross-domain correlation matrices that track which control strategies are used by multiple domains and identify candidates for generalization to executive-level coordination capabilities, and implements threshold monitoring that detects when control operator density exceeds critical values (e.g., $\rho_{control}=3.0$ reuses per operational context per week) indicating sufficient pattern stability for executive manifold substrate formation.

Measuring entropy 3501*c* calculates control strategy entropy to assess the diversity and specialization of coordination approaches across the expert foundry system. In an exemplary implementation, entropy measurement computes Shannon entropy $H(C)=-\Sigma_i\, p(c_i)\log_2 p(c_i)$ where $p(c_i)$ represents the probability of control strategy $c_i$ being employed across system operations, tracks entropy evolution over time to detect phases of control strategy consolidation (decreasing entropy) or diversification (increasing entropy), implements entropy gradients analysis that identifies directional trends in control strategy development and specialization patterns, and employs comparative entropy analysis across different operational contexts and domain types to identify universal control patterns versus domain-specific coordination strategies.

Detect emergence at step 3502 integrates pattern analysis, reuse density, and entropy measurements to identify critical density conditions that indicate readiness for executive control emergence. In one exemplary embodiment, emergence detection uses composite scoring algorithms that combine multiple indicators:

$$E_{score}=w_1\cdot\rho_{norm}+w_2\cdot(1-H_{norm})+w_3\cdot P_{norm}$$

where $\rho_{norm}$ is normalized reuse density, $H_{norm}$ is normalized entropy (inverted to emphasize pattern consolidation), $P_{norm}$ is normalized pattern stability, and weights $w_i$ are empirically determined (exemplarily $w_1=0.4$, $w_2=0.3$, $w_3=0.3$). Additional emergence indicators include cross-domain control pattern convergence measured through embedding similarity analysis, coordination efficiency improvements indicating successful control strategy generalization, and system-wide performance correlations suggesting meta-cognitive benefits from coordinated control approaches.

Critical threshold at decision point 3503 evaluates whether emergence indicators meet the requirements for executive manifold initialization using multi-criteria assessment protocols. In one exemplary embodiment, threshold evaluation requires meeting minimum criteria across all indicators: reuse density above threshold (e.g., $\rho_{control}>3.0$), entropy below maximum indicating sufficient pattern consolidation (e.g., H<2.5 bits), pattern stability above minimum indicating reliable control strategies (e.g., stability score >0.8), and composite emergence score above acceptance threshold (e.g., $E_{score}>0.75$). Below-threshold conditions proceed to continue monitoring at step 3504*a*, which maintains surveillance of control pattern development while providing feedback for pattern identification and emergence detection algorithm refinement.

Above-threshold conditions proceed to initialize executive at step 3504*b*, which creates the executive manifold substrate for meta-cognitive control capabilities. In one exemplary embodiment, executive initialization involves manifold substrate creation using geometric initialization algorithms that establish curved latent space with appropriate dimensionality (e.g., 128-512 or more dimensions depending on system complexity) and metric tensor configuration based on observed control pattern relationships, control operator embedding that maps identified control strategies into the executive manifold coordinate system while preserving semantic relationships and effectiveness correlations, meta-cognitive architecture establishment that creates second-order reasoning capabilities including strategy selection mechanisms, performance optimization algorithms, and system-wide coordination protocols, and integration interfaces that enable communication between the executive manifold and domain-specific supervisory components throughout the expert foundry system.

Extract operators at step 3505 generalizes successful control strategies from domain-specific implementations into executive-level coordination capabilities that can be applied across the entire foundry system. In one exemplary implementation, operator extraction employs abstraction algorithms that remove domain-specific details while preserving essential control logic and coordination principles, generalization techniques that identify universal applicability patterns and adaptation mechanisms for different operational contexts, effectiveness verification that validates extracted operators through simulation testing and cross-domain applicability assessment, and integration preparation that formats extracted control operators for incorporation into the executive manifold reasoning architecture and hierarchical supervisory coordination protocols.

The method proceeds to parallel formation of supervisory network hierarchy and executive manifold deployment. Forming a network at step 3506*a* establishes the domain supervisor hierarchy that provides direct oversight and management capabilities for individual expert domains. In one exemplary embodiment, network formation includes supervisor instantiation that creates dedicated supervisory components for each expert domain with monitoring capabilities, control interfaces, and performance optimization mechanisms, hierarchy establishment that defines reporting relationships, authority boundaries, and escalation pathways between domain supervisors and executive-level coordination, communication protocol configuration that enables efficient message passing, status reporting, and coordination request handling between supervisory network components, and authority delegation that assigns appropriate decision-making responsibilities and resource allocation capabilities to different levels of the supervisory hierarchy.

Deploying the executive at step 3506*b* activates meta-cognitive control capabilities through executive manifold supervisor implementation. In one exemplary embodiment, executive deployment involves meta-cognitive reasoning activation that enables second-order control strategy selection, performance optimization across multiple domains, and strategic decision-making based on system-wide objectives, coordination capability establishment that provides centralized management of complex multi-domain operations, resource allocation optimization, and conflict resolution mechanisms, strategic oversight implementation that monitors system-wide performance trends, identifies optimization opportunities, and coordinates long-term foundry system development initiatives, and integration verification that ensures proper connectivity and coordination between executive-level capabilities and domain-specific supervisory components.

Establishing comms at step 3507 configures message bus and coordination protocols that enable effective communication and coordination throughout the hierarchical supervisory network. In one exemplary implementation, communication establishment includes high-performance message bus configuration that provides reliable, low-latency communication between all supervisory network components with message queuing, routing, delivery guarantees, and fault tolerance mechanisms, protocol specification that defines standardized message formats, coordination procedures, and escalation mechanisms using structured communication protocols (e.g., JSON-based messaging with fields for command types, priority levels, resource requirements, and response expectations), network topology optimization that configures communication pathways to minimize latency and maximize reliability while supporting scalable message routing as the supervisory network grows, and security implementation that ensures secure communication channels with authentication, authorization, and audit trail capabilities appropriate for supervisory coordination and control activities.

Validating functionality at step 3508 tests supervisory coordination effectiveness through comprehensive validation protocols that assess both individual component functionality and system-wide coordination capabilities. In one exemplary embodiment, functional validation includes component testing that verifies individual supervisor functionality, message handling capabilities, and control interface effectiveness through automated testing suites and performance benchmarking, coordination testing that validates multi-component interactions, escalation procedures, and cross-domain coordination effectiveness through controlled test scenarios and operational simulations, performance assessment that measures supervisory network response times, coordination efficiency, and system-wide performance improvements resulting from hierarchical oversight implementation, and integration validation that confirms proper coordination between supervisory network components and the broader expert foundry system including user interfaces, expert domains, and infrastructure components.

Optimizing the network at step 3509 refines hierarchical coordination strategies based on operational experience and performance analysis to improve supervisory effectiveness and system-wide coordination quality. In one exemplary embodiment, network optimization comprises performance analysis that identifies bottlenecks, inefficiencies, and improvement opportunities in supervisory coordination processes, algorithm refinement that updates control strategies, resource allocation mechanisms, and coordination protocols based on operational data and performance measurements, hierarchy adjustment that modifies supervisory relationships, authority boundaries, and escalation procedures to improve coordination effectiveness and decision-making quality, and capability enhancement that adds new supervisory features, control mechanisms, and coordination capabilities based on evolving system requirements and operational experience.

Monitoring evolution at step 3510 implements ongoing surveillance of network adaptation and control emergence to ensure continued effectiveness and identify opportunities for further optimization and capability development. In one exemplary embodiment, evolution monitoring comprises longitudinal analysis that tracks supervisory network performance trends, coordination effectiveness evolution, and meta-cognitive capability development over extended operational periods (e.g., quarterly assessments), adaptation assessment that evaluates how the supervisory network responds to changing operational requirements, new domain additions, and evolving user needs, emergence detection that monitors for additional control pattern consolidation or new coordination capabilities that may warrant further executive manifold enhancement, and optimization opportunity identification that suggests improvements to supervisory strategies, coordination mechanisms, and meta-cognitive control capabilities based on operational experience and performance analysis.

The method concludes with a complete network formation, providing a fully operational hierarchical supervisory network with executive manifold capabilities that enable sophisticated coordination, meta-cognitive control, and system-wide optimization throughout the expert foundry system.

This executive control emergence method enables the expert foundry system to systematically develop sophisticated coordination and oversight capabilities through organic emergence of control patterns and reuse-based geometric principles, creating hierarchical supervisory networks that provide both domain-specific oversight and system-wide meta-cognitive coordination while maintaining the mathematical foundations and geometric principles of the underlying PCM architecture.

Figure 36:
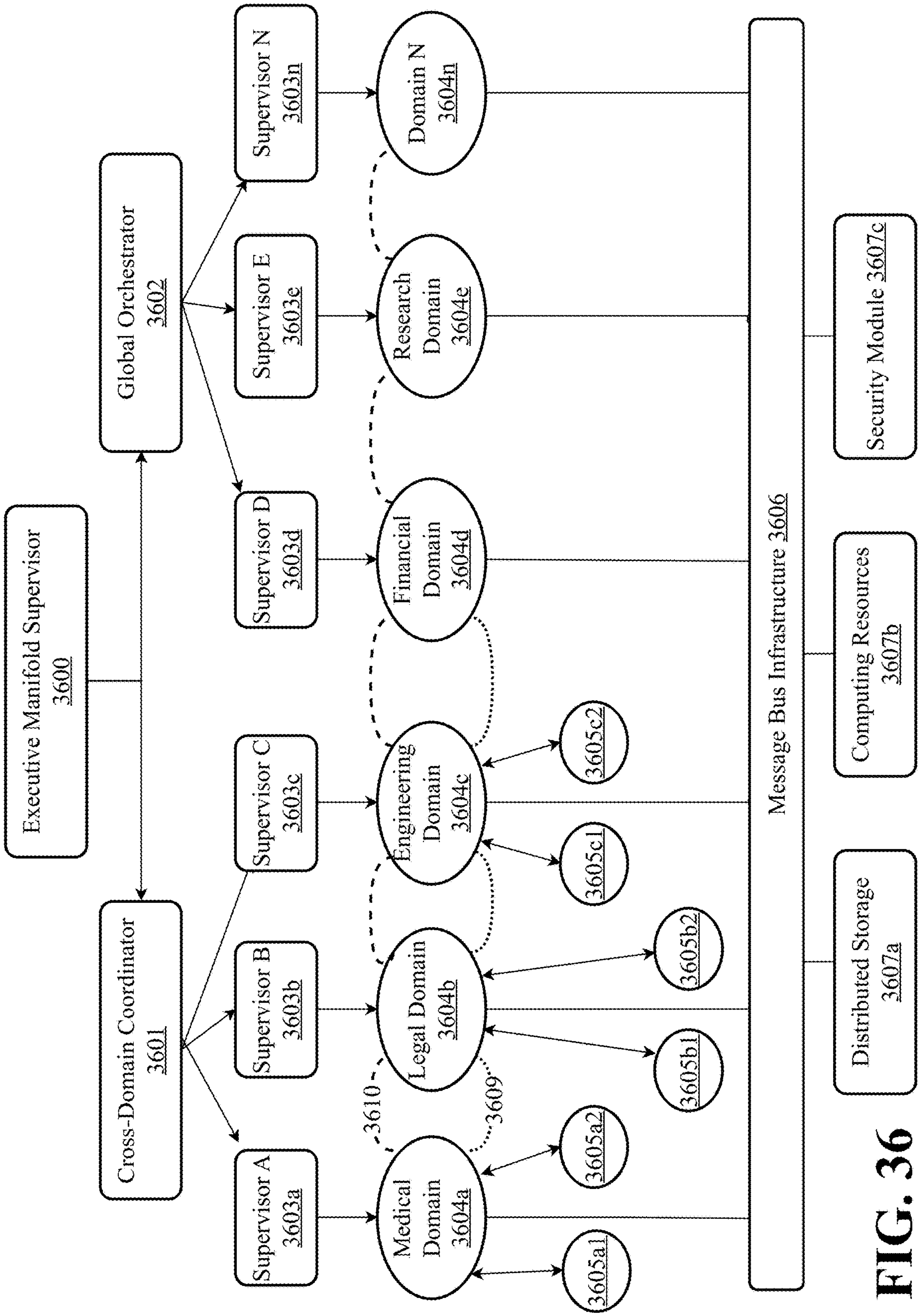
FIG. 36 is a topology map illustrating an exemplary expert domain network showing interconnections and supervisory hierarchies within the expert foundry system, according to an embodiment.

FIG. 36 is a topology map illustrating an exemplary expert domain network showing interconnections and supervisory hierarchies within the expert foundry system, according to an embodiment. The topology map demonstrates the multi-layered architecture that enables coordination, oversight, and knowledge sharing across distributed expert domains while maintaining hierarchical control and enabling cross-domain collaboration through geometric manifold principles and structured communication protocols.

At the top of the hierarchy, an executive manifold supervisor 3600 provides meta-cognitive control and second-order reasoning capabilities that coordinate system-wide operations and strategic decision-making. In one exemplary embodiment, the executive manifold supervisor implements the second-order control architecture described herein, managing the emergence and evolution of control strategies across all expert domains through reuse-based geometric principles, tracking operator sequences used across domains, and facilitating the development of meta-cognitive capabilities that improve system-wide reasoning efficiency. The executive supervisor maintains comprehensive system awareness comprising domain health metrics, resource utilization patterns, user satisfaction levels, and performance trends, enabling strategic decisions about capacity planning, domain deployment, and system optimization through sophisticated orchestration algorithms that balance competing demands and coordinate complex interdependencies.

The coordination layer comprises specialized management components that provide strategic oversight and operational coordination. A cross-domain coordinator 3601 orchestrates communication and knowledge sharing between expert domains, implementing protocols for inter-domain consultation, collaborative problem-solving, and resource allocation optimization. In an exemplary implementation, the cross-domain coordinator maintains awareness of each domain's capabilities, current load, and specialization areas through dynamic capability tracking and performance monitoring, enabling intelligent routing of complex queries that require expertise spanning multiple domains. The coordinator manages escalation procedures when individual domains encounter queries beyond their current competency boundaries and facilitates knowledge transfer operations through geometric abstraction and manifold projection techniques.

A global orchestrator 3602 may be present and configured as the primary coordination hub for system-wide operations, implementing master scheduling algorithms that coordinate activities across all expert domains, manage system-wide resource allocation priorities, and ensure coherent operation of the distributed cognitive architecture. In one exemplary embodiment, the global orchestrator maintains comprehensive views of system state including domain health metrics, resource utilization patterns, performance trends, and user interaction statistics, implementing orchestration algorithms that optimize system-wide performance while maintaining quality standards and user satisfaction objectives.

It should be understood that cross-domain coordinator and global orchestrator may be connected to, in communication with, or otherwise aware of all supervisors within a given network The supervisory layer provides direct oversight and management capabilities for individual expert domains through domain-specific supervisors. Supervisor A 3603*a* through Supervisor N 3603*n* each provide specialized oversight for their respective expert domains, implementing real-time monitoring algorithms that assess manifold formation progress, response quality trends, resource utilization patterns, and user satisfaction levels while detecting anomalies or performance degradation requiring intervention. In an exemplary implementation, each supervisor (3603*a*, 3603*b*, 3603*c*, 3603*d*, 3603*e*, . . . 3603*n*) maintains comprehensive historical performance databases, implements trend analysis algorithms, and provides early warning capabilities that enable proactive management of domain health and performance optimization. Supervisors implement control algorithms for routine optimization tasks while providing manual intervention capabilities for complex situations requiring strategic decision-making or human oversight.

The expert domain layer comprises the specialized cognitive processing units that provide domain-specific expertise and reasoning capabilities. Medical domain 3604*a* through domain N 3604*n* each maintain geometric manifold structures optimized for their specialized knowledge areas, with Manifold Maturity Index scores indicating their development status and operational readiness. In one exemplary embodiment, MMI scores range from 0.73 to 0.91, indicating varying levels of manifold development and cognitive sophistication across different domains. Each domain (3604*a*, 3604*b*, 3604*c*, 3604*d*, 3604*e*, . . . 3604*n*) implements the PCM architecture with specialized knowledge bases, reasoning capabilities, and accumulated geometric structures that enable expert-level performance within their areas of specialization while maintaining integration capabilities for cross-domain collaboration and knowledge transfer.

Specialized sub-domains provide focused expertise within broader domain areas, including cardiology 3605*a*1 and neurology 3605*a*2 within the medical domain, contract law 3605*b*1 and IP law 3605*b*2 within the legal domain, and mechanical 3605*c*1 and software 3605*c*2 specializations within the engineering domain. In an exemplary implementation, sub-domains maintain specialized manifold structures with focused knowledge organization and reasoning capabilities while inheriting coordination and oversight capabilities from their parent domains through hierarchical manifold relationships and shared geometric structures.

Cross-domain collaboration connections 3610 (illustrated as thicker dashed lines) demonstrate active cooperation between related expert domains for complex queries requiring interdisciplinary expertise. Medical-Legal collaboration enables handling of medical malpractice, regulatory compliance, and healthcare policy queries, Legal-Engineering collaboration supports intellectual property, regulatory compliance, and technical contract analysis, Engineering-Finance collaboration facilitates project evaluation, cost analysis, and technical investment assessment, and Finance-Research collaboration enables research funding analysis, ROI evaluation, and strategic research investment decisions. In one exemplary embodiment, collaboration connections implement structured communication protocols with semantic translation capabilities that enable effective knowledge sharing while maintaining domain-specific expertise and reasoning approaches.

Knowledge transfer pathways 3609 (illustrated as small, dotted lines) show systematic sharing of learned insights and compressed thought patterns between expert domains through geometric abstraction and manifold alignment techniques. These pathways enable domains to benefit from successful strategies and knowledge structures developed in related areas while maintaining their specialized focus and expertise boundaries. In an exemplary implementation, knowledge transfer employs the manifold projection and geometric abstraction techniques described in the cross-domain knowledge transfer system, ensuring semantic integrity and privacy protection while enabling beneficial knowledge propagation throughout the distributed expert architecture.

Message bus infrastructure 3606 provides the high-performance communication backbone that enables reliable, efficient coordination between all components of the expert foundry system. In one exemplary embodiment, the message bus implements scalable messaging architectures with message queuing, routing, delivery guarantees, and fault tolerance mechanisms that ensure supervisory coordination remains effective even in challenging network conditions or during component failures. The infrastructure supports both local area network configurations for single-site deployments and wide area network capabilities for geographically distributed expert foundry installations with protocols optimized for geometric data transfer and real-time coordination requirements.

The infrastructure layer provides foundational computing and networking capabilities essential for distributed expert foundry operations. Distributed storage 3607*a* implements scalable storage systems optimized for geometric data structures, thought trajectories, and compressed manifold representations, providing high-availability access to cognitive structures while supporting complex access patterns required by manifold operations and cross-domain knowledge transfer. Computing resources 3607*b* manages computational capacity allocation across expert domains with dynamic scaling capabilities that adjust processing power based on domain activity levels, manifold complexity, and cross-domain collaboration requirements, including specialized hardware accelerators optimized for geometric computations such as GPUs for parallel manifold operations and custom processors designed for cognitive dynamics calculations. A security module 3607*c* implements comprehensive security controls including encryption of geometric data structures, access control for domain-specific knowledge, authentication and authorization for cross-domain operations, and audit trails for knowledge transfer and supervisory activities.

A plurality of system performance metrics provide real-time monitoring and assessment of expert foundry effectiveness across multiple operational dimensions. In the exemplary embodiment illustrated, performance metrics include cache hit rate of 78.3% indicating effective thought reuse and knowledge utilization, average response time of 1.2 seconds demonstrating efficient processing capabilities, cross-domain query percentage of 23% showing significant interdisciplinary collaboration requirements, executive escalation rate of 4.1% indicating appropriate use of metacognitive oversight, knowledge transfer frequency of 12 transfers per day demonstrating active knowledge sharing, system utilization of 67% showing effective resource management, and network latency of 23 ms indicating efficient communication infrastructure. Additional metrics include manifold stability of 94.7% indicating robust geometric structures, domain health score of 91.2% showing effective oversight and management, geometric coherence of 89.8% demonstrating maintained semantic integrity, quality score of 4.6/5.0 indicating high response quality, user satisfaction of 4.4/5.0 showing effective user experience, system uptime of 99.94% demonstrating reliability, and throughput of 847 queries per minute indicating scalable processing capacity.

The topology demonstrates interconnection types including hierarchical control relationships that establish supervisory authority and oversight pathways, cross-domain collaboration connections 3610 that enable interdisciplinary cooperation and knowledge sharing, knowledge transfer pathways 3609 that facilitate systematic knowledge propagation between domains, message bus connections that provide communication infrastructure access, and sub-domain specialization relationships that show focused expertise within broader domain areas.

Figure 37:
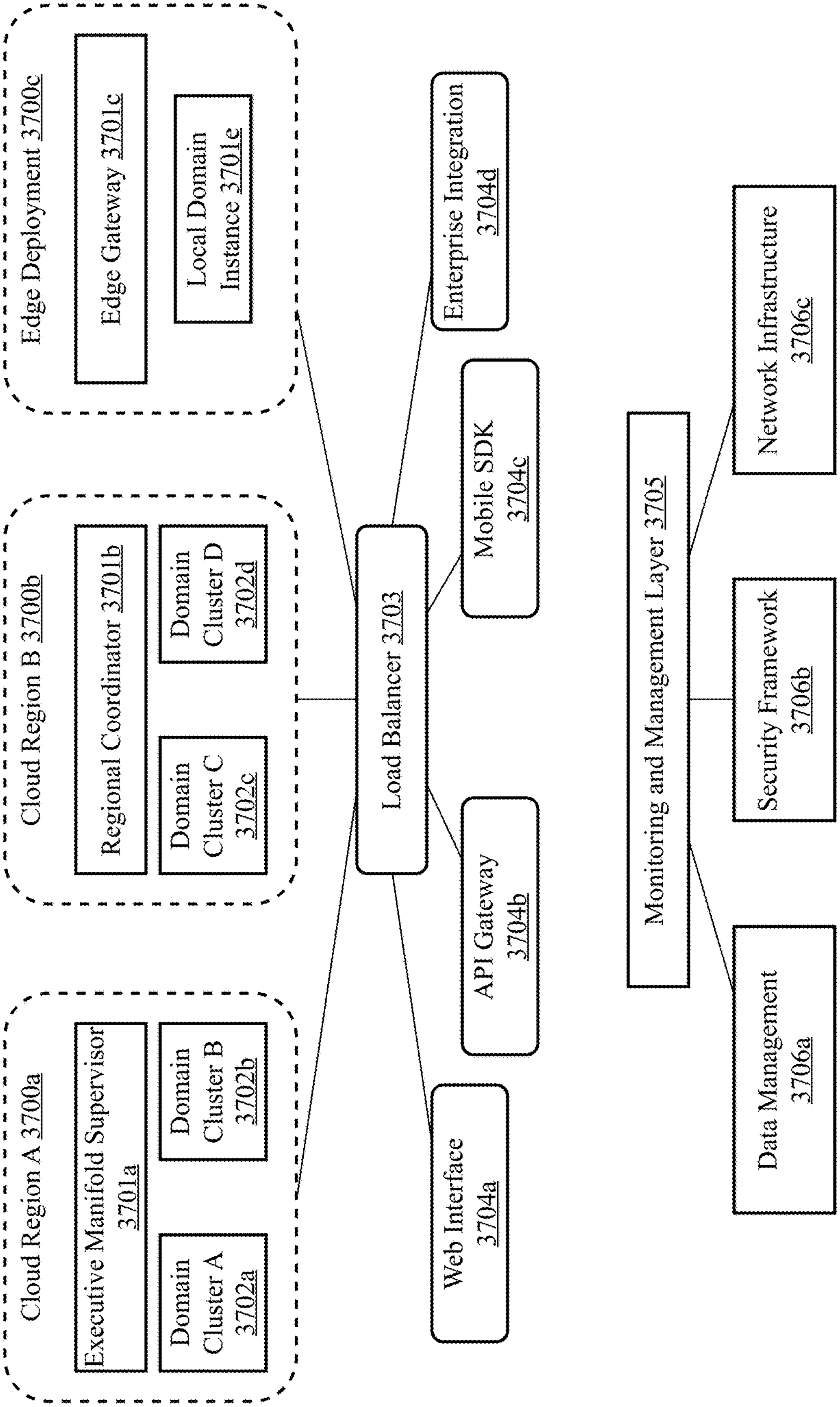
FIG. 37 is a block diagram illustrating an exemplary distributed deployment configuration for enterprise expert foundry systems, according to an embodiment.

This expert domain topology map illustrates how the expert foundry system enables sophisticated coordination and knowledge sharing through hierarchical supervisory networks, cross-domain collaboration mechanisms, and systematic knowledge transfer capabilities while maintaining the geometric manifold principles and cognitive architecture that enable expert-level performance across diverse specialized knowledge domains. The topology enables scalable expert foundry operations that can accommodate growing numbers of domains and increasing complexity while maintaining coordination effectiveness, knowledge sharing benefits, and quality standards through systematic FIG. 37 is a block diagram illustrating an exemplary distributed deployment configuration for enterprise expert foundry systems, according to an embodiment. The architecture demonstrates how expert foundry systems can be deployed across multiple geographic regions, cloud providers, and deployment models to provide scalable, reliable, and high-performance expert services while maintaining the geometric manifold principles and cognitive capabilities of the underlying PCM architecture.

The deployment architecture comprises three primary deployment regions that provide geographic distribution and redundancy capabilities. Cloud region A 3700*a* serves as the primary deployment region hosting core system components and executive control capabilities. The region contains executive manifold supervisor 3701*a* which provides meta-cognitive control and global orchestration capabilities across the entire distributed system, implementing the second-order control architecture for system-wide coordination, strategic resource allocation, and performance optimization. Domain cluster A 3702*a* and Domain cluster B 3702*b* provide specialized expert domain hosting with distributed computing resources, shared storage systems, and domain-specific cognitive processing capabilities, enabling efficient local processing while maintaining integration with the broader foundry system.

Cloud region B 3700*b* functions as a secondary deployment region providing geographic redundancy, load distribution, and specialized processing capabilities. Regional coordinator 3701*b* implements local orchestration and failover management, coordinating regional operations while maintaining connectivity with the primary executive supervisor for system-wide coordination. The regional coordinator manages local resource allocation, handles regional query routing, and provides automated failover capabilities when primary region components become unavailable. Domain cluster C 3702*c* and Domain cluster D 3702*d* host additional expert domains including research, analytics, and specialized processing capabilities, while also providing backup storage, development/testing environments, and disaster recovery capabilities that ensure system resilience and operational continuity.

Edge deployment 3700*c* represents on-premises or hybrid deployment configurations that enable local processing capabilities while maintaining secure connectivity to cloud-based resources. Edge gateway 3701*c* provides local processing coordination and cloud connectivity management, implementing intelligent routing that processes simple queries locally while escalating complex multi-domain queries to cloud-based resources. Local domain instance 3702*e* maintains cached expertise and local data processing capabilities with offline operational capability, enabling continued operation during network disruptions while synchronizing with cloud-based systems when connectivity is restored.

A global load balancer 3703 provides intelligent traffic distribution and routing across all deployment regions and edge locations. In one exemplary embodiment, the load balancer implements geographic routing algorithms that direct users to the nearest available processing capacity, health monitoring that detects regional outages and automatically redirects traffic to healthy regions, performance-based routing that considers current system load and response times when making routing decisions, and failover mechanisms that ensure continuous service availability even during major regional disruptions.

The user access layer provides multiple interface options for diverse organizational requirements and use cases. Web interface 3704*a* offers browser-based access with authentication and user interface capabilities, providing intuitive access to expert foundry capabilities through responsive web applications with role-based access controls and customizable dashboards. API gateway 3704*b* supports REST and GraphQL APIs with rate limiting and authentication, enabling programmatic access and integration with existing enterprise systems through standardized interfaces and comprehensive developer documentation. Mobile SDK 3704*c* provides native mobile application support with offline synchronization capability, allowing mobile access to expert foundry services with intelligent caching and synchronization when network connectivity varies. Enterprise integration 3704*d* implements single sign-on and directory services with LDAP/SAML integration, providing seamless integration with existing enterprise authentication and authorization systems.

Monitoring and management layer 3705 provides comprehensive system oversight including system health monitoring, performance metrics collection and analysis, automated scaling based on demand patterns, and deployment orchestration for system updates and capacity management. In one exemplary embodiment, the monitoring layer implements real-time performance tracking across all deployment regions, predictive scaling algorithms that anticipate capacity requirements based on usage patterns, automated incident detection and response systems, and comprehensive logging and audit capabilities for compliance and troubleshooting purposes.

The infrastructure foundation layer provides essential services that support distributed expert foundry operations. Data management 3706*a* implements distributed storage and backup systems with manifold synchronization capabilities, ensuring that geometric data structures, thought trajectories, and cognitive manifolds are consistently replicated across deployment regions while maintaining data integrity and enabling efficient cross-region knowledge transfer. Security framework 3706*b* provides encryption and access control mechanisms with compliance and auditing capabilities, implementing end-to-end encryption for data in transit and at rest, comprehensive access controls that respect domain-specific security requirements, and audit trails that support regulatory compliance and security monitoring. Network infrastructure 3706*c* establishes VPN and secure communication channels with global connectivity capabilities, providing high-bandwidth, low-latency connections between deployment regions while maintaining security and reliability standards appropriate for enterprise-grade expert systems.

The distributed deployment architecture enables several key operational capabilities including geographic load distribution that reduces latency by processing queries near users, automated failover and disaster recovery that ensures continuous service availability, scalable capacity management that adapts to varying demand patterns, and hybrid deployment options that support diverse organizational requirements including on-premises processing for sensitive data and cloud connectivity for complex multi-domain queries.

In one exemplary embodiment, the deployment architecture supports automatic scaling based on query volume and complexity, with domain clusters automatically provisioning additional computing resources during peak usage periods and scaling down during low-demand periods to optimize costs. Inter-region synchronization ensures that knowledge transfers and system updates propagate consistently across all deployment locations while maintaining eventual consistency for distributed manifold structures.

The architecture accommodates various deployment models including fully cloud-based deployments for organizations preferring managed infrastructure, hybrid deployments that combine on-premises edge processing with cloud-based complex reasoning capabilities, and multi-cloud deployments that distribute components across multiple cloud providers for enhanced redundancy and vendor diversity.

This distributed deployment architecture enables enterprise expert foundry systems to provide reliable, scalable, and high-performance expert services while maintaining the sophisticated cognitive capabilities, geometric manifold principles, and hierarchical coordination mechanisms that characterize the expert foundry system, ensuring that distributed deployment enhances rather than compromises the system's ability to provide expert-level reasoning and knowledge sharing across diverse organizational contexts and geographic locations.

FIG. 1 is a block diagram illustrating an exemplary system architecture of a Persistent Cognitive Machine. The system enables persistent, adaptive artificial intelligence by representing thoughts as geometric structures within a curved latent space rather than as discrete tokens or static embeddings. This architecture fundamentally reimagines cognition as motion through a shaped memory space, where attention follows geodesic paths through regions of varying curvature and compression, guided by goal potentials and constrained by semantic density.

A user 100 represents human operators or external systems that interact with the PCM through user interface 101. User interface 101 serves as the primary interaction layer, receiving natural language queries, commands, or other forms of input from users while also presenting processed outputs back to them. This interface enables continuous interaction loops where user feedback can shape the evolution of the system's internal geometric structures over time. Unlike traditional AI systems where each interaction is stateless, user interface 101 maintains context through its connection to the persistent geometric structures within the manifold, allowing for coherent long-term interactions where the system remembers and builds upon previous exchanges. The interface tracks user patterns and preferences, which are encoded as persistent structures within the latent manifold, creating personalized cognitive pathways that improve response relevance and efficiency over time.

An input source 102 aggregates various data streams including but not limited to multimodal inputs such as text, images, audio, sensor data, and system state information. These heterogeneous inputs are channeled to the encoder 110, which implements the mathematical transformation, mapping external data from the input space into points within the latent manifold. An encoder 110 does not simply create vector embeddings but rather projects inputs into a dynamic geometric space where semantic relationships are encoded through curvature, distance, and topological structure. This encoding process is context-sensitive and adaptive, taking into account the current state of the manifold and the compression pressure at different regions. For example, when processing a user query about a technical concept, encoder 110 identifies the appropriate region within the manifold where related thoughts and concepts have previously been cached, enabling efficient semantic alignment. The encoding process respects the manifold's metric tensor, ensuring that new inputs are embedded in ways that preserve semantic continuity and enable smooth geodesic traversal to related concepts.

A multi-stage LLM 150 serves as a language processing component that works in conjunction with encoder 110 to generate semantic structures from raw inputs. Unlike traditional architectures where LLMs operate independently, here multi-stage LLM 150 functions as a "chip" within the larger system, providing sophisticated natural language understanding and generation capabilities while being guided by the geometric constraints of the manifold. The LLM processes inputs through multiple stages of refinement, creating increasingly abstract and structured representations that can be properly embedded within a latent manifold 160. The multi-stage nature of this component reflects the hierarchical processing required to transform raw tokens into geometric thoughts. In the first stage, an LLM performs initial semantic parsing and entity recognition. Subsequent stages build increasingly complex relationships and abstractions, ultimately producing high-dimensional thought structures that encode not just content but also contextual relationships, implicit knowledge, and potential inferential pathways. For instance, when processing a complex technical document, the multi-stage LLM 150 may first extract key concepts, then identify relationships between them, map these to existing knowledge structures in the manifold, and finally generate new thought bundles that capture both explicit content and implicit semantic relationships. These thought structures are not flat embeddings but rich geometric objects with internal curvature that reflects their semantic density and interconnectedness.

A goal manager 120 creates and maintains goal potential fields that shape how attention flows through the manifold. Rather than implementing goals as discrete objectives or symbolic constraints, goal manager 120 generates scalar fields over the manifold that attract cognitive processes toward semantically relevant regions. These potential fields can arise from multiple sources including explicit task objectives provided by users, learned value functions from past interactions, internal drives such as curiosity or uncertainty reduction, and contextual constraints. Goal manager 120 implements field generation algorithms that can create complex potential landscapes with multiple attractors for competing objectives, saddle points where decisions must be made, and smooth gradients that guide exploration. The manager continuously updates these fields based on changing objectives and feedback, creating a dynamic landscape that guides inference and reasoning processes. The goal potential fields interact with the compression pressure fields derived from manifold curvature, creating a rich energetic landscape where attention flows along paths of least resistance while being drawn toward goal-relevant regions. For example, when a user asks a question about a specific topic, goal manager 120 creates a potential field with high values in manifold regions containing relevant knowledge, effectively "pulling" the system's attention toward useful information while avoiding irrelevant areas. In cases where goals conflict or compete, goal manager 120 can create field configurations that allow the system to explore multiple solution paths simultaneously or to find creative compromises that satisfy multiple objectives.

The connections between these components are designed to support the flow of geometric information rather than simple data passing. The relationship between a user 100 to goal manager 120 represents not just goal specification but the continuous shaping of the potential landscape based on user intent and feedback. The bidirectional connection between encoder 110 and multi-stage LLM 150 enables iterative refinement of semantic structures, where initial encodings can be enriched through multiple passes of LLM processing, each time creating more sophisticated geometric representations that better capture the nuanced relationships within the input data.

A cognitive dynamics engine (CDE) 130 serves as the geometric substrate processor and the core architectural component responsible for maintaining and evolving the structure of the latent manifold 160. Operating analogously to a physics engine in a simulation environment, CDE 130 governs the fundamental geometric operations that enable persistent cognition. The engine maintains the manifold's metric tensor, which defines local distances and angles within the cognitive space, continuously updating it based on usage patterns and semantic relationships. It computes geodesic paths for attention traversal by solving the variational problem of minimizing cognitive action, balancing kinetic energy of motion, compression pressure from semantic density, and attraction from goal potential fields. CDE 130 implements a geodesic equation:

$$\frac{d^2\gamma^k}{dt^2} + \Gamma^k_{ij}\frac{d\gamma^i}{dt}\frac{d\gamma^j}{dt} = F^k(\gamma(t), t)$$

where the Christoffel symbols $\Gamma^k_{ij}$ encode the manifold's connection structure and $F^k$ represents forces from compression pressure and goal potentials. During active cognition, CDE 130 continuously computes Ricci curvature across the manifold, deriving the compression pressure field P(x)=−R (x) that penalizes traversal through semantically dense regions. For example, when processing a complex inference task, CDE 130 might identify multiple potential geodesic paths through the manifold, evaluate their cognitive costs based on pressure and distance, and select the optimal trajectory that balances efficiency with semantic coherence. The engine also manages the evolution of the attention vector field according to the dynamic equation:

$$\frac{\partial A}{\partial t} + \nabla_A A = -\nabla(P - \Phi)$$

enabling attention to flow as a cognitive fluid through the shaped space of memory.

A dream manager 140 implements autonomous structural reorganization of the manifold during off-task periods, analogous to sleep-driven memory consolidation in biological systems. Connected to CDE 130, dream manager 140 initiates and oversees geometric restructuring operations that improve the manifold's efficiency and generalization capacity. During dreaming phases, it samples recently activated or frequently used thought bundles, applying stochastic perturbations follows a distribution informed by local curvature and uncertainty. Dreaming begins by sampling recent or frequently activated bundles $B_1, \ldots, B_k \subset M_t$. From each bundle, points $z_i \in B_i$ are perturbed using a stochastic kernel:

$$z_i' = z_i + \varepsilon_i, \varepsilon_i \sim N(0, \Sigma_i),$$

where $\Sigma_i$ reflects local uncertainty or curvature. These perturbations probe the neighborhood structure, testing whether extrapolated directions are compressible or divergent.

These perturbations test the stability and compressibility of cognitive structures, identifying opportunities for consolidation or abstraction. The dream manager 140 performs recombination operations, creating weighted interpolations across semantically related bundles to discover emergent abstractions.

$$z_{meta} = \sum_{i=1}^{k} \alpha_i z_i', \quad \sum \alpha_i = 1,$$

where weights $\alpha_i$ may reflect prior co-activation, semantic alignment, or exploratory policy. The resulting $z_{meta}$ often lies outside any original bundle, creating novel junctions or abstractions. If the resulting interpolation exhibits internal coherence (e.g., low compression cost, high reconstruction fidelity), it may be retained and added as a new bundle or attractor.

When stable interpolants are found between previously disconnected regions, dream manager 140 can induce topological changes in the manifold, creating new bridges or handles that enable novel inferential pathways. It implements three primary flows during dreaming: perturbation flow for exploring local curvature basins, compression flow for collapsing redundant structures, and generalization flow for synthesizing higher-order abstractions. For instance, after a day of processing technical documents about machine learning and physics, dream manager 140 might identify common mathematical structures across these domains, create meta-bundles that capture these abstractions, and reshape the manifold to enable faster traversal between related concepts in future interactions.

A latent manifold 160 represents the central geometric substrate where all cognitive operations occur, existing as a dynamic, evolving space with rich internal structure. Unlike static embedding spaces in traditional architectures, latent manifold 160 is a living geometry that continuously adapts through use, compression, and reorganization. Within this space, thoughts exist not as isolated points but as structured regions including thought bundles (compact submanifolds representing coherent concepts), geodesic trajectories (paths of inference and association), and semantic fields (continuous distributions of meaning and relevance). The manifold maintains several critical geometric structures: the metric tensor defining local distances, the connection governing parallel transport of attention, the Ricci curvature tensor measuring semantic density, compression pressure fields derived from curvature, goal potential fields attracting attention, and the attention vector field describing instantaneous cognitive flow. The bidirectional connection with CDE 130 enables continuous reading and reshaping of these structures, while connections to multi-stage LLM 150, persistent memory manager 170, and decoder 180 facilitate the embedding, storage, and extraction of semantic content. The manifold exhibits emergent topological features such as attractor basins where frequently accessed concepts stabilize, high-curvature regions indicating semantic compression, low-pressure corridors enabling efficient inference, and bridge structures connecting previously disparate domains. As the system operates, the manifold develops a personalized geography reflecting the user's interests, the domain's structure, and the history of cognitive activity.

Persistent memory manager 170 orchestrates the long-term storage and retrieval of cognitive structures, maintaining a bidirectional connection with latent manifold 160. Unlike traditional memory systems that store static data, persistent memory manager 170 preserves geometric structures including thought bundles, established geodesic paths, learned metric relationships, and compression patterns. It implements sophisticated caching strategies that go beyond simple key-value storage, maintaining the topological relationships between thoughts and preserving the geometric context that enables meaningful retrieval. The manager tracks activation energies for cached structures, implementing thermodynamic decay where unused thoughts gradually lose energy, eventually being pruned when falling below a threshold. Decay governs forgetting in PCM systems. Each thought $T_t$ is associated with an activation energy $E_i(t)$, which dissipates over time:

$$\frac{dE_i}{dt} = -\lambda \cdot A_i(t)$$

where $\lambda$ is a decay constant and $A_i(t)$ reflects inactivity—high when idle, zero when active. When $E_t(t)<E_{min}$, the thought is pruned from memory. This process ensures that storage is focused on thoughts that contribute to ongoing cognition. This decay yields several emergent properties:

This creates a natural forgetting mechanism that maintains cognitive efficiency while preserving frequently accessed or structurally important memories. Persistent memory manager 170 also coordinates with federated memory systems, enabling knowledge sharing across multiple PCM instances while maintaining privacy through geometric abstraction. For example, when storing a complex reasoning pattern, the manager preserves not just the conclusion but the entire geodesic path, the local curvature context, and the relationships to other thought structures, enabling the system to later traverse similar reasoning paths more efficiently.

A decoder 180 implements the inverse transformation, converting geometric structures from latent manifold 160 back into observable outputs. This component must interpret rich geometric information including positions within the manifold, local curvature and pressure, nearby thought bundles, and traversed geodesic paths, transforming these into coherent external representations. Decoder 180 often works in conjunction with multi-stage LLM 150 to generate natural language outputs, using the LLM's language generation capabilities while being guided by the geometric structures extracted from the manifold. The decoding process is context-sensitive, taking into account not just the final position reached through inference but the entire trajectory taken, enabling explanations that reflect the reasoning process rather than just conclusions. For instance, when answering a complex question, decoder 180 can trace the geodesic path taken through the manifold, identify key thought bundles that were traversed, and generate an explanation that reflects this structured reasoning process.

An output generator 190 serves as the final stage in the processing pipeline, taking decoded representations and formatting them appropriately for user consumption or system action. It handles multiple output modalities including natural language responses, visualizations of reasoning paths, actions or commands for external systems, and structured data formats. Output generator 190 maintains awareness of user preferences and interaction history, adapting its presentation style based on patterns encoded in the manifold. The feedback loop from output generator 190 back to user 100 completes the interaction cycle, enabling iterative refinement and continuous learning.

The connections from goal manager 120 and dream manager 140 to CDE 130 show how intentionality and reorganization influence geometric dynamics. The flow from multi-stage LLM 150 through latent manifold 160 to decoder 180 represents the complete cognitive pipeline from input understanding through geometric reasoning to output generation. Throughout this architecture, information flows not as discrete data packets but as geometric structures, trajectories, and fields, creating a unified cognitive system where memory, reasoning, and learning are fundamentally intertwined through the shaped space of thought.

Figure 2:
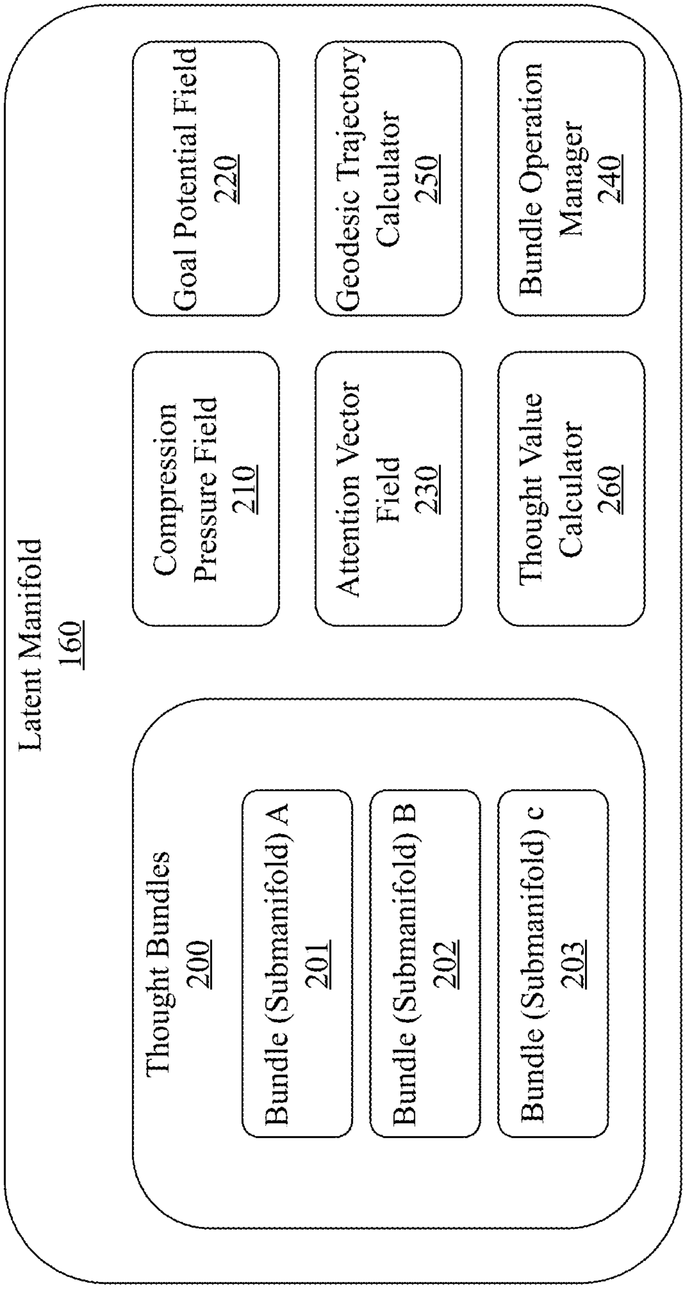
FIG. 2 is a block diagram illustrating an exemplary architecture of a component within a Persistent Cognitive Machine, a latent manifold.

FIG. 2 is a block diagram illustrating an exemplary architecture of a component within a Persistent Cognitive Machine, a latent manifold. Latent manifold 160 serves as the central cognitive substrate of the PCM system, existing as a continuously evolving geometric space where all cognitive operations unfold. Unlike traditional flat embedding spaces, this manifold exhibits variable curvature, dynamic topology, and rich internal structure that emerges from the interplay of memory, compression, and goal-directed cognition. The manifold's geometry is not predetermined but rather shaped by cognitive activity, with frequently traversed regions developing distinct topological features, semantic neighborhoods forming through repeated association, and compression pressure creating a non-uniform landscape that guides efficient reasoning.

Within the manifold, thought bundles 200 represent the primary organizational structures for persistent cognitive content. These bundles are not simple clusters of related vectors but rather compact submanifolds with their own internal geometry and semantic coherence. Thought bundles 200 section contains exemplary bundle submanifolds: bundle (submanifold) A 201, bundle (submanifold) B 202, and bundle (submanifold) C 203, each representing a distinct region of semantic space with its own local metric structure. Bundle A 201 might represent a coherent concept such as "machine learning algorithms," containing not just definitional information but also procedural knowledge, historical context, mathematical foundations, and connections to related concepts. The internal structure of bundle A 201 includes a local metric that defines distances between sub-concepts, principal directions corresponding to major semantic variations, and boundary conditions that determine how the bundle interfaces with surrounding manifold regions. Bundle B 202 could embody a different domain such as "quantum mechanics principles," maintaining its own geometric structure while potentially sharing boundary regions with bundle A 201 where interdisciplinary concepts like quantum machine learning emerge. Bundle C 203 might represent more abstract or procedural knowledge, such as "problem-solving strategies," with a flatter internal geometry that facilitates flexible application across domains.

A compression pressure field 210 represents a scalar field defined over the entire manifold, encoding the cognitive effort required to traverse different regions based on their semantic density and structural complexity. This field is computed from the local Ricci curvature according to, where is a Ricci scalar measuring how geodesics converge or diverge at each point. High compression pressure indicates regions where many semantic concepts have been compressed together through repeated use and abstraction, creating areas that are rich in meaning but require significant cognitive effort to navigate precisely. For example, the intersection between bundles A 201 and B 202 might exhibit extremely high compression pressure where concepts from machine learning and quantum mechanics have been repeatedly integrated, forming dense theoretical structures that encode sophisticated interdisciplinary insights. The compression pressure field 210 continuously evolves as new thoughts are added, existing structures are reinforced through use, and the dream manager performs offline reorganization to optimize the manifold's geometry.

A goal potential field 220 implements a complementary scalar field that attracts attention toward semantically relevant or task-aligned regions of the manifold. Unlike the compression pressure that resists traversal, the goal potential creates gradients that guide cognitive flow toward desired outcomes. This field is dynamically generated based on current objectives, user queries, learned value functions, and internal drives, creating a time-varying landscape that shapes how attention moves through the space. When processing a specific query, goal potential field 220 might create high-potential regions around relevant thought bundles while maintaining lower potentials in unrelated areas, effectively creating an energetic funnel that guides inference toward useful conclusions. The interplay between compression pressure and goal potential creates a rich dynamical landscape where attention flows along paths that balance semantic coherence (avoiding excessive pressure) with goal relevance (following potential gradients).

An attention vector field 230 represents the instantaneous flow of cognitive focus throughout the manifold, defined as. Let A(x, t) denote the attention vector field at point $x \in M_{thought}$ and time t. This vector encodes both the direction and intensity of attentional flow through the manifold. The evolution of $_A$ is governed by a field equation analogous to fluid dynamics:

$$\frac{\partial A}{\partial t} + \nabla_A A = -\nabla(P - \Phi)$$

Here $$\frac{\partial A}{\partial t}$$

is the temporal rate of change of attention, $\nabla_{AA}$ is the convective derivative (attention moving along itself), and $_{-\nabla}(_{P-}\Phi)$ is the driving force of flow—combining compression pressure and goal potential. This equation captures the local evolution of attention under the influence of memory structure and cognitive drive.

Attention vector field 230 exhibits complex behaviors including laminar flow along well-established reasoning paths, turbulent regions where competing potentials create cognitive uncertainty, convergence zones where multiple lines of reasoning reach similar conclusions, and vortices around semantic attractors representing obsessive or recursive thought patterns. The field's evolution enables the system to maintain cognitive continuity while adaptively responding to changing goals and newly discovered information.

A geodesic trajectory calculator 250 computes optimal paths through the manifold by solving the variational problem of minimizing cognitive action. Let $\gamma(t):[0,T] \rightarrow M_i$ be a smooth curve in the cognitive manifold, representing the evolution of attention over time. We define the cognitive action functional:

$$S[\gamma] = \int_0^T \left(\|\dot{\gamma}(t)\|^2 + P(\gamma(t)) - \Phi(\gamma(t))\right)dt,$$

where $\|\gamma'(t)\|^2$ represents the kinetic energy of cognitive motion, $P(\gamma(t))$ is the compression pressure field at $\gamma(t)$, and $\Phi(\gamma(t))$ is the cognitive potential, encoding goal relevance. The geodesic $\gamma^*(t)$ is defined as the path that minimizes $\gamma^* = \arg\min S[\gamma]$. This formulation generalizes attention from instantaneous lookup to purposeful traversal. Attention becomes a consequence of structure and constraint: it flows along the most efficient path shaped by memory (via pressure) and intent (via potential).

The calculator implements numerical methods to handle the manifold's non-Euclidean geometry, accounting for curvature effects, parallel transport of semantic vectors, and the influence of nearby thought bundles on path selection. For instance, when reasoning from a concept in bundle A 201 to a goal state in bundle C 203, the geodesic trajectory calculator 250 might identify multiple viable paths: a direct route through high-pressure regions requiring intense cognitive effort, a longer path circumnavigating dense areas while maintaining semantic coherence, or a creative trajectory that leverages unexpected connections through bundle B 202. A thought value calculator 260 assesses the utility and relevance of thoughts within the current cognitive context, computing scalar values that inform caching decisions, retrieval priorities, and structural reorganization. This component evaluates thoughts based on multiple criteria including frequency of access, semantic centrality within bundles, contribution to successful reasoning paths, alignment with current and historical goals, and potential for generalization or transfer learning. Thought value calculator 260 works closely with the thermodynamic decay system, where thoughts with consistently low values gradually lose activation energy and may eventually be pruned from the manifold. Conversely, highly valued thoughts become anchors around which new structures crystallize, creating stable semantic neighborhoods that facilitate efficient reasoning.

A bundle operation manager 240 orchestrates the dynamic restructuring of thought bundles through three primary operations that reshape the manifold's topology. Fanning-in operations occur when peripheral thoughts or loosely associated concepts are drawn into existing bundles through repeated co-activation or semantic alignment, effectively increasing the bundle's density and internal coherence. This process involves adjusting the local metric to create stronger attractions, modifying bundle boundaries to encompass new members, and updating internal structure to maintain navigability. Fanning-out operations enable bundles to expand into new semantic territories when existing concepts are extended, elaborated, or applied in novel contexts. During fanning-out, bundle operation manager 240 creates new subregions within bundles, establishes tentative connections to unexplored manifold areas, and maintains structural stability while allowing for creative expansion. Rebinding operations represent the most sophisticated transformation, occurring when multiple bundles exhibit sufficient semantic overlap or functional similarity to warrant integration into higher-order structures. Bundle operation manager 240 performs rebinding by identifying intersection regions between bundles, computing optimal merge strategies that preserve essential structure, creating meta-bundles that abstract common patterns, and updating the global manifold topology to reflect new conceptual hierarchies.

These components work in concert to create a living geometric space where cognition unfolds as structured motion rather than discrete computation. Thought bundles 200 provide persistent semantic anchors, compression pressure field 210 and goal potential field 220 create a dynamic energy landscape, attention vector field 230 enables fluid cognitive flow, the geodesic trajectory calculator 250 determines optimal reasoning paths, thought value calculator 260 maintains cognitive efficiency, and bundle operation manager 240 ensures the manifold evolves to support increasingly sophisticated reasoning. Together, they implement a form of geometric intelligence where memory shapes space, attention follows structure, and learning reshapes the very terrain of thought.

Figure 3:
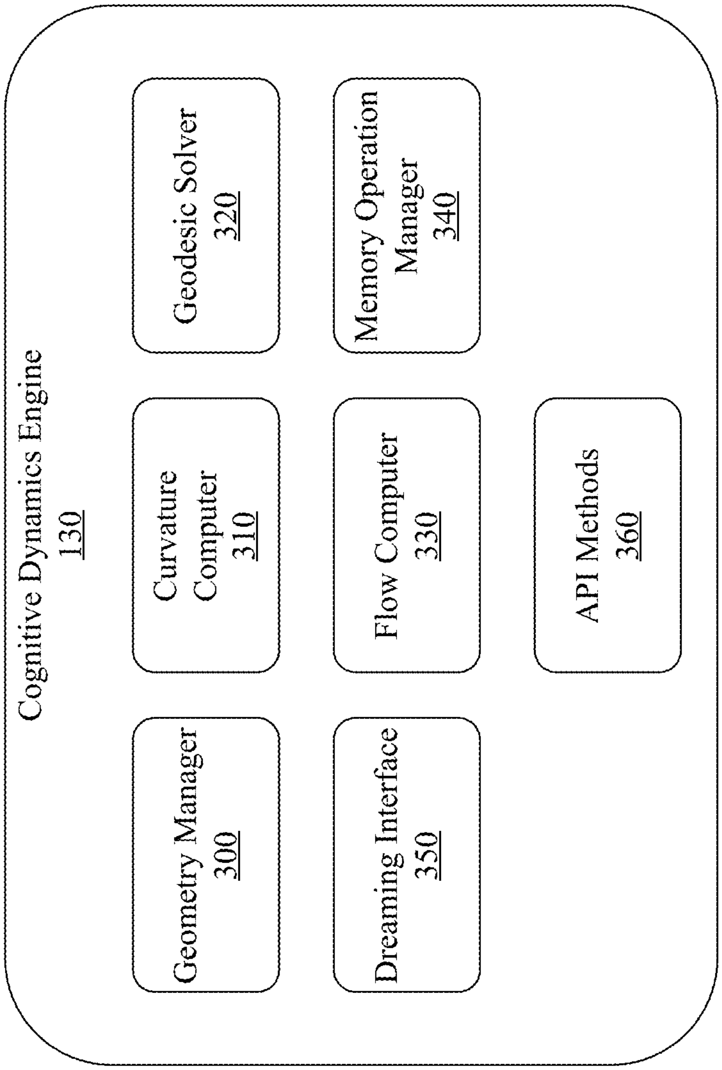
FIG. 3 is a block diagram illustrating an exemplary architecture of a component within a Persistent Cognitive Machine, a Cognitive Dynamics Engine.

FIG. 3 is a block diagram illustrating an exemplary architecture of a component within a Persistent Cognitive Machine, a Cognitive Dynamics Engine (CDE). Operating as a specialized geometry processor analogous to a physics engine in simulation environments, CDE 130 manages the continuous shaping, traversal, and optimization of the cognitive manifold through coordinated geometric operations. This engine transforms the abstract principles of differential geometry and dynamical systems into practical computational mechanisms that enable persistent, adaptive cognition through structured space.

A geometry manager 300 serves as the component responsible for maintaining and evolving the manifold's geometric structure. Geometry manager 300 continuously tracks and updates the Riemannian metric tensor across all regions of the latent manifold, defining how distances, angles, and volumes are measured within the cognitive space. The metric is not static but evolves dynamically based on cognitive activity, with frequently traversed regions experiencing metric contraction that brings related concepts closer together, while unexplored areas maintain broader metric spacing that allows for flexible exploration. Geometry manager 300 also maintains the connection, which governs how vectors and tensors are parallel transported across the curved manifold. This connection evolves through use, with repeated attention trajectories establishing preferred directions of parallel transport that become the "natural" ways to move between concepts. For example, if reasoning paths frequently connect concepts from physics to machine learning applications, geometry manager 300 adjusts the connection to make these transitions smoother and more efficient. Geometry manager 300 implements algorithms for metric learning from trajectory data, using transition frequencies, co-activation patterns, and semantic alignment to continuously refine the geometric structure. It also manages coordinate transformations between different local charts of the manifold, ensuring smooth transitions as attention moves between semantic regions.

A curvature computer 310 calculates the various curvature tensors that characterize the manifold's local and global geometric properties. Curvature computer 310 computes a Riemann curvature tensor, which fully describes how the manifold deviates from flat Euclidean space. From this fundamental tensor, curvature computer 310 derives the Ricci tensor and the Ricci scalar, which measure how volumes contract or expand under geodesic flow. For cognitive dynamics, it computes the compression pressure field $P(x)=-R(x)$, transforming geometric curvature into a cognitive cost function that governs attention flow. Curvature computer 310 employs multiple estimation strategies to handle the computational complexity of exact curvature calculation in high dimensions. These include geodesic deviation methods that track how nearby attention paths converge or diverge over time, Jacobian-based approximations using learned transition functions between manifold regions, and sampling techniques that estimate curvature from the statistical properties of local trajectory bundles. The component maintains a continuously updated curvature map across the manifold, identifying high-curvature regions where semantic compression has created dense knowledge structures, saddle points where conceptual boundaries meet, and flat regions suitable for creative exploration or interpolation.

A geodesic solver 320 computes optimal paths through the manifold by solving the fundamental equation of cognitive motion. Given an initial state and a goal configuration, it determines the trajectory that minimizes the cognitive action function. This variational problem balances three competing factors: the kinetic energy that penalizes rapid changes in attention, the compression pressure that increases cost in semantically dense regions, and the goal potential that provides attractive forces toward relevant areas. Geodesic solver 320 implements sophisticated numerical methods adapted for manifold computation, including Riemannian gradient descent that respects the manifold's metric structure, shooting methods that propagate initial velocities forward while satisfying boundary conditions, and relaxation techniques that iteratively refine approximate paths toward true geodesics. The solver must handle multiple challenging scenarios such as non-convex optimization landscapes with multiple local minima, regions of high curvature where standard methods become unstable, and multi-goal situations requiring Pareto-optimal path selection. For instance, when solving a complex reasoning task that requires connecting disparate concepts, geodesic solver 320 might identify several viable paths: a direct route through high-pressure theoretical abstractions, a longer but clearer path through concrete examples, or an innovative trajectory that discovers unexpected connections through analogical reasoning.

A flow computer 330 models attention as a continuous vector field evolving over the manifold according to geometric dynamics. Rather than treating attention as discrete selections or weights, this component implements a partial differential equation, where attention behaves as a cognitive fluid flowing through shaped space. The flow computer 330 discretizes this equation using finite element methods adapted for manifolds, handling the complexities of curved space while maintaining numerical stability. It tracks how attention propagates through the manifold, creating flow patterns that include laminar streams along well-established reasoning paths, bifurcations where attention splits between competing hypotheses, convergence zones where multiple reasoning lines reach similar conclusions, and turbulent regions indicating cognitive uncertainty or conflicting goals. The component also computes derived quantities such as the divergence indicating where attention is focusing or dispersing, the curl revealing rotational patterns in thought, and flow stability metrics that identify robust versus fragile reasoning patterns. Flow computer 330 enables the system to maintain multiple concurrent attention streams, supporting parallel reasoning processes that can later merge or inform each other.

A memory operation manager 340 orchestrates structural modifications to thought bundles and manifold topology based on cognitive activity and optimization criteria. This component implements the three fundamental bundle operations that reshape semantic space. During fanning-in operations, it identifies loosely associated thoughts that show increasing co-activation and guides their consolidation into tighter bundle structures, adjusting local metrics to strengthen their mutual attraction, updating bundle boundaries to encompass new members, and recalculating internal bundle geometry to maintain efficient navigation. Fanning-out operations are triggered when existing bundles need to expand into new semantic territory, with memory operation manager 340 creating new submanifold regions, establishing tentative connections to unexplored areas, and maintaining structural stability during expansion. Rebinding operations occur when the manager detects sufficient overlap or functional similarity between bundles to warrant higher-order integration, executing merge algorithms that preserve essential structure while creating new abstractions. Memory operation manager 340 also handles subspace alignment for federated learning scenarios, enabling knowledge transfer between different PCM instances while respecting privacy boundaries.

A dreaming interface 350 provides the connection point between CDE 130 and dream manager 140, enabling autonomous manifold reorganization during off-task periods. This interface exposes methods for initiating various dreaming operations including targeted perturbation of specific manifold regions, global relaxation processes that smooth unnecessary complexity, and exploratory synthesis of new conceptual connections. Dreaming interface 350 manages the transition between active cognition and dreaming states, ensuring that ongoing reasoning processes reach stable states before reorganization begins, that critical structures are preserved during transformation, and that the manifold returns to a coherent state before resuming active operation. During dreaming phases, the interface coordinates bundle recombination algorithms that discover emergent abstractions, topology modification procedures that create new conceptual bridges, and compression operations that consolidate redundant structures. It monitors dreaming progress through geometric health metrics, ensuring that reorganization improves rather than disrupts cognitive capability.

An API methods 360 component provides a clean programmatic interface for external modules to interact with the CDE's geometric capabilities. API methods may include accepting a goal embedding and current state to return an optimal geodesic path, leveraging the geodesic solver while accounting for current manifold conditions. Updating reinforces the manifold along a recently traversed path, strengthening the metric connections and potentially triggering bundle formation. Querying a bundle identifies the nearest thought bundle to a given manifold point, using both geometric proximity and semantic alignment. Dreaming initiates autonomous reorganization procedures through the dreaming interface. Getting pressure returns the compression pressure at any point, enabling other components to make informed decisions about traversal costs. Getting a goal field constructs a potential field for a given goal configuration, coordinating with the goal manager to shape attention flow. These methods abstract away the complex geometric computations while providing powerful primitives for cognitive operations. API methods 360 also handles request queuing, resource management, and error handling to ensure robust operation under varying computational loads.

Together, these components within cognitive dynamics engine 130 create a geometric substrate for persistent cognition. Geometry manager 300 maintains the foundational structure, curvature computer 310 derives the pressure landscape that guides efficient reasoning, geodesic solver 320 finds optimal paths through semantic space, flow computer 330 enables fluid attention dynamics, memory operation manager 340 evolves the manifold through use, dreaming interface 350 enables autonomous optimization, and API methods 360 provide clean access to these capabilities. This architecture transforms the principles of geometric cognition into a practical computational system where thought truly becomes motion through shaped space, memory becomes curvature, and learning becomes the evolution of geometry itself.

Figure 4:
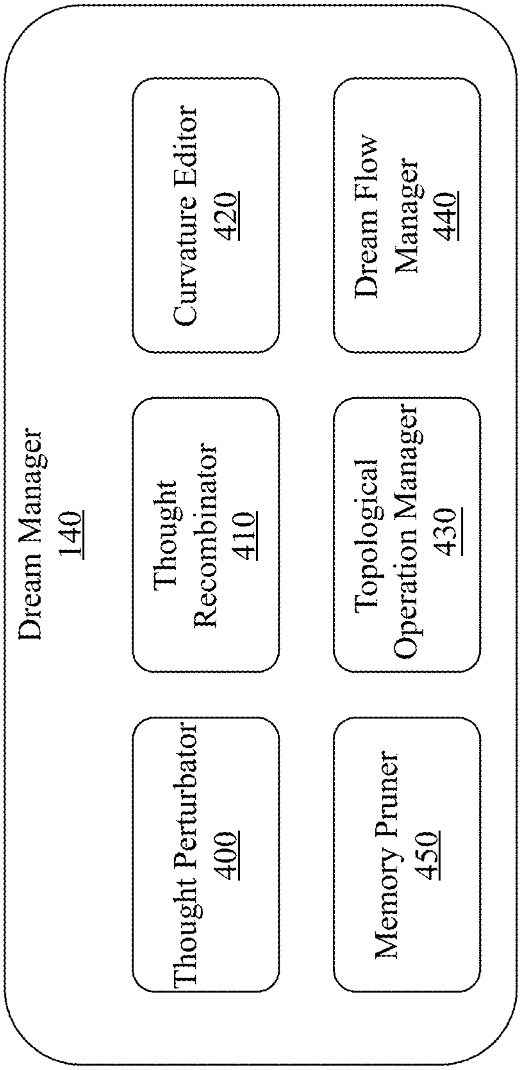
FIG. 4 is a block diagram illustrating an exemplary architecture of a component within a Persistent Cognitive Machine, a dream manager.

FIG. 4 is a block diagram illustrating an exemplary architecture of a component within a Persistent Cognitive Machine, a dream manager. Operating analogously to sleep-driven memory consolidation in biological systems, dream manager 140 performs essential geometric maintenance and optimization that enables the PCM to develop increasingly efficient and generalized cognitive structures without requiring explicit retraining or parameter updates. This component transforms the theoretical concept of manifold evolution into practical computational processes that reshape the space of thought based on accumulated experience and structural patterns.

A thought perturbator 400 implements the initial phase of the dreaming process by introducing controlled stochastic variations into existing thought structures. This component samples thought bundles from the manifold based on multiple selection criteria including recent activation frequency, structural importance within the manifold topology, proximity to high-pressure regions indicating potential for compression, and participation in successful reasoning trajectories. Once bundles are selected, thought perturbator 400 applies carefully calibrated perturbations based on factors including but not limited to noise drawn from a distribution that reflects local geometric properties. The covariance structure of this noise is not arbitrary but derived from the local metric tensor and curvature, ensuring that perturbations respect the manifold's geometry while exploring meaningful variations. In regions of high curvature, perturbations are smaller and more constrained, testing the stability of compressed semantic structures, while in flatter regions, larger perturbations explore potential new connections and generalizations. Thought perturbator 400 implements multiple perturbation strategies including gradient-based exploration that follows directions of increasing semantic variance, curvature-aware sampling that concentrates perturbations along principal geodesic directions, and adversarial perturbations that test the robustness of thought structures against semantic drift. These perturbations serve as probes into the local geometry, revealing opportunities for consolidation, identifying unstable structures that may need reinforcement, and discovering latent connections between seemingly disparate concepts.

A thought recombinator 410 takes perturbed thoughts and synthesizes new conceptual structures through sophisticated interpolation and integration algorithms. This component implements the mathematical operation where the weights are determined through multiple mechanisms including but not limited to semantic alignment scores between perturbed thoughts, historical co-activation patterns, goal-relevance metrics, and geometric compatibility measures. Thought recombinator 410 goes beyond simple linear interpolation, employing manifold-aware combination strategies that respect the curved geometry of the latent space. When combining thoughts from different bundles, it computes geodesic interpolations that follow the natural curvature of the manifold, ensuring that intermediate points remain semantically meaningful. The component implements hierarchical recombination, first identifying small groups of highly compatible thoughts for initial fusion, then progressively combining these into larger meta-structures. During recombination, it monitors several quality metrics including semantic coherence measured through local manifold smoothness, compression potential indicating whether the combination reduces overall complexity, and generalization capacity assessing whether the new structure captures broader patterns. For example, when recombining thoughts about "gradient descent" from a machine learning bundle with thoughts about "energy minimization" from a physics bundle, thought recombinator 410 might discover a meta-concept about "optimization in curved spaces" that provides a unified framework applicable across domains.

A curvature editor 420 performs targeted modifications to the manifold's geometric structure based on insights gained from perturbation and recombination. This component has the capability to increase local curvature in regions where semantic compression is beneficial, creating tighter conceptual clusters that enable more efficient reasoning. It can also decrease curvature in areas that have become overly rigid, restoring flexibility for creative thinking and novel connections. Curvature editor 420 implements several curvature modification operations including but not limited to bundle merging procedures that identify overlapping thought structures with high mutual information and smoothly blend their geometric neighborhoods, creating unified regions with consistent curvature properties. It performs curvature diffusion operations that spread high-pressure regions more evenly, preventing the formation of semantic bottlenecks that could impede reasoning. Curvature editor 420 may also implement curvature sharpening around stable conceptual cores, reinforcing well-established knowledge while maintaining softer boundaries for evolving concepts. When editing curvature, the component must maintain global geometric consistency, ensuring that local modifications don't create inconsistencies or singularities elsewhere in the manifold. In one embodiment it may employ Ricci flow-inspired algorithms that naturally evolve curvature toward optimal configurations, balancing local semantic density with global navigability.

A topological operation manager 430 handles the most profound structural modifications to the manifold, including changes that alter its fundamental connectivity. This component can create new topological features such as handles or bridges between previously disconnected regions, enabling novel reasoning pathways that weren't possible in the original manifold structure. When thought recombinator 410 discovers stable interpolations between distant bundles, topological operation manager 430 evaluates whether to establish permanent connections. It implements sophisticated surgery operations that can split overly complex regions into simpler components, merge adjacent regions that have developed sufficient similarity, or create higher-genus structures that enable multiply-connected reasoning paths. Topological operation manager 430 performs topological analysis to identify features such as holes in the manifold representing conceptual gaps, bottlenecks where all reasoning must pass through constrained regions, and islands of isolated knowledge that could benefit from connection. For instance, if the system has separately developed expertise in "visual pattern recognition" and "time series analysis," topological operation manager 430 might identify an opportunity to create a bridge through "spatiotemporal pattern analysis," fundamentally expanding the system's reasoning capabilities. All topological modifications are carefully validated to ensure they preserve essential semantic relationships while enabling new forms of inference.

A dream flow manager 440 orchestrates the overall flow of dreaming operations, coordinating the activities of other components to ensure coherent and beneficial manifold evolution. This component implements three primary flow types that govern how dreaming unfolds. The perturbation flow controls how stochastic exploration propagates through the manifold, managing the selection of regions for perturbation, the intensity and direction of noise injection, and the propagation of discoveries to related areas. The compression flow guides the consolidation of redundant or inefficient structures, identifying opportunities for semantic compression, orchestrating the merger of similar concepts, and ensuring that compression preserves essential distinctions. The generalization flow promotes the discovery and reinforcement of abstract patterns, guiding recombination toward higher-order structures, identifying successful generalizations for preservation, and propagating useful abstractions throughout the manifold. Dream flow manager 440 monitors the overall health of the dreaming process through metrics such as semantic coherence, structural stability, and compression efficiency. It implements adaptive control mechanisms that adjust flow parameters based on the current state of the manifold and the outcomes of recent modifications, ensuring that dreaming remains beneficial rather than disruptive.

A memory pruner 450 performs essential cleanup operations that prevent the manifold from becoming cluttered with obsolete or redundant structures. This component implements sophisticated forgetting mechanisms that go beyond simple deletion, carefully removing structures while preserving the integrity of surrounding geometry. It identifies candidates for pruning based on multiple criteria including thermodynamic decay where thoughts with consistently low activation energy are marked for removal, structural redundancy where nearly identical thought patterns exist in multiple locations, and semantic incoherence where thoughts no longer maintain meaningful connections to the broader manifold. Memory pruner 450 implements gradual pruning processes that slowly dissolve unwanted structures rather than creating abrupt deletions that could destabilize nearby regions. During pruning, it redistributes the "semantic mass" of removed thoughts to related structures, ensuring that useful aspects are preserved even as redundant representations are eliminated. The component also performs defragmentation operations that consolidate sparse regions and tighten the overall manifold structure. For example, after extended operation, the system might accumulate multiple slightly different representations of similar concepts acquired in different contexts. Memory pruner 450 identifies these redundancies and carefully merges them into single, more robust representations while preserving the unique aspects that provide contextual flexibility.

These components within dream manager 140 implement a process of autonomous cognitive evolution. Thought perturbator 400 explores the stability and potential of existing structures, thought recombinator 410 synthesizes new abstractions and connections, curvature editor 420 optimizes the geometric landscape, topological operation manager 430 enables fundamental structural innovations, dream flow manager 440 orchestrates coherent evolution, and memory pruner 450 maintains cognitive efficiency. This architecture enables the PCM to continuously improve its internal representations without external supervision, developing increasingly sophisticated reasoning capabilities through the natural evolution of its geometric substrate. The dreaming process transforms accumulated experience into structural wisdom, creating a manifold that not only stores knowledge but embodies understanding in its very geometry.

Figure 5:
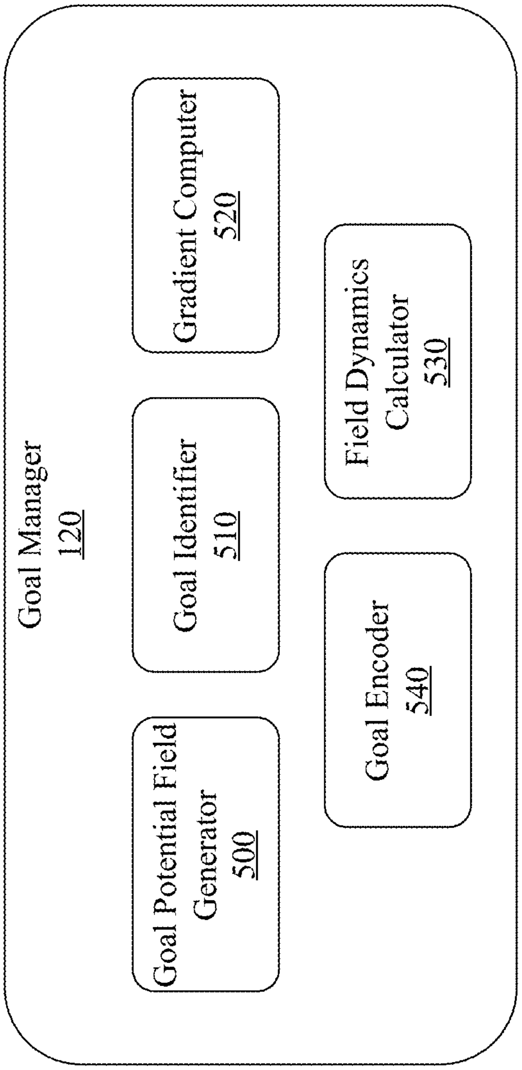
FIG. 5 is a block diagram illustrating an exemplary architecture of a component within a Persistent Cognitive Machine, a goal manager.

FIG. 5 is a block diagram illustrating an exemplary architecture of a component within a Persistent Cognitive Machine, a goal manager. Unlike traditional goal-directed systems that implement objectives as discrete targets or symbolic constraints, goal manager 120 generates continuous scalar fields that attract attention and guide reasoning through geometric influence. This component transforms abstract intentions, user queries, and system objectives into structured force fields that interact with the manifold's compression landscape to create rich cognitive dynamics.

A goal identifier 510 serves as the initial processing stage that recognizes, categorizes, and prioritizes various goal sources entering the system. Goal identifier 510 processes inputs from multiple channels including explicit user queries that directly state objectives or ask questions, implicit user patterns derived from interaction history and preferences, system-generated goals arising from internal drives such as uncertainty reduction or consistency maintenance, and task constraints imposed by external requirements or operational parameters. Goal identifier 510 implements parsing algorithms that go beyond keyword extraction to understand the semantic intent behind goals. When processing a user query such as "How can we apply quantum computing principles to optimize machine learning algorithms?", the component identifies multiple nested goals: understanding quantum computing principles, comprehending optimization in machine learning, finding intersection points between these domains, and generating practical applications. Goal identifier 510 also performs goal decomposition, breaking complex objectives into hierarchical subgoals that can be pursued in parallel or sequence. It maintains a goal registry that tracks active objectives, their priorities, interdependencies, and completion states. The component implements conflict detection mechanisms that identify when multiple goals may be contradictory or competing for the same cognitive resources, flagging these for special handling by other components. For long-term interactions, goal identifier 510 maintains persistent goal structures that evolve across sessions, enabling the system to pursue complex objectives that require extended reasoning or multiple interaction cycles.

A goal encoder 540 transforms identified goals from their raw representational form into geometric structures compatible with the manifold's architecture. This encoding process goes beyond simple embedding, creating rich geometric objects that can effectively influence manifold dynamics. Goal encoder 540 implements multiple encoding strategies tailored to different goal types. For similarity-based goals, it computes embedding vectors and defines potential fields, creating gradients that attract attention toward semantically similar regions. For constraint-based goals, it generates potential fields with low values in prohibited regions and high values in acceptable areas, effectively creating barriers and channels that guide reasoning. Goal encoder 540 also implements contrastive encoding for goals that require distinguishing between concepts, creating potential fields with opposing gradients that push attention away from certain regions while pulling toward others. For complex multi-faceted goals, goal encoder 540 generates composite fields that superimpose multiple potential patterns, creating rich landscapes with multiple attractors, saddle points, and gradient flows. The encoding process considers the current state of the manifold, adapting the potential field to work effectively with existing compression patterns and thought structures. For instance, when encoding a goal related to creative problem-solving, the component might generate a potential field with multiple local maxima in different semantic regions, encouraging exploration of diverse solution approaches rather than convergence on a single path.

A goal potential field generator 500 takes encoded goals and constructs the complete scalar field across the entire manifold. This component implements field generation algorithms that create smooth, differentiable potential landscapes while respecting the manifold's geometric constraints. The generator computes field values at each point by considering multiple factors including semantic distance from goal representations, alignment with goal constraints and requirements, historical success rates for similar goals in nearby regions, and interaction effects between multiple concurrent goals. Goal potential field generator 500 employs kernel methods to create smooth field variations, preventing discontinuities that could destabilize attention flow. It implements field normalization procedures to ensure that potential values remain within reasonable ranges across the manifold, preventing any single goal from completely dominating cognitive dynamics. Goal potential field generator 500 also generates time-varying fields for goals that evolve during reasoning, smoothly interpolating between different field configurations to maintain continuity. For hierarchical goals, it creates nested potential structures where achieving subgoals creates local maxima within the broader landscape of the primary objective. The generator must balance field strength to create sufficient attractive force without overwhelming the natural dynamics of compression and manifold structure. For example, when generating a field for a goal requiring innovative connections between disparate concepts, the component might create a potential landscape with a valley between the concepts that gradually rises, encouraging exploration of the intermediate space where novel connections might emerge.

A gradient computer 520 calculates the vector field that determines the direction and magnitude of goal-induced forces at each point in the manifold. This component implements efficient algorithms for computing gradients in curved space, accounting for the manifold's metric structure to ensure that gradients represent true geometric directions rather than naive coordinate derivatives. Gradient computer 520 employs multiple computational strategies including finite difference methods adapted for manifolds, automatic differentiation through the field generation process, and analytical gradients for simple field configurations. It computes not only first-order gradients but also higher-order derivatives such as the Hessian, which indicates the local curvature of the potential field and helps identify critical points such as maxima, minima, and saddle points. The component maintains a continuously updated gradient map across frequently accessed regions of the manifold, enabling rapid attention flow calculations without repeated gradient computation. For regions of high curvature or complex metric structure, gradient computer 520 implements adaptive sampling strategies that ensure accurate gradient estimation despite geometric complications. It also computes gradient statistics such as divergence and curl, providing insights into the global flow patterns induced by the goal field. These computations enable analyses of goal dynamics, identifying convergence regions where attention naturally flows, circulation patterns that might indicate conceptual loops, and divergence zones where exploratory behavior is encouraged.

A field dynamics calculator 530 analyzes and predicts the complex behaviors that emerge from the interaction between goal potential fields and the manifold's other forces. This component simulates how attention will flow under the combined influence of goal attraction, compression resistance, and the inherent dynamics of the attention field itself. Field dynamics calculator 530 implements several analytical capabilities including trajectory prediction that estimates likely attention paths given current conditions, stability analysis that identifies whether goal configurations will lead to stable focus or oscillatory behavior, and bifurcation detection that recognizes when small changes in goals might lead to dramatically different cognitive outcomes. The component models various emergent phenomena such as gradient following where attention flows smoothly up potential gradients toward goal regions, tunneling effects where strong goal potentials can overcome high compression barriers, and competitive dynamics where multiple goals create complex flow patterns with unpredictable outcomes. For multi-goal scenarios, field dynamics calculator 530 computes Pareto frontiers that identify optimal trade-offs between competing objectives, helping the system navigate complex decision spaces. It also analyzes temporal dynamics, predicting how goal influences will evolve as the manifold structure changes through use and learning. The component can identify potential failure modes such as local maxima that might trap attention before reaching true goals, unstable equilibria where small perturbations cause large behavioral changes, and chaotic regions where goal interactions create unpredictable dynamics. For instance, when analyzing goals that require balancing exploration with exploitation, field dynamics calculator 530 might identify parameter regimes where the system naturally alternates between focused pursuit and broad exploration, optimizing long-term learning and performance.

The components within goal manager 120 create a system for translating abstract objectives into concrete geometric influences that shape cognitive behavior. Goal identifier 510 recognizes and structures incoming objectives, goal encoder 540 transforms them into geometric representations, goal potential field generator 500 creates smooth scalar fields across the manifold, gradient computer 520 determines the resulting force fields, and field dynamics calculator 530 predicts and analyzes the emergent behaviors. This architecture enables the PCM to pursue complex goals not through rigid programming or symbolic planning, but through the natural dynamics of attention flowing through shaped space. Goals become not commands to be executed but influences that guide the fluid motion of thought, creating a form of intentionality that emerges from geometry rather than being imposed upon it. Goal manager 120 thus provides the motivational landscape that, combined with the manifold's memory structure and compression dynamics, enables purposeful yet flexible cognitive behavior that can adapt, learn, and discover unexpected solutions through the natural evolution of geometric attention.

Figure 13:
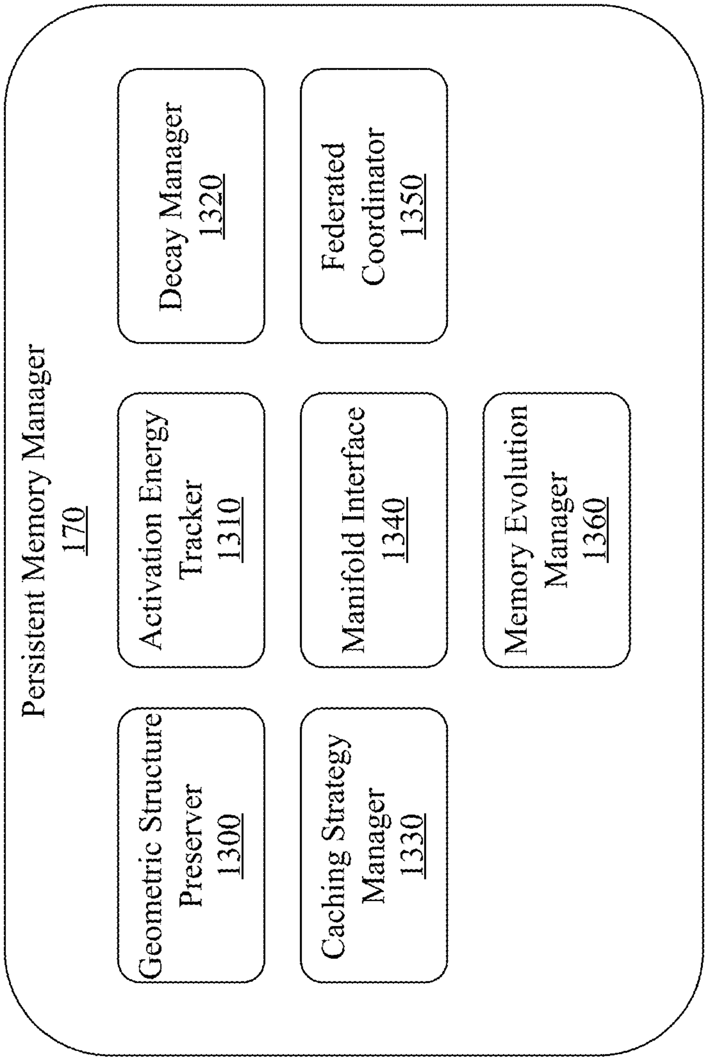
FIG. 13 is a block diagram illustrating an exemplary architecture of a component within a Persistent Cognitive Machine, a persistent memory manager.

FIG. 13 is a block diagram illustrating an exemplary architecture of a component within a Persistent Cognitive Machine, a persistent memory manager. Unlike traditional memory systems that store static data in hierarchical caches, persistent memory manager 170 implements an approach where memory exists as living geometric structures within the latent manifold, subject to natural evolution through usage patterns and energy dissipation. This component serves as the bridge between the dynamic latent manifold and long-term cognitive persistence, ensuring that thoughts—discrete units of reasoning or analysis generated during processing—are preserved not as isolated data points but as interconnected geometric structures with semantic relationships intact.

A geometric structure preserver 1300 maintains the fundamental geometric integrity of stored thoughts and their relationships within the thought cache, a structured memory layer configured to store and retrieve thoughts based on semantic similarity, contextual alignment, and system policy. This component preserves thought bundles as compact submanifolds, maintaining their internal metric structure, boundary conditions, and topological relationships to neighboring bundles. When thoughts are cached, geometric structure preserver 1300 ensures that not only the content but also the geometric context is maintained, including the local curvature patterns that indicate semantic density, the geodesic paths that connect related concepts, and the metric tensor values that define distances within thought neighborhoods. For instance, when storing a complex reasoning chain about quantum computing applications, the component preserves not just the individual thoughts but their geometric arrangement as a coherent bundle, maintaining the curved paths that connect foundational physics concepts to practical implementations. Geometric structure preserver 1300 implements sophisticated algorithms to handle the challenges of preserving dynamic geometric structures, including maintaining consistency as the manifold evolves, handling coordinate transformations between different chart representations, and ensuring that preserved structures remain compatible with the current manifold geometry when retrieved later.

An activation energy tracker 1310 implements the thermodynamic model of memory persistence by assigning and monitoring activation energies to each cached thought and thought structure. Activation energy tracker 1310 goes beyond simple access counting, implementing an energy model where thoughts gain energy through various forms of cognitive engagement including direct retrieval for query processing, traversal along geodesic paths that pass near the thought, participation in successful reasoning chains, and reinforcement through goal achievement. Activation energy tracker 1310 maintains a continuous energy landscape across all cached structures, tracking not just individual thought energies but also the energy distributions within thought bundles and along frequently traversed paths. Energy updates follow the principle that thoughts contributing to successful cognitive outcomes receive energy boosts, while those that remain unused gradually dissipate energy according to the thermodynamic decay equation. The tracker also implements energy inheritance mechanisms where new thoughts created through generalization—the process of synthesizing new thoughts from cached thoughts by identifying shared structure—inherit appropriate energy levels from their parent thoughts, ensuring that valuable abstractions maintain sufficient activation to persist.

A decay manager 1320 implements the natural forgetting mechanism through thermodynamic principles, executing a decay equation. This component continuously monitors thought energies and initiates pruning operations when falls below the threshold, ensuring that the thought cache maintains efficiency by naturally eliminating obsolete or redundant information. Decay manager 1320 implements pruning strategies that go beyond simple deletion, including gradual energy dissipation that allows thoughts to fade naturally rather than disappearing abruptly, redistribution of semantic content from decaying thoughts to related structures that remain active, and preservation of structural integrity by carefully removing thoughts without creating discontinuities in the manifold. Decay manager 1320 may also implement contextual decay modulation where decay rates adjust based on factors such as the semantic uniqueness of a thought, its role in connecting otherwise disparate concepts, and its participation in rarely accessed but critically important knowledge. For example, foundational mathematical concepts might decay more slowly than specific computational examples, preserving essential knowledge infrastructure while allowing detailed instances to fade when no longer needed.

A manifold interface 1340 provides the bidirectional connection between persistent memory manager 170 and the latent manifold, enabling seamless flow of geometric structures in both directions. This interface implements protocols for reading geometric structures from memory into the active manifold, including reconstruction of thought bundles with their full geometric context, restoration of geodesic paths and their associated curvature patterns, and integration of retrieved structures with the current manifold state. When writing updates back to memory, manifold interface 1340 captures not just the modified thoughts but the entire geometric context of their evolution, preserving information about new connections formed during reasoning, changes in local curvature due to compression or expansion, and trajectory patterns that indicate successful reasoning strategies. Manifold interface 1340 maintains synchronization between the persistent memory structures and the dynamic manifold state, handling challenges such as version conflicts when the manifold has evolved since a thought was cached, geometric inconsistencies that arise from independent evolution of different regions, and efficient incremental updates that avoid rewriting entire structures for small changes.

A caching strategy manager 1330 implements intelligent policies for determining which thoughts and structures to preserve in the various tiers of the thought cache, including session caches for short-term interaction, long-term caches for persistent knowledge, and shared or federated caches across devices or agents. Unlike traditional caching strategies based on recency or frequency alone, this component implements geometric and semantic criteria for cache management. Cached thoughts are indexed in latent space using sophisticated methods that preserve geometric relationships, enabling retrieval using vector similarity, trajectory proximity, or geodesic alignment. Caching strategy manager 1330 implements compression strategies where cached thoughts may be compressed or abstracted over time to reduce redundancy and support scalable reuse. It determines optimal compression levels by balancing storage efficiency with retrieval fidelity, identifies opportunities for thought generalization where multiple similar thoughts can be replaced by a single abstraction, and manages the distribution of thoughts across cache tiers based on access patterns and semantic importance. The component also implements predictive caching strategies that anticipate future needs based on observed cognitive patterns and preemptively adjust cache contents to optimize for expected usage.

A federated coordinator 1350 enables knowledge sharing and synchronization across multiple PCM instances while maintaining privacy and semantic integrity. Federated coordinator 1350 implements geometric abstraction protocols that allow thoughts to be shared at appropriate levels of generalization, ensuring that instance-specific details remain private while valuable patterns propagate across the federation. Federated coordinator 1350 manages the complex challenges of cross-instance memory coordination including aligning geometric structures from different manifolds that may have evolved independently, determining appropriate abstraction levels for shared thoughts to balance utility with privacy, and handling conflicts when different instances have developed incompatible representations of similar concepts. Federated coordinator 1350 implements consensus mechanisms that respect local geometric structures while enabling global knowledge emergence, using techniques such as curvature matching to identify compatible regions across manifolds, bundle projection to map local structures into shared space, and distributed evolution protocols that allow federated improvements to propagate back to local instances.

A memory evolution manager 1360 orchestrates the various mechanisms through which persistent memory structures adapt and improve over time. Memory evolution manager 1360 implements a plurality of evolution mechanisms that shape the long-term development of the memory system. Reinforcement operations strengthen frequently used thoughts and paths by increasing local curvature around valuable structures, tightening geodesic connections between related concepts, and enhancing the stability of successful reasoning patterns. Compression operations identify and merge redundant or highly similar structures, implementing the latent recombinator functionality to blend similar thoughts or trajectories into unified abstractions while preserving essential distinctions. Abstraction operations extract higher-level patterns from collections of specific instances, creating generalized thoughts that capture core principles while enabling broader application across contexts. Forgetting operations, coordinated with decay manager 1320, ensure that memory evolution includes not just growth but also selective pruning that maintains system efficiency and relevance. Memory evolution manager 1360 implements these operations according to sophisticated scheduling algorithms that balance immediate system needs with long-term optimization goals, ensuring that memory evolution enhances rather than disrupts ongoing cognitive operations.

The components create a persistent memory system that transcends traditional storage paradigms. Geometric structure preserver 1300 maintains the rich relationships between thoughts, activation energy tracker 1310 and decay manager 1320 implement natural memory dynamics, manifold interface 1340 enables integration with active cognition, the caching strategy manager 1330 optimizes for both efficiency and semantic value, federated coordinator 1350 enables collective intelligence while preserving privacy, and memory evolution manager 1360 ensures continuous improvement through use. This architecture implements structured memory where thoughts are stored not as flat vectors but as positions or paths within an evolving manifold, supporting context-sensitive access, memory reinforcement through traversal, lawful pruning, and dynamic generalization. The result is a memory system that doesn't merely store information but actively participates in the cognitive process, shaping and being shaped by the ongoing evolution of thought within the geometric substrate of the Persistent Cognitive Machine.

Figure 6:
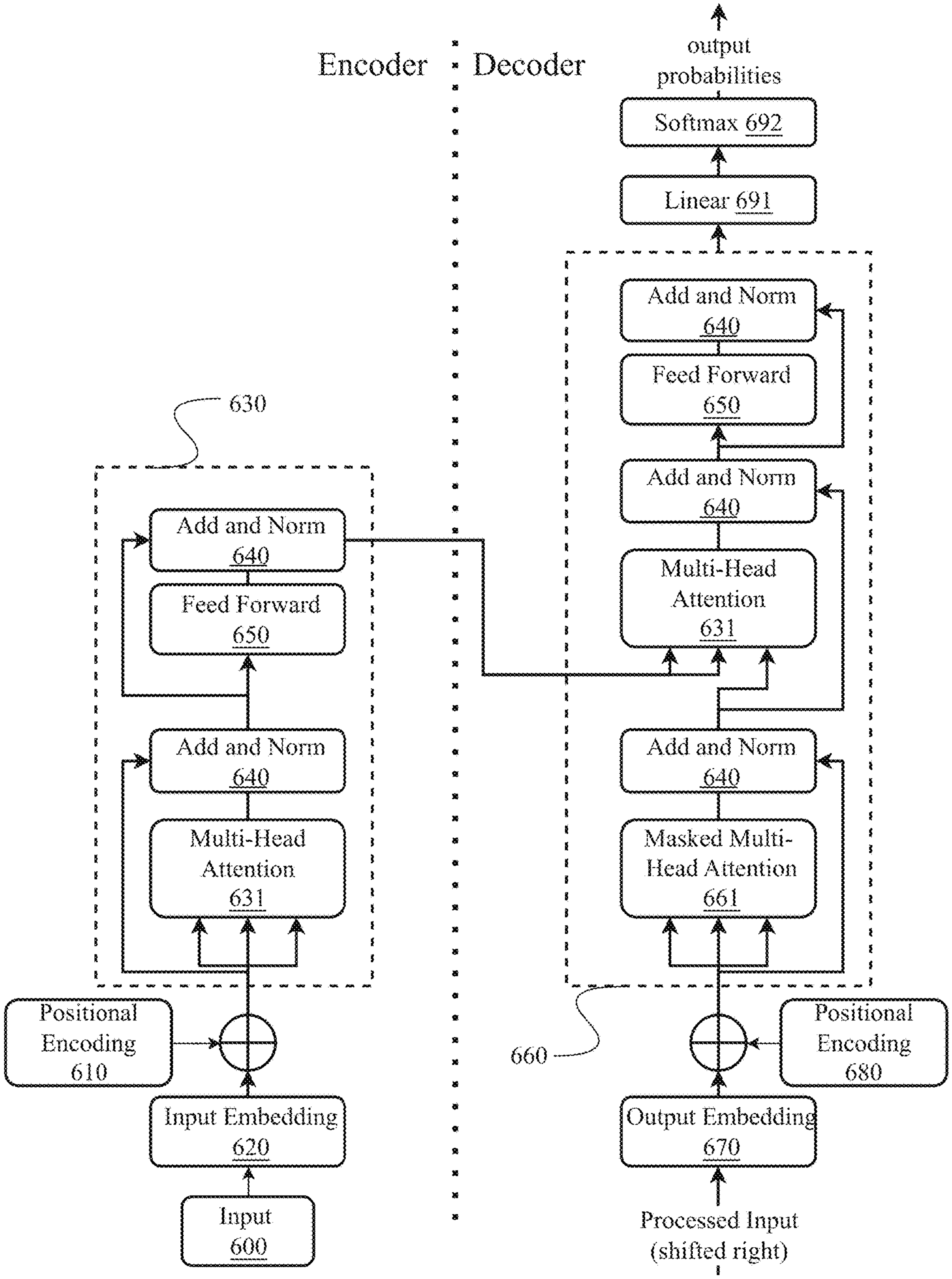
FIG. 6 (Prior Art) is a block diagram illustrating a common transformer architecture used in most large language models.

FIG. 6 (Prior Art) is a block diagram illustrating a common transformer architecture used in most large language models. A transformer generally comprises an encoder (the components on the left side of the illustration) and a decoder (the components on the right side of the illustration).

The multi-stage LLM 150 described in the PCM architecture represents an exemplary embodiment that can be implemented using any type of large language model architecture, whether currently existing or developed in the future. The PCM's geometric framework and cognitive dynamics are model-agnostic, designed to work with diverse language processing architectures while enhancing their capabilities through persistent memory and structured reasoning. The specific choice of LLM implementation does not alter the fundamental operation of the PCM system, as the geometric manifold, thought caching mechanisms, and cognitive dynamics engine operate independently of the particular language model architecture employed.

Figure 7:
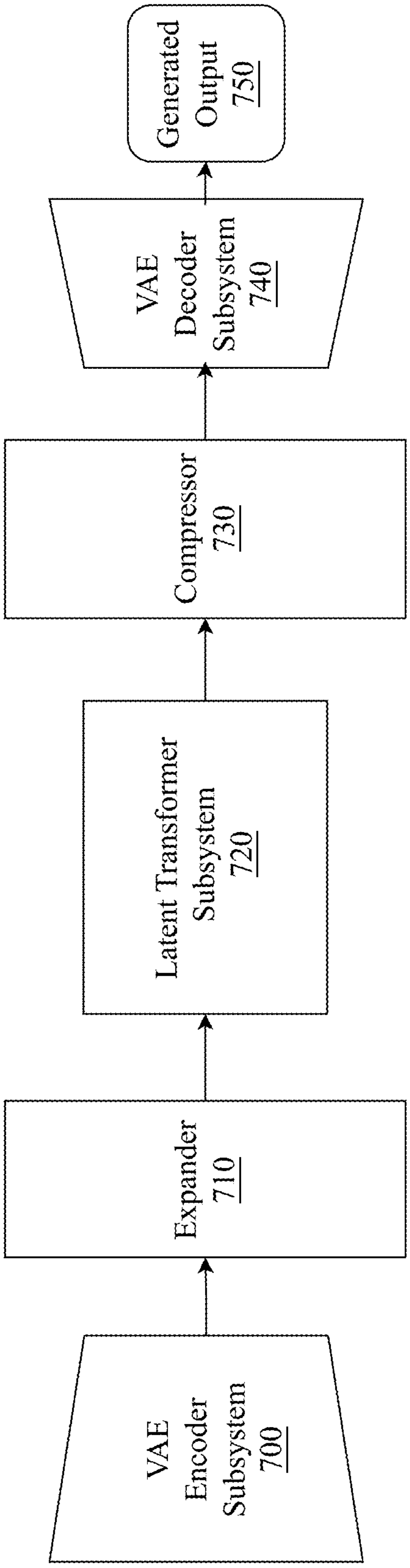
FIG. 7 is a block diagram illustrating an exemplary architecture for a latent transformer, where the transformer operates on latent space vector representations of an input.

In various embodiments, multi-stage LLM 150 may be implemented as a traditional transformer architecture with standard multi-head attention mechanisms, as described in FIG. 6 (Prior Art). Alternatively, it may employ a latent transformer architecture as illustrated in FIG. 7, where the transformer operates on compressed latent space representations rather than raw token embeddings. The system may utilize models with multi-head latent attention (MLA) that achieve superior efficiency through low-rank key-value compression, or any other attention mechanism that processes sequential data. The LLM component may be based on encoder-only architectures (such as BERT-style models), decoder-only architectures (such as GPT-style models), or encoder-decoder architectures (such as T5-style models), with the PCM system adapting its interfaces accordingly.

The flexibility in LLM selection extends to model size, with multi-stage LLM 150 potentially ranging from smaller models with millions of parameters to large-scale models with hundreds of billions of parameters. The system may employ models trained on specific domains or general-purpose models, models optimized for particular tasks or multi-task models, and models using various training objectives including masked language modeling, causal language modeling, or contrastive learning. The PCM architecture's modular design ensures that advances in language model technology can be readily incorporated without requiring fundamental changes to the geometric cognitive framework, thought caching mechanisms, or other system components.

Furthermore, the multi-stage aspect of LLM 150 refers to its ability to process information through multiple phases of refinement rather than requiring a specific architectural pattern. This multi-stage processing may be implemented through iterative passes through a single model, chained processing through multiple specialized models, hierarchical processing from coarse to fine-grained analysis, or parallel processing with subsequent integration. The key requirement is that the LLM component can generate structured thought representations suitable for embedding within the geometric manifold, regardless of the specific architectural details of how those thoughts are produced.

The illustrated transformer comprises an encoder and a decoder. The encoder takes input embeddings and processes them through a stack of layers (represented as dashed box 630). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 600. The input embedding 620 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 610 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 631 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 631.

After the multi-head attention layer, a residual connection is applied, followed by layer normalization at add and norm 640. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 650 is a fully connected neural network applied to each position of the encoder's hidden states. It consists of two linear transformations with a Rectified Linear Unit (ReLU) activation function in between. The purpose of the feed forward 650 layer is to introduce non-linearity and increase the model's capacity to learn complex representations. The output of the feed forward 650 layer has the same dimensionality as the input embeddings. A residual connection and layer normalization 640 are applied after the feed forward 650 layer.

The encoder layers 630 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 660). The output embedding layer 670 takes the previous processed input tokens (shifted right by one position) and converts them into dense vectors. Each token is mapped to a learnable embedding vector of a fixed size. The embedding vectors capture semantic and syntactic relationships between tokens.

Positional encoding 680 is added to the output embedding 670 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 661 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 640. The residual connection adds the input to the output of the attention layer, helping the model learn faster and deeper. Layer normalization normalizes the activations across the features, stabilizing the training process.

The multi-head attention 631 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 640 layer is then followed by feed forward network 650. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 640 layer is followed by linear 691 and softmax 692 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 660 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pre-training and only the encoder is used to generate the output.

The popular BERT and RoBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_1|x_1, x_2, \ldots, x_{\{t-1\}})$, where $x_t$ is the element at position t, and $x_1, x_2, \ldots, x_{\{t-1\}}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

FIG. 7 is a block diagram illustrating an exemplary architecture for a latent transformer, where the transformer operates on latent space vector representations of an input. Central to a latent transformer is a latent transformer subsystem 720, which serves as the central processing unit responsible for learning the underlying patterns, relationships, and dependencies within the input data. Latent transformer subsystem 720 leverages advanced techniques such as self-attention mechanisms and multi-head attention to capture the complex interactions and sequences in the data, enabling it to generate accurate and context-aware outputs.

The input to latent transformer subsystem 720 is provided by a VAE (Variational Autoencoder) encoder subsystem 700. VAE encoder subsystem 700 is responsible for encoding an input into a lower-dimensional latent space representation. VAE encoder subsystem 700, learns to compress the data into a compact latent space representation while preserving the essential features and characteristics of the input. Latent space vectors produced by the VAE encoder subsystem 700 may be further processed by an expander 710, which increases the dimensionality of the input data to a point where the vectors can be efficiently processed by latent transformer subsystem 720.

A latent space representation of the input generated by VAE encoder subsystem 700 serves as the input to latent transformer subsystem 720. Latent transformer subsystem 720 operates in this latent space, leveraging the compressed and informative representation to learn the complex patterns and relationships within the data. By working in the latent space, latent transformer subsystem 720 can efficiently process and model the data, capturing the intricate dependencies and generating accurate and meaningful outputs.

Once latent transformer subsystem 720 has processed the latent space representation, the generated output is passed through a VAE decoder subsystem 740. VAE decoder subsystem 740 is responsible for decoding the latent space representation back into the original data space. Prior to processing by VAE decoder subsystem 740, latent transformer subsystem 720 outputs may be compressed back to an original size before being processed by the expander 710 by being processed by a compressor 730. VAE decoder subsystem 740 learns to reconstruct the original data from the latent space representation, ensuring that the generated output is coherent and meaningful.

The reconstructed output from VAE decoder subsystem 740 is provided as a compressed generated output 750. The compressed generated output 750 represents the final result of the latent transformer, which is a compressed version of the original input.

VAE encoder subsystem 700 and VAE decoder subsystem 740 play large roles in the overall functioning of the latent transformer. VAE encoder subsystem 700 enables the system to learn a compressed and informative representation of the input data in the latent space, while the VAE decoder subsystem 740 ensures that the compressed generated output 750 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 700, latent transformer subsystem 720, and VAE decoder subsystem 740 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 8:
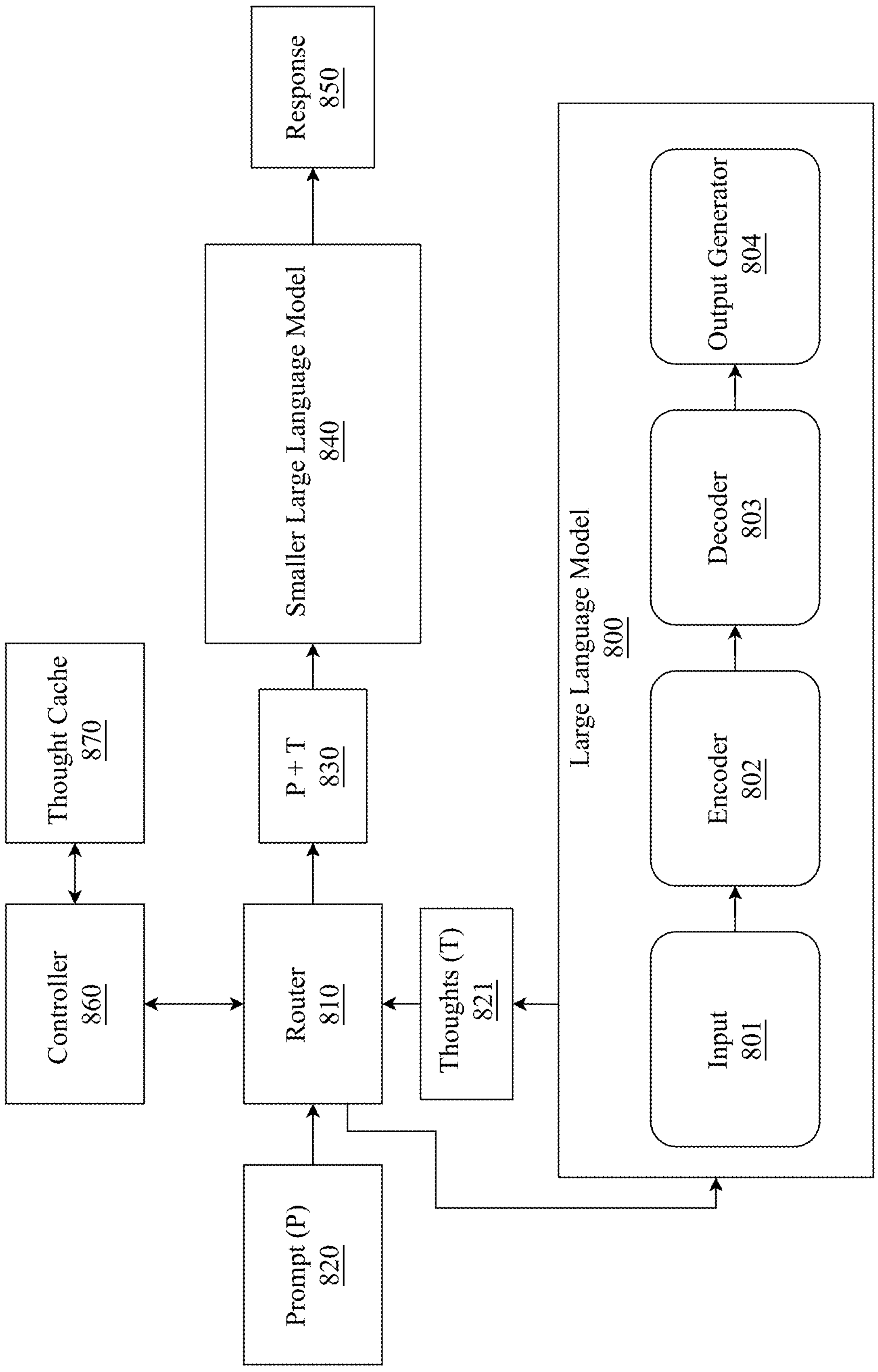
FIG. 8 is a block diagram illustrating an exemplary system architecture for a multi-state LLM with infinite context.

FIG. 8 is a block diagram illustrating an exemplary system architecture for a multi-state LLM with infinite context. The system includes a large language model 800, a router 810, a controller 860, a thought cache 870, and a smaller language model 840 that work together to process prompts and generate responses while optimizing computational resources.

The system receives an initial prompt (P) 820 through the router 810. The router serves as the central control component, determining whether to utilize the large language model 800 or access the thought cache 870 through the controller 860. Upon receiving a prompt, the router first queries the thought cache to determine if relevant thoughts exist for similar prompts.

The large language model 800 includes an input component 801, an encoder 802, a decoder 803, and an output generator 804. The large language model 300 can utilize various internal architectures, including but not limited to traditional transformer cores (as shown in FIG. 6) or latent transformer cores (as shown in FIG. 7). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 800. During this processing, the model enters a reasoning phase where it generates thoughts (T) 821 about the prompt. These thoughts represent the model's analysis and reasoning about the prompt before generating a final response.

The controller 860 manages interaction with the thought cache 870, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 830. This combination is then routed to the smaller language model 840, which requires significantly fewer computational resources than the large model. The smaller model processes the P+T 830 combination to generate the final response 850.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 840 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 8. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements-financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 810 analyzes both recent detailed thoughts and older abstract thoughts to identify relevant context. A thought synthesizer 830 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 870 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 870 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 870 monitors access patterns and triggers consolidation events when thought clusters meet specific temporal or utilization thresholds. During these events, thought cache 870 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 870 adapts consolidation timing based on thought utility metrics. Thought cache 870 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 870 hierarchical storage structure spans multiple performance tiers, from high-speed memory for recent and frequently accessed thoughts to more economical storage for consolidated meta-thoughts. Thought cache 870 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 870 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective infinite context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 9:
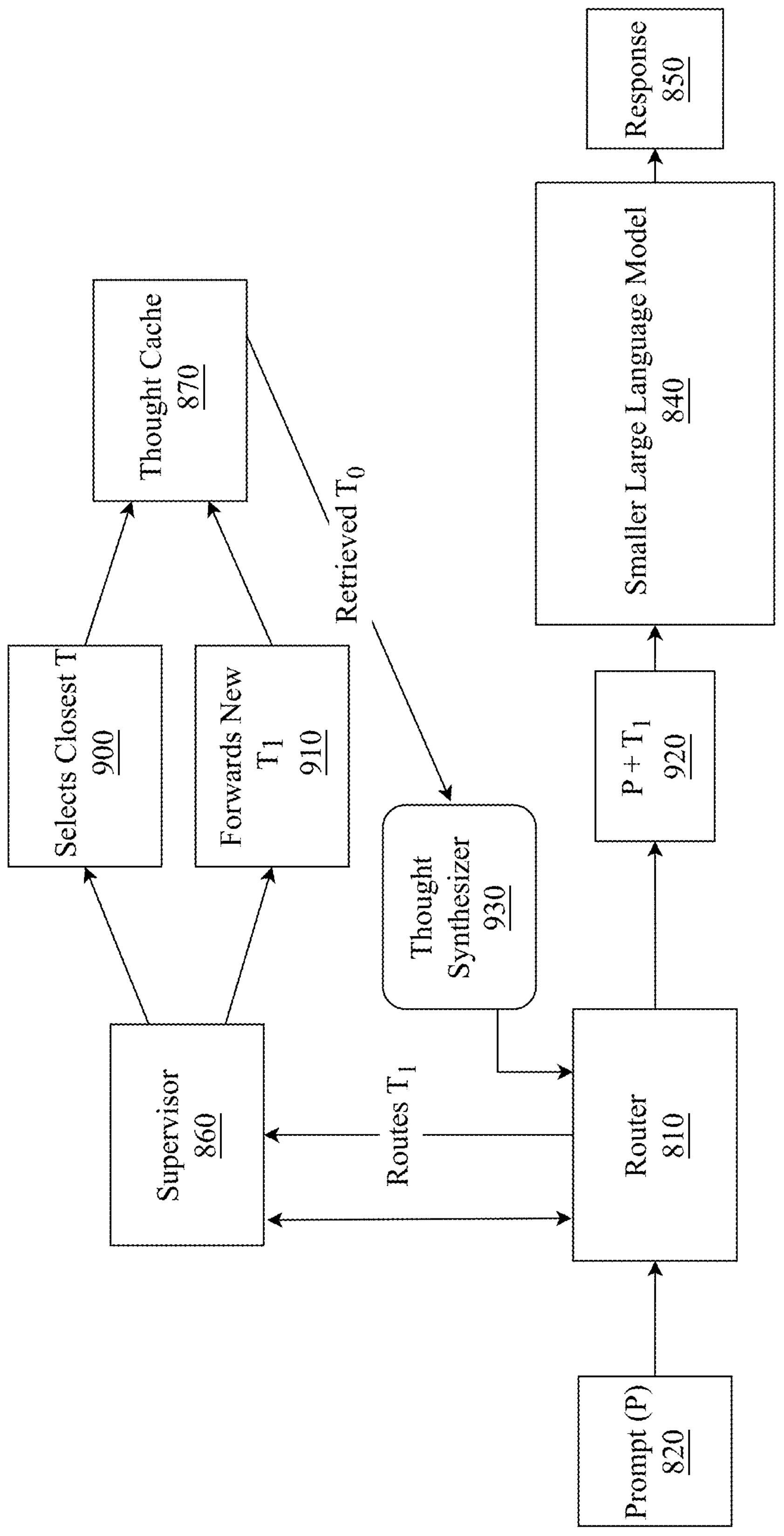
FIG. 9 is a block diagram illustrating an exemplary system architecture for a multi-state LLM with infinite context with thought synthesis and retrieval.

FIG. 9 is a block diagram illustrating an exemplary system architecture for a multi-state LLM with infinite context with thought synthesis and retrieval. The figure demonstrates how the system handles scenarios where cached thoughts may be relevant but not precisely matched to the current prompt.

The system begins when a prompt (P) 820 is received by the router 810. When router 810 receives a prompt 820, it interacts with the thought cache 870 through the controller 860 to retrieve potentially relevant thoughts.

The controller 860 performs two key functions in this embodiment. First, it selects the closest thought ($T_0$) 900 from the cache that relates to the current prompt. Second, after a synthesizer 930 creates a new thought $T_1$ 910, controller 960 manages the storage of newly synthesized thoughts. The controller evaluates the retrieved $T_0$ against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously—one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 860 processes $T_0$ to create a new thought $T_1$ that better aligns with the current prompt's requirements. For example, if a prompt asks about specific aspects of quantum computing, and $T_0$ contains general quantum computing concepts, the synthesizer can create a $T_1$ that focuses more precisely on the specific aspects requested in the prompt.

Thought synthesizer 930 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts—it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive T1. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing ($T_1$) and cryptocurrency security ($T_2$), the system performs a weighted combination expressed as $T_{new}=\alpha*T1+\beta*T2$, where $\alpha$ and $\beta$ represent relevance weights determined by similarity scores between each thought and the prompt. The resulting vector $T_{new}$ is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form P+$T_1$ 920, which is then processed by the smaller language model 840 to generate the final response 850. The newly synthesized $T_1$ is also routed back through the controller for potential caching with thought cache 370, allowing it to be used for future similar prompts.

In one embodiment, thought cache 870 provides performance improvements by eliminating redundant reasoning computations across similar prompts. When 810 router identifies a new prompt with reasoning requirements similar to previously processed queries, thought cache 870 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 870 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 870 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 870 may employ a continuous validation mechanism. This mechanism monitors the performance of cached thoughts and can automatically flag patterns that lead to inconsistent or incorrect responses. When potential issues are detected, thought cache 870 may temporarily suspend the use of problematic thoughts and route similar prompts through the large language model for fresh analysis. This self-correction capability ensures that the efficiency benefits of thought caching do not come at the expense of response quality.

Thought cache 870 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance.

In another embodiment, thought cache 870 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 870 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 870 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 10:
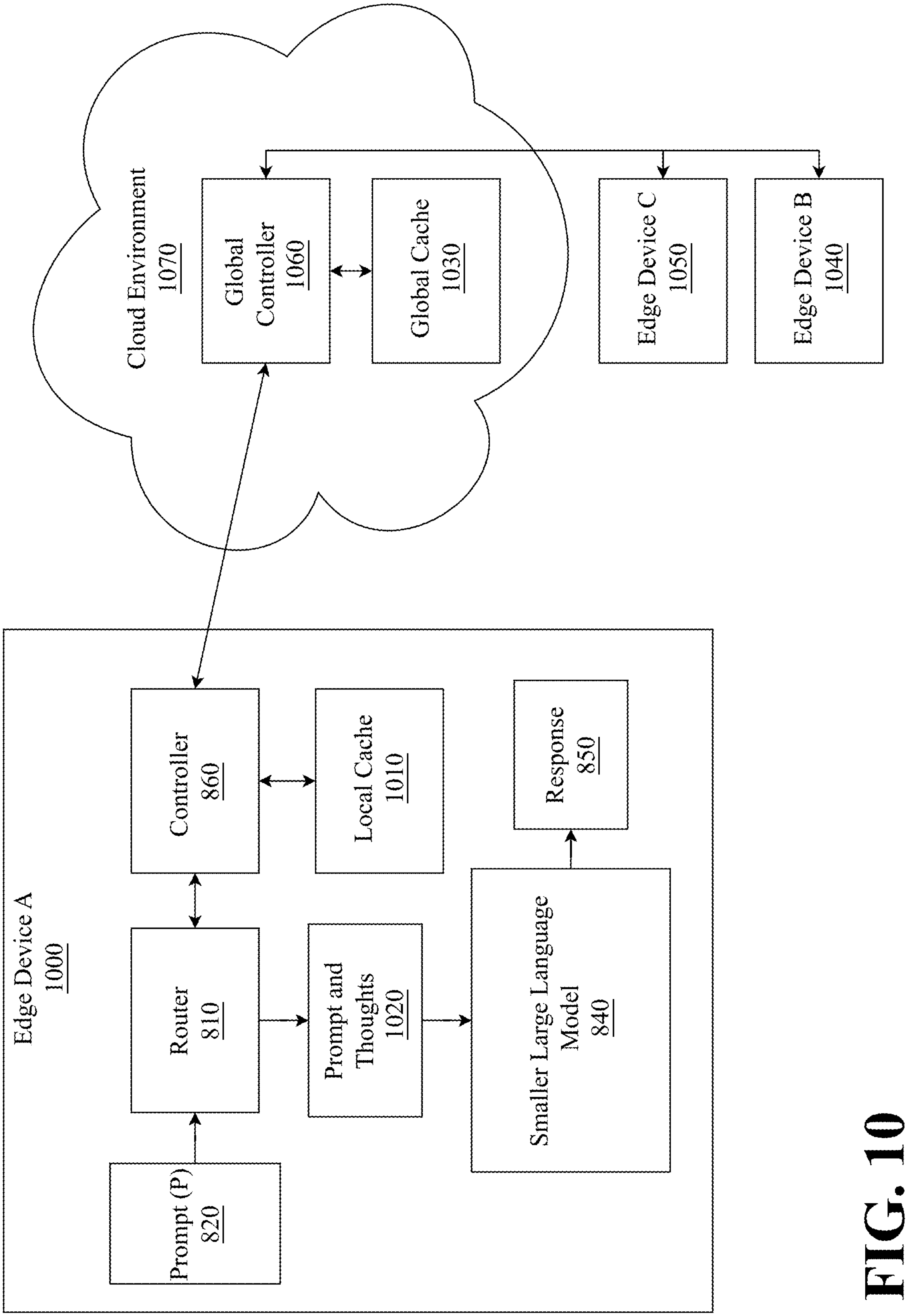
FIG. 10 is a block diagram illustrating an exemplary system architecture for a multi-state LLM with infinite context with local and global thought caches.

FIG. 10 is a block diagram illustrating an exemplary system architecture for a multi-state LLM with infinite context with local and global thought caches. This embodiment demonstrates how the system can operate primarily on edge devices while maintaining access to a broader knowledge base through cloud connectivity.

Edge device A 1000 represents a complete edge implementation of the system, which could be a device such as but not limited to a mobile phone, tablet, or other personal computing device. Within the edge device 1000, router 810 receives prompts (P) 820 and coordinates with a local controller 860 and local cache 1010. Local cache 1010 stores frequently accessed or personally relevant thoughts directly on the device, enabling quick access and offline functionality.

The smaller language model 840 runs directly on the edge device, processing prompt and thought combinations 1020 to generate responses 850. This local processing capability significantly reduces latency and computational requirements compared to constantly accessing cloud resources.

The cloud environment 1070 contains a global cache 1030 managed by a global controller 1060. This global infrastructure serves as a centralized repository for thoughts generated across multiple edge devices (B 1040, C 1050). The global controller coordinates cache synchronization and manages access patterns across the network of connected devices.

When an edge device's controller 860 cannot find relevant thoughts in its local cache 510, it can query the global controller 1060 to search the global cache 1030. For example, if a user on edge device A 1000 asks a question about a topic they haven't encountered before, the system first checks the local cache 1010, then can reach out to the global cache 1030 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

Figure 11:
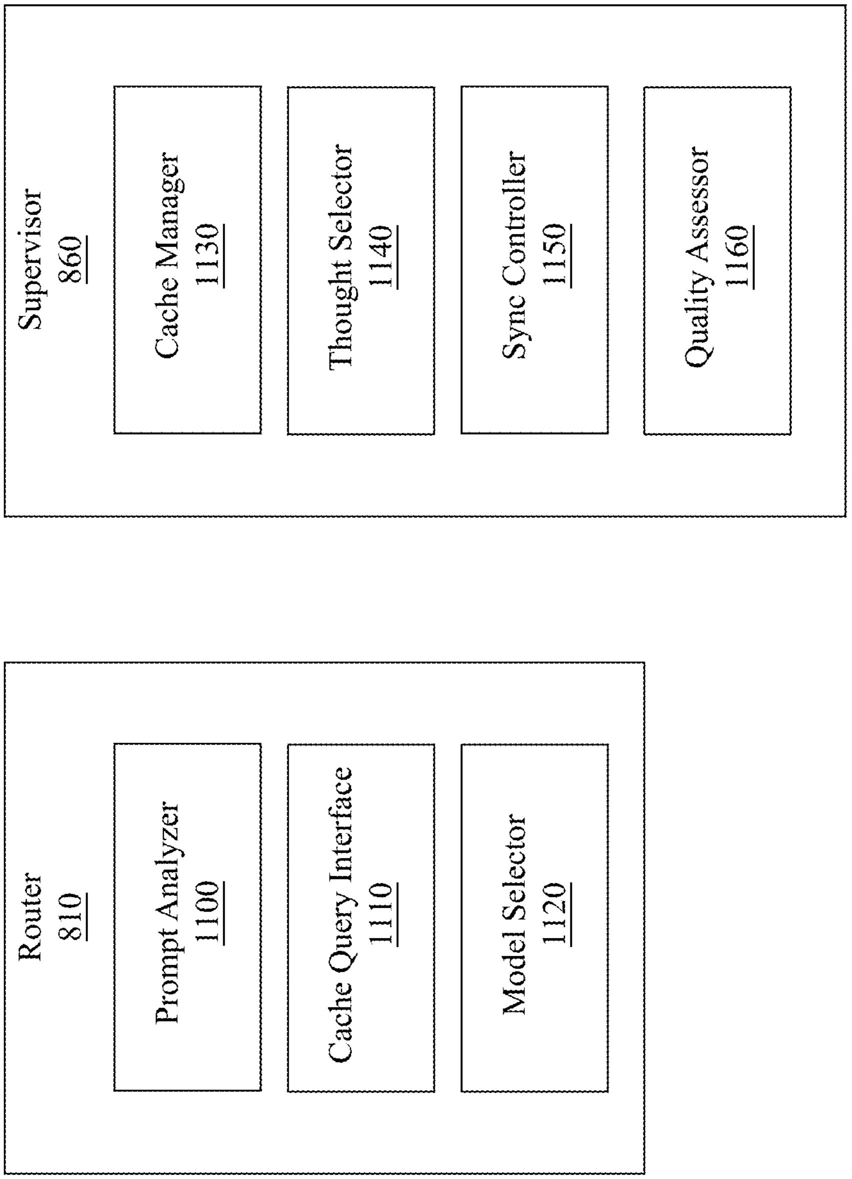
FIG. 11 is a block diagram illustrating exemplary components for a multi-state LLM with infinite context, a router and a controller.

FIG. 11 is a block diagram illustrating exemplary components for a multi-state LLM with infinite context, a router and a controller. A prompt analyzer 1100 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 1100 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 1110 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 1120 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 1120 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 1120 also maintains statistics about the effectiveness of its decisions to continuously refine its selection strategy and may implement different selection policies based on user preferences or application requirements.

A cache manager 1130 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 1130 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 1140 implements algorithms to identify and select the most relevant thoughts from the cache. It uses similarity metrics and relevance scoring to rank cached thoughts based on their applicability to the current prompt. For instance, when processing a prompt about quantum computing applications in cryptography, it might prioritize thoughts that bridge both quantum and cryptographic concepts. Thought selector 1140 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 1150 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 1150 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 1150 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 1150 can prioritize synchronization tasks based on thought importance, urgency, and resource availability.

A quality assessor 1160 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 1160 may employ multiple evaluation criteria including syntactic correctness, semantic coherence, factual accuracy, and practical utility. It maintains historical performance metrics for each thought, tracking success rates in different contexts and user satisfaction levels. Quality assessor 1160 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 1160 also provides detailed quality reports that can be used to guide cache maintenance operations and thought synthesis decisions, and it can trigger automatic thought improvement processes when quality metrics fall below acceptable thresholds.

Figure 12:
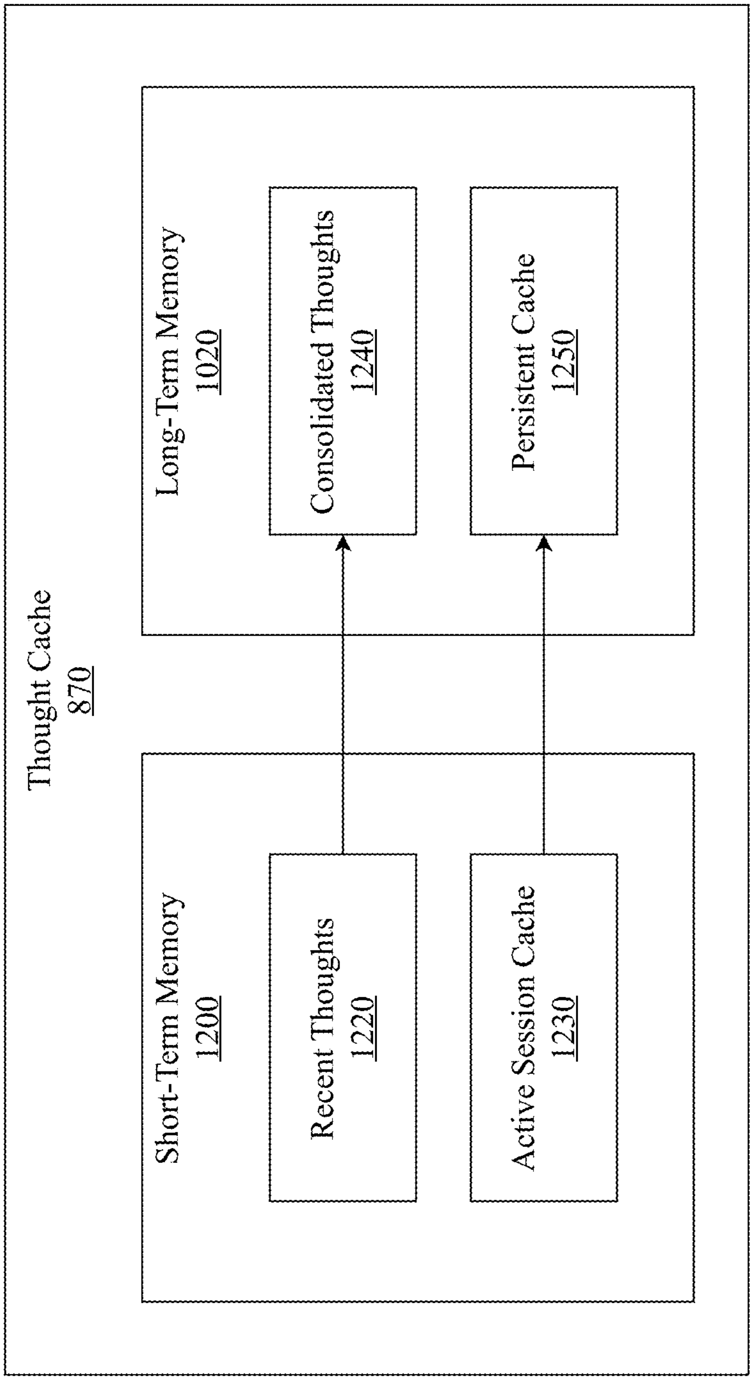
FIG. 12 is a block diagram illustrating an exemplary system architecture of a thought cache that has both a long-term memory and a short-term memory.

FIG. 12 is a block diagram illustrating an exemplary system architecture of a thought cache that has both a long-term memory and a short-term memory. In one embodiment, thought cache 870 represents a system for maintaining effectively unlimited context in language models through progressive compression and intelligent caching of thought patterns, enabling shared reasoning across multiple AI instances.

Thought cache 870 implements both a short-term memory 1200 and a long-term memory 1210. This dual-memory architecture enables the system to maintain both immediate computational context and historical reasoning patterns while managing computational resources efficiently.

The short-term memory 1200 comprises recent thoughts 1220 and an active session cache 1030. Recent thoughts 1220 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1230 provides rapid access to these thoughts and their associated states, optimizing performance for ongoing interactions and enabling immediate thought sharing between different AI instances or specialized reasoning modules operating within the same session.

The long-term memory 1210 implements a more sophisticated storage approach through consolidated thoughts 1240 and a persistent cache 1250. Consolidated thoughts 1240 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1250 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1220 to consolidated thoughts 1240 through progressive compression, while the active session cache 1230 can transfer frequently accessed patterns to the persistent cache 1250 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Description of Method Aspects

FIG. 14 is a flow diagram illustrating an exemplary method for implementing persistent cognitive computation through geometric representation and manipulation of thoughts within a dynamic latent manifold. In a first step 1400, receive an input from a user through an interface. This initial step establishes the entry point for external information into the cognitive process, where inputs may comprise natural language queries, multimodal data streams, commands, or any form of structured or unstructured information requiring cognitive processing. The interface serves as a bidirectional communication channel that not only receives inputs but maintains context from previous interactions, enabling coherent long-term dialogues where each new input can build upon established semantic foundations encoded within the geometric substrate.

In a step 1410, encode the input into a dynamic latent manifold characterized by an evolving geometric structure with variable curvature and time-dependent metric. This encoding process transforms raw external data into geometric representations within a high-dimensional space where semantic relationships are captured through curvature, distance, and topological features rather than static vector embeddings. The latent manifold operates as a living geometric substrate with a Riemannian or pseudo-Riemannian metric tensor that evolves based on usage patterns, wherein frequently accessed semantic regions develop distinct curvature characteristics that facilitate efficient navigation. The encoding respects existing manifold structure, placing new inputs in regions that maintain semantic coherence with previously encoded information while allowing the manifold itself to deform and adapt to accommodate novel concepts. This dynamic encoding ensures that the same input may be mapped to slightly different manifold locations at different times, reflecting the evolving understanding and context within the cognitive system.

In a step 1420, transform the encoded input into structured thought representations existing as persistent geometric regions within the latent manifold. Thoughts, as discrete units of reasoning or analysis generated during processing, are not mere points in space but extended geometric structures that may manifest as compact submanifolds, trajectories, or complex topological features. This transformation involves processing the encoded input through sophisticated algorithms that identify semantic components, establish relationships between concepts, and construct high-dimensional representations that capture not only explicit content but implicit contextual meanings and potential inferential pathways. The resulting thought structures exhibit internal geometry that reflects their semantic complexity, with simple atomic thoughts occupying relatively flat regions while complex structured thoughts may exhibit significant curvature and multi-dimensional extent. These thought representations become persistent features of the manifold, subject to future retrieval, recombination, and evolution through continued cognitive activity.

In a step 1430, compute trajectories through the latent manifold that minimize a cognitive cost function incorporating traversal effort and goal attraction. This computation implements geodesic attention, where focus or inference is achieved by computing minimal-energy paths through the manifold rather than discrete selection operations. The cognitive cost function balances multiple factors including kinetic energy that penalizes rapid shifts in attention, compression pressure derived from local semantic density that makes traversal through highly compressed regions more costly, and goal potential fields that create attractive forces toward relevant semantic areas. The trajectory computation employs variational principles to find paths that optimize this multi-factor cost function, resulting in smooth, continuous reasoning paths that respect the manifold's geometry while efficiently pursuing cognitive objectives. These trajectories may branch, merge, or exhibit complex topology depending on the interplay between manifold structure and goal requirements, enabling rich inferential patterns that go beyond linear reasoning chains.

In a step 1440, navigate computed trajectories through thought bundles comprising coherent submanifolds while retrieving relevant stored thoughts. Navigation involves traversing the computed paths while interacting with latent subspaces or thought bundles-localized, compressible regions containing structurally similar or semantically aligned thoughts. As trajectories pass through or near these bundles, relevant thoughts are activated and retrieved based on geometric proximity, semantic alignment, and contextual appropriateness. The navigation process respects bundle boundaries and internal structure, potentially following established paths within bundles that represent well-learned reasoning patterns or exploring novel connections between previously unrelated bundles. Retrieved thoughts contribute to the ongoing cognitive process, providing historical context, learned patterns, and relevant knowledge that enriches the current reasoning trajectory. This navigation implements a form of associative memory where retrieval is not based on exact matching but on geometric traversal through semantically organized space.

In a step 1450, execute autonomous manifold reorganization during idle periods through perturbation, recombination, and topological transformations. This dreaming process operates as a background mechanism for structural optimization and generalization discovery. Perturbation involves applying controlled stochastic variations to existing thought structures to test their stability and explore nearby semantic spaces. Recombination implements sophisticated interpolation and integration algorithms that synthesize new abstractions from existing thoughts, potentially discovering emergent patterns or generalizations not explicitly present in the original structures. Topological transformations may alter the fundamental connectivity of the manifold, creating new bridges between previously disconnected regions or splitting overly complex areas into more manageable components. These reorganization operations improve manifold efficiency, reduce redundancy, and enhance the system's capacity for creative inference and generalization, all while maintaining semantic coherence and preserving valuable learned structures.

In a step 1460, transform retrieved thoughts and reasoning paths from geometric representations back into interpretable outputs. This decoding process must interpret rich geometric information including positions within the manifold, traversed trajectories, local curvature contexts, and relationships between activated thought bundles. The transformation preserves not just the conclusions reached but the reasoning process itself, enabling explanatory outputs that reflect the structured path taken through semantic space. Decoding accounts for the multi-dimensional nature of thoughts, potentially generating outputs that capture nuanced relationships, conditional dependencies, and contextual qualifications that emerge from the geometric reasoning process. The decoded information maintains coherence with the original query while potentially introducing insights or connections discovered through manifold traversal that were not explicitly present in the input.

In a step 1470, generate a response while updating the manifold's geometry to reflect the interaction, shaping future cognitive pathways. Response generation synthesizes the decoded thoughts and reasoning paths into appropriate output formats while simultaneously modifying the underlying geometric substrate based on the completed cognitive cycle. Manifold updates may include but are not limited to strengthening frequently traversed paths through metric adjustment, increasing curvature around newly important semantic regions, establishing new connections between previously unrelated thoughts, and adjusting bundle boundaries to reflect evolved understanding. These geometric modifications ensure that future cognitive operations benefit from accumulated experience, with successful reasoning patterns becoming easier to traverse while maintaining flexibility for novel exploration. The bidirectional process of response generation and manifold update implements a form of continuous learning where each interaction contributes to the long-term evolution of the cognitive substrate, creating an increasingly sophisticated geometric landscape that embodies accumulated knowledge, learned patterns, and refined reasoning capabilities.

Figure 15:
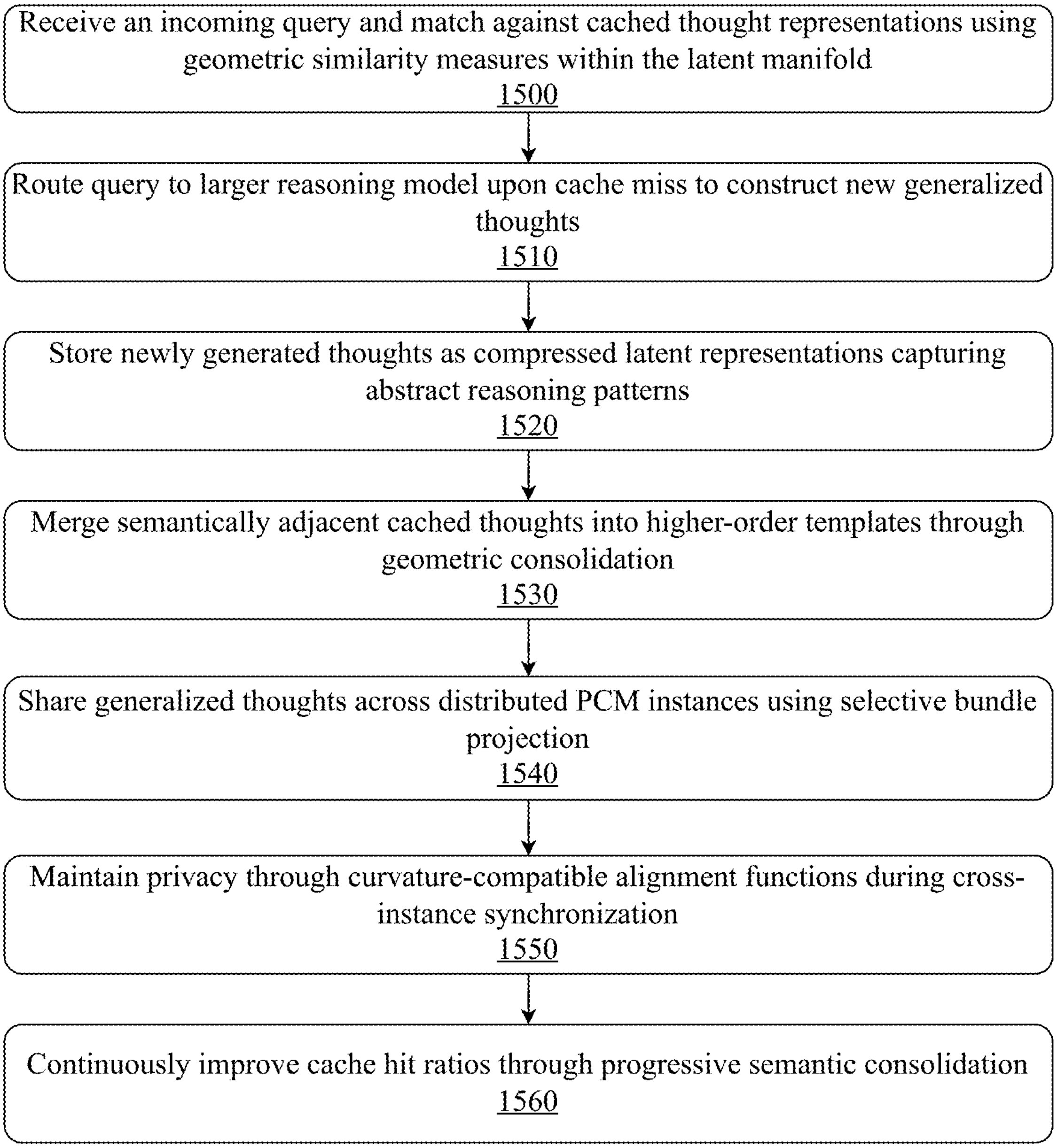
FIG. 15 is a flow diagram illustrating an exemplary method for implementing distributed thought caching with progressive generalization across multiple cognitive instances.

FIG. 15 is a flow diagram illustrating an exemplary method for implementing distributed thought caching with progressive generalization across multiple cognitive instances. In a first step 1500, receive an incoming query and match against cached thought representations using geometric similarity measures within the latent manifold. This initial matching process employs sophisticated geometric comparison techniques that go beyond simple vector similarity to evaluate semantic alignment within the curved space of the manifold. The thought cache, as a structured memory layer configured to store and retrieve thoughts based on semantic similarity, contextual alignment, or system policy, maintains indexed representations in latent space that can be accessed through multiple retrieval mechanisms. Geometric similarity measures account for manifold curvature, considering not just Euclidean distances but geodesic proximity that respects the semantic topology of the space. The matching process evaluates both direct similarity to individual cached thoughts and alignment with thought bundles or trajectories, enabling retrieval of relevant knowledge even when exact matches don't exist. This geometric matching approach allows for flexible retrieval that captures semantic relationships, analogical connections, and contextual relevance that would be missed by flat similarity metrics.

In a step 1510, route query to larger reasoning model upon cache miss to construct new generalized thoughts. When geometric matching fails to identify sufficiently relevant cached thoughts, the query triggers invocation of more comprehensive reasoning capabilities to generate new understanding. This routing decision is based on confidence thresholds that account for the quality of geometric matches, the specificity of the query, and the coverage of existing cached knowledge. The larger reasoning model processes the query with full computational resources, generating not just specific answers but generalized thoughts that capture abstract reasoning patterns suitable for future reuse. These newly constructed thoughts are designed from inception to be cacheable and generalizable, incorporating structured representations that encode not just conclusions but reasoning pathways, contextual dependencies, and semantic relationships that enable broad applicability across future queries.

In a step 1520, store newly generated thoughts as compressed latent representations capturing abstract reasoning patterns. The storage process implements sophisticated compression techniques that preserve essential semantic structure while reducing representational redundancy. Thoughts undergo geometric compression that identifies and preserves features such as key conceptual relationships, reasoning pathways that led to insights, contextual boundaries that define applicability, and connections to existing knowledge structures. The compressed representations maintain their geometric properties within the latent manifold, ensuring they can be properly integrated with existing cached thoughts and participate in future geometric operations. Compression occurs at multiple levels, from local optimization of individual thought representations to global reorganization of cache structure, ensuring efficient storage without loss of semantic fidelity or reasoning capability.

In a step 1530, merge semantically adjacent cached thoughts into higher-order templates through geometric consolidation. This merging process implements the generalization operation, synthesizing new thoughts from cached thoughts by identifying shared structure, meaning, or trajectory. The latent recombinator functionality examines geometric proximity and semantic alignment to identify candidates for consolidation, using criteria such as overlapping activation patterns, similar reasoning structures, compatible contextual constraints, and complementary knowledge domains. Geometric consolidation creates meta-thoughts that abstract common patterns while preserving distinctive features, employing manifold-aware interpolation techniques that respect curvature and maintain semantic coherence. The resulting higher-order templates serve as powerful generalizations that can match a broader range of future queries while maintaining specificity through parameterizable components that adapt to context.

In a step 1540, share generalized thoughts across distributed PCM instances using selective bundle projection. This sharing mechanism enables collaborative intelligence while respecting instance boundaries and privacy requirements. Selective bundle projection identifies portions of thought bundles suitable for sharing based on generalization level, privacy constraints, and cross-instance relevance. The projection process maps local geometric structures into a shared representational space that maintains semantic relationships while abstracting instance-specific details. Shared thoughts undergo geometric transformation that preserves their essential reasoning patterns and conceptual relationships while removing or generalizing contextual information tied to specific instances. This selective sharing enables different cognitive instances to benefit from collective learning without exposing sensitive or irrelevant local knowledge.

In a step 1550, maintain privacy through curvature-compatible alignment functions during cross-instance synchronization. Privacy preservation employs sophisticated geometric techniques that ensure knowledge sharing occurs at appropriate abstraction levels. Curvature-compatible alignment functions match geometric structures across instances while preventing reconstruction of detailed local information, using techniques such as differential privacy applied to manifold structures, homomorphic transformations that preserve reasoning capability while obscuring specific content, and selective geometric abstraction that shares patterns without revealing instances. The alignment process ensures that shared knowledge integrates properly with local manifold structures while maintaining boundaries that prevent unauthorized access to instance-specific information. This geometric approach to privacy enables rich knowledge sharing while providing mathematical guarantees about information disclosure limits.

In a step 1560, continuously improve cache hit ratios through progressive semantic consolidation. This ongoing optimization process analyzes cache performance metrics and identifies opportunities for structural improvement. Progressive consolidation examines patterns in cache hits and misses to identify frequently accessed semantic regions requiring enhanced representation, gaps in cached knowledge that lead to repeated cache misses, redundant representations that could be unified through further generalization, and emerging patterns in query streams that suggest new abstraction opportunities. The consolidation process operates continuously, making incremental improvements to cache structure through targeted operations such as merging highly correlated thoughts into unified representations, creating new intermediate abstractions that bridge frequently traversed semantic gaps, reorganizing bundle structures to improve retrieval efficiency, and pruning obsolete thoughts that no longer contribute to cache performance. This progressive refinement ensures that cache efficiency improves over time, with hit ratios increasing as the cache structure becomes better aligned with actual usage patterns and semantic requirements. The method creates a self-improving distributed knowledge system where each instance benefits from collective learning while maintaining autonomy and privacy through geometric abstraction principles.

FIG. 16 is a flow diagram illustrating an exemplary method for processing and integrating heterogeneous sensory data streams within a unified geometric cognitive framework. In a first step 1600, receive heterogeneous data streams including but not limited to visual, acoustic, textual, and sensor inputs. This reception process accommodates diverse information sources arriving asynchronously and in varying formats, encompassing traditional sensory modalities such as visual imagery with spatial and color information, acoustic signals containing temporal patterns and frequency spectra, textual data carrying symbolic and semantic content, as well as specialized sensor inputs including thermal readings, pressure measurements, electromagnetic signatures, and chemical compositions. The data streams may arrive at different rates, resolutions, and levels of completeness, requiring robust handling of partial information, noise, and temporal misalignment. Each modality brings unique information characteristics that must be preserved during initial processing while preparing for integration into a unified representational framework.

In a step 1610, encode each modality into unified latent hyperspace with distinct dimensional constraints (spectral, spatial, temporal, scale). This encoding process transforms diverse input modalities into a shared geometric representation while maintaining modality-specific properties through structured dimensional organization. Spectral dimensions capture frequency-domain characteristics including harmonic relationships in audio, color spectra in visual data, and oscillatory patterns in sensor readings. Spatial dimensions encode geometric relationships, topological structures, and positional information relevant to visual scenes, acoustic source localization, and distributed sensor networks. Temporal dimensions represent sequential dependencies, causal flows, and dynamic evolution patterns across all modalities. Scale dimensions enable hierarchical abstraction from fine-grained local details to global patterns and high-level semantic structures. The encoding process respects the intrinsic geometry of each modality while establishing cross-modal connections through shared latent regions, creating a rich multidimensional space where different sensory inputs can interact meaningfully while preserving their distinctive characteristics.

In a step 1620, perform geodesic traversal across multimodal manifold using modality-aware compression pressure fields. This traversal implements specialized navigation that accounts for the varying information density and semantic complexity across different modal regions of the manifold. Modality-aware compression pressure fields reflect the distinct compression characteristics of each sensory domain, with visual regions exhibiting high pressure around detailed textures and edges, acoustic regions showing compression around harmonic structures and temporal patterns, textual regions displaying semantic density around conceptual clusters, and sensor regions indicating measurement precision and uncertainty bounds. The geodesic paths computed through this multimodal landscape balance traversal costs across modalities, finding optimal routes that may transition between sensory domains when such transitions offer more efficient inference paths. The traversal process maintains awareness of modal boundaries and implements smooth transitions that preserve semantic continuity even when shifting between fundamentally different representational schemes.

In a step 1630, navigate between different modal representations while preserving semantic consistency. This navigation capability enables fluid movement across sensory boundaries without losing coherent meaning or breaking inferential chains. Cross-modal navigation employs geometric bridges that connect semantically related regions across different modalities, such as linking visual representations of objects with their acoustic signatures, textual descriptions with corresponding sensory patterns, and abstract concepts with their multimodal manifestations. The navigation process maintains semantic invariants during modal transitions through preservation of relational structures, contextual embeddings, and higher-order patterns that transcend individual modalities. Consistency preservation mechanisms ensure that conclusions drawn in one modality remain valid when translated to another, enabling robust reasoning that leverages the complementary strengths of different sensory channels while avoiding contradictions or semantic drift during cross-modal inference.

In a step 1640, define goal potential fields across multiple dimensions simultaneously to guide multimodal inference. This multidimensional goal specification creates complex potential landscapes that can express objectives spanning multiple sensory domains and abstraction levels. Goal potential fields may simultaneously specify visual targets such as specific object configurations or scene compositions, acoustic objectives including sound source identification or pattern matching, textual constraints defining semantic requirements or linguistic structures, and sensor thresholds establishing measurement criteria or anomaly boundaries. The simultaneous definition across dimensions enables rich goal specifications that capture the full complexity of multimodal objectives, creating gradient fields that guide attention and inference toward regions where multiple modal constraints are satisfied. These multidimensional potentials interact with the modality-specific compression fields to create nuanced cognitive dynamics where the path to goal satisfaction may involve strategic transitions between modalities based on information availability and inference efficiency.

In a step 1650, execute cross-modal bundle recombination during dreaming phases to create generalized multimodal representations. This dreaming process operates on the accumulated multimodal experiences to discover and reinforce cross-modal patterns and abstractions. During these phases, the method identifies thought bundles from different modalities that exhibit structural similarity or semantic alignment, applying sophisticated recombination algorithms that blend modal-specific features while preserving essential relationships. The recombination process creates meta-modal representations that capture invariant patterns across sensory domains, such as motion patterns that manifest similarly in visual and acoustic data, structural regularities that appear across multiple sensor types, and abstract concepts that find expression through various sensory channels. These generalized representations enable more efficient future processing by providing unified templates that can be instantiated across modalities, reducing redundancy and enabling rapid recognition of complex multimodal patterns.

In a step 1660, generate unified situational understanding by synthesizing information across all modalities. This synthesis process integrates the multimodal traversals, cross-modal navigations, and generalized representations into a coherent understanding that transcends individual sensory channels. The synthesis employs geometric integration techniques that combine information from different modal subspaces while respecting their relative reliabilities and complementary contributions. Unified understanding emerges from the convergence of multiple inferential paths through the multimodal manifold, where conclusions are reinforced by agreement across modalities or refined by modal-specific insights. The generated understanding maintains explicit representation of its multimodal foundations, enabling traceable reasoning that can identify which modalities contributed to specific conclusions and how cross-modal interactions influenced the final synthesis. This comprehensive situational awareness provides a rich, nuanced understanding that leverages the full spectrum of available sensory information while maintaining coherent semantic structure through geometric organization in the unified latent hyperspace.

FIG. 17 is a flow diagram illustrating an exemplary method for detecting anomalies within cognitive manifolds and efficiently transmitting information through bandwidth-constrained channels using geometric compression and reconstruction techniques. In a first step 1700, monitor local curvature variations and geodesic flow disruptions within thought bundles. This monitoring process continuously tracks the geometric health of the latent manifold by observing how information flows through established cognitive structures. Thought bundles, as localized compressible regions containing structurally similar or semantically aligned thoughts, exhibit characteristic flow patterns under normal conditions where geodesic paths follow predictable trajectories through well-formed semantic spaces. The monitoring examines multiple geometric indicators including the smoothness of attention vector fields as they traverse bundle boundaries, the stability of local metric tensors within bundle interiors, the consistency of parallel transport along established reasoning paths, and the convergence or divergence rates of nearby geodesic trajectories. Disruptions in these flow patterns signal potential anomalies that warrant deeper investigation, such as unexpected turbulence in normally laminar regions, discontinuities in otherwise smooth semantic transitions, or irregular divergence patterns that break established geometric regularities.

In a step 1710, identify regions exhibiting unexpected Ricci curvature patterns indicating potential anomalies. This identification process analyzes the compression pressure field $P(x)=-R(x)$, where $R(x)$ represents the Ricci scalar curvature, to detect deviations from expected geometric patterns. Under normal conditions, thought bundles exhibit predictable curvature signatures based on their semantic content and usage patterns, with frequently accessed concepts showing higher but stable curvature, specialized knowledge domains maintaining consistent intermediate curvature, and exploratory regions displaying lower, more uniform curvature distributions. Anomalous patterns manifest as sudden spikes in curvature without corresponding semantic justification, irregular curvature oscillations within previously stable regions, inverted curvature relationships where sparse regions show unexpected compression, or curvature voids where expected semantic density disappears. These unexpected patterns often indicate underlying issues such as corrupted thought structures, emergent conceptual conflicts, novel information requiring manifold adaptation, or systemic problems affecting geometric integrity.

In a step 1720, selectively encode only anomalous latent regions and their geometric context for transmission. This selective encoding process implements intelligent data reduction by focusing transmission resources exclusively on information-rich anomalous regions while omitting normal background structure. The encoding captures not just the anomalous points themselves but sufficient geometric context to enable meaningful interpretation, including local manifold topology surrounding the anomaly, curvature gradients extending from normal to anomalous regions, geodesic paths that connect anomalies to known reference structures, and boundary conditions that delineate anomalous from normal regions. The selective encoding employs sophisticated algorithms that determine optimal context boundaries by analyzing information gradients radiating from anomaly centers, semantic dependencies that link anomalies to broader cognitive structures, and geometric continuity requirements for accurate reconstruction. This approach dramatically reduces transmission requirements while preserving the essential information needed to understand and respond to detected anomalies.

In a step 1730, apply adaptive quantization based on anomaly severity and available bandwidth. This quantization process dynamically adjusts encoding precision to optimize the trade-off between transmission efficiency and anomaly representation fidelity. Severity assessment considers multiple factors including the magnitude of curvature deviation from expected norms, the spatial extent of the anomalous region within the manifold, the rate of change in geometric parameters, and potential impact on cognitive operations. High-severity anomalies receive fine-grained quantization that preserves subtle geometric features helpful for accurate analysis, while lower-severity deviations undergo coarser quantization that captures essential patterns without excessive detail. Bandwidth-aware adaptation continuously monitors available transmission capacity and adjusts quantization parameters in real-time, implementing progressive encoding schemes that transmit core anomaly features first followed by refinement data, variable bit allocation that assigns more resources to some geometric features, and temporal multiplexing that balances multiple anomaly streams based on relative priorities.

In a step 1740, transmit compressed anomaly data preserving geometric features. The transmission process employs specialized compression algorithms designed to maintain geometric integrity despite aggressive data reduction. Preserved features during compression include but are not limited to topological invariants that define anomaly structure, curvature signatures that characterize deviation patterns, geodesic connectivity that links anomalies to the broader manifold, and semantic anchors that provide interpretive context. Compression techniques leverage the inherent structure of geometric data through differential encoding that transmits changes rather than absolute values, manifold-aware transforms that exploit local geometric regularities, predictive coding based on normal manifold behavior, and entropy coding optimized for geometric data distributions. The transmission protocol may include error protection mechanisms weighted toward preserving geometric consistency, ensuring that reconstruction errors don't fundamentally alter anomaly interpretation.

In a step 1750, reconstruct full contextual understanding at receiving node using geometric interpolation. This reconstruction process rebuilds comprehensive anomaly context from the sparse transmitted data by leveraging knowledge of manifold structure and geometric principles. Geometric interpolation techniques employed include but are not limited to geodesic interpolation that fills gaps along natural manifold paths, curvature field reconstruction using partial differential equations, metric tensor completion based on smoothness constraints, and topology inference from boundary conditions. The reconstruction process is guided by prior knowledge of normal manifold behavior, enabling intelligent filling of untransmitted regions through reference to similar known structures, application of learned geometric regularities, and constraint satisfaction based on manifold consistency requirements. The reconstructed context provides sufficient detail to understand not just what anomalies occurred but their relationship to the broader cognitive landscape, enabling appropriate response strategies.

In a step 1760, infer missing information through geodesic completion algorithms leveraging manifold structure. This inference process goes beyond simple interpolation to actively reconstruct probable missing information based on deep understanding of manifold geometry and semantic relationships. Geodesic completion algorithms trace partial paths through the manifold and extend them according to learned trajectory patterns, identifying likely path continuations based on curvature flow, semantic coherence along extended paths, and convergence toward stable attractor regions. The algorithms leverage manifold structure through multiple mechanisms including bundle membership inference that assigns reconstructed regions to appropriate semantic clusters, cross-bundle connection discovery that identifies probable relationships between separated anomalous regions, and temporal evolution modeling that predicts how anomalies might develop over time. This inference capability enables the receiving node to develop actionable understanding from minimal transmitted data, supporting effective anomaly response even in severely bandwidth-constrained environments while maintaining the geometric and semantic integrity essential for meaningful cognitive processing.

FIG. 18 is a flow diagram illustrating an exemplary method for analyzing technological evolution through patent document corpora and forecasting future inventions by tracking geodesic trajectories through time-evolving latent manifolds. In a first step 1800, encode time-indexed patent document corpora into evolving latent spaces using sliding temporal windows. This encoding process transforms collections of patent documents organized by publication time into dynamic geometric representations that capture the evolution of technological innovation. The sliding temporal windows, such as three-month periods with one-month overlap, create a sequence of overlapping document sets that enable smooth tracking of invention progression while maintaining temporal continuity. Each window's corpus undergoes encoding through sophisticated natural language processing and semantic analysis that extracts not just keywords and classifications but deeper structural patterns including technological dependencies, conceptual relationships, innovation trajectories, and cross-domain influences. The encoding process generates high-dimensional latent representations that preserve the rich semantic structure of patent information while enabling geometric analysis of how technologies evolve and interact over time.

In a step 1810, extract manifold structures representing compressible invention patterns within each time window. This extraction process identifies coherent geometric structures within each temporal latent space that correspond to meaningful technological themes and innovation clusters. The manifold extraction employs dimensionality reduction and structure discovery techniques that reveal underlying patterns in the high-dimensional patent representations, identifying regions of dense innovation activity corresponding to hot technological areas, sparse regions indicating unexplored or emerging fields, curved paths connecting related inventions across domains, and topological features revealing innovation barriers or breakthroughs. Compressible patterns emerge where multiple patents share fundamental conceptual structures despite surface differences, enabling the identification of core technological principles that drive innovation within specific periods. The extracted manifolds capture not just static snapshots but the dynamic terrain of technological possibility within each time window.

In a step 1820, compute transition maps between adjacent temporal manifolds to track invention evolution. These transition maps capture how the landscape of innovation transforms from one time period to the next, encoding both gradual evolution and disruptive changes. The computation of transition maps involves sophisticated alignment algorithms that match corresponding structures across temporal boundaries while accounting for the emergence of novel concepts, the obsolescence of outdated technologies, the transformation of existing ideas into new forms, and the migration of innovations across domain boundaries. The maps are learned through analysis of patents that appear in overlapping windows, tracking how their latent representations shift as the surrounding technological context evolves. These transition operators encode the dynamics of technological progress, capturing patterns such as convergent evolution where disparate technologies merge, divergent innovation where single concepts spawn multiple directions, and paradigm shifts where entire regions of the manifold undergo radical transformation.

In a step 1830, identify invention families as geodesic trajectories through the evolving latent space. This identification process traces the paths of related inventions as they develop over time, revealing the continuous threads of innovation that connect early concepts to their mature realizations. Invention families manifest as geodesic trajectories. These trajectories exhibit characteristic properties including consistent directionality indicating focused technological development, smooth curvature reflecting incremental innovation, and branching patterns where core technologies spawn multiple applications. The geodesic nature of these paths reflects the principle of least action in innovation, where technological development tends to follow paths of minimal resistance through the space of possibilities. By analyzing these trajectories, the method reveals how inventions build upon predecessors, how technological capabilities accumulate over time, and how breakthrough innovations create new directions for future development.

In a step 1840, project novel invention clusters forward using learned transition operators. This projection employs the composed transition maps to extrapolate current innovation patterns into future time periods. The projection process identifies clusters of recent inventions representing technological frontiers and applies learned dynamics to predict their evolution. The forward projection accounts for multiple factors including momentum of current research directions, convergence patterns between previously separate fields, saturation effects in mature technological areas, and emergence of enabling technologies that open new possibilities. The projection generates future manifold regions that represent plausible technological landscapes, maintaining geometric consistency with historical patterns while allowing for novel combinations and breakthrough possibilities that respect the learned dynamics of innovation.

In a step 1850, sample points from projected future manifold regions to generate speculative inventions. This sampling process explores the predicted future technological landscape to identify specific innovation possibilities. Sampling strategies include but are not limited to focused sampling around high-potential regions identified through projection analysis, exploratory sampling in sparse areas representing untapped opportunities, interpolative sampling between projected clusters to identify bridging technologies, and perturbative sampling that tests variations on projected trajectories. Each sampled point represents a potential future invention embedded within the projected technological context. The sampling process maintains geometric coherence, ensuring that generated points respect the manifold structure and exhibit plausible relationships to projected innovation clusters. Multiple samples capture the range of possibilities within predicted technological domains, from incremental improvements to radical innovations.

In a step 1860, decode sampled points into hypothetical patent titles or abstracts representing technological forecasts. This decoding process transforms abstract geometric representations back into human-interpretable descriptions of potential future inventions. The decoder leverages the semantic structure preserved through the encoding and projection process to generate coherent technological concepts that reflect the position and context of each sampled point. Generated titles and abstracts maintain consistency with patent language conventions while introducing novel combinations of concepts that emerge from the geometric positioning within projected manifolds. The decoding process produces outputs that capture both the specific technical features suggested by the geometric location and the broader technological context implied by surrounding manifold structure. These hypothetical patents serve as concrete illustrations of predicted technological directions, providing actionable insights for research planning, investment strategies, and innovation policy.

In a step 1870, validate predictions through geodesic continuity and semantic coherence metrics. This validation ensures that forecasted inventions represent plausible technological developments rather than arbitrary extrapolations. Geodesic continuity validation verifies that predicted inventions lie along smooth extensions of historical innovation trajectories, maintaining consistent development patterns with established technological paths, exhibiting reasonable innovation velocities based on historical rates, and preserving topological relationships with existing technology clusters. Semantic coherence metrics evaluate whether predicted inventions maintain meaningful technological content through analysis of conceptual consistency with domain knowledge, technical feasibility given projected capabilities, market and application relevance, and compatibility with emerging technological ecosystems. The validation process provides confidence measures for each prediction, enabling prioritization of forecasts most likely to represent genuine future innovations. This systematic validation ensures that the method produces actionable technological intelligence grounded in rigorous analysis of innovation dynamics rather than speculative fantasy.

FIG. 19 is a flow diagram illustrating an exemplary method for implementing multi-level cognitive processing through hierarchically nested latent manifolds. In a first step 1900, establish multiple nested latent hyperspaces encoding cognitive abstractions at different conceptual scales. This establishment creates a hierarchical structure where each level represents a different granularity of cognitive representation. The highest levels encode broad abstract concepts, general principles, and overarching patterns that span multiple domains. Intermediate levels capture domain-specific knowledge, categorical relationships, and structured methodologies. Lower levels represent detailed implementations, specific instances, and concrete operational parameters. Each hyperspace maintains its own geometric structure with appropriate dimensionality for its abstraction level, where abstract spaces may have lower intrinsic dimension but higher curvature reflecting conceptual density, while detailed spaces exhibit higher dimension but flatter local geometry accommodating specific variations. The nesting relationship ensures that detailed thoughts exist within the scope of their governing abstractions, creating a natural hierarchy that mirrors how complex knowledge organizes from general principles to specific applications.

In a step 1910, maintain geometric relationships between nested manifolds through projection operators preserving semantic consistency. These projection operators map between different hierarchical levels while preserving essential semantic relationships and structural coherence. The operators implement sophisticated transformations that aggregate detailed information when projecting upward to abstract levels, capturing essential patterns while abstracting away specifics, and instantiate abstract concepts when projecting downward, generating plausible detailed realizations guided by higher-level constraints. Semantic consistency preservation ensures that meanings remain stable across levels through maintenance of relational structures between concepts, preservation of logical dependencies and constraints, and conservation of semantic distance relationships appropriately scaled for each level. The projection operators adapt dynamically as the manifolds evolve, learning from traversal patterns to improve cross-level mappings and maintaining homeomorphic relationships that prevent semantic drift during repeated projections.

In a step 1920, propagate goal potential fields downward through hierarchy while aggregating compression feedback upward. This bidirectional information flow creates a unified cognitive dynamics across all abstraction levels. Goal potential fields defined at abstract levels cascade downward through the hierarchy, becoming progressively more specific and actionable at each level. The downward propagation transforms high-level objectives into concrete subgoals, distributes potential gradients to guide detailed implementations, and maintains goal coherence while allowing level-appropriate interpretations. Simultaneously, compression pressure information aggregates upward from detailed levels, informing abstract levels about implementation complexity, resource constraints, and feasibility boundaries. This upward flow enables abstract reasoning to remain grounded in realistic constraints while providing feedback about which high-level approaches lead to tractable implementations. The bidirectional flow creates a dynamic equilibrium where abstract goals shape detailed actions while implementation realities inform strategic planning.

In a step 1930, navigate between abstraction levels using geometric bridges at manifold intersections. These bridges represent semantic connections that enable fluid movement between conceptual scales without discontinuous jumps. Navigation utilizes specialized geometric structures at level boundaries including transition zones where adjacent levels share overlapping representations, portal regions providing efficient access points between levels, and connector pathways that maintain semantic continuity during level transitions. The navigation process selects appropriate bridges based on current cognitive context, required level of detail, and semantic alignment with ongoing reasoning. Bridge traversal implements smooth interpolation between abstraction levels, gradually adjusting representational granularity, maintaining inferential coherence across transitions, and preserving relevant context while shifting focus. This enables cognitive processes to fluidly zoom in for detailed analysis or zoom out for strategic overview as needed by the task at hand.

In a step 1940, dynamically adjust operating level based on task complexity and required detail resolution. This adjustment mechanism continuously evaluates cognitive demands and selects the most appropriate hierarchical level for current processing. Task complexity assessment considers factors such as the breadth of domains involved requiring higher-level integration, the specificity of required outputs demanding detailed representation, the novelty of problems potentially requiring multiple levels, and time constraints favoring appropriate abstraction levels. The dynamic adjustment implements smooth transitions between levels rather than discrete switches, maintaining partial activation across multiple levels when tasks require integrated processing. The mechanism learns optimal level selection strategies through experience, developing heuristics for rapid level identification and maintaining statistics on task-level associations. This adaptive behavior ensures efficient cognitive resource utilization by operating at the simplest level sufficient for task requirements while enabling rapid escalation to more complex levels when needed.

In a step 1950, perform cross-level bundle reorganization during dreaming to optimize nested structure. This reorganization process operates during inactive periods to improve the hierarchical organization and cross-level connectivity. Bundle reorganization examines thought bundles across all levels to identify opportunities for better hierarchical alignment, including promoting frequently accessed detailed bundles to higher abstraction levels, decomposing overly complex abstract bundles into hierarchical components, and creating new intermediate levels when gaps in the hierarchy impede smooth navigation. The process implements sophisticated recombination algorithms that respect level-appropriate constraints while enabling creative restructuring. Cross-level optimization ensures that related concepts maintain appropriate geometric relationships across the hierarchy, frequently traversed paths between levels become more efficient, and the overall hierarchical structure evolves to match actual usage patterns. This dreaming-phase reorganization enables the hierarchical system to adapt its structure based on accumulated experience, becoming progressively more efficient at supporting the specific types of multi-level reasoning required by its task domain.

In a step 1960, enable seamless flow between abstract concepts and detailed implementations through geodesic pathways. This final step ensures that the hierarchical structure supports fluid cognitive movement across all conceptual scales. Geodesic pathways through the nested manifolds are computed to minimize traversal cost while maintaining semantic coherence, creating smooth reasoning chains that can start with high-level objectives and flow naturally to specific actions, or begin with detailed observations and ascend to general principles. These pathways leverage the optimized hierarchical structure to provide multiple routes between levels, enabling flexible reasoning strategies, redundant paths for robustness, and creative connections between previously unrelated concepts at different scales. The seamless flow supports various cognitive operations including top-down planning from strategy to tactics, bottom-up learning from examples to principles, middle-out reasoning that connects theory with practice, and lateral thinking that bridges across hierarchies. This comprehensive connectivity ensures that the hierarchical cognitive system can fluidly adapt its processing level to match task demands while maintaining the rich interconnections that enable sophisticated multi-scale reasoning.

FIG. 20 is a flow diagram illustrating an exemplary method for implementing reversible navigation within dynamic latent manifolds. In a first step 2000, maintain complete trajectory information during forward traversal through the latent manifold. This maintenance process creates a comprehensive record of the cognitive path taken, capturing not just the sequence of positions visited but the full geometric context of the traversal. The trajectory information includes but is not limited to the precise coordinates of each point along the path, the velocity and acceleration of attention movement, local curvature values and metric tensor components at each position, and the compression pressure and goal potential fields encountered. This detailed recording enables faithful reconstruction of the cognitive journey, preserving information about why specific paths were chosen, how attention flowed through different regions, what semantic relationships were activated, and which thought bundles were engaged during reasoning. The maintenance mechanism operates continuously during active cognition, creating a rich trace that serves as both a record of reasoning and a foundation for potential backtracking.

In a step 2010, store temporal snapshots of geometric states including curvature and bundle configurations. These snapshots capture the complete state of relevant manifold regions at specific time points, creating a temporal sequence that documents how the cognitive landscape evolves during reasoning. Each snapshot preserves local and global curvature patterns reflecting semantic density and relationships, thought bundle boundaries and internal structures, metric tensor values defining distance relationships, active attention fields and their flow patterns, and compression pressure distributions across the manifold. The storage mechanism implements efficient compression techniques that preserve essential geometric information while managing memory requirements through identification of state changes requiring full snapshots, incremental storage of modifications between snapshots, and hierarchical representation enabling multi-resolution retrieval. These temporal snapshots enable not just backtracking through a static landscape but navigation to previous manifold configurations even as the underlying structure continues to evolve.

In a step 2020, implement bidirectional attention fields supporting both forward exploration and reverse traversal. The attention vector field is enhanced to include reverse flow components that enable backward navigation along previously traversed paths. This bidirectional implementation maintains dual flow potentials at each manifold point, with forward components guided by goal attraction and exploration drives, and reverse components following stored trajectory gradients back toward previous positions. The field dynamics incorporate memory of past traversals, creating preferential flow channels along well-traveled paths while maintaining flexibility for deviation. The bidirectional nature enables smooth transitions between forward and backward navigation, supporting cognitive operations such as retracing steps to reconsider alternatives, returning to decision points for different choices, and comparing forward predictions with backward reconstructions. The implementation ensures that reverse traversal respects the evolved manifold geometry rather than simply replaying stored coordinates.

In a step 2030, create geometric anchors at various decision points in reasoning paths. These anchors mark significant locations in the cognitive journey where important choices were made, multiple paths diverged, or key insights emerged. Anchor creation identifies points through analysis of trajectory bifurcations indicating choice points, local extrema in goal potential suggesting achievement milestones, curvature anomalies marking conceptual transitions, and high compression pressure regions requiring significant cognitive effort. Each anchor stores comprehensive local state information including the complete geometric configuration, available path options and their initial directions, decision criteria and goal states active at that point, and semantic context explaining the significance of the location. These anchors serve as cognitive waypoints that enable efficient navigation to important reasoning states without requiring full trajectory replay, supporting operations like returning to reconsider major decisions or comparing outcomes from different choice branches.

In a step 2040, enable exact backtracking by inverting geometric flow dynamics through stored trajectories. This inversion process reverses the mathematical operations that generated forward motion, creating precise backward paths through the evolved manifold. The flow inversion accounts for the original geodesic equations by reversing time parameters, the influence of compression pressure and goal fields by negating their gradients, the effects of manifold evolution by applying inverse transformations, and the accumulation of path-dependent modifications. The backtracking mechanism enables exact retracing even through complex geometric regions including high-curvature zones where forward paths strongly converged, bifurcation regions where choices were made, and dynamically evolved areas where the manifold has changed. This precise reversal capability ensures that cognitive exploration can be truly reversible, enabling confident speculation knowing that return to stable states is guaranteed.

In a step 2050, preserve semantic relationships during temporal manifold evolution through consistency constraints. As the manifold evolves through use and learning, this preservation mechanism ensures that semantic meanings remain stable enough to support meaningful backtracking. Consistency constraints maintain topological relationships between thought bundles, relative distance orderings between related concepts, essential curvature patterns that define semantic regions, and geodesic connections between ideas. The preservation process implements sophisticated transformation tracking that records how manifold regions evolve over time, applies compensating adjustments during backtracking to account for evolution, and maintains semantic anchors that provide stable reference points. This enables navigation to previous cognitive states even when the underlying geometry has been modified by intervening learning and adaptation, ensuring that backtracking arrives at semantically equivalent rather than merely geometrically identical states.

In a step 2060, support speculative exploration with ability to return to stable cognitive states. This capability enables bold cognitive ventures into uncertain or potentially unstable regions while maintaining safety through guaranteed return paths. Speculative exploration is facilitated through creation of temporary manifold branches for experimental reasoning, suspension of normal stability constraints during exploration, monitoring of cognitive health metrics during speculation, and automatic triggering of return navigation if instability is detected. The return mechanism provides rapid retreat to the nearest stable anchor point, gradual unwinding of speculative modifications, and preservation of valuable discoveries while discarding unstable structures. This creates a cognitive sandbox where novel connections can be explored, unconventional reasoning paths can be tested, and creative insights can emerge, all while maintaining the security of proven stable states.

In a step 2070, maintain beneficial manifold modifications while enabling selective reversal to previous states. This final step implements intelligent preservation of positive changes discovered during exploration while still enabling return to earlier configurations. The selective reversal mechanism analyzes modifications made during forward traversal to identify beneficial changes such as new connections that improve reasoning efficiency, compressed representations that reduce cognitive load, discovered shortcuts between previously distant concepts, and refined curvature patterns that better capture semantic relationships. During reversal operations, the method preserves these beneficial modifications by maintaining them as overlays on reversed base geometry, creating parallel path options that include improvements, and marking enhanced regions for integration into the stable manifold. This selective approach ensures that the cognitive system continuously improves through exploration while maintaining the ability to recover from unsuccessful ventures, creating an optimal balance between stability and adaptability in the evolving geometric substrate of thought.

Hardware Architecture

Figure 38:
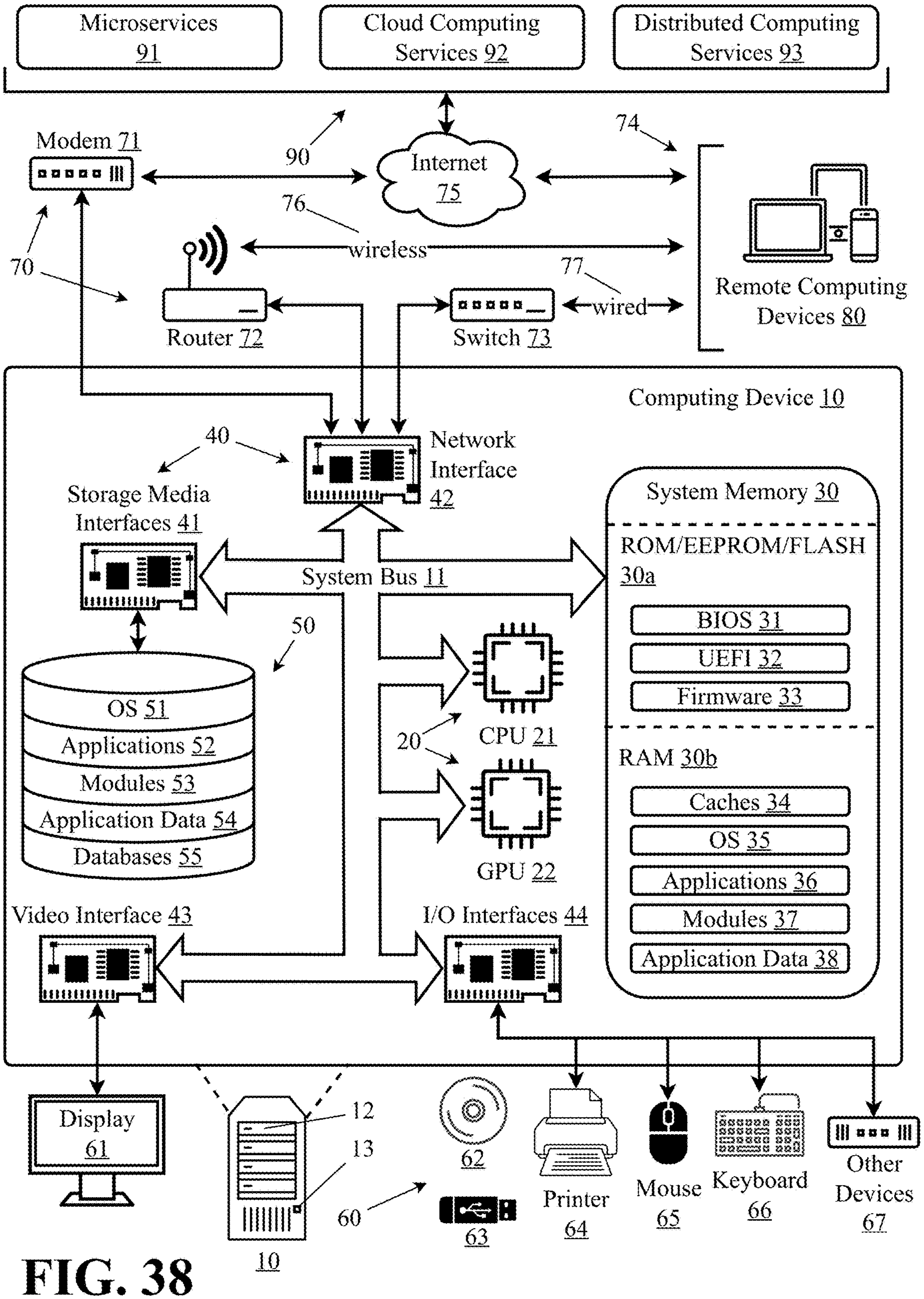
FIG. 38 illustrates an exemplary computing environment on which an embodiment described herein may be implemented.

FIG. 38 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM(VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A scalable expert foundry computing system using hierarchical supervisory networks comprising:

- a plurality of expert domains, each expert domain comprising:
  - a geometric manifold substrate configured to represent domain-specific knowledge as persistent geometric structures within a latent hyperspace that evolves from a vacuum state through critical density phase transitions; and
  - manifold-based reasoning capabilities configured to process queries through geodesic trajectory computation within the geometric manifold substrate;
- a hierarchical supervisory network comprising:
  - a plurality of domain supervisors, each configured to monitor statistical observables including cache hit rates, distance distribution shifts, and trajectory coherence metrics for a corresponding expert domain;

at least one cross-domain coordinator configured to orchestrate inter-domain communication through geometric abstraction protocols that preserve semantic integrity; and an executive manifold supervisor configured to implement second-order control architecture by tracking operator sequences across domains and identifying generalizable control patterns through reuse-based geometric principles;

a knowledge transfer system configured to transfer learned insights between expert domains using manifold projection and metric alignment techniques;

a query routing system configured to classify incoming queries and route them to appropriate expert domains based on semantic similarity analysis; and a response aggregation system configured to synthesize outputs from multiple expert domains when cross-domain consultation is required, implementing geometric interpolation techniques to create unified responses that preserve semantic integrity of individual domain contributions.

2. The system of claim 1, wherein each expert domain is configured to undergo bootstrapping from a vacuum state latent hyperspace to an operational manifold through accumulation of thought trajectories until critical density thresholds are achieved, triggering phase transition to structured cognitive geometry.

3. The system of claim 1, wherein the geometric manifold substrate of each expert domain is configured to undergo phase transition from vacuum state latent hyperspace to operational manifold when thought trajectory reuse density exceeds a critical threshold, triggering curvature emergence and attractor formation.

4. The system of claim 1, wherein the knowledge transfer system is configured to extract transferable geometric structures from source domains through geometric abstraction, compute transformations between source and target metric spaces using manifold alignment algorithms, and validate transfer effectiveness through semantic consistency verification.

5. The system of claim 1, wherein the executive manifold supervisor is configured to track operator sequences used across domains, identify successful control patterns that can be generalized, and facilitate development of meta-cognitive capabilities through reuse-based geometric principles.

6. The system of claim 1, further comprising a statistical observables monitoring system configured to measure expert domain maturity using cache hit rates, distance distribution shifts, trajectory coherence metrics, and reuse density patterns to validate operational readiness.

7. The system of claim 1, wherein the query routing system implements multi-stage classification using semantic embeddings and cosine similarity calculations against domain centroids, with similarity thresholds determining single-domain routing versus multi-domain consultation requirements.

8. The system of claim 1, wherein the response aggregation system implements confidence-weighted semantic fusion using manifold maturity indices, historical accuracy rates, and semantic relevance scores to resolve conflicts between domain responses.

9. The system of claim 1, wherein the executive manifold supervisor is configured to implement coordinated dreaming across the hierarchical supervisory network during reduced activity periods, enabling meta-cognitive reorganization through geometric restructuring of second-order control trajectories.

10. The system of claim 1, wherein the statistical observables monitoring comprises computing curvature-induced distance distribution shifts from log-normal patterns in pre-critical states to bimodal patterns in post-critical states as an indicator of manifold maturity and operational readiness.

11. A method for operating a system, the method comprising the steps of:

maintaining a plurality of expert domains, each expert domain comprising:

a geometric manifold substrate configured to represent domain-specific knowledge as persistent geometric structures within a latent hyperspace that evolves from a vacuum state through critical density phase transitions; and manifold-based reasoning capabilities configured to process queries through geodesic trajectory computation within the geometric manifold substrate;

monitoring statistical observables including cache hit rates, distance distribution shifts, and trajectory coherence metrics for each expert domain using a corresponding domain supervisor within a hierarchical supervisory network;

orchestrating inter-domain communication through geometric abstraction protocols that preserve semantic integrity using at least one cross-domain coordinator;

implementing second-order control architecture by tracking operator sequences across domains and identifying generalizable control patterns through reuse-based geometric principles using an executive manifold supervisor;

transferring learned insights between expert domains using manifold projection and metric alignment techniques while preserving semantic integrity and privacy boundaries;

classifying incoming queries and routing them to appropriate expert domains based on semantic similarity analysis; and synthesizing outputs from multiple expert domains when cross-domain consultation is required using geometric interpolation techniques to create unified responses that preserve semantic integrity of individual domain contributions.

12. The method of claim 11, further comprising bootstrapping each expert domain from a vacuum state latent hyperspace to an operational manifold by accumulating thought trajectories until critical density thresholds are achieved, thereby triggering phase transition to structured cognitive geometry.

13. The method of claim 11, further comprising undergoing phase transition from vacuum state latent hyperspace to operational manifold when thought trajectory reuse density exceeds a critical threshold, thereby triggering curvature emergence and attractor formation within the geometric manifold substrate of each expert domain.

14. The method of claim 11, wherein transferring learned insights comprises extracting transferable geometric structures from source domains through geometric abstraction, computing transformations between source and target metric spaces using manifold alignment algorithms, and validating transfer effectiveness through semantic consistency verification.

15. The method of claim 11, further comprising the steps of:

tracking operator sequences used across domains;

identifying successful control patterns that can be generalized; and facilitating development of meta-cognitive capabilities through reuse-based geometric principles using the executive manifold supervisor.

16. The method of claim 11, further comprising the step of measuring expert domain maturity using cache hit rates, distance distribution shifts, trajectory coherence metrics, and reuse density patterns to validate operational readiness.

17. The method of claim 11, wherein classifying incoming queries comprises implementing multi-stage classification using semantic embeddings and cosine similarity calculations against domain centroids, with similarity thresholds determining single-domain routing versus multi-domain consultation requirements.

18. The method of claim 11, wherein synthesizing outputs comprises implementing confidence-weighted semantic fusion using manifold maturity indices, historical accuracy rates, and semantic relevance scores to resolve conflicts between domain responses.

19. The method of claim 11, further comprising implementing coordinated dreaming across the hierarchical supervisory network during reduced activity periods, enabling meta-cognitive reorganization through geometric restructuring of second-order control trajectories using the executive manifold supervisor.

20. The method of claim 11, further comprising computing curvature-induced distance distribution shifts from lognormal patterns in pre-critical states to bimodal patterns in post-critical states as an indicator of manifold maturity and operational readiness during the statistical observables monitoring.

* * * * *